(12) United States Patent
Lavender et al.

(10) Patent No.: US 9,100,547 B2
(45) Date of Patent: Aug. 4, 2015

(54) ACCESSING BROADCAST MEDIA

(75) Inventors: Ben Lavender, Oxford (GB); Priya Prakash, London (GB); Jae K Lee, London (GB); Anthony Ageh, London (GB)

(73) Assignee: BRITISH BROADCASTING CORPORATION, London (GB)

( * ) Notice: Subject to any disclaimer, the term of this patent is extended or adjusted under 35 U.S.C. 154(b) by 1386 days.

(21) Appl. No.: 11/630,516

(22) PCT Filed: Jun. 21, 2005

(86) PCT No.: PCT/GB2005/002437
§ 371 (c)(1),
(2), (4) Date: Jan. 15, 2008

(87) PCT Pub. No.: WO2005/125200
PCT Pub. Date: Dec. 29, 2005

(65) Prior Publication Data
US 2009/0007198 A1    Jan. 1, 2009

(30) Foreign Application Priority Data

Jun. 21, 2004 (GB) .................................. 0413858.3

(51) Int. Cl.
*H04N 7/173* (2011.01)
*H04N 7/16* (2011.01)
(Continued)

(52) U.S. Cl.
CPC ............ *H04N 7/163* (2013.01); *H04N 21/2181* (2013.01); *H04N 21/4331* (2013.01); *H04N 21/4667* (2013.01); *H04N 21/632* (2013.01)

(58) Field of Classification Search
CPC .......... H04N 21/2221; H04N 21/2347; H04N 21/2351; H04N 21/2407; H04N 21/2223; H04N 21/25816; H04N 21/25875; H04N 21/4182; H04N 21/4415; H04N 21/441; H04N 21/2181; H04N 21/2225
USPC ........ 713/193; 725/91–93, 44, 52, 59, 51, 87, 725/115, 116, 121, 111, 36, 145, 49
See application file for complete search history.

(56) References Cited

U.S. PATENT DOCUMENTS 5,751,282 A    5/1998  Girard et al.
5,774,552 A    6/1998  Grimmer
(Continued)

FOREIGN PATENT DOCUMENTS

EP    1 168 835 A2    1/2002
EP    1244309         9/2002
(Continued)

OTHER PUBLICATIONS

UK Search Report dated Aug. 30, 2005, for GB0512645.3 (priority application).
(Continued)

*Primary Examiner* — Nasser Goodarzi
*Assistant Examiner* — An Nguyen
(74) *Attorney, Agent, or Firm* — Finnegan, Henderson, Farabow, Garrett & Dunner, LLP

(57) ABSTRACT

This invention relates to a system (2000) for providing individual users access to audio/visual content which has been broadcast to a plurality of users on a scheduled basis. The system comprises means for storing the content, means for enabling a user to download the content in the form of a downloadable file, and means for enabling a user to view the content by opening and playing the downloaded file. The means for opening and playing the downloaded file preferably being adapted to open and/or play the downloaded file only within a fixed time period after the scheduled broadcast time of the content.

37 Claims, 88 Drawing Sheets

(51) Int. Cl.
*H04N 21/218* (2011.01)
*H04N 21/433* (2011.01)
*H04N 21/466* (2011.01)
*H04N 21/63* (2011.01)

(56) References Cited

U.S. PATENT DOCUMENTS

| | | | |
|---|---|---|---|
| 6,012,086 A * | 1/2000 | Lowell | 709/218 |
| 6,192,131 B1 | 2/2001 | Geer, Jr. et al. | |
| 6,423,892 B1 | 7/2002 | Ramaswamy | |
| 6,427,149 B1 | 7/2002 | Rodriguez et al. | |
| 6,507,951 B1 * | 1/2003 | Wugofski | 725/59 |
| 6,574,609 B1 | 6/2003 | Downs et al. | |
| 6,742,184 B1 | 5/2004 | Finseth et al. | |
| 2001/0001014 A1 * | 5/2001 | Akins et al. | 380/241 |
| 2001/0034610 A1 * | 10/2001 | Black | 705/1 |
| 2002/0011988 A1 | 1/2002 | Sai et al. | |
| 2002/0040326 A1 | 4/2002 | Spratt | |
| 2002/0049679 A1 * | 4/2002 | Russell et al. | 705/52 |
| 2002/0091943 A1 * | 7/2002 | Lau | 713/201 |
| 2002/0138593 A1 * | 9/2002 | Novak et al. | 709/219 |
| 2002/0156546 A1 | 10/2002 | Ramaswamy | |
| 2002/0194601 A1 * | 12/2002 | Perkes et al. | 725/44 |
| 2003/0028889 A1 * | 2/2003 | McCoskey et al. | 725/91 |
| 2003/0046238 A1 | 3/2003 | Nonaka et al. | |
| 2003/0066074 A1 | 4/2003 | Zimmerman et al. | |
| 2003/0069964 A1 | 4/2003 | Shteyn et al. | |
| 2003/0088768 A1 | 5/2003 | Challener | |
| 2003/0095791 A1 | 5/2003 | Barton et al. | |
| 2003/0101456 A1 | 5/2003 | Park et al. | |
| 2003/0126086 A1 | 7/2003 | Safadi | |
| 2003/0126608 A1 | 7/2003 | Safadi et al. | |
| 2003/0163684 A1 | 8/2003 | Fransdonk | |
| 2003/0163823 A1 | 8/2003 | Logan et al. | |
| 2003/0208767 A1 * | 11/2003 | Williamson et al. | 725/93 |
| 2003/0237097 A1 | 12/2003 | Marshall et al. | |
| 2004/0003403 A1 | 1/2004 | Marsh | |
| 2004/0055007 A1 | 3/2004 | Allport | |
| 2004/0117837 A1 | 6/2004 | Karaoguz et al. | |
| 2004/0167984 A1 * | 8/2004 | Herrmann | 709/229 |
| 2004/0172376 A1 * | 9/2004 | Kobori et al. | 707/1 |
| 2005/0102528 A1 * | 5/2005 | Tan et al. | 713/193 |
| 2005/0160461 A1 * | 7/2005 | Baumgartner et al. | 725/52 |
| 2006/0010470 A1 | 1/2006 | Kurosaki et al. | |

FOREIGN PATENT DOCUMENTS

| | | |
|---|---|---|
| EP | 1278330 | 1/2003 |
| GB | 2 380 352 A | 4/2003 |
| GB | 2 398 955 A | 9/2004 |
| JP | 2003018514 | 1/2003 |
| WO | WO98/26584 | 6/1998 |
| WO | WO99/45700 | 9/1999 |
| WO | WO 00/59222 | 10/2000 |
| WO | WO 0058811 | 10/2000 |
| WO | WO 0106701 | 1/2001 |
| WO | WO 0163433 | 8/2001 |
| WO | WO 0186842 | 11/2001 |
| WO | WO 02/01871 A1 | 1/2002 |
| WO | WO 02/39738 A1 | 5/2002 |
| WO | WO 02/45316 A2 | 6/2002 |
| WO | WO03/043333 | 5/2003 |
| WO | WO03/045058 | 5/2003 |
| WO | WO 03079269 | 9/2003 |
| WO | WO03/093965 | 11/2003 |
| WO | WO 03/098446 A1 | 11/2003 |
| WO | WO 2004/049692 A2 | 6/2004 |
| WO | WO 2004/064296 A2 | 7/2004 |

OTHER PUBLICATIONS

UK Search Report dated Jun. 17, 2005, for GB0413854.1 (priority application).
UK Search Report dated Jun. 20, 2005, for GB0413856.6 (priority application).
UK Search Report dated Jun. 17, 2005, for GB0413848.3 (priority application) (6 pages).
P. Ricardo, International Search Report for PCT/GB2005/002437, dated Apr. 18, 2006.
Faculty of EEMCS, "Comprising Logic-based and XML-based Rights Expression Languages" pp. 1-40.
ContentGuard, Inc., "Profiling MPEG Rights Expression Language: Concept, Approach and Applications" (2003) pp. 1-13.
Robby Robson, "The Teach Act and the MPEG Rights Expression Language" (Jan. 11, 2003). pp. 1-19.
Renato Iannelia, "Open Digital Rights Language (ODRL)" Version 1.1 (Sep. 19, 2002) pp. 1-72.
Microsoft "Windows Media Rights Manager SDK", Version 7 (2007) pp. 1-3.

* cited by examiner

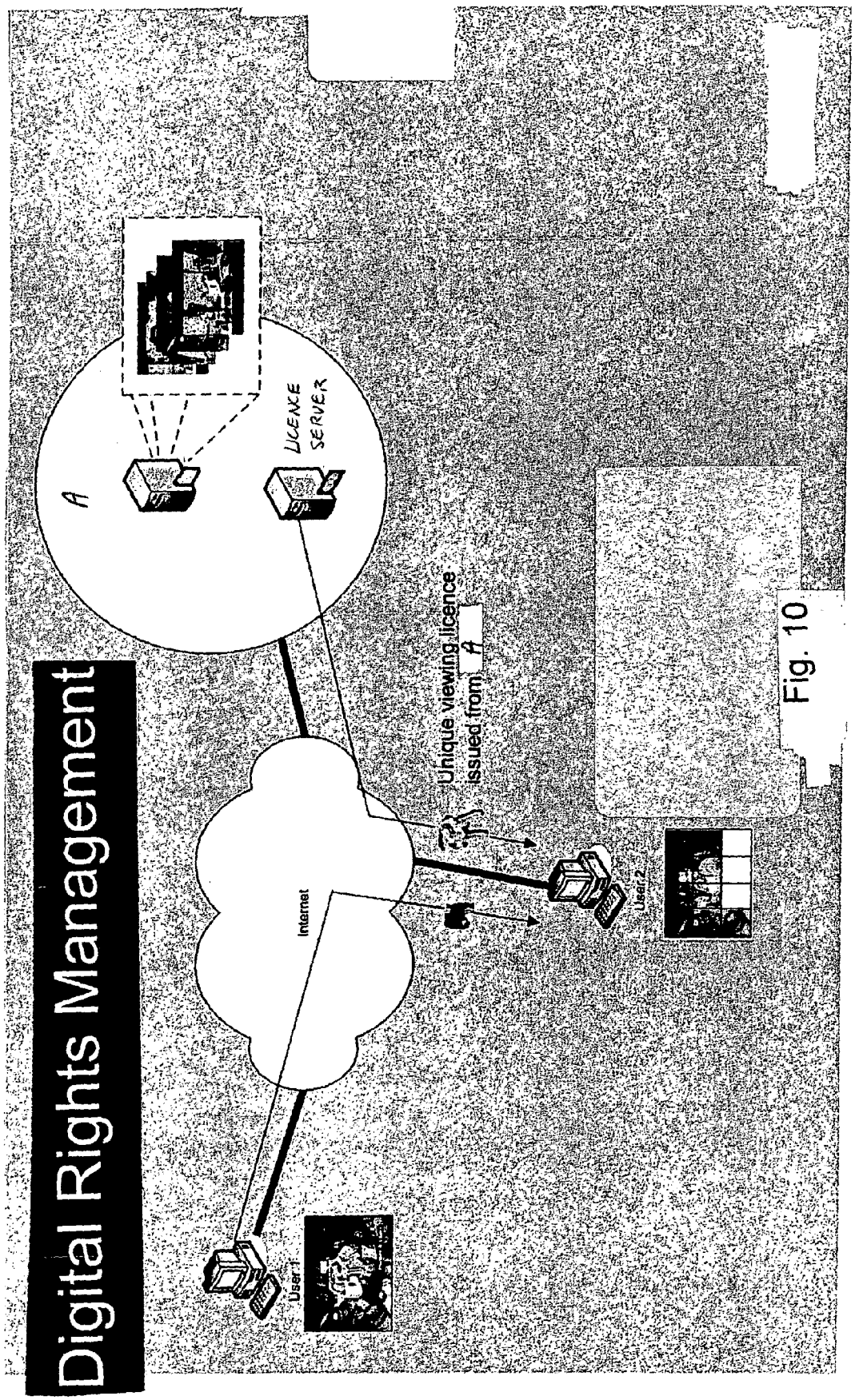

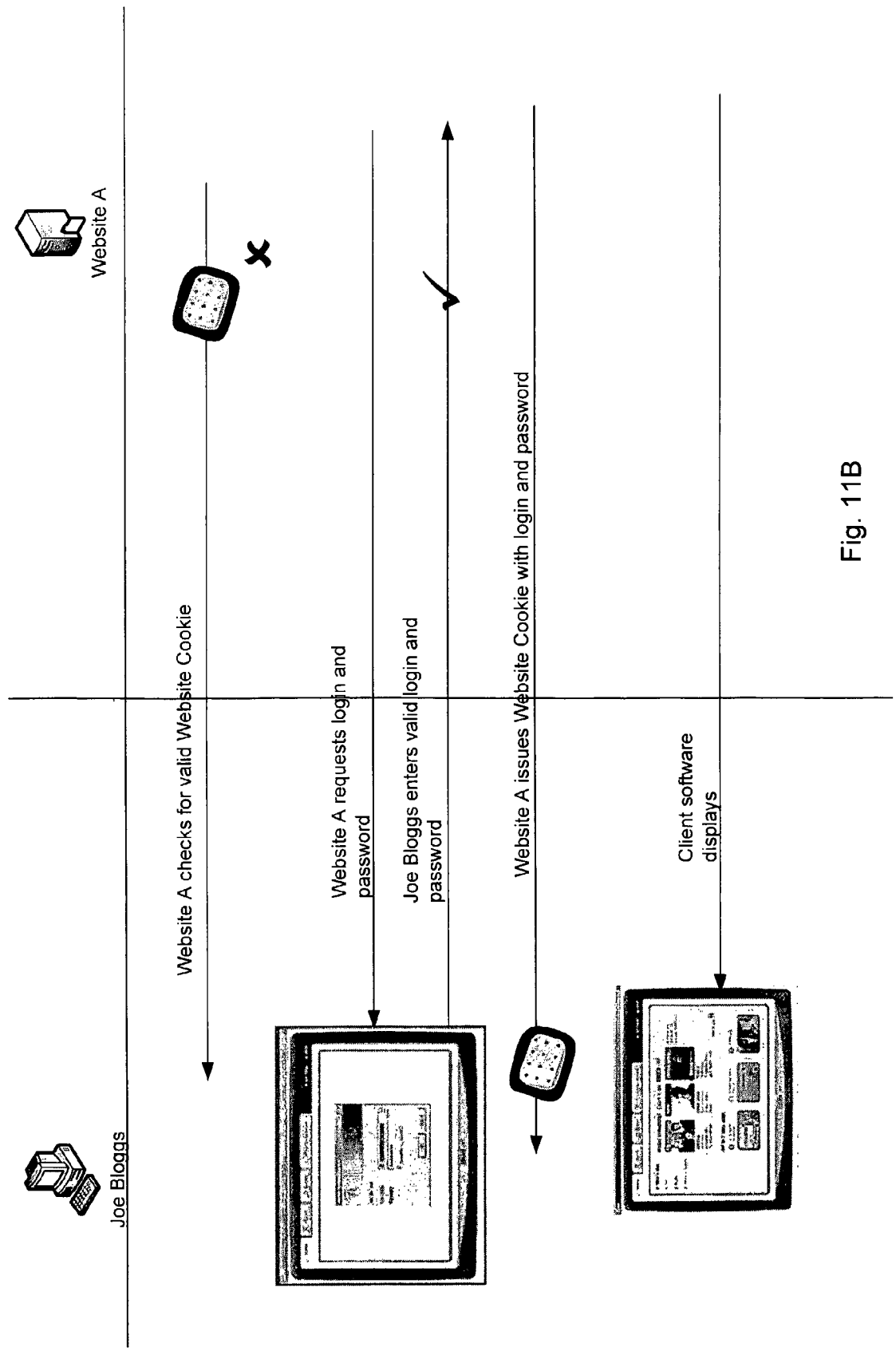

ACCESSING BROADCAST MEDIA

The present invention relates to the accessing of broadcast media. Aspects of the invention relate to systems for providing access to broadcast media content, a media player, a replay system, and software embodied in forms such as computer program products and signals for the aforementioned aspects. Further aspects of the invention relate to an electronic programme guide, a web-based interface, and software embodied in forms such as computer program products and signals for the aforementioned aspects.

The invention provides, in general terms, a system for replaying scheduled broadcast content, the system comprising means for storing said content and means for enabling a user to replay said content once it has been broadcast.

The present invention relates to two closely related aspects of the invention which relates to the accessing of broadcast media.

These two closely related aspects are the architecture of a system for providing access to broadcast media content, and the user interface to that system. The two related aspects are intended to describe one and the same content access system, with the architecture, described and defined in the first aspect, implementing the functionality to which the user interface, described and defined in the second aspect, provides access. Therefore, any, some and/or all features in one aspect can be applied to any, some and/or all features in the other aspect, in any appropriate combination. Purely by way of example, the user interface in the first aspect may be implemented in the form of the Electronic Programme guide in the second aspect, and the rolling time window in the second aspect may be applied to the listing of content for downloading and/or ordering described in the first aspect. In addition, the means for restricting access to content described in the first aspect may, for instance, be applied to the means for indicating the viewing rights associated with content.

It should also be appreciated that particular combinations of the various features described and defined in these two aspects of the invention can be implemented and/or supplied and/or used independently.

According to one aspect of the invention, there is provided a system for providing individual users access to audio/visual content which has been broadcast to a plurality of users on a scheduled basis, the system comprising means for storing the content, means for enabling a user to download the content, optionally in the form of a downloadable file, and means for enabling a user to view the content by opening and playing the downloaded file, the means for opening and playing the downloaded file optionally being adapted to open and/or play the downloaded file only within a fixed time period after the scheduled broadcast time of the content.

The means for storing the content may comprise a memory device, for instance a hard disk drive. The means for enabling a user to download the content may comprise a communication device, for instance a communication device adapted to connect to and communicate across a network. The means for opening and playing the downloaded file may comprise a processor, for instance a processor adapted to process audio-visual files, such as an MPEG 3 or MPEG 4 processor, or a media player incorporating such a processor.

In the context of the present document, a file is a self contained portion of data. In order to play content from a file containing the content, the file should be present in its entirety.

Preferably, the means for opening and playing the downloaded file is adapted to open and/or play the downloaded file only once the downloading of the file has been completed.

The downloading means may be adapted to download the content via a network, and the network may comprise a wide area network or an open IP network. The network may comprise at least part of the internet.

The content may be available for downloading in each of a plurality of different formats and/or in each of a plurality of different resolutions.

Preferably, the means for opening and playing the downloaded file is associated with a display or storage device, and the system comprises means for selecting the format or resolution in which the content is downloaded in dependence upon the type of display or storage device. The display or storage device may comprise one of:—a television, a portable computer, a desktop computer, a personal video recorder, a mobile phone, and a games console.

The means for selecting the format or resolution in which the content is downloaded may comprise a processor.

The audio/visual content may be televisual content which has been broadcast to a plurality of users as a scheduled television broadcast, preferably as a scheduled free-to-air television broadcast or as a scheduled webcast.

The audio/visual content may comprise subtitles and/or audio description, and preferably the means for opening and playing the downloaded file is adapted to display the subtitles and/or play the audio description in association with the viewing of the content, upon request of the user. That feature may be provided independently.

The system may comprise ordering means for enabling a user to order the download of content, and the ordering means may be adapted to enable a user to order via the internet the download of content.

The ordering means may comprise a processor.

Preferably the ordering means is adapted to enable a user to order within a time window the download of content, and the time window may be a time window around the scheduled broadcast time of the content.

The ordering means may be adapted to enable a user to order the download of content, in advance of the scheduled broadcast time of the content, and preferably within a fixed time period before the scheduled broadcast time of the content. The fixed time period before the scheduled broadcast time may be between 2 and 15 days, or between 5 and 10 days, and preferably is 7 days.

That feature may be provided independently. In a further aspect of the invention there is provided a system for providing individual users access to audio/visual content which has been broadcast to a plurality of users on a scheduled basis, the system comprising means for storing the content, ordering means for enabling a user to order the download of content, in advance of the scheduled broadcast time of the content, means for enabling a user to download the content, and means for enabling a user to view the content. Preferably the ordering means is adapted to enable a user or order content within a fixed time period before the scheduled broadcast time of the content. The fixed time period before the scheduled broadcast time may be between 2 and 15 days, or between 5 and 10 days, and preferably is 7 days.

The ordering means may be adapted to process an order for the download of content only after the broadcast of the content has commenced or only after the broadcast of the content has been completed.

Preferably the downloading means is adapted to download the content only after the broadcast of the content has commenced or only after the broadcast of the content has been completed.

The downloading means may be adapted to download the downloadable file before the scheduled broadcast of the content, in response to an order placed in advance of the scheduled broadcast time, and the means for opening and playing the downloaded file may be adapted to open and play the file only once the content has been broadcast, and preferably only after a delay after the content has been broadcast.

Preferably the ordering means is adapted to enable a user to order the download of the content after the scheduled broadcast of the content, and preferably for a fixed time period after the scheduled broadcast of the content. The fixed time period after the scheduled broadcast of the content may be, for instance, between 2 and 15 days, or between 5 and 10 days, or preferably is 7 days.

Series Download

The ordering means may be adapted to enable a user to order the download of a series of related content items.

Preferably the downloading means is adapted to download each of the series of related content items only after it has been broadcast.

The ordering means may be adapted to enable the user to order, before at least one of the series of related content items has been broadcast, the download of the series of related content items.

The ordering means may be adapted to enable the user to order, within a time window, the download of a series of related content items. That feature may be provided independently.

According to a further aspect of the invention there is provided a system for providing individual users access to audio/visual content which has been broadcast to a plurality of users on a scheduled basis, the system comprising means for storing the content, ordering means for enabling a user to order the download of content, means for downloading the content, and means for enabling a user to view the content, wherein the ordering means is adapted to enable the user to order, within a time window, the download of a series of related content items.

Preferably the time window extends to a fixed period of time after the broadcast of the last in the series of content items.

The system may further comprise local storage means for locally storing each of the series of related content items after it has been downloaded.

The local storage means may comprise a memory device, for instance a hard disk drive or a solid-state memory device.

In addition, the system may comprise a user interface adapted to display a list of the content items in the series of related content items which are stored in the local storage means and/or to display a list of the content items in the series of related content items which are available to download and/or which will be available to download.

Preferably the system further comprises means for managing locally stored content, adapted to overwrite at least one of the series of related content items with at least one other of the series of related content items.

The content management means may comprise a processor.

The content management means may be adapted to overwrite each of the series of related content items with the next of the series of related content items.

Preferably, the downloading means is adapted to download each of the series of related content items within a fixed time period after the respective scheduled broadcast of that related content item.

The series of related content items may be a series of television programmes.

Encoding/Access

The system may further comprise means for encoding the content, and the encoding means may be adapted to encode the content before the scheduled broadcast of the content.

The means for encoding the content may comprise an encoding device, for instance a processor running encoding software.

Preferably the encoding means is adapted to encode the content in real time during the scheduled broadcast of the content.

In particular, the encoding means may comprise Microsoft™ Windows Media Encoder.

The system may further comprise means for restricting access to the content.

The means for restricting access may comprise an encryption device, for instance a processor on which encryption software is installed, or a device operable to apply digital rights management processes.

Preferably the means for restricting access is adapted to restrict access in dependence upon the geographic location of the user, and the means for restricting access may be adapted to determine the geographic location of the user in dependence upon address information associated with the user.

Preferably the means for restricting access is adapted to determine the geographic location of the user in dependence upon an IP address associated with the user, and preferably is adapted to determine the geographic location of the user using a GeoIp procedure.

The means for restricting access to the content may be adapted to restrict or prevent playback of the content by a user, preferably by causing the means for opening and playing the downloaded file to be prevented from opening and/or playing the file or by causing the output from the means for opening and playing the downloaded file to be scrambled.

Preferably the means for restricting access is adapted to allow a user to replay the content for a fixed period of time following the scheduled broadcast of the content.

The means for restricting access may in particular be adapted to allow a user to replay the content for a certain period of time following the scheduled broadcast of the content, preferably for between 2 and 15 days, or for between 5 and 10 days, or for 7 days, following the scheduled broadcast of the content.

The means for restricting access may also be adapted to allow a user to replay the content a fixed number of times, preferably between 1 and 10 times, or between 3 and 5 times.

Preferably the means for restricting access is adapted to allow a user to replay the content a fixed number of times following the download of the content, and preferably said fixed number of times is between 1 and 10 times, or between 3 and 5 times.

The means for restricting access may comprises means for encrypting the content, and in that case the means for opening and playing the downloaded file may be adapted to decrypt the content.

Preferably the means for opening and playing the downloaded file is adapted to obtain a license or key to enable the decryption of the content. The license or key may enable a user to replay the content a fixed number of times or for a fixed period of time.

The system may also comprise local storage means for storing the downloaded file and for storing the license or key, and preferably the local storage means is adapted to store the license or key separately from the encrypted content.

Preferably the means for opening and playing the downloaded file is adapted to log on to a server to obtain the license or key.

The encrypting means may comprise Digital Rights Management (DRM) technology, preferably Microsoft Windows Media DRM software. The encrypting means may comprise public key encryption software.

In a preferred arrangement, the means for restricting access to content and the means for opening and playing the downloaded file are included in a media player. The media player may be implemented in software.

Local Storage

The system may comprise local storage means for storing content in the form of downloaded files. There may also be provided means for managing locally stored content.

Preferably the content management means comprises means for deleting content.

The content management means may be adapted to delete content once a fixed period of time for replaying the content has expired, or may be adapted to delete content once the content has been replayed an allowed number of times.

Preferably the system further comprise means for overwriting content items. The means for overwriting content items may be adapted to overwrite older related content items in a series with newer related content items in a series. The means for overwriting content items may comprise a processor.

The local storage means may be adapted to store a file containing a piece of content and to store a file containing data associated with the piece of content.

The associated data file may comprise subtitle data, and preferably the content management means comprises means for searching the associated data file for a requested search string. The searching means may comprise a processor.

Preferably the content management means comprises means for searching the locally stored content.

The local storage means may comprise a first local storage device, and the system may further comprise means for transferring content from the first local storage device to a second local storage device. The transferring means may comprise a communication device.

Preferably the system further comprises means for allocating memory to be used for the local storage of the downloaded content. The allocating means may comprise a processor.

The system may further comprise means for monitoring the memory occupied by the downloaded content. The monitoring means may comprise a processor.

Preferably the local storage means comprises a hard disk drive, for instance the hard disk drive of a personal computer.

Peer-to-peer

The downloading means may be adapted to download the downloadable file in parts and to combine the parts once downloaded, and preferably the downloading means is adapted to download the parts of the downloadable file out of order.

The means for storing the content may comprise a plurality of separate storage devices in different locations, and the downloading means may be adapted to download the content from any of the storage devices. Preferably the content stored in at least one of the storage devices is of broadcast quality and preferably originates directly from the same source as the content as broadcast.

According to a further aspect of the invention there is provided a system for providing individual users access to audio/visual content which has been broadcast to a plurality of users on a scheduled basis, the system comprising means for storing the content, means for enabling a user to download the content, and means for enabling a user to view the downloaded content within a fixed time period after the scheduled broadcast time of the content, wherein the means for storing the content comprises a plurality of separate storage devices in different locations, and the downloading means is adapted to download the content from any of the storage devices. Preferably the content stored in at least one of the storage devices is of broadcast quality and preferably originates directly from the same source as the content as broadcast.

Preferably the downloading means is adapted to download the content partially from one of the storage devices and partially from at least one other of the storage devices.

The downloading means may be adapted to download a part of the downloadable file from one of the storage devices and to download another part of the downloadable file from another of the storage devices.

At least one of the storage devices may comprise a storage device associated with another user, and may in particular comprise a hard disk drive of a personal computer associated with the another user.

The system may be adapted to store and/or download content using a Peer-to-Peer (P2P) technique.

The system may comprise Kontiki™ software for implementing the Peer-to-Peer (P2P) technique. Alternatively or additionally the system may comprise BitTorrent™ software for implementing the Peer-to-Peer (P2P) technique.

The means for storing the content preferably comprises a plurality of physically separate storage servers. Each of the storage servers may be controlled by one of a plurality of Internet Service Providers (ISPs) or Broadband Service Providers (BSPs).

Preferably the downloading means is adapted to select one or more of the storage devices from which to download a piece of content, in dependence upon at least one of bandwidth demands, content requirements, and the location of stored content.

The content may be stored on the means for storing the content for a fixed period of time following the scheduled broadcast of the content.

Preferably the content is stored on the means for storing the content only after the scheduled broadcast of the content.

The content may be stored on the means for storing the content before the scheduled broadcast of the content, and the downloading means may be adapted to allow download of the content only after the scheduled broadcast of the content.

Monitoring and Analysis

The system may further comprise means for monitoring use of the system. That feature is also provided independently.

According to a further aspect of the invention there is provided a system for providing individual users access to audio/visual content which has been broadcast to a plurality of users on a scheduled basis, the system comprising means for storing the content, means for enabling a user to download the content in the form of a downloadable file, means for enabling a user to view the content by opening and playing the downloaded file, and means for monitoring use of the system.

Preferably the monitoring means is adapted to monitor the download of content and/or the replay of content.

The system may further comprise analysis means, preferably adapted to analyse data from the monitoring means. The analysis means may be adapted to analyse the nature of content that has been downloaded and/or may be adapted to analyse the replay of content. The analysis means may comprise a processor.

Preferably the analysis means is adapted to track at least one of demand for content and user preferences for content, and preferably is adapted to determine which content items are most popular.

The system may further comprise a user interface, and the system may be adapted to configure the user interface in dependence upon monitoring data from the monitoring means or analysis data from the analysis means.

Preferably the system is adapted to configure the user interface so as to identify to a user particular content available for download in dependence upon monitoring data from the monitoring means or analysis data from the analysis means.

Alternatively or additionally the system may be adapted to configure the user interface so as to identify to a user the piece or pieces of content available for download which have been downloaded the most by other users, preferably which have been downloaded the most by other users over a particular period of time, preferably over one of the last day, week, or month. That feature be provided independently.

According to a further aspect of the invention there is provided a system for providing individual users access to audio/visual content which has been broadcast to a plurality of users on a scheduled basis, the system comprising means for storing content, means for enabling a user to download content, means for enabling a user to view the downloaded content, and a user interface configured so as to identify to a user the piece or pieces of content available for download which have been downloaded the most by other users, preferably which have been downloaded the most by other users over a particular period of time, preferably over one of the last day, week, or month.

The system may be adapted to configure the user interface so as to identify to a user the piece or pieces of content which have been downloaded by a particular other user, preferably which have been downloaded by the particular other user over a particular period of time, preferably over one of the last day, week, or month. That feature may also be provided independently.

According to a further aspect of the invention there is provided a system for providing individual users access to audio/visual content which has been broadcast to a plurality of users on a scheduled basis, the system comprising means for storing content, means for enabling a user to download content, means for enabling a user to view the downloaded content, and a user interface configured so as to identify to a user the piece or pieces of content which have been downloaded by a particular other user, preferably which have been downloaded by the particular other user over a particular period of time, preferably over one of the last day, week, or month.

Preferably the system is adapted to configure the user interface so as to provide to a user ratings provided by at least one other user concerning pieces of content. That feature may also be provided independently.

According to a further aspect of the invention there is provided a system for providing individual users access to audio/visual content which has been broadcast to a plurality of users on a scheduled basis, the system comprising means for storing content, means for enabling a user to download content, means for enabling a user to view the downloaded content, and a user interface configured so as to provide to a user ratings provided by at least one other user concerning pieces of content.

The system may be adapted to configure the user interface so as to identify to a user the piece or pieces of content which have been rated most highly by other users.

Preferably the system is adapted to configure the user interface for each user and/or to make particular content available for ordering by each user, in dependence upon respective monitoring data or respective analysis data for that user.

The downloading means may comprise Peer-to-Peer technology and the monitoring means may be adapted to monitor at least one of bandwidth demands, content requirements, and the physical location of content.

User Interface

The system may comprise a user interface, the user interface comprising means for displaying a list of content which is available for download and/or content whose download has been ordered and/or content which has been downloaded. The listing means may comprise a processor adapted to control the display of data on the user interface.

The listing means may be adapted to provide information relating to at least one item of content. In particular, the listing means may be adapted to indicate the status of content items whose download has been ordered or booked, and may be further adapted to indicate the type of such content items.

The listing means may also be adapted to display one or more parameters relating to the or each item of downloaded content, and the one or more parameters may comprise at least one of:—scheduled broadcast date or range of scheduled broadcast dates; scheduled broadcast time or range of scheduled broadcast times; time available for download left; whether content has been viewed by the user; time left during which content can be viewed by the user; number of times content can be viewed by user remaining; genre; parental guidance certificate; user rating; popularity of download; playing time; date of production; language; whether part of series; channel of broadcast; size of file; and availability of subtitles.

Preferably the system comprises sorting means for sorting the displayed list of content in dependence upon one or more of the parameters. The sorting means may comprise a processor.

The sorting means may be operable by a user, preferably by selection by the user of an area of a display using a selection device, wherein preferably the area of the display is the head of a column containing one of the parameters.

The listing means may be adapted to indicate viewing rights and/or viewing status associated with at least one item of downloaded content.

Preferably the listing means is adapted to indicate the amount of time left for viewing the or each item of downloaded content, and preferably the listing means is adapted to indicate the number of days left for viewing the or each item of downloaded content.

The listing means may be adapted to alter the display of the listing of a downloaded content item in dependence on the amount of time left for viewing the downloaded content item, and preferably the listing means is adapted to change the colour in which the listing of a downloaded content item is displayed in dependence on the amount of time left for viewing the downloaded content item.

The listing means may be adapted to indicate whether or not the or each item of downloaded content has been viewed or played, and may be adapted to indicate how many times the or each item of downloaded content has been viewed or played.

Preferably the listing means is adapted to alter the display of the listing of the or each item of downloaded content in dependence on the number of times the or each downloaded content item has been viewed, and preferably the listing means is adapted to alter the colour in which the listing of the or each item of downloaded content is displayed. The listing means may be adapted to indicate the number of times the or each piece of content may be viewed.

The listing means may also be adapted to indicate whether the or each item of downloaded content has expired and is not available to be replayed.

In addition, the listing means may be adapted to list downloaded but expired content. Preferably the listing means is adapted to list expired content separately from content available to be replayed.

The user interface may comprise a web-based interface.

Preferably the user interface comprises an electronic programme guide.

Calendar with Rolling Time Window

The user interface may comprise a calendar with a rolling active time window. That feature may also be provided independently.

According to a further aspect of the invention there is provided a system for providing individual users access to audio/visual content which has been broadcast to a plurality of users on a scheduled basis, the system comprising means for storing content, means for enabling a user to download content, means for enabling a user to view the downloaded content, and a user interface for listing content comprising a calendar with a rolling active time window.

Preferably the calendar is in the form of a monthly calendar, which displays the days of the month.

Preferably each of the days within the rolling active time window is linked to a list of available content with a scheduled broadcast on that day.

The user interface may comprises means for selecting a particular day within the rolling active time window, thereby to list available content with a scheduled broadcast on that day. Days shown on the calendar which are not within the active time window may be inactive.

Days shown on the calendar which are not within the active time window may be a different colour to the days within the active time window, and preferably the days shown on the calendar which are not within the active time window are greyed out.

Preferably the first and/or last days within the active time window are highlighted.

The user interface may be adapted to display a list of any or all of the content available for download and/or any or all of the content whose download has been ordered and/or any or all of the content which has been downloaded, and the system comprises filtering means operable to filter the list so that the user interface displays only that content which possesses at least one selected characteristic. That feature may be provided independently.

According to a further aspect of the invention there is provided a system for providing individual users access to audio/visual content which has been broadcast to a plurality of users on a scheduled basis, the system comprising means for storing content, means for enabling a user to download content, means for enabling a user to view the downloaded content, a user interface for displaying a list of content, and filtering means operable to filter the list so that the user interface displays only that content which possesses at least one selected characteristic.

The filtering means may comprise a processor adapted to carry out a filtering process on the list.

Preferably the at least one selected characteristic is selected upon command of a user.

The at least one selected characteristic may comprise at least one of:—scheduled broadcast date or range of scheduled broadcast dates; scheduled broadcast time or range of scheduled broadcast times; time available for download left; whether content has been viewed by the user; time left during which content can be viewed by the user; number of times content can be viewed by user remaining; genre; parental guidance certificate; user rating; popularity of download; playing time; date of production; language; whether part of series; channel of broadcast; size of file; and availability of subtitles.

Preferably, as a default the at least one selected characteristic comprises a particular scheduled broadcast date, and preferably that particular scheduled broadcast date is yesterday so that, as a default, the user interface displays all content scheduled to be broadcast yesterday.

The filtering means may be operable to filter the list so that the user interface displays only that content which possesses a plurality of selected characteristics, and the filtering means is adapted firstly to filter the list in dependence on one of the selected characteristics to produce a filtered list and then to filter the filtered list in dependence on the one or more other selected characteristics in succession.

Preferably the filtering means is adapted to receive a command from a user selecting a characteristic, to filter the list to produce a filtered list so that the user interface displays only that content which possesses that characteristic, to receiver a further command from a user selecting a further characteristic, and to filter the filtered list so that the user interface displays only that content which possesses the characteristic and the further characteristic.

The user interface may comprise user input means for enabling the user to select the at least one selected characteristic.

Preferably the user input means comprises at least one text box and/or drop down menu, the or each text box and drop down menu being adapted to allow a user to select a respective characteristic.

The or each drop down menu may comprise the calendar referred to above.

The user input means may comprise means for displaying at least one button, the or each button being operable to select and/or increment a characteristic.

Preferably the or one of the buttons is operable to increment the date of scheduled broadcast characteristic.

The or each button may be operable to display the calendar referred to above.

Preferably the at least one text box and/or drop down menu is linked to the at least one button, so that:—selection or increment of a characteristic using the at least one button causes a change in the display of at least one text box and/or drop down menu representative of the selection or increment of the characteristic; and/or selection of a characteristic using the least one text box and/or drop down menu causes a change in a display feature associated with the at least one button representative of the selection of the characteristic.

The system may be arranged so that selection of at least one characteristic using the at least one text box and/or drop down menu overrides selection or increment of a characteristic using the or each button, and preferably is arranged so that the means for displaying at least one button only displays the at least one button if no characteristic is selected using the at least one text box and/or drop down menu.

The system may also be arranged so that selection or increment of at least one characteristic using the at least one button overrides selection or increment of a characteristic using the or each text box and/or drop down menu, and preferably is arranged so that the or each text box and/or drop down menu is only displayed if no characteristic is selected using the at least one button.

For a piece of content which is a member of series or related content items, the user interface may comprises means for listing members of the series, and preferably for displaying respective information, such as broadcast date, for each member of the series.

The means for listing further members of the series may be arranged so that when the members of the series are listed no other content items are listed.

Preferably the means for listing members of the series is operable to list the members of the series upon selection of a button or link associated with a listing of a member of the series.

The system may comprise production means adapted to prepare downloadable files in respect of content which may be downloaded. The production means may comprise a production processor.

The production means may be adapted to provide data associated with the content for use by the or a user interface means to display information relating to the content, or for use by the or a monitoring means, or for use by the or an analysis means, or for use by the or a content management means.

The information may comprise at least one of:—scheduled broadcast date; scheduled broadcast time; time available for download left; time left during which content can be viewed by the user; number of times content can be viewed by user; genre; parental guidance certificate; user rating; popularity of download; playing time; date of production; language; whether part of series; channel of broadcast; size of file; preview clips; subtitles.

Preferably the production means is adapted to provide the associated data in the downloadable files, or in further downloadable files, or by a streaming process. The production means may be adapted to combine information and/or content from a plurality of sources in order to produce the downloadable files and the associated data.

The plurality of sources may include at least one of:—a content production facility; a content database; an EPG database; an EPG production facility; a rights database; a broadcast scheduling facility; a classification database; a recommendations database; a usage database; an encryption facility; and an encoding facility.

Preferably the production means is responsive to the broadcast of a piece of content to produce a downloadable file containing the piece of content and/or to make available for download a downloadable file containing the piece of content and/or to provide or update information associated with the piece of content.

The means for storing the content may comprise a memory device, for instance a hard disk drive. The means for enabling a user to download the content may comprise a communication device, for instance a communication device adapted to connect to and communicate across a network. The means for opening and playing the downloaded file may comprise a processor, for instance a processor adapted to process audio-visual files, such as an MPEG 3 or MPEG 4 processor, or a media player incorporating such a processor. The means for selecting the format or resolution in which the content is downloaded may comprise a processor. The ordering means may comprise a processor. The local storage means may comprise a memory device, for instance a hard disk drive or a solid-state memory device. The content management means may comprise a processor. The means for encoding the content may comprise an encoding device, for instance a processor running encoding software. The means for restricting access may comprise an encryption device, for instance a processor on which encryption software is installed, or a device operable to apply digital rights management processes.

In a further aspect of the invention there is provided a method for providing individual users access to audio/visual content which has been broadcast to a plurality of users on a scheduled basis, the method comprising storing the content, enabling a user to download the content, optionally in the form of a downloadable file, and enabling a user to view the content by opening and playing the downloaded file, the step of opening the file and/or playing the file optionally only being permitted within a fixed time period after the scheduled broadcast time of the content.

Preferably the steps of opening and/or playing the downloaded file occur only once the downloading of the file has been completed.

Preferably the content is downloaded via a network.

The network may comprise a wide area network, or an open IP network. The network may comprise at least part of the internet.

The content may be available for downloading in each of a plurality of different formats and/or in each of a plurality of different resolutions.

Preferably the method comprises selecting the format or resolution in which the content is downloaded in dependence upon the type of a display or storage device on which the user may view the content or on which the user may store the content.

The display or storage device may comprise one of:—a television, a portable computer, a desktop computer, a personal video recorder, a mobile phone, and a games console.

The audio/visual content may be televisual content which has been broadcast to a plurality of users as a scheduled television broadcast, preferably as a scheduled free-to-air television broadcast or as a scheduled webcast.

The audio/visual content may comprise subtitles and/or audio description, and the method may comprise displaying the subtitles and/or playing the audio description in association with the viewing of the content, upon request of the user.

Ordering

The method may further comprise enabling a user to order the download of content.

The order may be sent from the user via the internet.

Preferably the method comprises enabling a user to order the download of content only within a time window.

The time window may be a time window around the scheduled broadcast time of the content.

The method may comprise enabling a user to order the download of content, in advance of the scheduled broadcast time of the content, and preferably within a fixed time period before the scheduled broadcast time of the content. That feature may be provided independently.

In a further aspect of the invention there is provided a method for providing individual users access to audio/visual content which has been broadcast to a plurality of users on a scheduled basis, the method comprising storing the content, enabling a user to order the download of content, in advance of the scheduled broadcast time of the content, enabling a user to download the content, and enabling a user to view the content. Preferably the method comprises enabling the user to order content within a fixed time period before the scheduled broadcast time of the content.

The fixed time period before the scheduled broadcast time may be between 2 and 15 days, or between 5 and 10 days, and preferably is 7 days.

Preferably the order is processed only after the broadcast of the content has commenced or only after the broadcast of the content has been completed.

Preferably the content is downloaded only after the broadcast of the content has commenced or only after the broadcast of the content has been completed.

Alternatively, the downloadable file may be downloaded before the scheduled broadcast of the content, in response to an order placed in advance of the scheduled broadcast time. Preferably it is only permitted to open and play the file once the content has been broadcast, and preferably only after a delay after the content has been broadcast.

Preferably the user may order the download of the content after the scheduled broadcast of the content, and preferably for a fixed time period after the scheduled broadcast of the content.

The fixed time period after the scheduled broadcast of the content may be between 2 and 15 days, or between 5 and 10 days, or preferably is 7 days.

Series Download

The method may further comprise enabling a user to order the download of a series of related content items.

Preferably each of the series of related content items is downloaded only after it has been broadcast.

The method may further comprise enabling the user to order, before at least one of the series of related content items has been broadcast, the download of the series of related content items.

Preferably the method comprises enabling the user to order, within a time window, the download of a series of related content items. That feature may also be provided independently.

In a further aspect of the invention there is provided a method for providing individual users access to audio/visual content which has been broadcast to a plurality of users on a scheduled basis, the method comprising storing the content, enabling a user to order the download of content, downloading the content, and enabling a user to view the content, wherein the step of enabling the user to order the download of content comprises enabling the user to order, within a time window, the download of a series of related content items.

Preferably the time window extends to a fixed period of time after the broadcast of the last in the series of content items.

The method may further comprise storing locally each of the series of related content items after it has been downloaded.

The method may further comprise displaying to the user a list of the content items in the series of related content items which are stored locally and/or displaying to the user a list of the content items in the series of related content items which are available to download and/or which will be available to download.

The method may further comprise managing locally stored content, and preferably overwriting at least one of the series of related content items with at least one other of the series of related content items.

Preferably each of the series of related content items is overwritten with the next of the series of related content items.

Preferably each of the series of related content items is downloaded within a fixed time period after the respective scheduled broadcast of that related content item.

The series of related content items may be a series of television programmes.

Encoding/Access

The method may further comprise encoding the content.

Preferably the encoding of the content is carried out before the scheduled broadcast of the content.

The encoding of the content may be carried out in real time during the scheduled broadcast of the content.

Preferably the encoding is carried out using Microsoft™ Windows Media Encoder.

The method may further comprise restricting access to the content.

The step of restricting access to the content may comprise restricting access to the content in dependence upon the geographic location of the user.

Preferably the method comprises determining the geographic location of the user in dependence upon address information associated with the user.

Preferably the geographic location of the user is determined in dependence upon an IP address associated with the user, and preferably is determined using a GeoIp procedure.

The step of restricting access to the content may restrict or prevent playback of the content by a user, preferably by preventing the opening and/or playing of the file or by causing the output resulting from the opening and playing of the downloaded file to be scrambled.

Preferably the user is allowed to replay the content only for a fixed period of time following the scheduled broadcast of the content.

Preferably the user is allowed to replay the content only for a certain period of time following the scheduled broadcast of the content, preferably for between 2 and 15 days, or for between 5 and 10 days, or for 7 days, following the scheduled broadcast of the content.

The user may be allowed to replay the content a fixed number of times, preferably between 1 and 10 times, or between 3 and 5 times.

Preferably the user may be allowed to replay the content a fixed number of times following the download of the content, and preferably said fixed number of times is between 1 and 10 times, or between 3 and 5 times.

The step of restricting access to the content may comprise encrypting the content. In that case the step of opening and playing the downloaded file may comprise decrypting the content.

The method may comprise obtaining a license or key to enable the decryption of the content.

Preferably the license or key enables a user to replay the content a fixed number of times or for a fixed period of time.

The method may comprise storing locally the encrypted content and storing the license or key, and preferably comprises storing the license or key separately from the encrypted content.

The method may comprise logging on to a server to obtain the license or key.

Preferably the step of encrypting and/or decrypting the content comprises using Digital Rights Management (DRM) technology, preferably Microsoft Windows Media DRM software.

Preferably the step of encrypting and/or decrypting the content comprises using public key encryption software.

Preferably the steps of restricting access to the content and opening and playing the downloaded file are carried out using a media player.

The media player may be implemented in software.

Local Storage

The method may comprise storing locally content in the form of downloaded files. The method may further comprise managing locally stored content.

The step of managing locally stored content may comprise deleting content, and preferably comprises deleting content once a fixed period of time for replaying the content has expired.

Preferably the step of managing locally stored content comprises deleting content once the content has been replayed an allowed number of times.

The method may further comprise overwriting content items.

The step of overwriting content items may comprise overwriting older related content items in a series with newer related content items in a series.

The method may comprise storing locally a file containing a piece of content and a file containing data associated with the piece of content.

The associated data file may comprise subtitle data, and preferably the step of managing locally stored content comprises searching the associated data file for a requested search string.

Preferably the step of managing locally stored content comprises searching the locally stored content.

Preferably the method comprises transferring content from a first local storage device to a second local storage device.

The method may comprise allocating memory to be used for the local storage of the downloaded content.

The method may comprise monitoring the memory occupied by the downloaded content.

The step of storing content locally may comprise storing content on the hard disk drive of a personal computer.

Peer-to-peer

The step of enabling the user to download content may comprise downloading the downloadable file in parts and combining the parts once downloaded, and preferably it comprises downloading the parts of the downloadable file out of order.

The step of storing the content may comprise storing the content in a plurality of separate storage devices in different locations, and the step of downloading may comprise downloading the content from any of the storage devices. Preferably the content stored in at least one of the storage devices is of broadcast quality and preferably originates directly from the same source as the content as broadcast.

In a further aspect there is provided a method for providing individual users access to audio/visual content which has been broadcast to a plurality of users on a scheduled basis, the method comprising storing the content, enabling a user to download the content, and enabling the user to view the downloaded content within a fixed time period after the scheduled broadcast time of the content, wherein the step of storing the content comprises storing the content in or across a plurality of separate storage devices in different locations, and the method comprises downloading the content from any of the storage devices. Preferably the content stored in at least one of the storage devices is of broadcast quality and preferably originates directly from the same source as the content as broadcast.

Preferably the method comprises downloading the content partially from one of the storage devices and partially from at least one other of the storage devices.

The method may comprise downloading a part of the downloadable file from one of the storage devices and downloading another part of the downloadable file from another of the storage devices.

At least one of the storage devices may comprise a storage device associated with another user, and preferably comprises a hard disk drive of a personal computer associated with the another user.

The method may comprise storing and/or downloading content using a Peer-to-Peer (P2P) technique. Preferably the method comprises implementing the Peer-to-Peer (P2P) technique using Kontiki™ software.

The method may comprise implementing the Peer-to-Peer (P2P) technique using comprising BitTorrent™ software.

The step of storing the content may comprise storing the content in or across a plurality of physically separate storage servers.

Preferably each of the storage servers is controlled by one of a plurality of Internet Service Providers (ISPs) or Broadband Service Providers (BSPs).

The step of downloading may comprise selecting one or more of the storage devices from which to download content, in dependence upon at least one of bandwidth demands, content requirements, and the location of stored content.

Preferably the content is stored for a fixed period of time following the scheduled broadcast of the content.

Preferably the step of storing the content comprises storing the content only after the scheduled broadcast of the content.

Preferably the step of storing the content comprises storing the content before the scheduled broadcast of the content, and preferably the method comprises allowing download of the content only after the scheduled broadcast of the content.

Monitoring and Analysis

The method may comprise monitoring performance of at least one of the steps of the method and/or monitoring actions of the user or of each user. That feature may be provided independently.

In a further aspect of the invention there is provided a method for providing individual users access to audio/visual content which has been broadcast to a plurality of users on a scheduled basis, the method comprising storing the content, enabling a user to download the content in the form of a downloadable file, enabling a user to view the content by opening and playing the downloaded file, the method further comprising monitoring performance of at least one of the steps of the method and/or monitoring actions of the users or of each user.

Preferably the monitoring step comprises monitoring the download of content and/or the replay of content.

The method may further comprise analysing performance, preferably analysing monitoring data obtaining from the monitoring step.

The method may comprise analysing the nature of content that has been downloaded and/or the replay of content.

The method may comprise tracking at least one of demand for content and user preferences for content, and preferably the method comprises determining which content items are most popular.

Preferably the method comprises configuring a user interface in dependence upon monitoring data or analysis data.

The method may comprise configuring the user interface so as to identify to a user particular content available for download in dependence upon monitoring data or analysis data.

Preferably the step of configuring the user interface comprises configuring the interface so as to identify to a user the piece or pieces of content available for download which have been downloaded the most by other users, preferably which have been downloaded the most by other users over a particular period of time, preferably over one of the last day, week, or month. That feature may be provided independently.

In a further aspect of the invention there is provided a method for providing individual users access to audio/visual content which has been broadcast to a plurality of users on a scheduled basis, the method comprising storing content, enabling a user to download content, enabling the user to view the downloaded content, and providing a user interface configured so as to identify to a user the piece or pieces of content available for download which have been downloaded the most by other users, preferably which have been downloaded the most by other users over a particular period of time, preferably over one of the last day, week, or month.

The method may comprise configuring the user interface so as to identify to a user the piece or pieces of content which have been downloaded by a particular other user, preferably which have been downloaded by the particular other user over a particular period of time, preferably over one of the last day, week, or month. That feature may be provided independently.

In a further aspect of the invention there is provided a method for providing individual users access to audio/visual content which has been broadcast to a plurality of users on a scheduled basis, the method comprising storing content, enabling a user to download content, enabling the user to view the downloaded content, and providing a user interface configured so as to identify to a user the piece or pieces of content which have been downloaded by a particular other user, preferably which have been downloaded by the particular other user over a particular period of time, preferably over one of the last day, week, or month.

The method may comprise configuring the user interface so as to provide to a user ratings provided by at least one other user concerning pieces of content. That feature may be provided independently.

In a further aspect of the invention there is provided a method for providing individual users access to audio/visual content which has been broadcast to a plurality of users on a scheduled basis, the method comprising storing content, enabling a user to download content, enabling the user to view the downloaded content, and providing a user interface configured so as to provide to a user ratings provided by at least one other user concerning pieces of content.

Preferably the method comprises configuring the user interface so as to identify to a user the piece or pieces of content which have been rated most highly by other users.

The method may comprise configuring the user interface for each user and/or to make particular content available for ordering by each user, in dependence upon respective monitoring data or respective analysis data for that user.

Preferably the step of downloading content comprises using Peer-to-Peer technology and preferably the step of monitoring comprises monitoring at least one of bandwidth demands, content requirements, and the physical location of content.

User Interface

Preferably the method comprises displaying to the user on a user interface a list of content which is available for download and/or content whose download has been ordered and/or content which has been downloaded.

The list may include information relating to at least one item of content.

Preferably the list indicates the status of content items whose download has been ordered or booked, and preferably further indicates the type of such content items.

The list may comprise one or more parameters relating to the or each item of downloaded content, the one or more parameters comprising at least one of:—scheduled broadcast date or range of scheduled broadcast dates; scheduled broadcast time or range of scheduled broadcast times; time available for download left; whether content has been viewed by the user; time left during which content can be viewed by the user; number of times content can be viewed by user remaining; genre; parental guidance certificate; user rating; popularity of download; playing time; date of production; language; whether part of series; channel of broadcast; size of file; and availability of subtitles.

Preferably the method comprises sorting the displayed list of content in dependence upon one or more of the parameters.

The step of sorting may be carried out on command of the user, preferably in response to selection by the user of an area of a display using a selection device. The area of the display may be the head of a column containing one of the parameters.

Preferably the list indicates viewing rights and/or viewing status associated with at least one item of downloaded content.

The list may indicate the amount of time left for viewing the or each item of downloaded content, and preferably indicates the number of days left for viewing the or each item of downloaded content.

The method may comprise alter the display to a user of the listing of a downloaded content item in dependence on the amount of time left for viewing the downloaded content item, and preferably method comprises changing the colour in which the listing of a downloaded content item is displayed in dependence on the amount of time left for viewing the downloaded content item.

The method may comprise indicating on the displayed list whether or not the or each item of downloaded content has been viewed or played, and preferably indicating how many times the or each item of downloaded content has been viewed or played.

Preferably the method comprises altering the listing of the or each item of downloaded content in dependence on the number of times the or each downloaded content item has been viewed, and preferably the method comprises altering the colour in which the listing of the or each item of downloaded content is displayed.

The list may indicate the number of times the or each piece of content may be viewed.

The list may indicate whether the or each item of downloaded content has expired and is not available to be replayed.

The method may comprise listing downloaded but expired content, and preferably the method comprises listing expired content separately from content available to be replayed.

The user interface may comprise a web-based interface.

The user interface may comprise an electronic programme guide.

Calendar with Rolling Time Window

The user interface may comprise a calendar with a rolling active time window. That feature may be provided independently.

In a further aspect there is provided a method for providing individual users access to audio/visual content which has been broadcast to a plurality of users on a scheduled basis, the method comprising storing content, enabling a user to download content, enabling a user to view the downloaded content, and providing a user interface for listing content, the user interface comprising a calendar with a rolling active time window.

The calendar may be in the form of a monthly calendar, which displays the days of the month.

Preferably each of the days within the rolling active time window is linked to a list of available content with a scheduled broadcast on that day.

Preferably the method comprises enabling a user to select a particular day within the rolling active time window, and in response to that selection listing available content with a scheduled broadcast on that day.

Preferably the days shown on the calendar which are not within the active time window are inactive.

Preferably the method comprises showing the days on the calendar which are not within the active time window in a different colour to the days within the active time window, and preferably the method comprises showing the days on the calendar which are not within the active time window as being greyed out.

The method may comprise highlighting the first and/or last days within the active time window.

The method may comprise displaying a list of any or all of the content available for download and/or any or all of the content whose download has been ordered and/or any or all of the content which has been downloaded, and the method may comprise comprises filtering the list so that the user interface displays only that content which possesses at least one selected characteristic. That feature may be provided independently.

In a further aspect there is provided a method for providing individual users access to audio/visual content which has been broadcast to a plurality of users on a scheduled basis, the method comprising storing content, enabling a user to download content, enabling a user to view the downloaded content, providing a user interface for displaying a list of content, and filtering the list so that the user interface displays only that content which possesses at least one selected characteristic.

Preferably the at least one selected characteristic is selected upon command of a user.

The at least one selected characteristic may comprise at least one of:—scheduled broadcast date or range of scheduled broadcast dates; scheduled broadcast time or range of scheduled broadcast times; time available for download left; whether content has been viewed by the user; time left during which content can be viewed by the user; number of times content can be viewed by user remaining; genre; parental guidance certificate; user rating; popularity of download; playing time; date of production; language; whether part of series; channel of broadcast; size of file; and availability of subtitles.

Preferably as a default the at least one selected characteristic comprises a particular scheduled broadcast date, and preferably that particular scheduled broadcast date is yesterday so that, as a default, the user interface displays all content scheduled to be broadcast yesterday.

The method may comprise filtering the list so that the user interface displays only that content which possesses a plurality of selected characteristics, and the step of filtering may comprise firstly filtering the list in dependence on one of the selected characteristics to produce a filtered list and then filtering the filtered list in dependence on the one or more other selected characteristics in succession.

The method may comprise receiving a command from a user selecting a characteristic, filtering the list to produce a filtered list so that the user interface displays only that content which possesses that characteristic, receiving a further command from a user selecting a further characteristic, and filtering the filtered list so that the user interface displays only that content which possesses the characteristic and the further characteristic.

Preferably the method comprises enabling the user to select the at least one selected characteristic.

The method may comprise displaying at least one text box and/or drop down menu, the or each text box and drop down menu being adapted to allow a user to select a respective characteristic.

The or each text box may comprise a calendar as referred to above.

The method may comprise displaying at least one button, the or each button being operable to select and/or increment a characteristic.

The or one of the buttons may be operable to increment the date of scheduled broadcast characteristic.

The or each button may be operable to display a calendar as referred to above.

Preferably selection or increment of a characteristic using the at least one button causes a change in the display of at least one text box and/or drop down menu representative of the selection or increment of the characteristic; and/or selection of a characteristic using the least one text box and/or drop down menu causes a change in a display feature associated with the at least one button representative of the selection of the characteristic.

Selection of at least one characteristic using the at least one text box and/or drop down menu may override selection or increment of a characteristic using the or each button, and preferably the at least one button is only displayed if no characteristic is selected using the at least one text box and/or drop down menu.

Selection or increment of at least one characteristic using the at least one button may override selection or increment of a characteristic using the or each text box and/or drop down menu, and preferably the or each text box and/or drop down menu is only displayed if no characteristic is selected using the at least one button.

For a piece of content which is a member of series or related content items, the method may comprise listing members of the series, and preferably displaying respective information, such as broadcast date, for each member of the series.

The method may comprise listing further members of the series in such a way that when the members of the series are listed no other content items are listed.

Preferably the method comprises listing the members of the series upon selection of a button or link associated with a listing of a member of the series.

The method may comprise a production step comprising preparing downloadable files in respect of content which may be downloaded.

The production step may comprise providing data associated with the content for use by the or a user interface to display information relating to the content, or for use in monitoring or analysis or content management.

The information may comprise at least one of:—scheduled broadcast date; scheduled broadcast time; time available for download left; time left during which content can be viewed by the user; number of times content can be viewed by user; genre; parental guidance certificate; user rating; popularity of download; playing time; date of production; language; whether part of series; channel of broadcast; size of file; preview clips; subtitles.

The production step may comprise providing the associated data in the downloadable files, or in further downloadable files, or by a streaming process.

The production step may comprise combining information and/or content from a plurality of sources in order to produce the downloadable files and the associated data.

The plurality of sources may include at least one of:—a content production facility; a content database; an EPG database; an EPG production facility; a rights database; a broadcast scheduling facility; a classification database; a recommendations database; a usage database; an encryption facility; and an encoding facility.

The production step may comprise responding to the broadcast of a piece of content to produce a downloadable file containing the piece of content and/or to make available for download a downloadable file containing the piece of content and/or to provide or update information associated with the piece of content.

In a further aspect of the invention there is provided an electronic programme guide for providing access to audio/visual content which has been broadcast to a plurality of users on a scheduled basis, the electronic programme guide comprising means for enabling a user to download the content in the form of a downloadable file, and preferably the electronic programme guide only permits the download of the content for a fixed period of time after the broadcast of the content.

In a further aspect of the invention there is provided an electronic programme guide for providing access to audio/visual content which has been broadcast to a plurality of users on a scheduled basis, the electronic programme guide comprising ordering means for enabling a user to order the download of content, and preferably the ordering means being adapted to enable the user to order, within a time window, the download of a series of related content items.

In a further aspect of the invention there is provided an electronic programme guide for providing access to audio/visual content which has been broadcast to a plurality of users on a scheduled basis, the electronic programme guide comprising ordering means for enabling a user to order the download of content, and means for enabling the download of content, wherein the downloading means is adapted to enable the download of the content from any of a plurality of storage devices.

In a further aspect of the invention there is provided an electronic programme guide for providing access to audio/visual content which has been broadcast to a plurality of users on a scheduled basis, the electronic programme guide comprising means for enabling the download of content, the electronic programme guide being adapted to co-operate with monitoring means, and preferably the electronic programme guide being adapted to reconfigure itself in dependence upon monitoring data from the monitoring means.

In a further aspect of the invention there is provided an electronic programme guide for providing access to audio/visual content which has been broadcast to a plurality of users on a scheduled basis, the electronic programme guide comprising means for enabling the download of content, the electronic programme guide being adapted to identify to a user the piece or pieces of content available for download which have been downloaded the most by other users, preferably which have been downloaded the most by other users over a particular period of time, preferably over one of the last day, week, or month.

In a further aspect of the invention there is provided an electronic programme guide for providing access to audio/visual content which has been broadcast to a plurality of users on a scheduled basis, the electronic programme guide comprising means for enabling the download of content, the electronic programme guide being adapted to identify to a user the piece or pieces of content which have been downloaded by a particular other user, preferably which have been downloaded by the particular other user over a particular period of time, preferably over one of the last day, week, or month.

In a further aspect of the invention there is provided an electronic programme guide for providing access to audio/visual content which has been broadcast to a plurality of users on a scheduled basis, the electronic programme guide comprising means for enabling the download of content, the electronic programme guide being adapted to provide to a user ratings provided by at least one other user concerning pieces of content.

In a further aspect of the invention there is provided an electronic programme guide for providing access to audio/visual content which has been broadcast to a plurality of users on a scheduled basis, the electronic programme guide comprising means for enabling the download of content, the electronic programme guide comprising a calendar with a rolling active time window.

In a further aspect of the invention there is provided an electronic programme guide for providing access to audio/visual content which has been broadcast to a plurality of users on a scheduled basis, the electronic programme guide comprising a list of content available for download, and filtering means operable to filter the list so as to display only that content which possesses at least one selected characteristic.

Further System Architecture Aspects

Broadly, according to another aspect of the invention, there is provided a system for providing individual users access to content which has been broadcast to a plurality of users on a scheduled basis, the system comprising means for storing said content, means for enabling a user to download said content, and means for enabling a user to replay said downloaded content.

In this way a user can be provided with increased flexibility, since the user is able to download the content after the scheduled broadcast of said content, store said content on a local storage means, for example, the hard disk of a personal computer (e.g. a desktop computer or a portable laptop or handheld computer), and replay the content as and when convenient, and as often as desired.

Preferably, the scheduled broadcast is free to air. More preferably, the scheduled broadcast content is in the form of a broadcast by way of a cable, satellite or terrestrial television or radio channel.

Preferably, the scheduled broadcast is in the form of a "one-to-many" broadcast.

This important aspect of the invention may be provided independently. According to another aspect of the invention, there is provided a system for providing individual users access to content which has been previously broadcast to a plurality of users on a scheduled basis, the system comprising means for broadcasting content as part of a "one-to-many" broadcast, and means for transmitting content to individual users on a one-to-one basis after the content has been broadcast.

Thus, an "on-demand" content service may be provided as an adjunct to a "free-to-air" service, which may provide improved service and flexibility to users. For example, if a user finds out that he or she has missed a programme of interest which had been broadcast the previous day, he or she may download the programme and watch it when convenient. In other words, it is possible to "record" content after it has already been broadcast.

Preferably, the replay means comprises means for restricting access to said content to be replayed.

This aspect of the invention may be provided independently. According to another aspect of the invention, there is provided a system for providing individual users access to content which has been broadcast to a plurality of users on a scheduled basis, the system comprising means for storing said content, and means for enabling a user to replay said content, said replay means comprising means for restricting access to said content to be replayed.

By providing restricted access to the content following broadcast, the system may provide enhanced flexibility to content providers, since they may be able to control or limit the replay of content which has already been broadcast.

Preferably, the replay means is adapted to allow a user to replay the content for a fixed period of time following the scheduled broadcast of the content. For example, the replay means may enable a user to replay content for a certain number of days following the broadcast of the content. More preferably, the replay means is adapted to allow the user to replay the content for between 2 and 15 days. Yet more preferably, the replay means is adapted to allow the user to replay the content for between 5 and 10 days. Even more preferably, the replay means is adapted to allow the user to replay the content for 7 days following the scheduled broadcast of the content.

More preferably, the replay means is adapted to allow a user to replay the content a fixed number of times following the download of said content, for example, at least once or twice, between 1 and 10 times, and most preferably between 3 and 5 times.

Preferably, the system further comprises means for connecting the system to a communications network. More preferably, the connecting means comprises means for connecting the system to a wide area network, typically the Internet.

Thus, a user may be able to access the communications network and then download said content from the communications network.

Preferably, the storage means is in the form of a plurality storage servers. More preferably, the storage means comprises a plurality of physically separate storage servers. Yet more preferably, the storage means comprises a grid of storage servers.

For example, the content may be stored on servers controlled by a number of different Internet Service Providers (ISPs) or Broadband Service Providers (BSPs). Thus, a user can access and download the content from a local ISP, which may improve the overall efficiency of the system, since the content, and hence user access, is distributed over multiple ISPs.

Preferably, the content is stored on the storage means for a fixed period of time following the scheduled broadcast of said content. More preferably, the content is stored on the storage means for between 2 and 15 days following broadcast. Yet more preferably, the content is stored on the storage means for between 5 and 10 days. Even more preferably, the content is stored for a 7-day period following broadcast.

Preferably, the downloading means comprises a rolling time window thereby to enable a user to download content that has been broadcast during a previous fixed period (for example, between 2 and 15, or between 5 and 10, or desirably during the previous seven days).

Preferably, the content is stored on the storage means only after the scheduled broadcast of the content, for example, half an hour or one hour after the broadcast, or at a time longer than 30 or 60 minutes after the scheduled broadcast and shorter than 10, 5, 3 or 2 hours. Alternatively, in another embodiment of the invention, the content may be stored on the storage means before the content has been broadcast. In this case, the replay means may be adapted to allow the user to replay content only after it has been broadcast, and the downloading means may similarly be adapted to allow the user to download content after it has been broadcast. Selected content, such for example as news and current affairs programmes, may be stored live, in real time, whilst other content may be stored only after a delay.

Preferably, the download means is adapted to allow content to be downloaded from a number of locations.

More preferably, the download means comprises Peer-to-Peer (P2P) technology. Thus, as individual users download the same piece of content to their own hard disks, the download means will monitor bandwidth demands, content requirements and the physical location of the content and optimise the downloading of content between users. For example, a single piece of content may be sourced from a number of physically remote storage location and reassembled jigsaw-fashion) on a user's hard disk.

In one embodiment, Kontiki™ software may, for example, be used to implement P2P content distribution. In another embodiment, BitTorrent™ software may, for example, be used to implement P2P content distribution. It is also possible to use peer-to-peer technology provided by other providers to implement peer-to-peer aspects of the system. Alternatively, or in addition, the download means may comprise a Content Distribution Network.

Preferably, the system further comprises means for encoding the content.

Preferably, the content is encoded from scheduled broadcasts or from pre-recorded broadcasts, for example using the Microsoft™ Windows Media Encoder.

Preferably, the content is encoded in real-time during a broadcast.

Alternatively, or in addition, the content may be encoded before the broadcast.

Preferably, the content is encrypted. More preferably, the content is packaged using Digital Rights Management technology, for example, Microsoft™ Media DRM software.

Preferably, the replay means is adapted to decrypt the content. More preferably, the replay means is adapted to obtain a license or key to allow a user to replay the content.

Preferably, the license or key enables a user to replay the content for a fixed period of time or a fixed number of times.

Preferably, the encrypted content is stored separately from the license or key.

Preferably, the replay means is adapted to log on to a server containing the license or key in order to enable the user to replay the content.

In another embodiment, the encoding means comprises public key encryption software.

Preferably, the system further comprises means for uploading said content to the network. More preferably, the content is only uploaded after a certain time interval following the broadcast, for example half an hour or one hour following the broadcast, or at a time longer than 30 or 60 minutes after the broadcast and shorter than 10, 5, 3 or 2 hours.

Preferably, the system further comprises means for ordering the download of content in advance of the scheduled broadcast of the content.

More preferably, said ordering means comprises a rolling time window thereby to enable a user to look ahead for a fixed period of time (for example, between 2 and 15, or between 5 and 10, or desirably seven days prior to the scheduled broadcast of the content) for ordering downloads. In this way, the system may provide enhanced flexibility, since a user can determine the content that is desired and then replay the content in an "on-demand" fashion once the content has been broadcast.

This important feature may also be provided independently. Accordingly, the invention further provides a system which comprises means for broadcasting scheduled content, means for storing said content, and means for ordering the download of content from the storage means in advance of the scheduled broadcast of the content.

Preferably, the ordering means is adapted to process the request for the download of content only after the content has been broadcast. For example, the ordering means may process the request for the download of the content (maybe at least) half an hour, or one hour, after the broadcast.

Alternatively, in another embodiment of the invention, the ordering means is adapted to download the content in advance of the scheduled broadcast of said content. In this case, the replay means may be adapted to allow a user to replay the content only once it has been broadcast, or indeed after a delay after broadcast.

Preferably, the system further comprises means for ordering the download of a series of related content items. Thus, a user may for example download an entire series of a television programme.

This aspect may also be provided independently. According to a further aspect of the invention, there is provided a system which comprises means for broadcasting scheduled content, means for storing the content, and means for ordering the download of a series of related content items in advance of the scheduled broadcast of the content.

Preferably, the system further comprises means for caching the content to be downloaded. More preferably, the caching means is provided by the Internet Service Providers.

Preferably, the system further comprises means for time shifting the ordered downloads, thereby to enable the system to avoid downloading the content to the user during periods of peak bandwidth use.

Preferably, the system further comprises a user interface thereby to enable the user to manage the content to be replayed and/or downloaded.

More preferably, the system further comprises a media player.

Preferably, the media player further comprises means for accessing a network, for example, the Internet.

According to a further aspect of the invention, there is provided a media player which comprises an audio/visual output for playing audio/visual content, means for enabling a user to download content, said content having been previously broadcast, and means for permitting replay of said content for a fixed period of time following the broadcast.

In one embodiment, the media player is implemented in software, and executable on a personal computer.

Preferably, the system further comprises a user interface thereby to enable the user to view the content to be downloaded and/or replayed.

Preferably, the content may be viewed in the form of a programme guide. For example, an Electronic Programme Guide.

Preferably, the user interface is adapted to enable a user to view content to be downloaded and/or replayed and/or ordered using a rolling time window, thereby preferably to enable a user to look ahead for a fixed period of time (for example, between 2 and 15, or between 5 and 10, or desirably the forthcoming seven days) for ordering downloads, and preferably to enable a user to review content that has already been broadcast in a previous fixed time period (for example, between 2 and 15, or between 5 and 10, or desirably during the previous seven days) for downloading and replaying content. The rolling time window may be between 2 and 30, preferably between 10 and 20, more preferably 14 days in duration. It may be centred on the current date, or skewed either in to the past or the future.

Preferably, the user interface comprises means for ordering content to be downloaded. More preferably, the user interface comprises means for modifying and/or cancelling ordered content.

Preferably, the user interface comprises means for ordering the download of a series of related content items.

To provide increased functionality to a user, preferably, the system further comprises means for storing downloaded content locally.

Preferably, the system further comprises means for transferring content from a first local storage device to a second local storage device, for example, from a personal computer to a portable computer, such as a handheld device. Thus a user can download content onto a desktop machine and then transfer the content to a portable machine for replaying said content, or content can be transferred between individual users.

Preferably, the system further comprises means for managing locally stored content.

Preferably, the content management means comprises means for deleting content. More preferably, the content management means is adapted to delete content once the fixed period of time for replaying the content has expired, or once the content has been replayed the allowed number of times.

Preferably, the system further comprises means for overwriting content items. More preferably, the system comprises means for overwriting older related content items in a series with newer related content items in that series.

In order to enable a user to manage the amount of disk space used by the system for downloading content, such as ordered content, the system preferably further comprises means for allocating memory to be used for the local storage of content.

Preferably, the system further comprises means for monitoring the memory occupied by downloaded content.

Preferably, the system further comprises means for monitoring the download of content. More preferably, the system further comprises means for analysing the nature of the content that has been downloaded. In this way the system may be able to track demand or user preferences for content.

Preferably, the system further comprises means for monitoring the replay of the content. More preferably, the system comprises means for analysing the replay of content. In this way the system may be able to determine which content items are most popular.

According to yet a further aspect of the invention, there is provided a system for enabling a user to replay previously broadcast content, the system comprising means for determining whether content has been previously broadcast, and means for allowing a user to replay the content for a fixed period of time following the broadcast.

It is envisaged that aspects of this system may be implemented in software running on a computer such as a personal computer or receiver/decoder, (which may be connected directly to a monitor or to a television or other display means) which enables a user to download content that has been previously broadcast and to replay said content. Using this software, the user may also order content to be downloaded once it has been broadcast.

Other aspects of this system may be implemented in software running on various interconnected servers, and it is to be appreciated that inventive aspects of this system may reside in the software running on such servers.

Furthermore, individual user's computers will also be connectable to a communications network which is in turn connected to the various other servers and computers which constitute the system and accordingly there may be communications software running on each of the aforementioned computers and/or servers which controls the system.

According to another aspect of the invention, there is provided a computer programme product for implementing the system as hereinbefore described. This may be used for example to load software onto the user's computer.

The invention extends to methods of providing individual users access to content that has already been broadcast to a plurality of users on a scheduled basis, and to computer programme products for implementing said methods.

The invention also extends to a server or a plurality of interconnecting servers running software adapted to implement the system as hereinbefore described.

Further User Interface Aspects

Broadly, according to another aspect of the invention, there is provided an electronic programme guide, said guide comprising means for listing content which has been previously broadcast as part of a scheduled programme broadcast and means for downloading said content which has been previously broadcast.

Thus, a user may be provided with increased flexibility as it is possible to view a programme guide schedule relating to content that has been previously broadcast, and to download content listed in that schedule which can then be replayed on demand whenever convenient. Thus, if a user finds out that he or she has missed a programme of interest, or has forgotten to set a recorder, in advance, to record a programme of interest, it is still possible to "record" (i.e. download) that programme.

Preferably, the guide further comprises means for playing said content. More preferably, said playing means comprises an audio/visual player.

This important aspect of the invention may be provided independently. According to another aspect of the invention, there is provided a media player which comprises means for listing content which has been previously broadcast as part of a scheduled broadcast, and means for playing said content.

Preferably, the playing means is adapted to play the content on display means. More preferably, the playing means is adapted to play the content on a personal computer. Alternatively, or in addition, the playing means may be adapted to play the content on a television.

Preferably, the listing means is further adapted to list content scheduled to be broadcast in the future.

Preferably, the guide further comprises means for ordering content to be downloaded after it has been broadcast.

This important aspect of the invention may be provided independently. According to another aspect of the invention, there is provided an electronic programme guide, the guide comprising means for listing content which will be broadcast in the future, and means for ordering content to be downloaded after it has been broadcast.

Preferably, the downloading means is adapted to download ordered content only after the content has been broadcast, for example, (maybe at least) half an hour, or one hour, after the broadcast. Alternatively, or in addition, the downloading means may be adapted to download ordered content once broadcasting of said content has commenced.

Preferably, the content is listed in form of a programme schedule, for example, on a grid with the columns indicating the times of programmes and rows indicating different programmes and/or channels.

The content is typically in the form of any content conventionally broadcast by cable, terrestrial or satellite radio or television channels, such as news broadcast, television and radio programmes and films.

Thus, the guide can provide users with access to a schedule which lists content which has previously been broadcast, as well as content which will be broadcast in the future, all as part of the schedule, and can provide a user with means for downloading content which has already been broadcast, as well as means for ordering the download of content which will be broadcast in the future.

Preferably, the guide further comprises means for connecting to a communications network. More preferably, the guide comprises means for connecting to a wide area network, for example, the Internet.

Preferably, the listing means is adapted to list the content which has been previously broadcast within a rolling time window.

Preferably, the rolling time window covers a fixed period of time prior to the current time. Preferably, the rolling time window covers a fixed time period of between 1 and 15 days. More preferably, the rolling time window covers a fixed time period of between 5 and 10 days. Yet more preferably, the rolling time window covers a fixed time period of 7 days.

In this way a user may be able to download any programmes that have been missed and which have been broadcast as part of a scheduled broadcast within, for example, the last seven days.

Preferably, the listing means is adapted to list content which will be broadcast in the future within a rolling time window. Preferably, the rolling time window covers a fixed time period of between 1 and 15 days. More preferably, the rolling time window covers a fixed time period of between 5 and 10 days. Yet more preferably, the rolling time window covers a fixed time period of 7 days.

Preferably, the listing means is adapted to enable a user to view content to be downloaded and/or ordered using a rolling time window, thereby preferably to enable a user to look ahead for a fixed period of time (for example, between 2 and 15, or between 5 and 10, or desirably the forthcoming seven days) for ordering downloads, and preferably to enable a user to review content that has already been broadcast in a previous fixed time period (for example, between 2 and 15, or between 5 and 10, or desirably during the previous seven days) for downloading and replaying content. The rolling time window may be between 2 and 30, preferably between 10 and 20, more preferably 14 days in duration.

Preferably, the listing means is adapted to list content in the form of a rolling time window centred around the current date, or skewed either in to the past or the future.

In this way a user may be able to see which programmes will be broadcast as part of a future scheduled broadcast within, for example, the coming seven days, and order or book content for downloading after said content has been broadcast.

Preferably, the listing means comprises a calendar having a rolling active time window. More preferably, the calendar is in the form of a monthly calendar, which displays the days of the month.

Preferably, each of the days shown within the active rolling time window are linked to a list of content available on each of those days.

Preferably, the listing means comprises means for selecting a particular day within the active rolling time window, thereby to list content available on a particular day.

Preferably, the days shown on the calendar which are not within the active rolling window are inactive. More preferably, days shown on the calendar which are not within the active rolling window are greyed-out. Preferably also the first and/or last days which are available within the active rolling window are highlighted.

Preferably, the guide further comprises means for text based searching of the content.

Preferably, the listing means is adapted to display information relating to each content item. More preferably, the listing means is adapted to display any one or more of the following parameters relating to each content item: size, duration, when first broadcast, type of content, and channel. Preferably, the listing means is adapted to display iconic indications representative of the nature and/or type of each content item. Preferably, the listing means is adapted to display further information regarding a particular item when the focus is on that item.

Preferably, the listing means further comprises means for playing previews of the listed content.

Preferably, the listing means is adapted to allow a user to click on a content item in order to download said content item.

Preferably, the system further comprises means for ordering the download of a series of related content items in advance of the scheduled broadcast of the content. Thus, a user may for example download an entire series of a television programme, by downloading each programme after it has been broadcast.

This aspect may also be provided independently. According to a further aspect of the invention, there is provided an electronic programme guide, said guide comprising means for listing content which will be broadcast in the future, means for ordering the download of a series of related content items in advance of the scheduled broadcast of the content, and means for downloading each content item automatically once it has been broadcast.

Preferably, the downloading means comprises means for cancelling an order for the download of series of related content items.

Preferably, the listing means is adapted to provide an indication as to whether each content listed item is part of a series of related content items.

Preferably, the listing means is further adapted to list downloaded content items.

Preferably, the listing means is adapted to provide information relating to each downloaded content item. More preferably, the listing means is adapted to display any one or more of the following parameters relating to each downloaded content item: size, duration, when first broadcast, type of content, time left during which the content can be viewed, an indication of whether it has been viewed yet, and channel of broadcast. Preferably, the listing means is adapted to display iconic indications representative of the nature and/or type of each downloaded content item.

Preferably, the listing means is adapted to indicate the viewing status of each downloaded content item, for example, whether or not a particular downloaded content item has been viewed or played, or how many times a particular content item has been viewed or played.

Preferably, the listing means is adapted to indicate the date on which each downloaded content item was broadcast.

Preferably, the listing means is adapted to indicate viewing rights associated with each downloaded content item. More preferably, the listing means is adapted to indicate the amount of time left for viewing a particular downloaded content item. Yet more preferably, the listing means is adapted to list the number of days left for viewing a particular downloaded content item.

Preferably, the listing means is adapted to alter the display of downloaded content items in dependence on the amount of time left for viewing a particular downloaded content item, for instance, the colour in which a downloaded content item is represented may change in dependence on the amount of time left for viewing a particular downloaded content item. In one embodiment a content item may be shown in red or some other appropriate colour on the last day of availability of that particular content item.

Preferably, the listing means is further adapted to alter the display of downloaded content items in dependence on the number of times a particular content item has been viewed, for instance, the colour in which a downloaded content item is represented may change in dependence on the number of times a particular content item has been viewed.

Preferably, the listing means is adapted to indicate the number of times a particular downloaded content item may be viewed.

Preferably, the listing means is adapted to indicate whether a particular downloaded content item has expired.

Preferably, the listing means is adapted to list downloaded but expired content. More preferably, the listing means is adapted to list expired content separately from available content.

Preferably, the listing means is adapted to indicate the status of ordered or booked content items that have not yet been downloaded, as well preferably as their type (e.g. whether a series or not)

Preferably, the listing means comprises means for sorting downloaded content items on command of a user. More preferably, the sorting means is adapted to sort content items on the basis of any one of the following parameters: broadcast date and/or time; channel of broadcast; file size; days left for viewing; number of times viewed; and status.

Preferably, the listing means is adapted to display a thumbnail representative of each downloaded content item. More preferably, the listing means comprises means for activating and/or deactivating the thumbnail display.

Preferably, the listing means is adapted to display a thumbnail representative of each content item. More preferably, the listing means comprises means for activating and/or deactivating the thumbnail display.

According to another aspect of the invention, there is provided a web-based interface which comprises: means for listing content which has been previously broadcast as part of a scheduled programme broadcast in the form of an electronic programme guide, and means for downloading said content which has been previously broadcast.

In one preferred embodiment, the electronic programme guide as hereinbefore described is implemented in software.

It is envisaged that aspects of this guide and/or media player may be implemented in software running on a computer such as a personal computer or receiver/decoder, (which may be connected directly to a monitor or to a television or other display means) which enables a user to download content that has been previously broadcast and to replay said content. Using this software, the user may also order content to be downloaded once it has been broadcast.

Other aspects of this guide and/or media player may be implemented in software running on various interconnected servers, and it is to be appreciated that inventive aspects of this guide and/or media player may therefore reside in the software running on such servers.

Furthermore, individual user's computers will also be connectable to a communications network which is in turn connected to the various other servers and computers which constitute the system and accordingly there may be communications software running on each of the aforementioned computers and/or servers which controls the system.

According to another aspect of the invention, there is provided a computer programme product for implementing the Electronic Programme Guide or media player as hereinbefore described. This may be used for example to load software onto the user's computer.

The invention extends to methods of providing individual users access to content that has already been broadcast to a plurality of users on a scheduled basis, and to computer programme products for implementing said methods.

The invention also extends to a server or a plurality of interconnecting servers running software adapted to implement the system as hereinbefore described.

The invention extends to methods and/or apparatus substantially as herein described with reference to the accompanying drawings.

Any feature in one aspect of the invention may be applied to other aspects of the invention, in any appropriate combination. In particular, method aspects may be applied to apparatus aspects, and vice versa.

The invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

The invention also provides a signal embodying a computer program for carrying out any of the methods described herein and/or for embodying any of the apparatus features described herein, a method of transmitting such a signal, and a computer product having an operating system which supports a computer program for carrying out any of the methods described herein and/or for embodying any of the apparatus features described herein.

Furthermore, features implemented in hardware may generally be implemented in software, and vice versa. Any reference to software and hardware features herein should be construed accordingly.

Preferred features of the invention will now be described, purely by way of example, with reference to the accompanying drawings, in which:

FIG. 10 shows a Digital Rights Management (DRM) system;

FIGS. 11A to 11H show a process flowchart illustrating the interaction between a user and a DRM server;

DEFINITIONS AND ACRONYMS

The following definitions and/or acronyms are used in the description of the various embodiments of the invention:

| Term | Definition |
|---|---|
| 50i MPEG2 | 50 Mbps iFrame MPEG2. A full quality format used for capturing Broadcast TV output. |
| Broadcast Stream | The TV or Radio signal delivered from playout |
| DMS | Kontiki ™ Delivery Management System |
| DRM | Digital Rights Management |
| EPG | Electronic Programme Guide |
| Geo-IP | An application that uses an IP address to determine a users geographic location. |
| GPI | General Purpose Interface. Signals and metadata inserted in Broadcast stream, to indicate junctions in a programme. |
| HDTV | High Definition Television |
| MOMS | Media Object Management System, produced by a broadcaster. |
| ODPS | On Demand Production System. This is the sub-system for producing the metadata and content required for system. |
| SDI | Serial Digital Interface. A bit-serial digital interface for SDTV component signals operating at data rates ranging from 19.4 Mb/s up to 540 Mb/s. The SDI interface is standardized in SMPTE 259M, SMPTE 310M and can be carried over coaxial and fiber optic cables |
| Series Stacking | Series Stacking means that for a discreet series all previous episodes of the series will be available until 7 days after broadcast of the final episode. e.g. 'Spooks' series 3 runs for 10 weekly episodes, so after the $5^{th}$ episode has been played out a viewer would be able to see episodes 5, 4, 3, 2 & 1. |
| SID | Schedule Interface for Digital Broadcasting |
| SDTV | Standard Definition Television |
| UAT | User Acceptance Test |
| VCS | Radio Broadcast Scheduling & Playout system |
| VOD | Video On Demand |
| WM9 | Microsoft ™ Windows ™ Media 9 |
| XrML | eXtensible rights Markup Language |
| TBS | TV Broadcast Scheduling system (PICS/Orion) |

System Architecture

Figure 1:
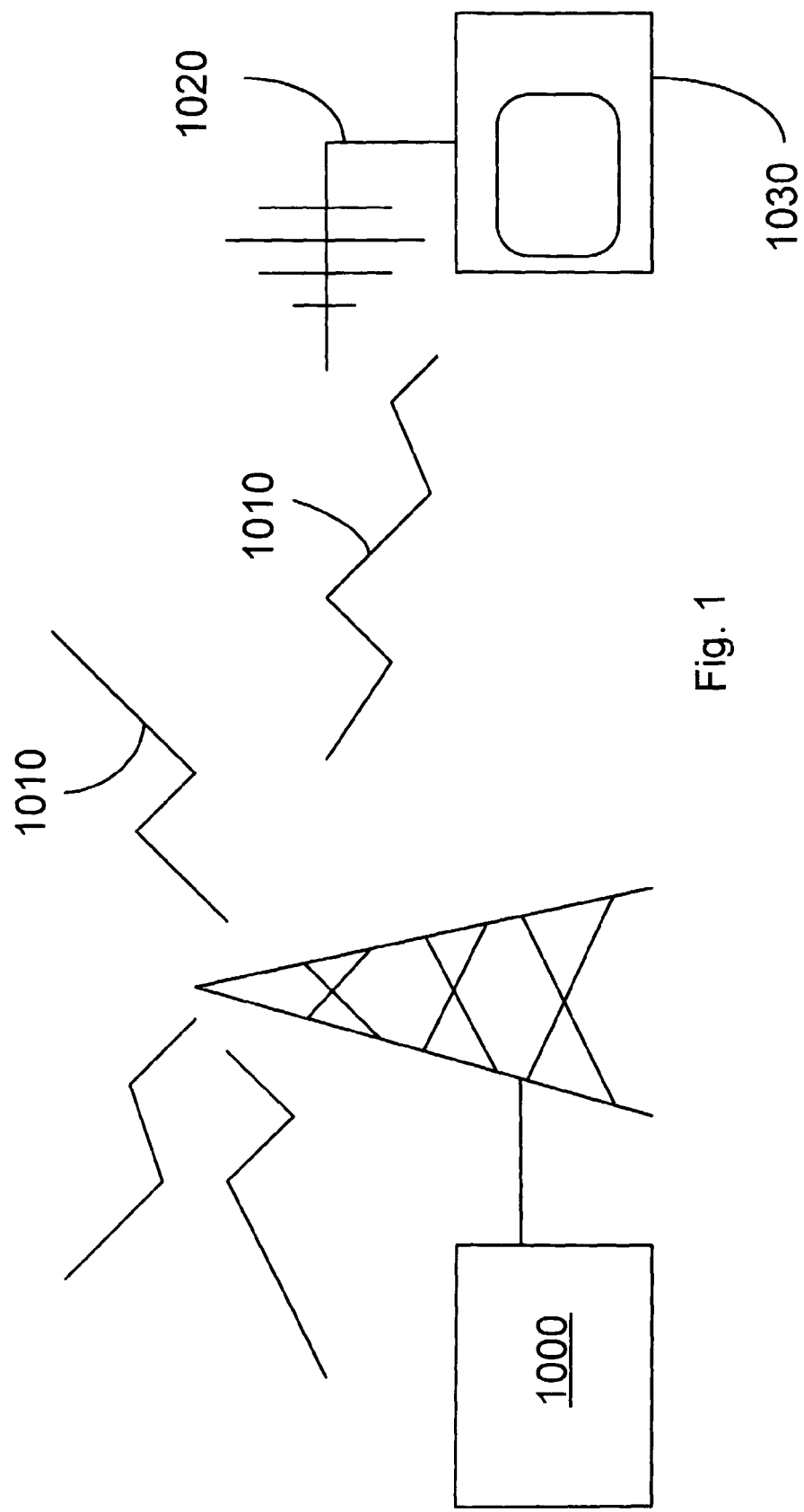
FIG. 1 shows an example of a terrestrial broadcast system.

Conventionally, terrestrial, cable and satellite television and radio broadcasters broadcast content in a scheduled fashion. Thus, all content provided by such broadcasters is allocated particular slots in a schedule and is then transmitted at a specific time on a specific day. For example, FIG. 1 shows an example of a prior art terrestrial television broadcaster 1000, which broadcasts a television channel on a free-to-air basis via signal 1010. This signal 1010 is then received by the receiver 1020 of a user's television 1030, which demodulates the signal and enables the user to view any content broadcast as part of the channel.

However, all content transmitted by the broadcaster 1000 is available only as part of scheduled broadcast, and a user has to ensure that he either watches programmes of interest at the time they are broadcast, or else remembers to set a video recorder, in advance, to record programmes for later viewing.

Figure 2:
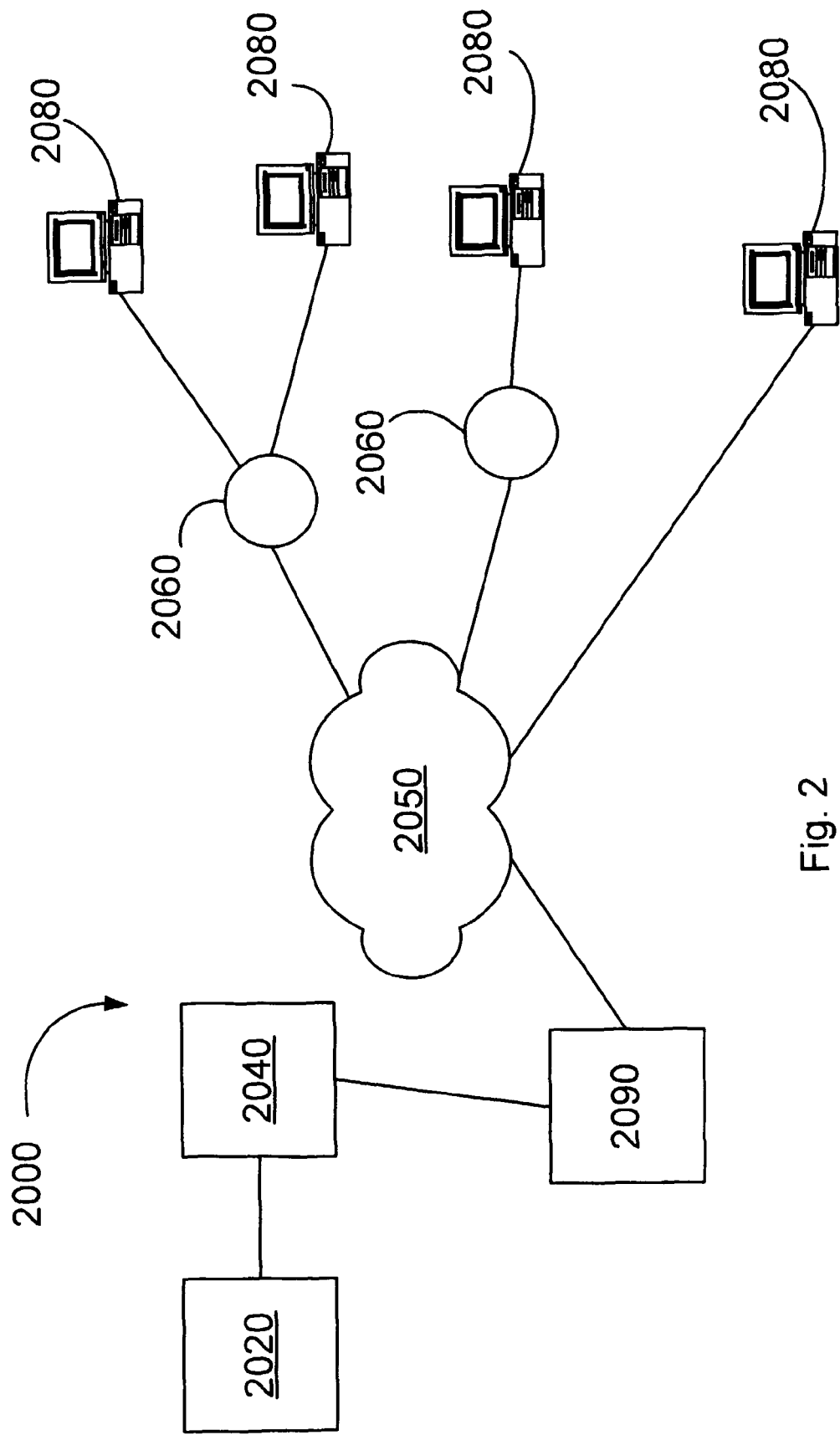
FIG. 2 shows a system for producing and distributing content which has already been broadcast as part of a scheduled broadcast.

FIG. 2 shows a preferred embodiment of a system 2000 for providing individual users with access to content that has been previously broadcast as part of a scheduled broadcast. The system 2000 includes a broadcaster 2020 which is connected to a server 2040 that contains content that has been previously broadcast by the broadcaster 2000 as part of a scheduled broadcast. The server 2040 is connected to a network, for example, the Internet 2050, which is in turn connected to a number of further servers 2060, which may be operated by Internet Service Providers (ISPs) or Broadband Service Providers (BSPs). Individual user personal computers 2080 are then connected to these servers 2060 in the usual manner. In addition user's personal computers 2080 may be connected to the Internet in some other fashion. The system 2000 also includes a Digital Rights Management (DRM) server 2090.

In use, once content has been broadcast by the broadcaster 2020 over their usual terrestrial, cable or satellite transmission channel, as part of a scheduled broadcast, this content is encoded and stored on the server 2040. The content is then wrapped in a digital rights management package which provides restricted access to the content. For example, the DRM wrapping may enable a user to replay the content for fixed period of time, say for a seven-day period, or only a fixed number of times.

Users are then able to view the content stored on the server 2040, by way of a web interface, for example, and download the content onto their local computer 2080. Users may then access and replay the content on demand whenever convenient, within the fixed period of time specified by the DRM wrapping. The user can also replay the content as many times as desired within the limits specified by the DRM wrapping.

Content that has been previously broadcast is typically made available to users for download for a fixed period of time following the broadcast. Thus, if a user finds out that he has missed a programme of interest he can access the server 2040 and is able to download the programme for viewing when convenient.

Preferred embodiments include any, some, or all of the following features in any appropriate combination:

Download of scheduled broadcast content upon command for a fixed period of time after scheduled broadcast, and local storage of the content;

limited duration rights for replay of the content;

limited number of plays of each piece of content;

storage of content at, and download of content from, a plurality of sites, for instance ISPs;

rolling time window (for instance, seven days after broadcast of content) for download of content;

rolling lookahead for fixed period (for instance, seven days prior to broadcast of content) for booking download of content;

automatic download of series of programmes on command of a user local management of downloaded content, including:— removal of availability of content after expiry of allowed storage time, or after allowed number of plays;

user allocation of memory allowed for storage of content;

user control of downloaded content and of bookings of content, including deletion of content or of bookings on command of a user;

monitoring of memory occupied by stored content, and available for further content;

Electronic programme guide listing scheduled previously broadcast content and/or content scheduled to be broadcast in future, and means for downloading and storing content from remote source after it has been broadcast;

listing content already broadcast within rolling time window (for instance, previous seven days) and available for downloading;

listing content to be broadcast within rolling time window (for instance, following seven days) and available for booking download;

calendar display with rolling, active time window;

selection of days within rolling active time window of that calendar, linking to lists of available content from those days;

display of downloaded but expired content;

display of stored file size in respect of each programme;

display of time remaining, and number of plays remaining, for stored content;

display of booking data for booked content;

particular combinations of data displayed on the 'Home', 'Guide', and 'Your Programmes' screens;

means for sorting electronic programme guide listings on command of a user by at least one of:—broadcast time, channel, file size;

change of display for listed content in dependence on time remaining for that content to be available (for instance, change of colour of display on last day of availability of particular content);

text based searching of electronic programme guide;

streamed previews of programmes available for download;

A web interface to select and download content with limited duration rights, preferably incorporating subsidiary features as listed above;

Automatic download of series of programmes, from a remote source in dependence upon availability at the remote source of the latest programme in a series;

overwriting of preceding programme in series upon download of latest programme;

local management of automatic downloads, including ability to book or cancel download of a series.

Further aspects of the architecture and operation of the system are now described in further detail.

Figure 3:
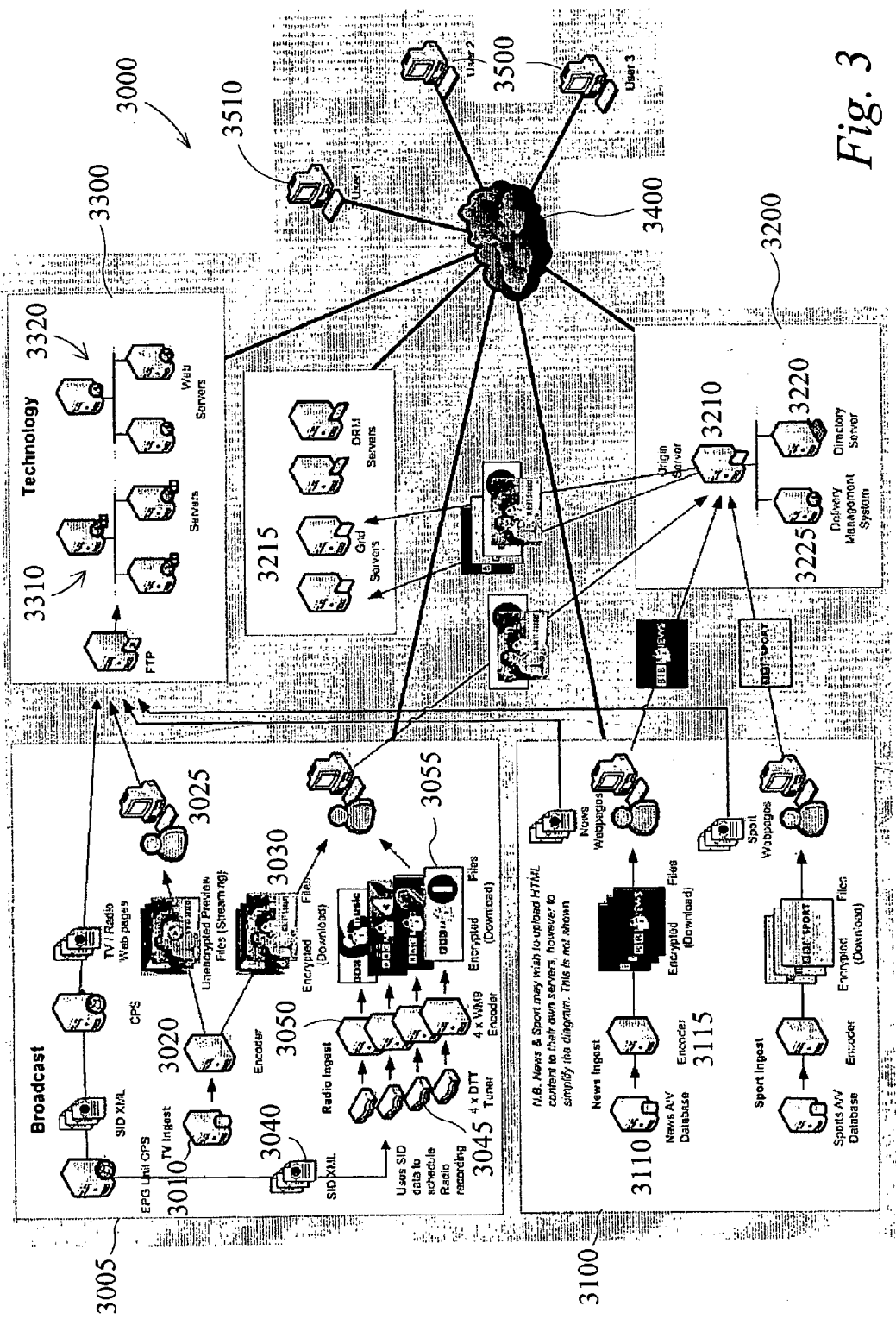
FIG. 3 shows a high level system architecture of a system for providing content to users that has already been broadcast as part of a scheduled broadcast.

FIG. 3 shows a preferred embodiment of the system described above (as shown in FIG. 2). FIG. 3 shows a high level system architecture 3000 comprising content generated by a broadcast system 3005, a system 3100 for generating content such as news and sports clips sourced from news and sports web pages or archives, a Digital Rights Management Software (DRM) system 3200, and a content distribution system 3300 connected via the internet 3400 to multiple software client application programs.

Broadcast programme content is prepared for distribution by using an encoding process. In this embodiment, a Windows™ 9 media encoder is used; however, in alternative embodiments other encoder systems, for example a RealNetworks™ encoder or an Adobe™ encoder, can be used. The original broadcast programme is copied from a media management system 3010 to a Windows™ Media 9 encoder 3020, which produces unencrypted preview WMV files (for streaming) 3025 and encrypted WMV files 3030 for wrapping by DRM system 3200 with a software layer comprising a user license which is 'unlocked' by a digital key related to the user and/or the user client software and/or hardware.

To create the license for each programme, the date and time of broadcast (or of expected broadcast) is required. Scheduling data containing broadcast date and time (SID) data 3040 is used to schedule radio recording using DTT tuners 3045 which output the radio program content into a Windows™ Media 9 encoder 3050 producing encrypted WMA files 3055 for wrapping with a DRM license. In an alternative embodiment, SID data can also be obtained directly (i.e. not over the air) from an electronic file containing electronic programme guide information.

News and sports content is prepared using a news audio visual database 3110 and a Windows™ Media 9 encoder 3115 which produces encrypted WMV files. The sports content is prepared in the same way. News and sports content is also sent to the DRM system 3200 for wrapping with a DRM license.

A user is able to view content which has been previously broadcast, as well as content which will be broadcast in future by accessing web pages stored on the servers 3310 and 3320. This content is shown in the form of an Electronic Programme Guide accessible via these web pages. Furthermore, previews relating to such content may be streamed to a user directly from these servers 3310, 3320, as preview content is not encrypted.

A user may then either decide to download content, which has been previously broadcast, or order or book content to be downloaded after it has been broadcast.

The DRM system 3200 comprises an origin server 3210 linked to remote grid servers 3215, a directory server 3220 and a delivery management system 3225. The DRM system 3200 uses Windows™ Media 9 DRM which is supported on a multitude of platforms such as PC, Macintosh, selected Personal Digital Assistants (PDAs); however, in alternative embodiments other DRMs such as DRMs available from Real™, DivX™, and Apple™ may be employed.

The DRM system 3200 encrypts programs for distribution so that the program is unviewable unless a unique, non-transferable license is issued from the content provider. In a preferred embodiment, the license is unique to the hardware device and is non-transferable. Viewing licenses can also be time-limited, for example the license period would expire after seven days (after the programme was encrypted) and the programme would not be able to be viewed after the license period expired.

Figure 9:
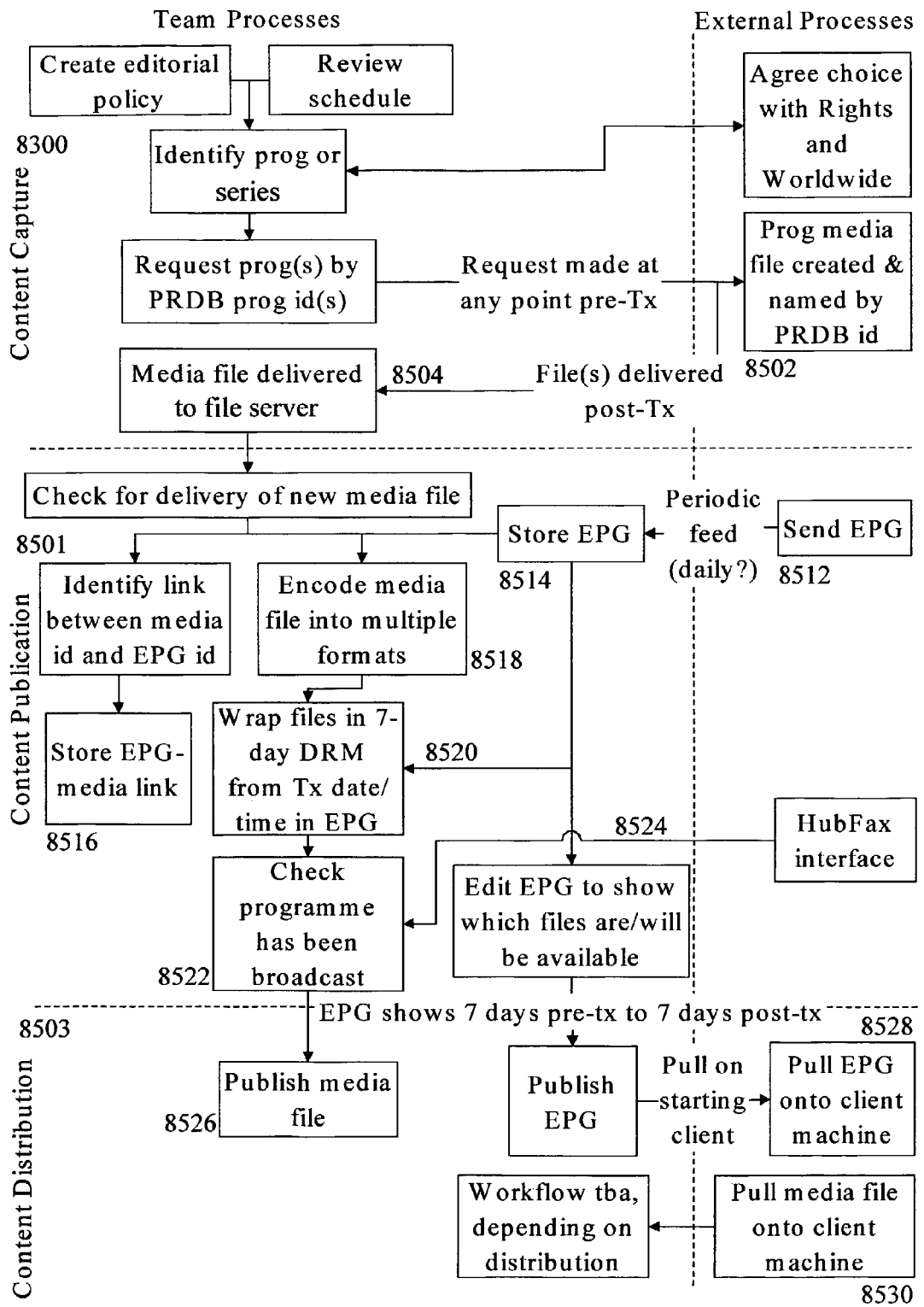
FIG. 9 shows the process flow involved with media content capture, publication, and distribution.
Figure 11A:
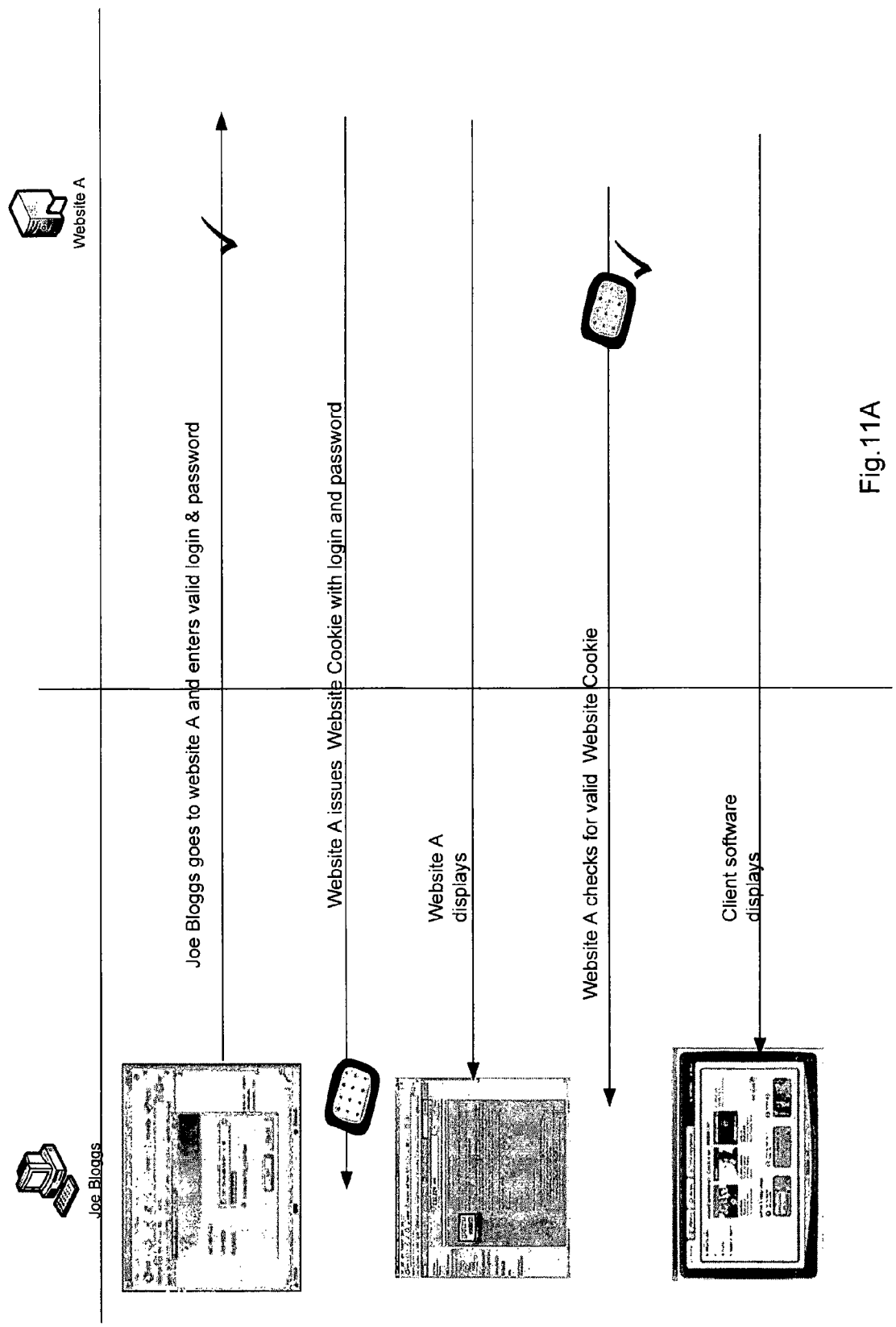
Figure 11C:
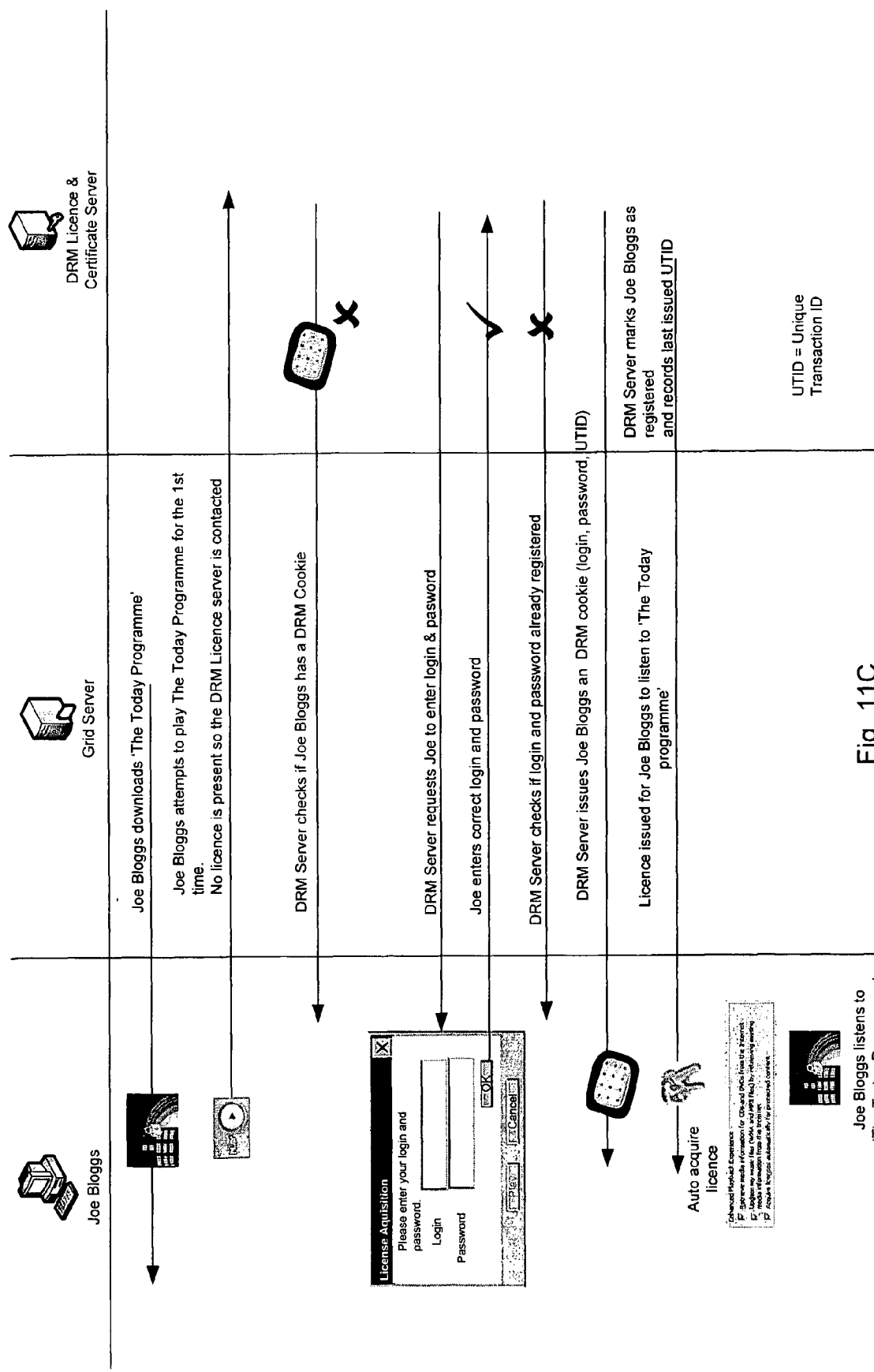
Figure 11D:
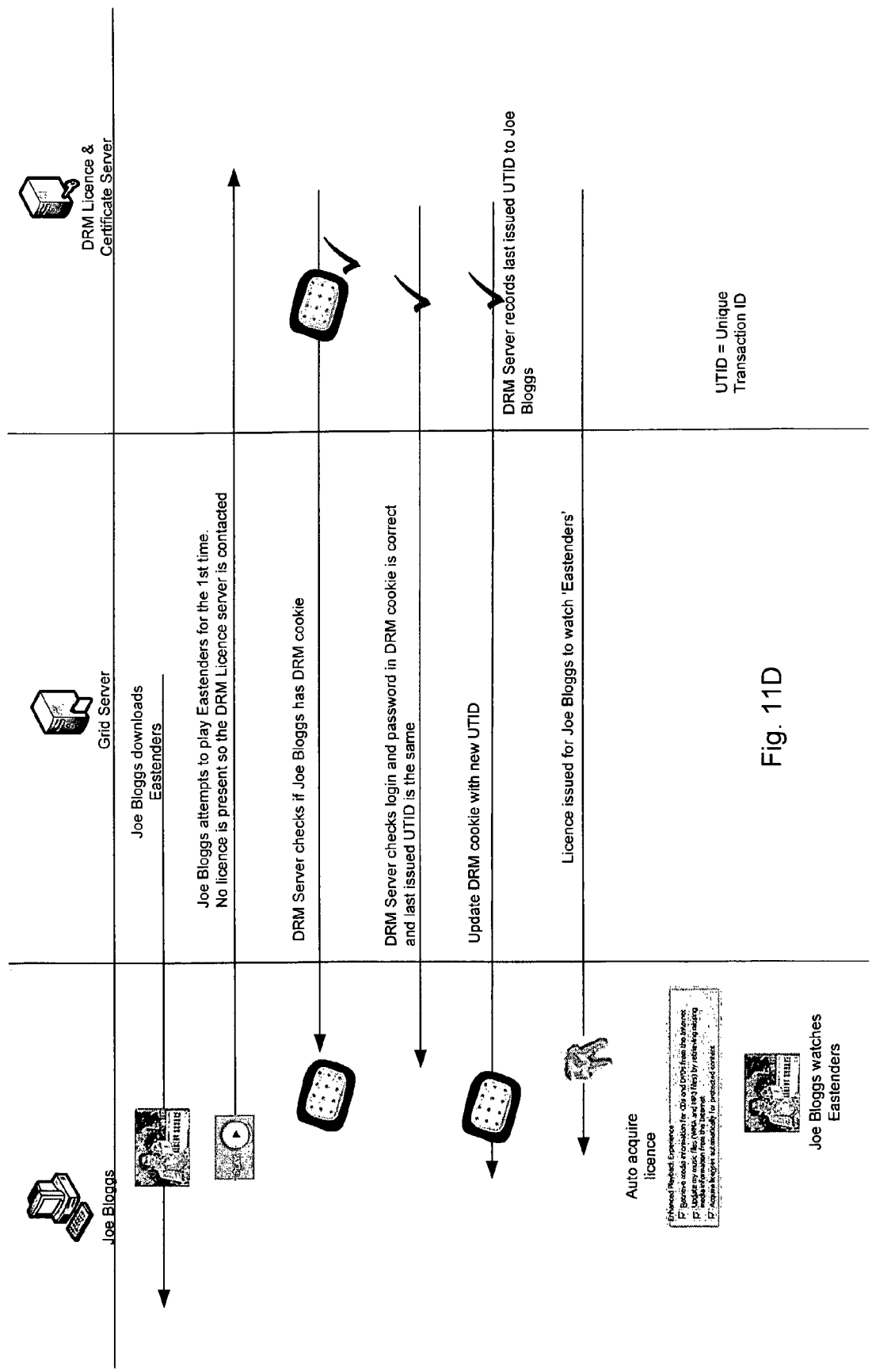
Figure 11E:
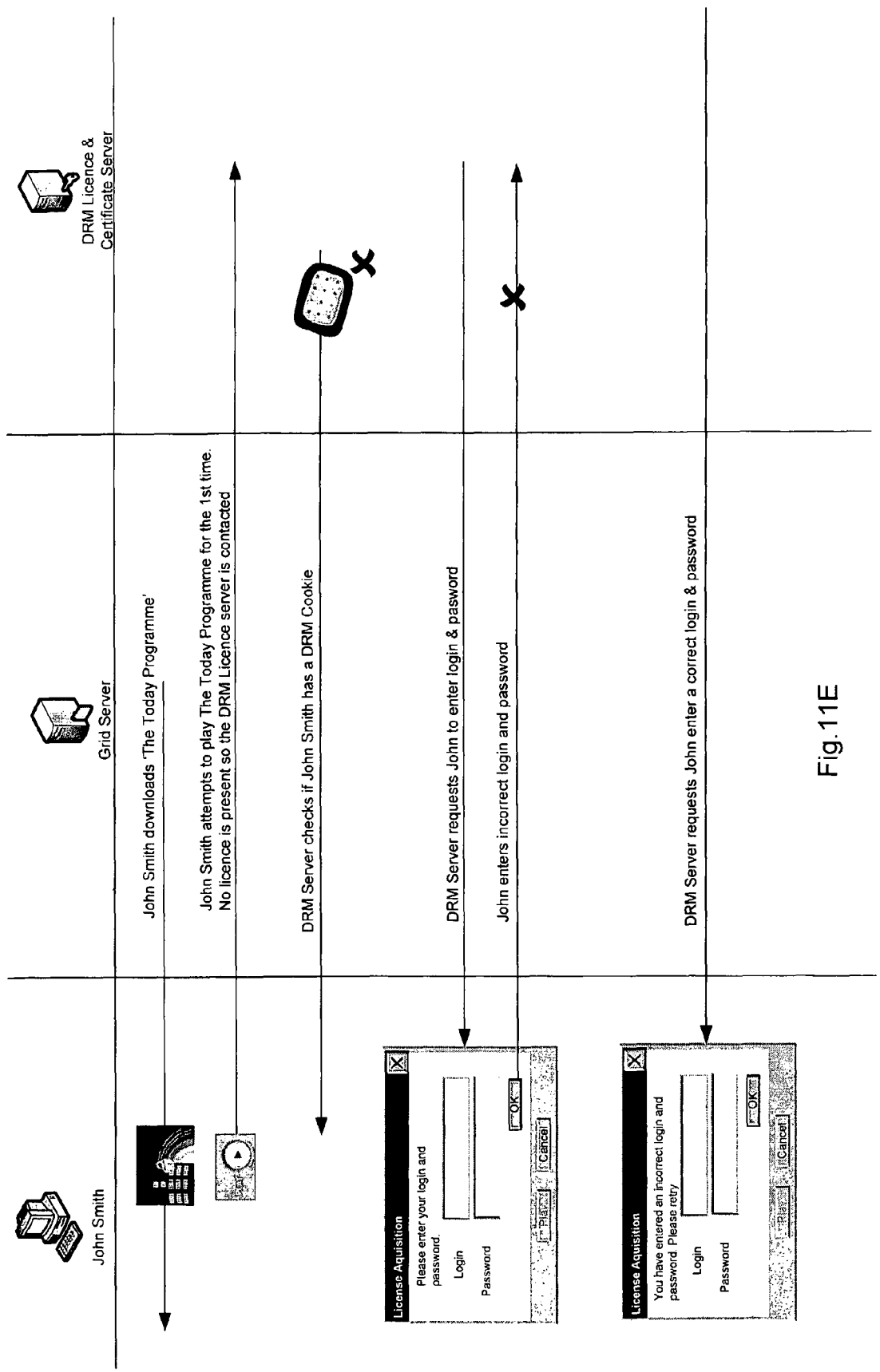
Figure 11F:
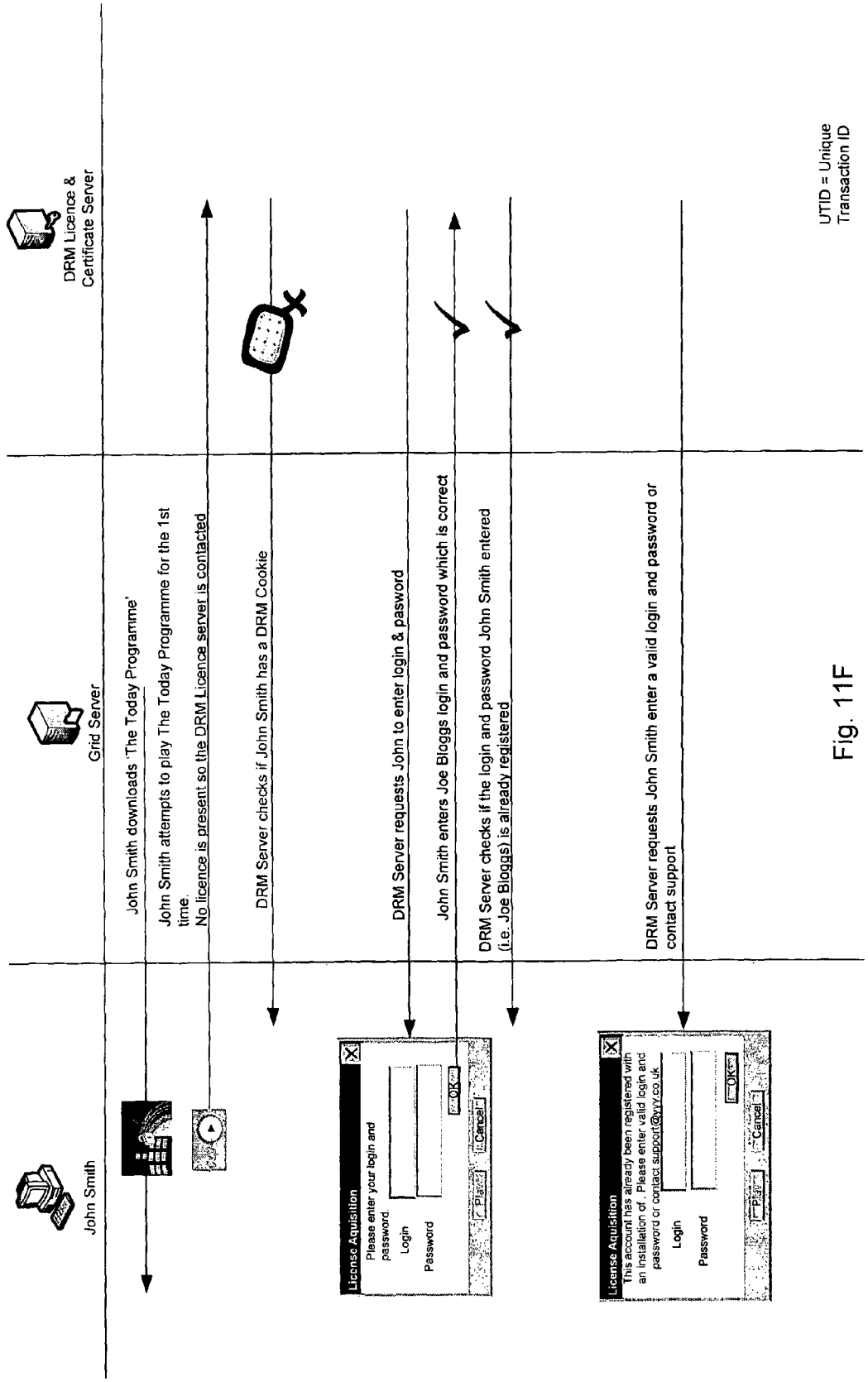
Figure 11G:
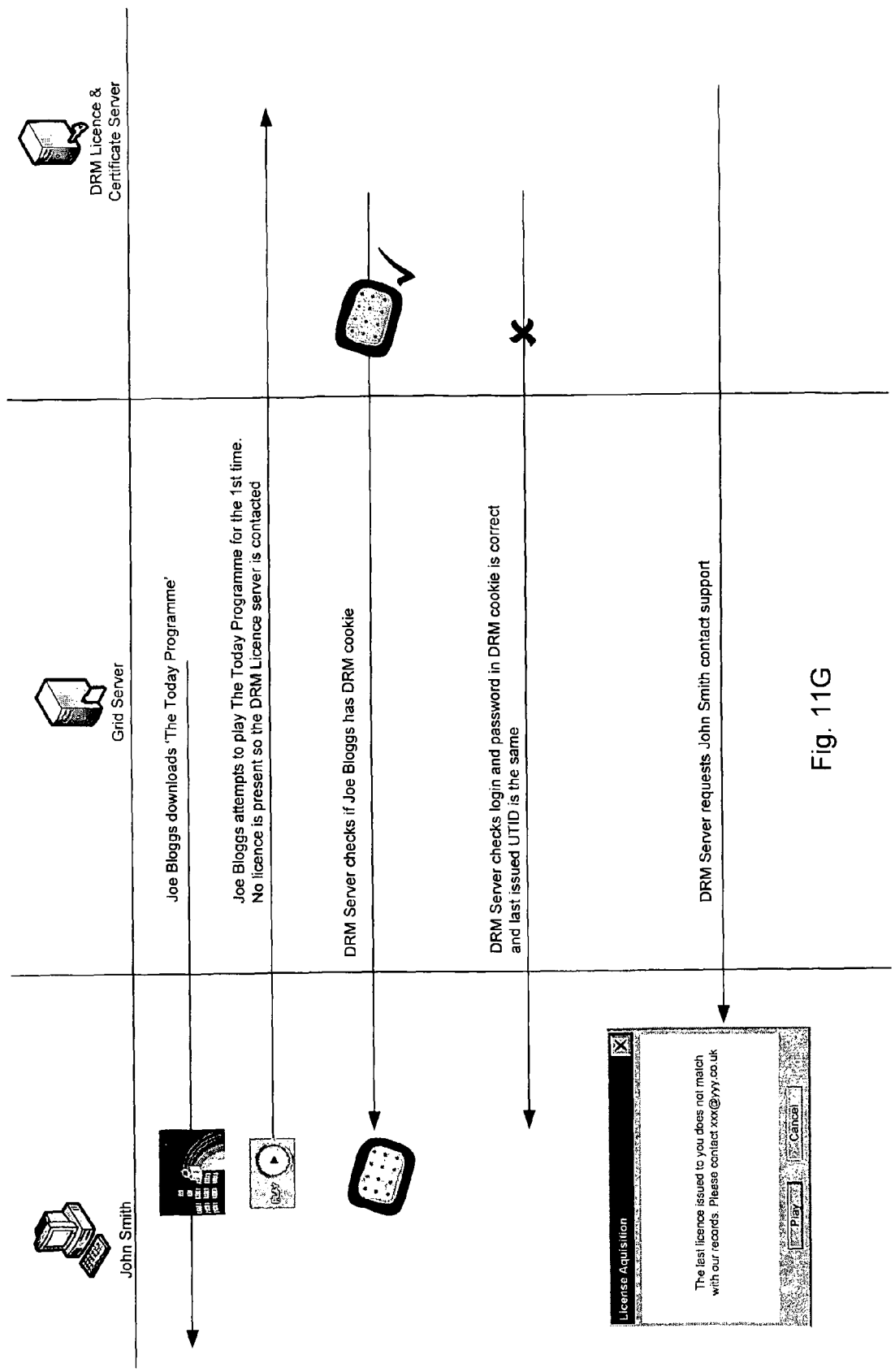
Figure 11H:
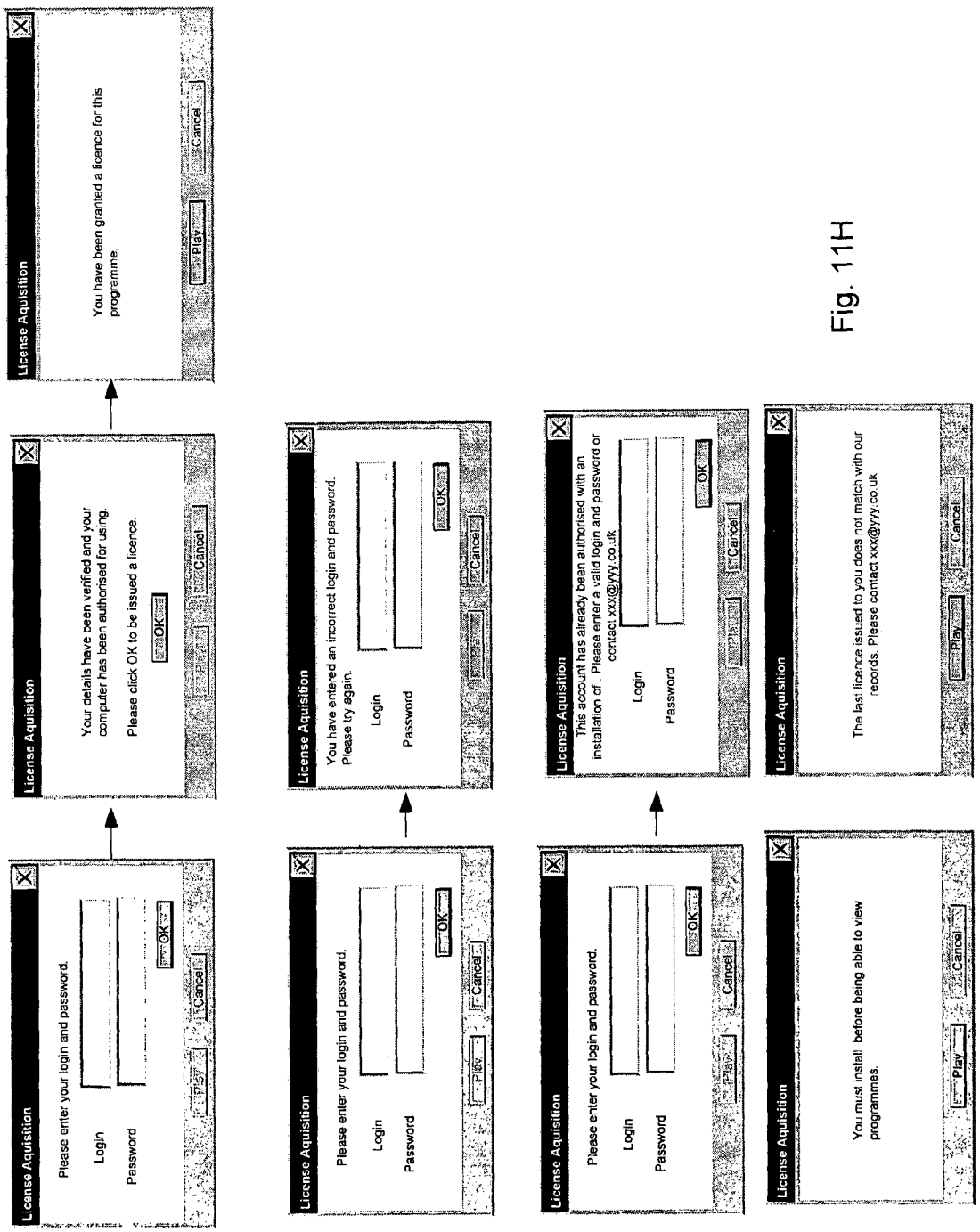

In a preferred embodiment, the content distribution system 3300 comprises a peer-to-peer network which allows a user's computer 3510 to download parts of a selected program from other users' computers 3500 simultaneously, assembling the complete programme file at the user's computer 3510 (further details are shown in FIG. 9). In other embodiments, alternative content distribution systems may be used, such as Broadband Servers Providers which host content for direct download, Centralised Distribution in which the content provider hosts the material for download at a master content server, and a Combination Centralised server with Super Hubs (additional large servers) located at broadband service providers' exchanges.

In a variant, the origin server 3210, delivery management server 3225 and the directory server 3220 control the distribution of content, and the servers 3310 and 3320 are used to provide details, in the form of web pages, of content available for downloading. In this case information relating to available content is uploaded to the servers 3310 and 3320 which are accessible to users 3500 via the Internet 3400.

When users 3500 select content on the servers 3310, 3320 for downloading, the content is distributed to a user's computers 3500 via the servers 3225, 3220 and 3210.

Figure 4:
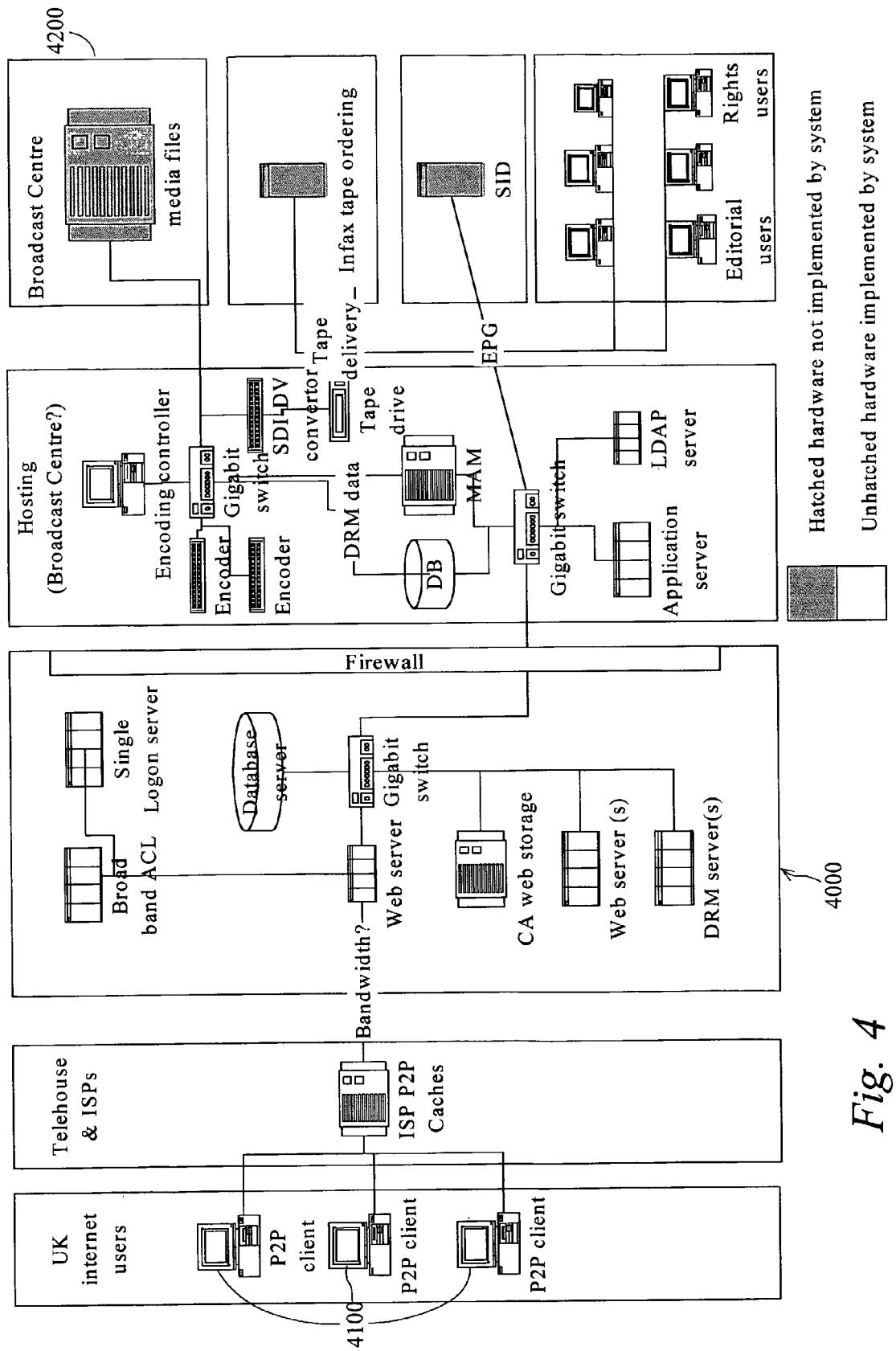
FIG. 4 shows various items of hardware equipment used to implement the content production and distribution system.

FIG. 4 shows items of equipment 4000 used to implement the system shown in FIG. 3. The delineated areas show the equipment that is located in particular geographical areas. For example, the Internet users' personal computers 4100 are shown in the left hand side box whilst the broadcast centre 4200 equipment is shown at the top right hand side corner of FIG. 4. The equipment which is shown using a diagonal hatch pattern is, in one alternative embodiment, not implemented by the interactive media system 3000, whereas the un-hatched equipment is used to implement the media system 3000.

The content production and distribution system in the preferred embodiment will now be described in further detail with reference to FIG. 5.

Figure 5:
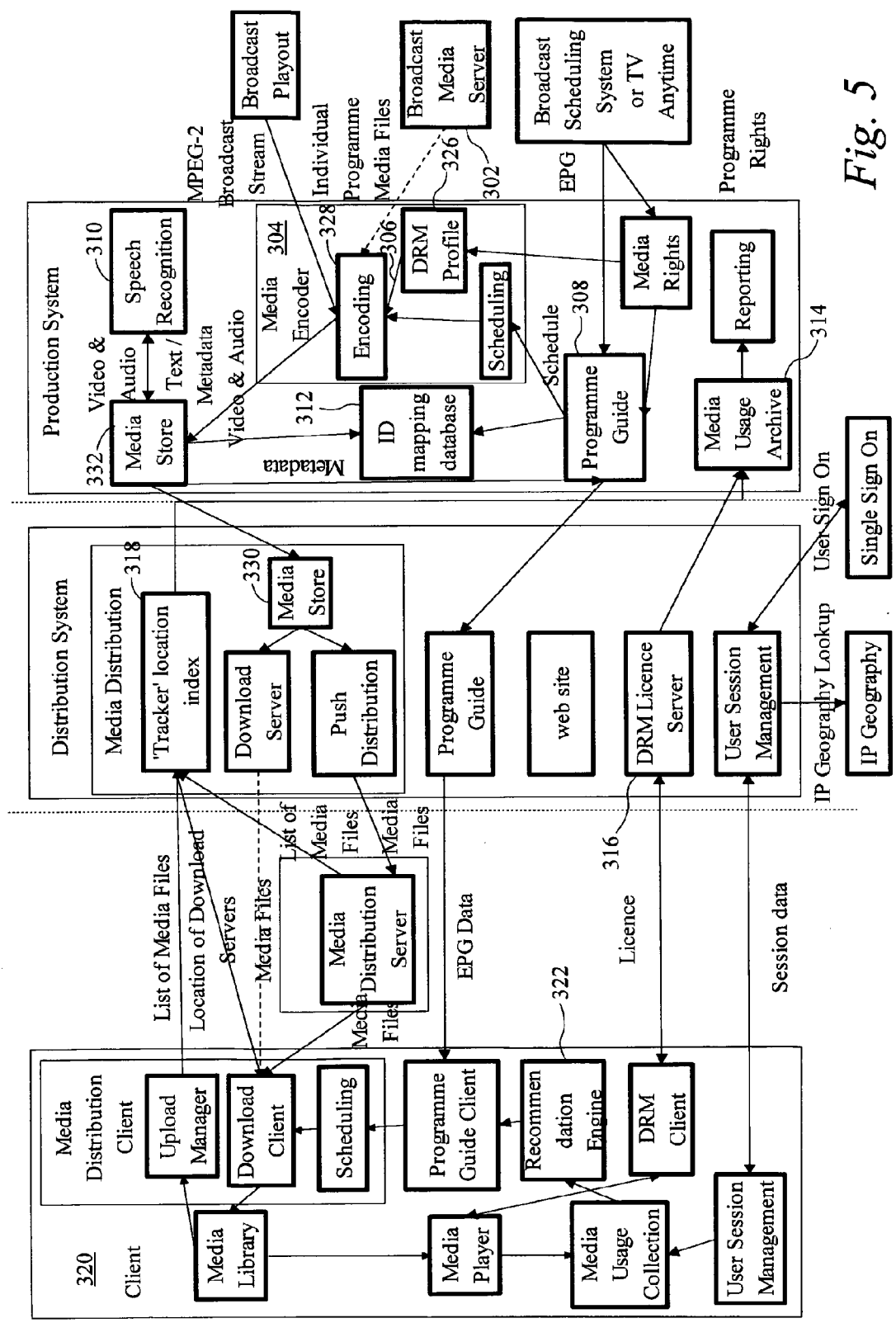
FIG. 5 shows a detailed system architecture of the content production, distribution and viewing system.

FIG. 5 shows a more detailed illustration of the logical architecture of the content production and distribution system 3000.

The Broadcast Media Server 302 stores digitised content to be played.

The Media Encoder 304 is responsible for creating the DRM-wrapped content files. In some situations, it is necessary to transcode the media to change the format or the bitrate. The DRM encoding 306 depends on when the programme was broadcast for correctly setting the license expiry period; therefore a link is provided to the Programme Guide 308.

In the preferred embodiment, existing text is used for subtitling files. In an alternative embodiment, a system 310 can be used to partially automate the recognition of speech in programmes. The text generated would be used for subtitling.

An ID Mapping Database 312 is used to link metadata on the scheduling, rights and content management systems by mapping the connections between the separate identifiers. In other embodiments, systems such as Orion for scheduling and IPM for rights management are employable.

The Media Usage Archive 314 is used for usage reporting and analysis and is populated with data from the DRM server 316, for data on file usage and the P2P tracker 318 for data on the file distribution. In other embodiments it would be possible to have the user clients 320 send usage data back to the archive 314 if this granularity of data were required.

In an embodiment including a Recommendations engine 322, recommendations are generated on a server. The Programme Guide includes 'must see' tags for all users and adds extra personalised recommendations on the client. The Recommendations Engine is upgradeable and scaleable.

In an alternative embodiment, the programme guide 308 may take the form of a complete schedule with a subset of those programmes enabled for download. Alternatively, it may be a structured list (ordered by day, channel, genre etc) of programmes available, with no visibility of programmes which are not available.

In a further alternative embodiment it is possible that 'full EPG' functionality (i.e. a fully-populated schedule) is available in the Programme Guide 308.

The Programme Guide 308 will allow editing of the data to add the file download options.

The Transcoder (shown as the encoder 304) is part of the production system; this is responsible for changing bitrates, formats (e.g. MPEG-4 to WMF) and aspect ratios.

The DRM profiler 326 takes the DRM profile (e.g. unlimited plays allowed in a 7-day window) and the appropriate start and combines the information into an XML file.

The DRM Encrypter 328 takes the media file from the transcoder and the DRM profile 326 and uses them to create a media file which is stored in the Distribution Media Store 330, and the encryption key (not shown), which is sent to the DRM License Server 316.

The Media store 332 stores media in the system 301 to allow further refinements to be made to the media before sending to the distribution system 303. The diagram shows its use for speech recognition, but a number of alternative embodiments are envisaged, such as a holding area to allow simultaneous release of multiple programmes. In such an example, the holding area would be sufficient for approximately one week of programmes.

The Production Media Store is also useful during development of the system; it gives the opportunity for re-processing media files and re-sending them to the Distribution System.

The Programme Guide 334 takes the programme guide XML from the production system and transforms into XML or HTML (Hypertext Markup Language) for use by the client 320 (Extension Markup Language). This additional transformation between system 301 and the client is to insulate changes in one from the other.

Figure 6:
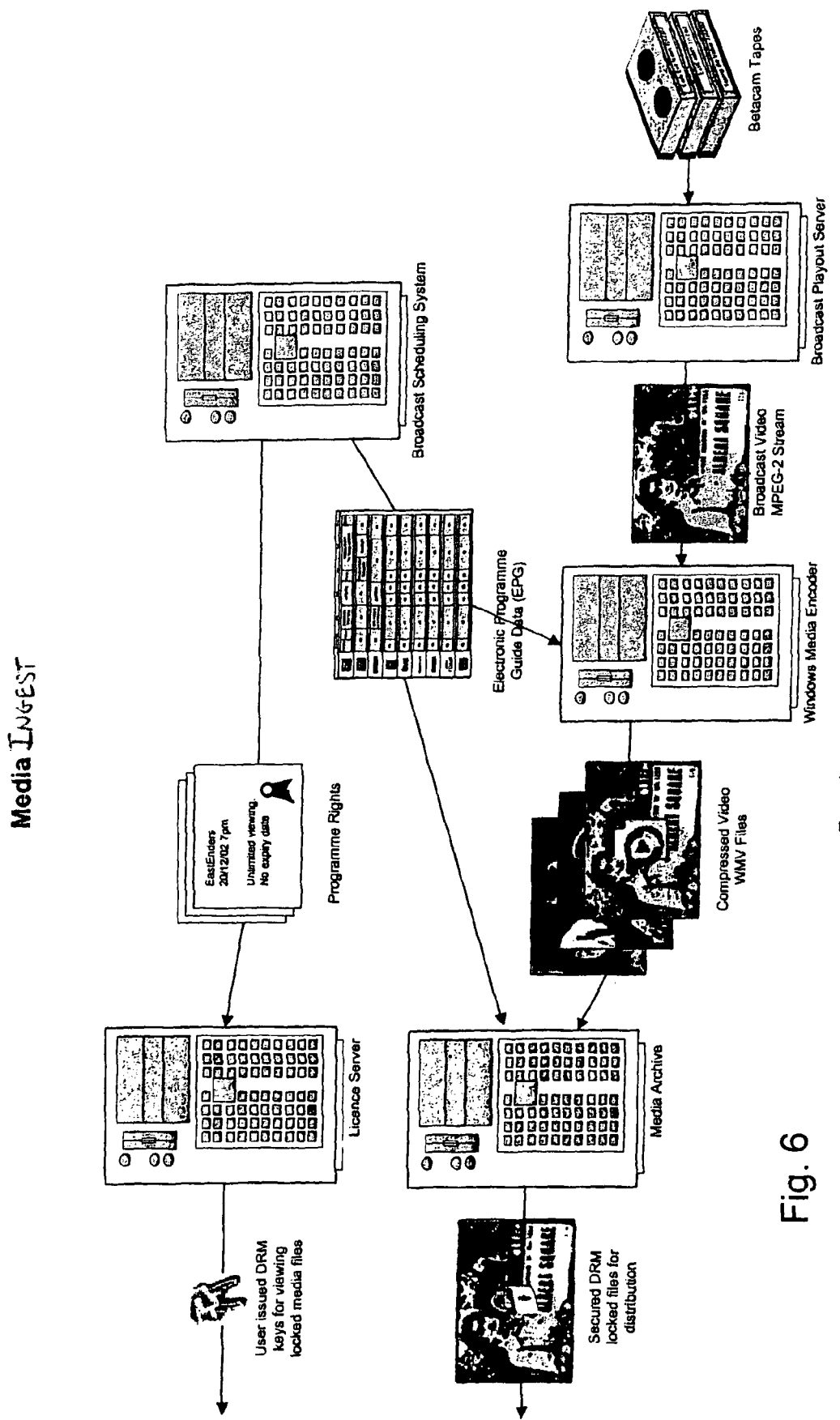
FIG. 6 shows a process flow diagram illustrating the creation of secured Digital Rights Management (DRM) content and DRM license keys from unencoded source media.
Figure 7:
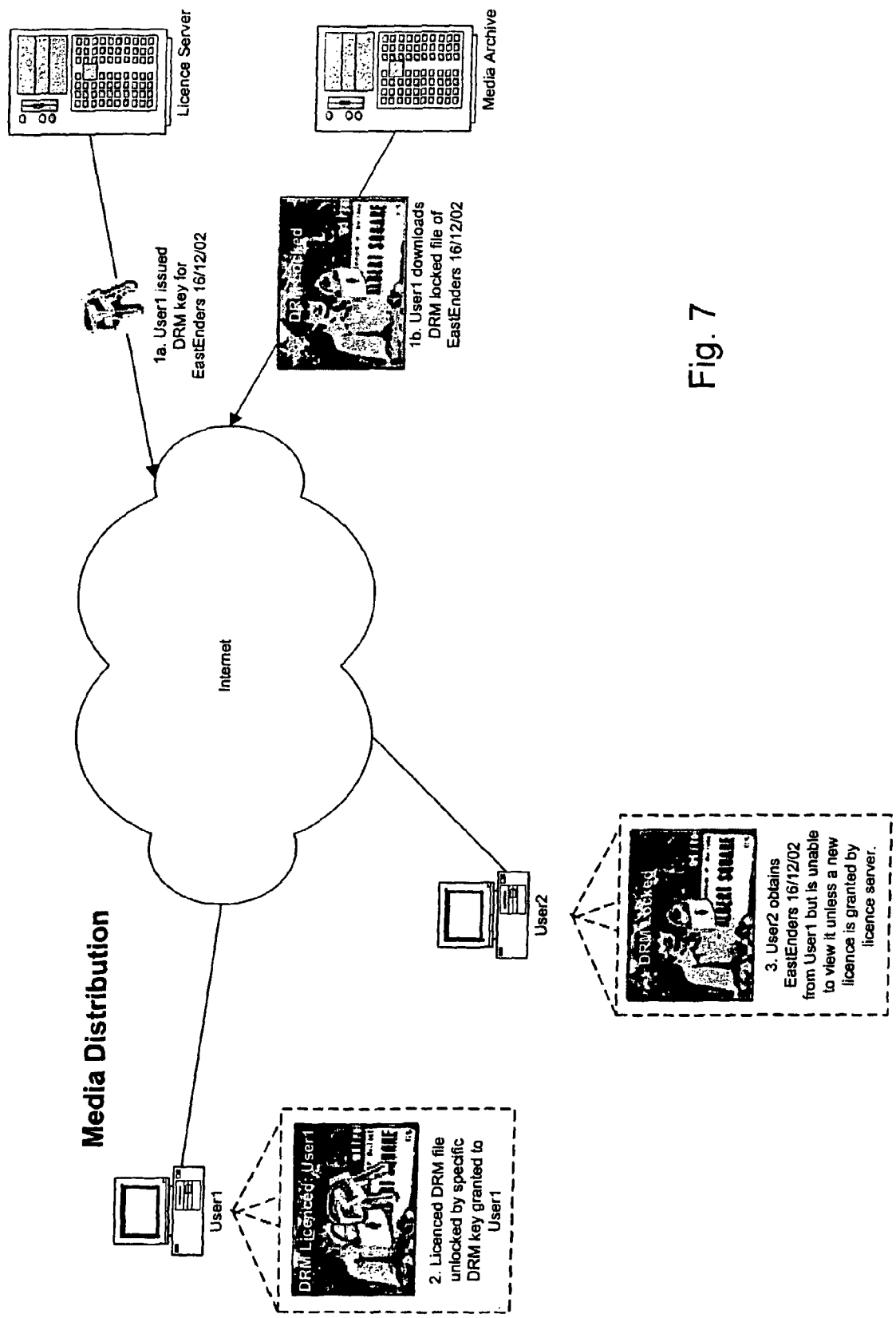
FIG. 7 shows a license server issuing a digital DRM key for unlocking content for viewing.

FIG. 6 shows a process flow diagram illustrating the creation of secured Digital Rights Management (DRM) content and DRM license keys from un-encoded source media. FIG. 7 shows a license server issuing a DRM key for unlocking content for viewing.

Figure 8:
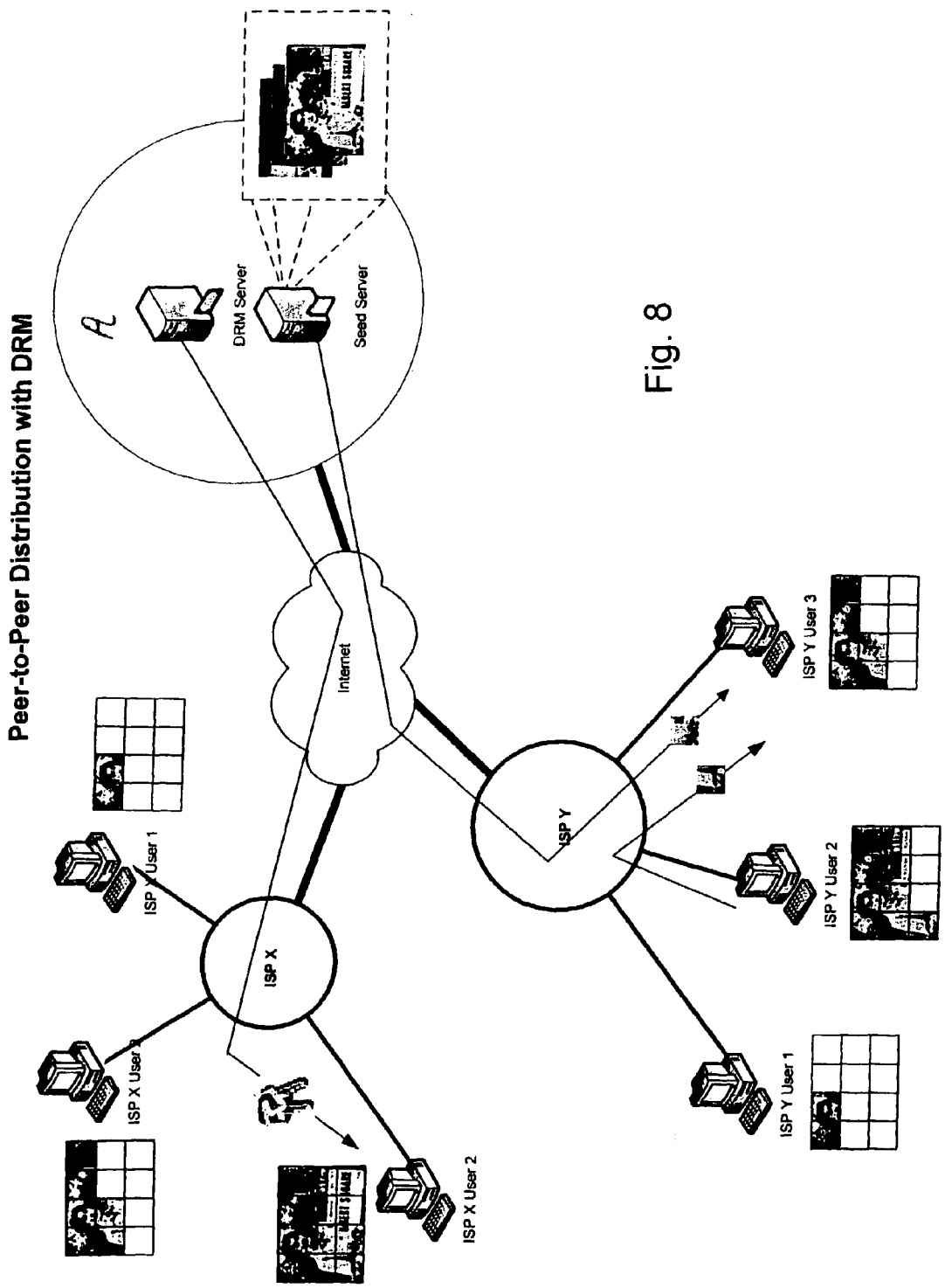
FIG. 8 shows an overview of the Peer-to-Peer file distribution with DRM.

FIG. 8 illustrates Peer-to-Peer content distribution using DRM. In particular, the following process is followed:
(1) Initially a user downloads an encrypted programme from server A.
(2) This programme cannot be viewed unless a viewing key is issued to the user. This key is unique to the PC and is non-transferable. The key would be valid for a period of time e.g. for 7 days after the broadcast of the programme.
(3) Using peer-to-peer technology, encrypted programmes can be distributed in a controlled manner from computer to computer without having to download from server A.
(4) Programme files are split in to chunks by peer-to-peer technology so they can be distributed, chunk by chunk between user's PCs minimising access to server A.
(5) Chunks downloaded are assembled, like a jigsaw, automatically on a user's PC.
(6) When the programme is fully downloaded and assembled it is still unviewable unless a unique non-transferable license is issued from server A.
(7) Viewing keys are only issued to users who are in the UK using Geographic IP address checking, who are registered with server A.

A workflow process for content capture, publication and distribution within a DRM managed system will now be described with reference to FIG. 9.

The Content capture stage 8300 includes a system for managing programme selection, before broadcast, in view of program choice and existing distribution rights. During this stage media files for broadcast are delivered to the file server 8504 for forwarding to the Content Publication stage 8501.

In the Content Publication stage 8501, the media files sent from the server 8504 are matched up with the Electronic Programme Guide 8512 id (EPG id). The media files are then encoded at stage 8518 into a desired file format for wrapping in a time limited (7 days hence) DRM wrapper 8520 using the Transmission time and date obtained from the EPG 8512.

Before content distribution is authorised, a check 8522 is made as to whether the programme file has been broadcast. If it has been broadcast, the media file enters the Content Distribution stage 8503 and the media file details are entered into an EPG which is accessible by the media system client devices 8528 at the user end.

FIG. 10 shows a Digital Rights Management (DRM) system including a media server which distributes DRM media files to computers via the Internet together with a license server which issues digital viewing licenses (e.g. involving digital keys) to user application client software (based on the client software registration, hardware geographical IP address, or other identification information) to unlock the DRM media file for viewing.

Note that after "User 2" (in FIG. 10) downloads a programme from "User 1" User 2 is unable to view it unless a unique viewing license is issued by the license server A.

Further details regarding the interaction between a user software client application program, the content distribution system, and the DRM license server are now provided.

FIGS. 11A to 11H show a process flowchart illustrating the interaction between a user, a media distribution system (grid server) and an associated DRM license server. Authentication of the user to the media system requires a username and password and is achieved using website cookies stored on the user's computer; DRM licenses are also transmitted using similar website cookies.

Further details relating to content distribution systems will now be described with reference to FIGS. 12 to 19.

Figure 12:
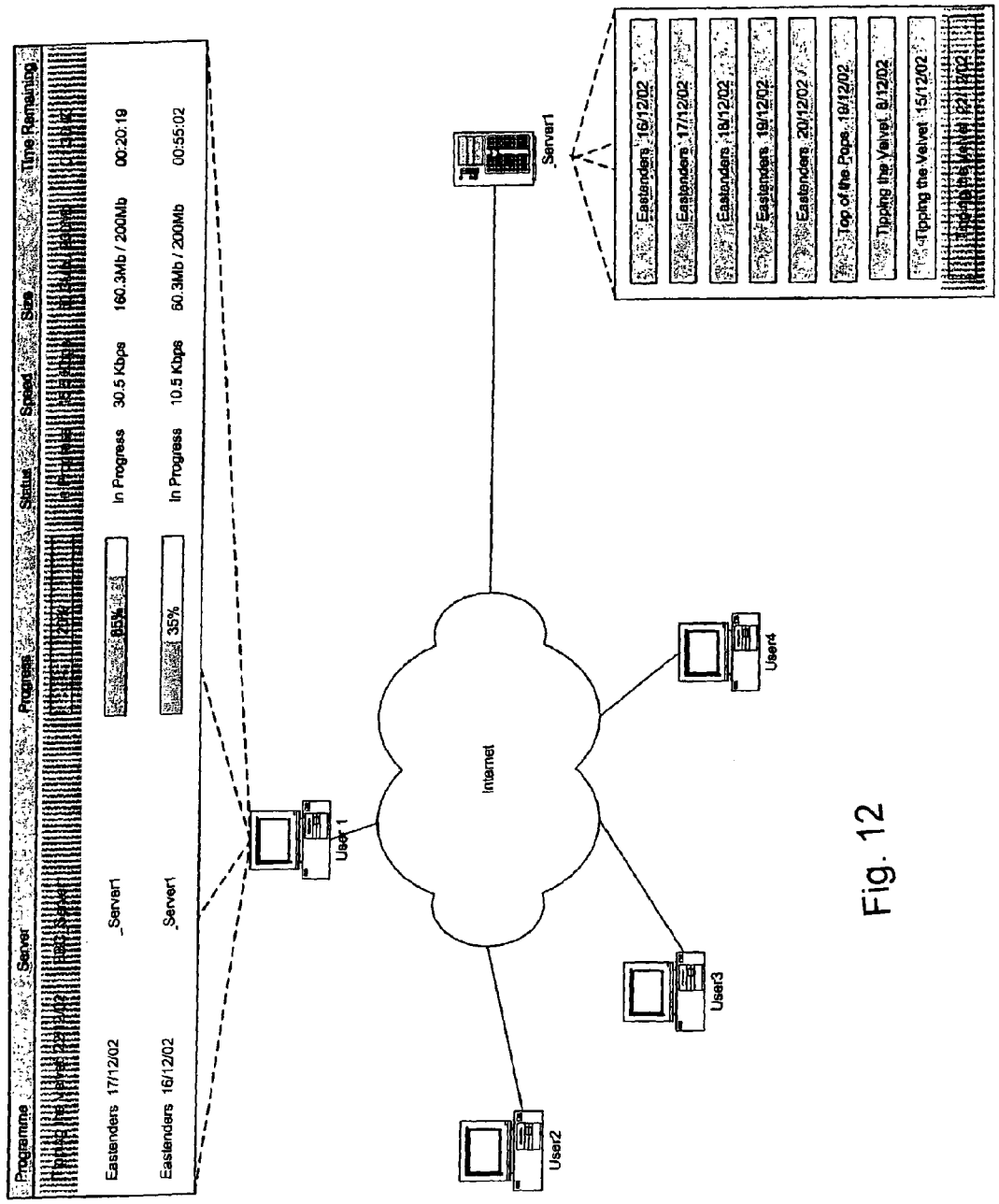
FIG. 12 shows a download of a programme from a central distribution server. Simultaneous downloading of multiple programmes from a single, centralised server to a single user computer is illustrated.

FIG. 12 shows a download of a programme from a central distribution server. Simultaneous downloading of multiple programmes from a single, centralised server to a single user computer is illustrated.

Figure 13:
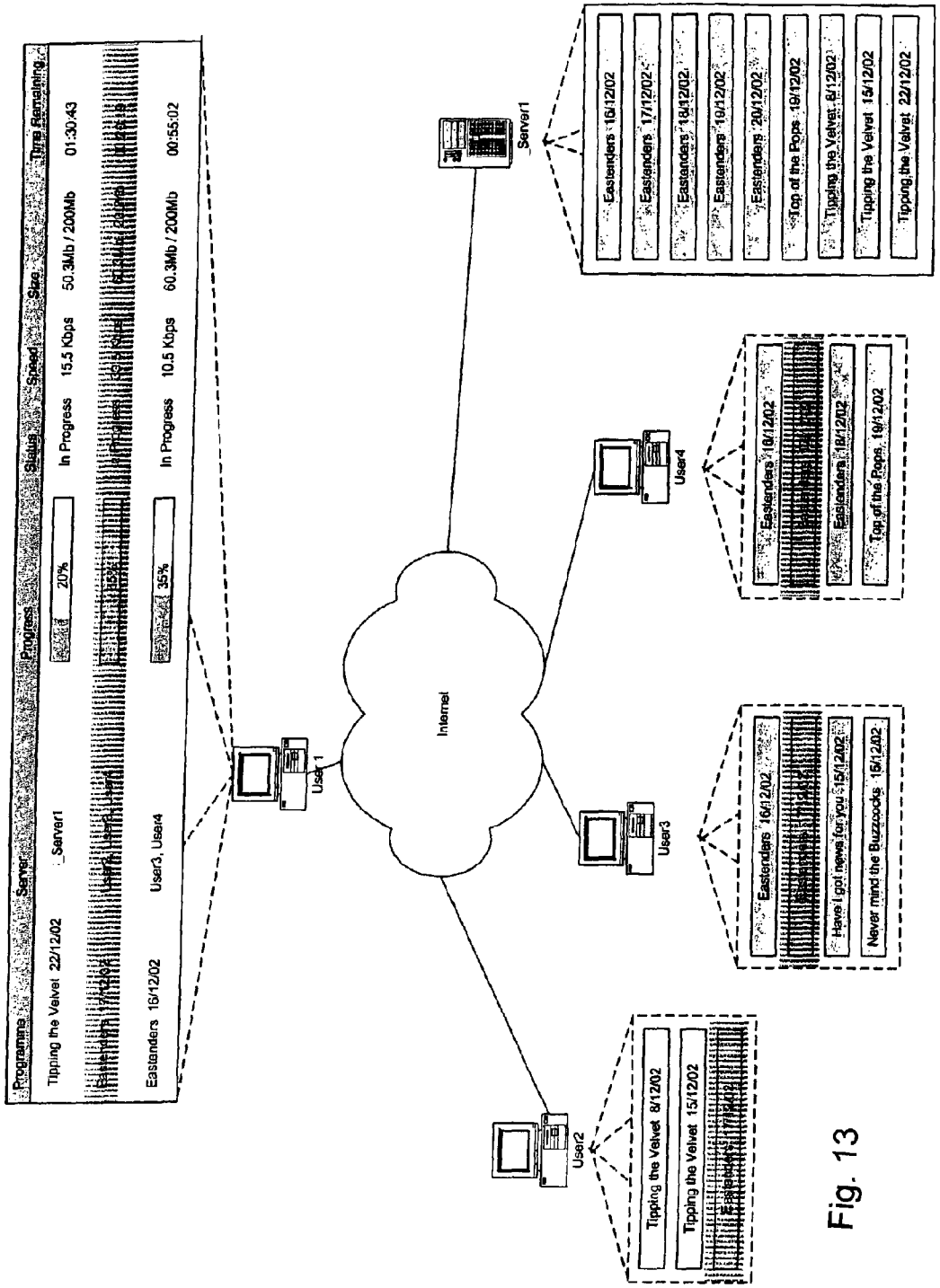
FIG. 13 shows a peer-to-peer network employed during a programme download. The peer-to-peer network comprises user computers and is shown to download the same programme from three remote user computers, which has the effect of reducing the transfer load from the centralised server.

FIG. 13 shows a peer-to-peer network employed during a programme download. The peer-to-peer network comprises user computers and is shown to download the same programme from three remote user computers, which has the effect of reducing the transfer load from the centralised server.

Figure 14:
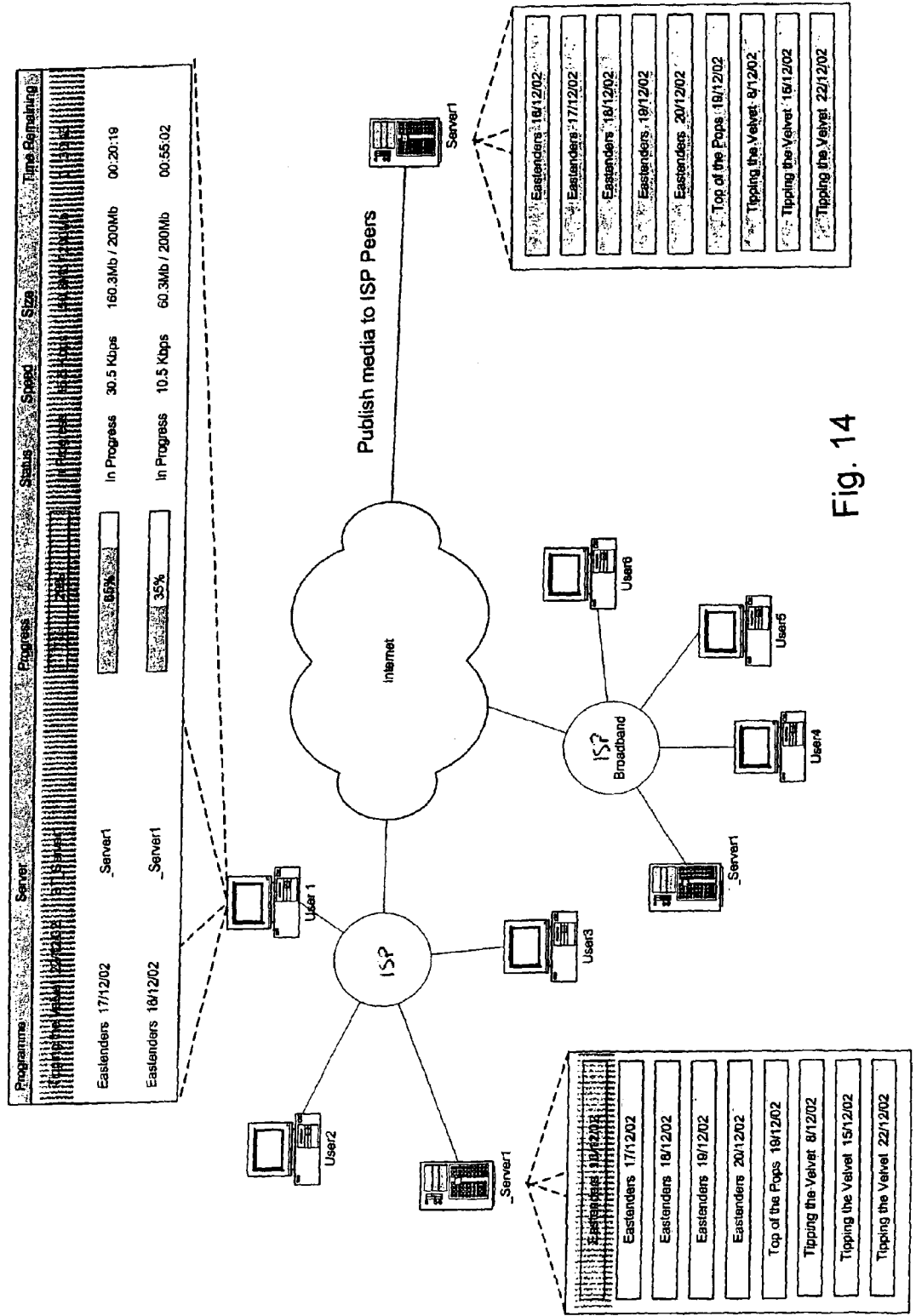
FIG. 14 shows a content distribution system employing an Internet Service Provider (ISP) peer-to-peer network. The ISPs are equipped with extra servers which mirror the content held on the centralised server for providing access to the user computers.

FIG. 14 shows a content distribution system employing an Internet Service Provider (ISP) peer-to-peer network. The ISPs are equipped with extra servers which mirror the content held on the centralised server for providing access to the user computers.

Figure 15:
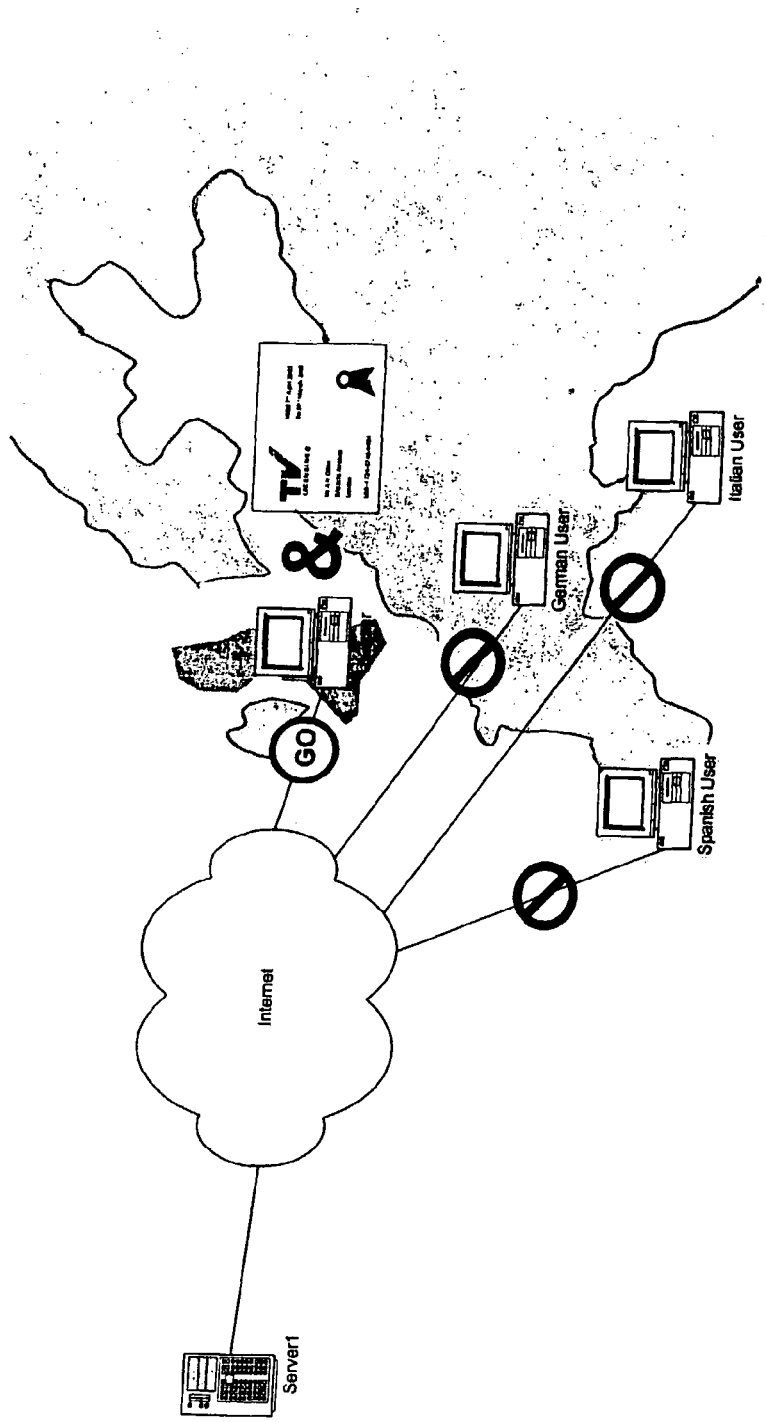
FIG. 15 shows a basic system for verifying user and license authentication information in foreign territories.
Figure 16:
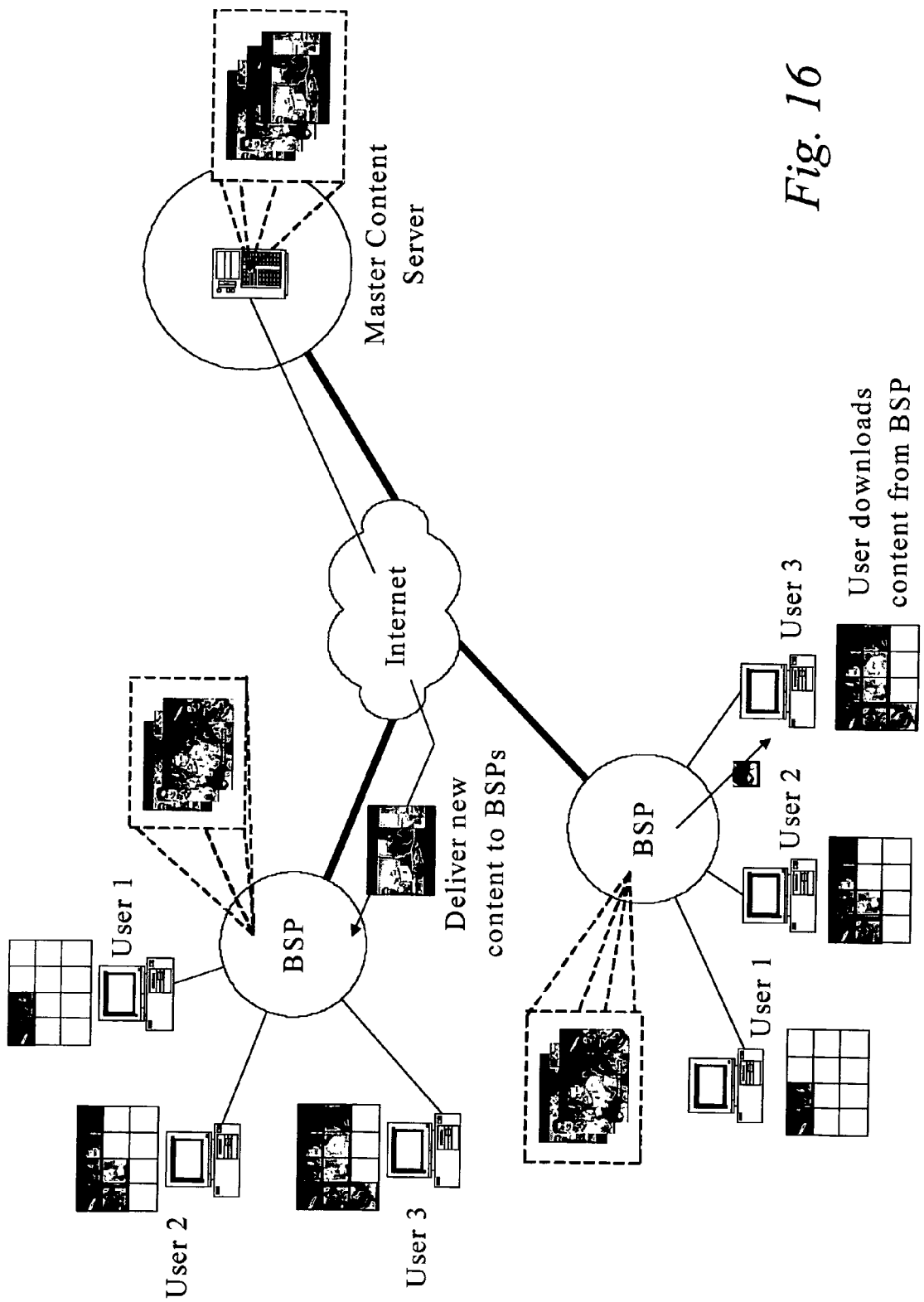
FIG. 16 shows a content distribution system employing Internet Service Providers (ISP) wherein the ISPs provide hardware resources for hosting the downloadable content.

FIG. 15 shows a basic system for verifying user and license authentication information in foreign territories. In particular, the system checks the location and TV license of user before:
 Downloading the client application
 Installing the client application
 Starting the client application
 Requesting a download FIG. 16 shows a content distribution system employing Internet Service Providers (ISP) wherein the ISPs provide hardware resources for hosting the downloadable content.

Figure 17:
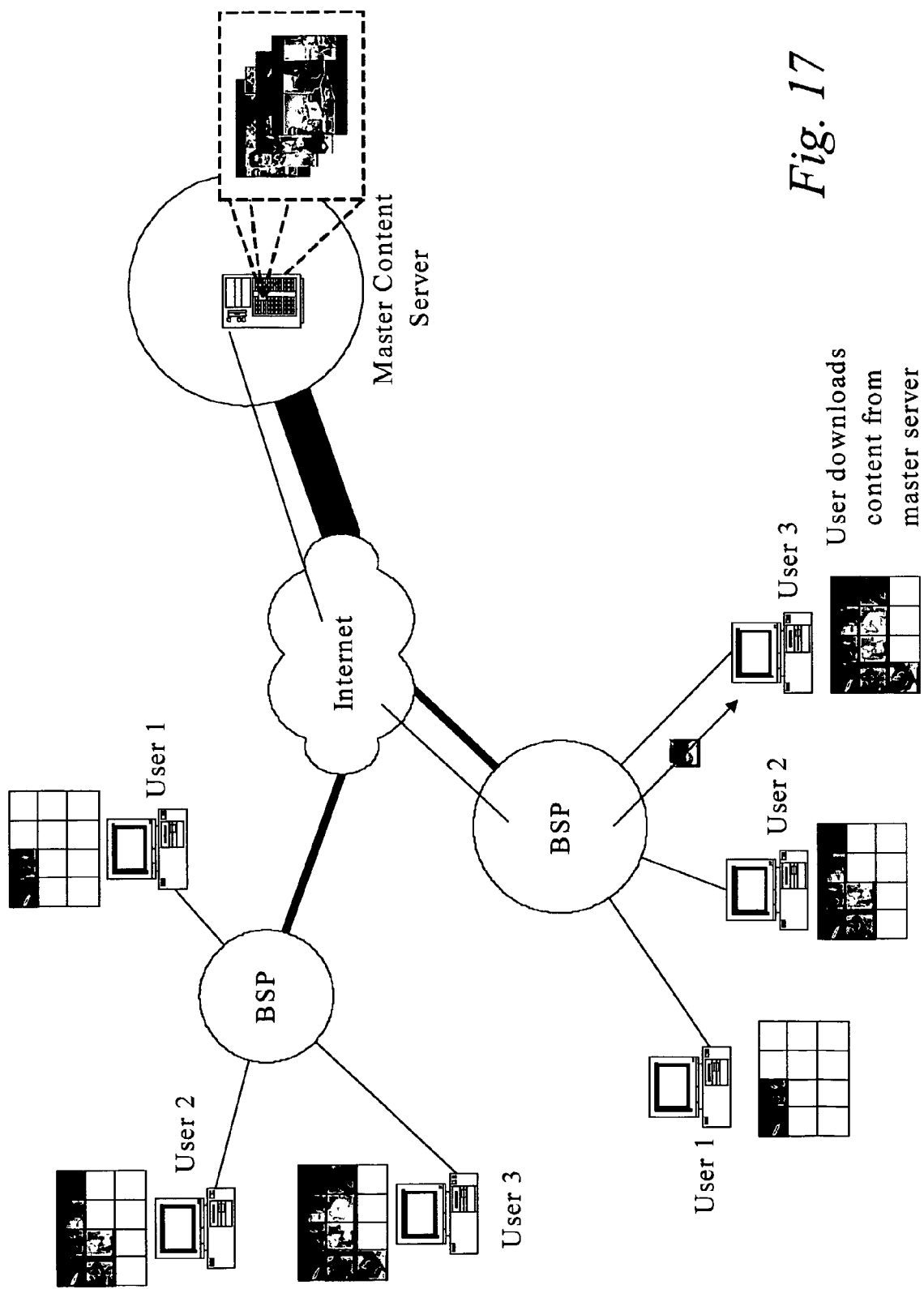
FIG. 17 shows a centralised content distribution model employing Broadband Service Providers (BSPs) for distribution of content wherein the BSPs are not equipped with mirror servers (similar to FIG. 14)

FIG. 17 shows a centralised content distribution model employing Broadband Service Providers (BSPs) for distribution of content wherein the BSPs are not equipped with mirror servers (similar to FIG. 14).

Figure 18:
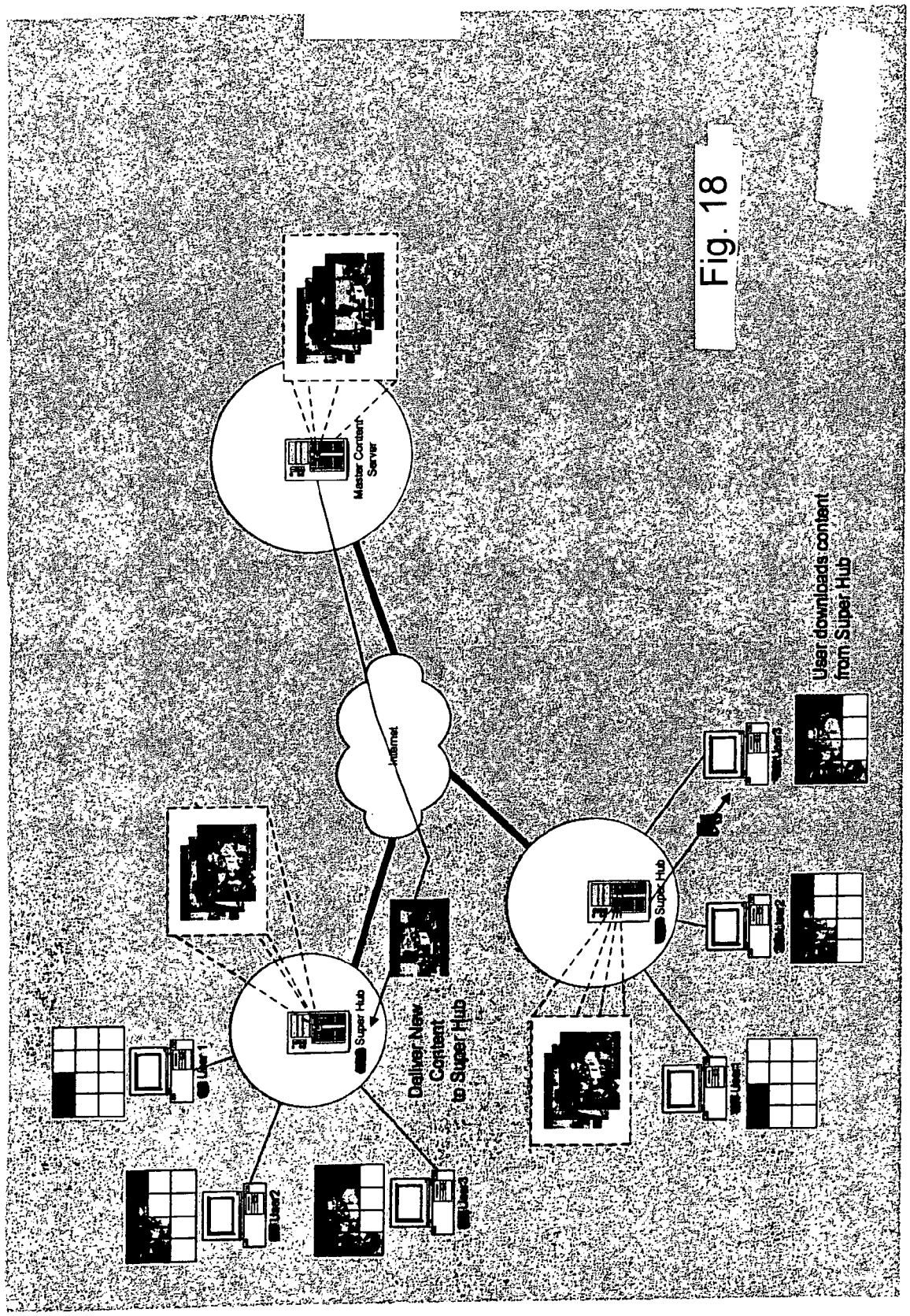
FIG. 18 shows a content distribution system employing Broadband Service Providers (BSPs) wherein the ISPs are provided with extra hardware resources (Super Hubs) for hosting the downloadable content.

FIG. 18 shows a content distribution system employing Broadband Service Providers (BSPs) wherein the ISPs are provided with extra hardware resources (Super Hubs) for hosting the downloadable content.

Figure 19:
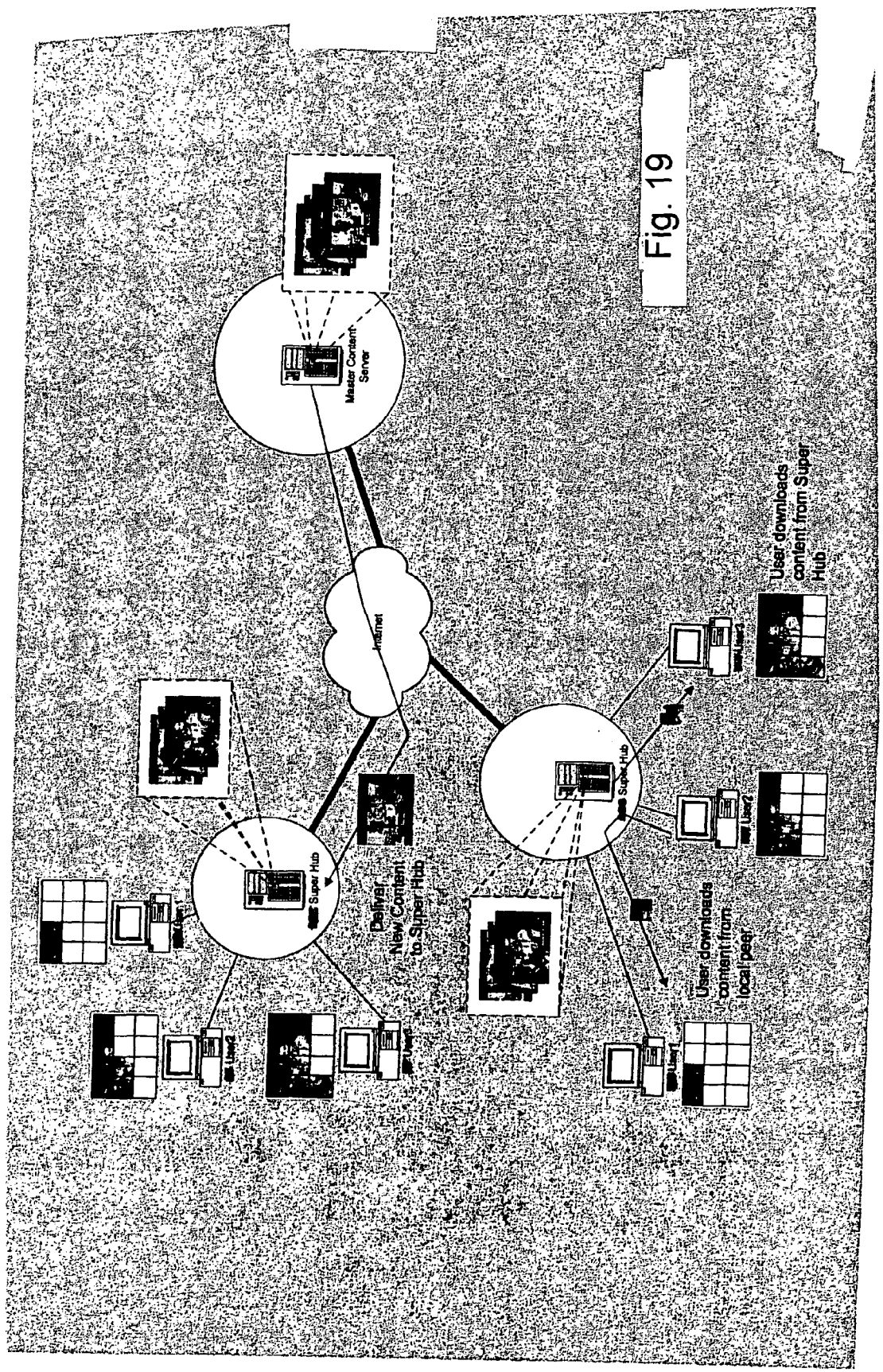
FIG. 19 shows a centralised content distribution network which combines a central distribution server, BSPs equipped with media content download mirror servers, and a local user peer-to-peer network.

FIG. 19 shows a centralised content distribution network which combines a central distribution server, BSPs equipped with media content download mirror servers, and a local user peer-to-peer network.

A further embodiment of the system is now described.

Figure 20A:
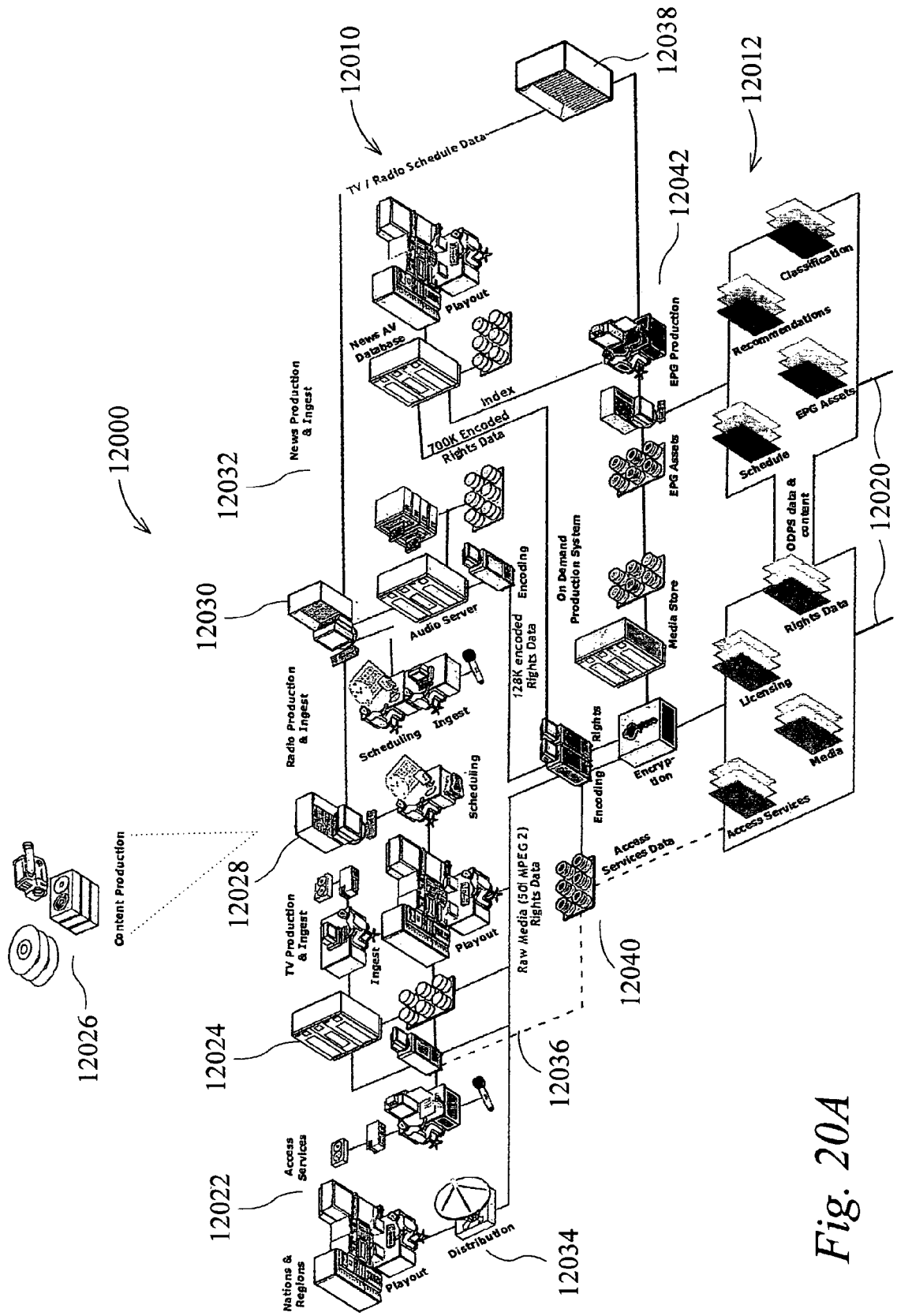
FIGS. 20A and 20B show a further embodiment of the system shown in FIG. 3.
Figure 20B:
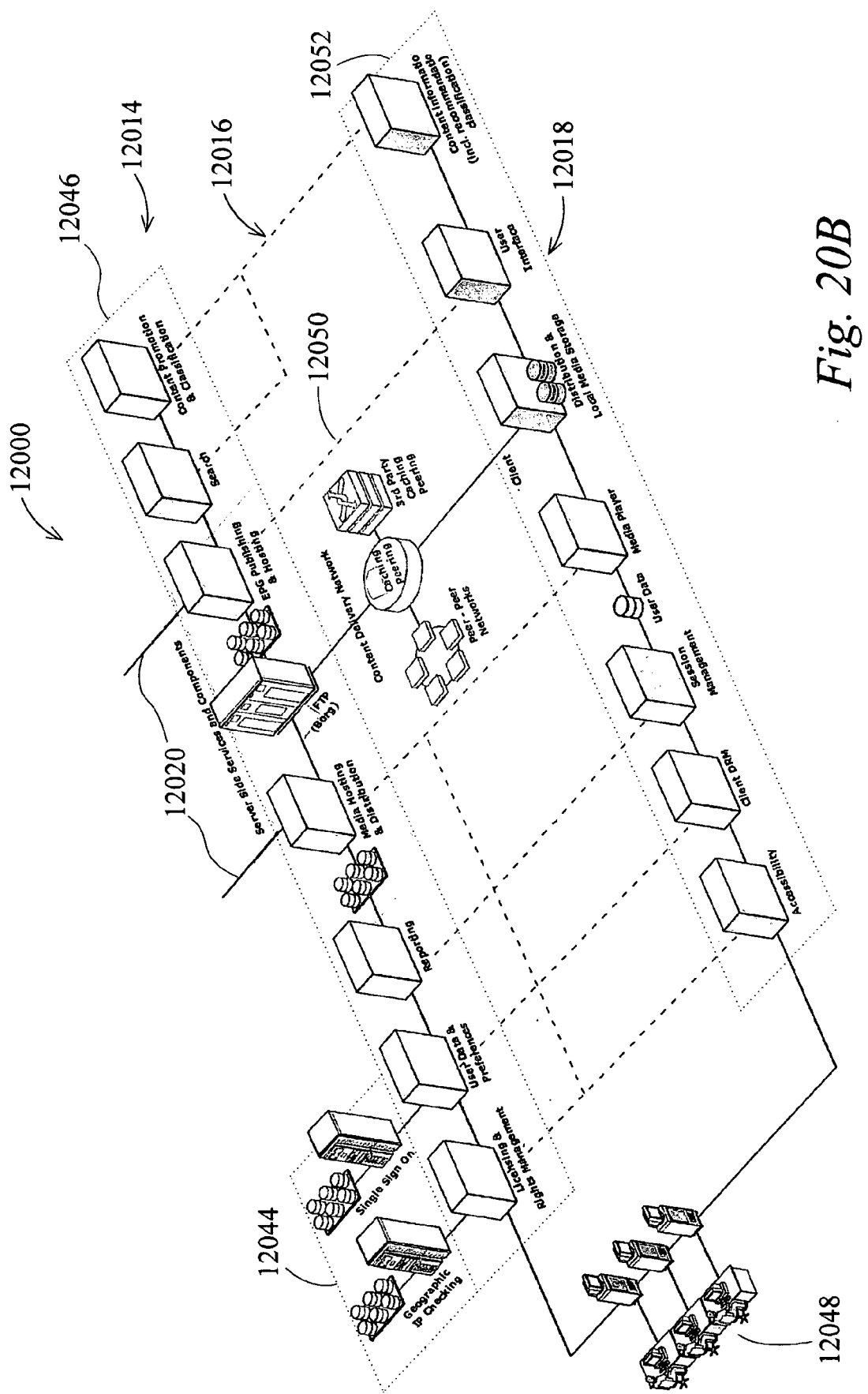

FIGS. 20a and 20B show a further embodiment 12000 of the system shown in FIG. 3. In particular, FIG. 20A shows the interconnection of the broadcasting and production equipment, generally indicated by reference numeral 12010, as well as the on-demand production equipment, indicated by reference numeral 12012, and FIG. 20B shows the interconnection between the content delivery equipment 12014, which is connected via distribution equipment 12016, to client equipment 12018. The production equipment 12012 is connected to the content delivery equipment 12014 via interconnections 12020.

The following annotations apply to FIGS. 20A and 20B:
12010: Broadcaster services and infrastructure
12012: On Demand Production Services (ODPS)—Services, Media and Data
12014: Catch up TV publishing services
12016: Distribution options
12018: Catch up TV client equipment and services
12020: Interconnection between ODPS and content publication 12022: Access Services—Produce accessible versions of content, for example with audio description, subtitling, BSL 12024: MOMS—The MOMS system will store broadcast media files and deliver them to the ODPS for encoding and encryption.

12026: Production—Commissioning, long term scheduling and production units provide content and data for ingest.

12028: TV Production Scheduling System (TBS)—These systems will provide the schedule data information to SID and the rights information to accompany TV content.

12030: VCS—The VCS manages the scheduling and storage of radio assets. These are delivered as packaged content which is encoding for delivery to the ODPS. Scheduled information is also sent to SID.

12032: News/Sport—News and sport clips packages will be extracted from the News AV (audio visual) Database along with an index of content and rights information. The index is used instead of a schedule.

12034: Nations and Regions—Production of nations and regions content is made across various regions. This needs to be gathered and ingested from local playout centres.

12036: Access Services Data—Additional information to deliver subtitling and access services which needs to be stored and managed by the ODPS to be combined with media on playback.

12038: SID (serial digital interface)—combines information from both TV and Radio schedules to produce the EPG for all channels.

12040: Media Store—Content will be delivered to the Media Store either encoded or as raw media files for encoding. All Rights information will accompany the media and mappings between media and licenses resolved. All media needs to be encrypted before distribution.

12042: ODPS EPG Production—The Production system will provide the relevant tools to produce the iMP EPG, create EPG assets (such as thumbnails) and ensure that Schedule, Media and Rights information has been correctly ingested. Some types of media and schedules content should be automatically encoded and published based on received information (such as regular series).

12044: Existing broadcaster services—The ODPS is integrated to these existing broadcaster services.

12046: ODPS Publishing/Services—These services and components make up the publishing and content delivery systems for the catch up TV system.

12048: Operations and Support Services—The system is provided with 24-hour operational management to ensure automated processes and other services operate as required. This team manages the service, perform maintenance and deal with editorial issues related to published content.

12050: Content Delivery—One of a variety of options and combinations of content distribution methods may be used.

12052: Client equipment—Cross platform content delivery is provided with components as shown. Content is managed and stored locally, and EPG and playout mechanisms are provided.

The system 12000 is designed to allow certain users to access previously broadcast programming through their PC. It delivers a 14 day EPG (7 days past, 7 Days future) which allows them to record programs on demand for off line viewing. In essence it acts as a Digital PVR (Personal Video Recorder), providing the audience with the ability to view this schedule and set-up recording of future programs as well as providing a 7 day "catch-up" TV guide for programs that have already been broadcast, which can also be downloaded and viewed. It is also anticipated that certain programmes will be made available beyond 7 days from broadcast.

An overview of the functionality of the system 12000 is presented below. The aims are preferably to:

Deliver TV and Radio programmes that have been broadcast to users for download via their computers (i.e. PCs (Windows™ 2000 & Windows™ XP), Apple™ Macintosh™ computers and Linux machines).

Provide a user friendly EPG so users can see which programmes are available for download. Primarily programmes will be available within a 14 day window linked to the broadcast schedule; 7 days in the future, 7 days behind. However certain programmes will be available for a longer period of time and certain programmes may not be linked to the broadcast schedule.

Allow users to initiate the download of available programmes shown in the EPG.

Allow users to book programmes shown in the EPG not yet broadcast to be downloaded; initiating the download as soon as the programme becomes available.

Allow users to subscribe to a series (Series Stacking), which will automatically download each episode immediately after being broadcast.

Allow the audience to store and manage content on their computer for viewing within a specified time window.

Allow content to be transferred onto portable devices.

Control user access to content using DRM, granting DRM licenses only to authenticated users identified as being in the UK (using Geo-IP).

Minimise the costs of production, distribution and delivery of content

Effectively manage rights and licensing issues.

Develop new systems and production models for on demand content distribution across multiple delivery channels The following sections describe the components and interfaces relating to the system 12000.

TV Content Scheduling

Overview

The TV broadcast scheduling system (TBS) provides TV scheduling for the broadcaster. This system contains program scheduling details including available rights information. The system generates a TV playout schedule at regular intervals according to an update policy which is then delivered to both the SID EPG system and the TV broadcast playout systems to control playout.

Integration

In view of the volume of programming to be handled (approximately 150 hours per week selected from a range of channels broadcast by the broadcaster) direct integration between the broadcast scheduling sub-systems is required. This is achieved via the on-demand production system.

A weekly TV schedule is produced, including programmes which will be made available by the system 12000 for catch up. The broadcaster may include specific programmes they wish to promote for each channel and for each day as part of this schedule, such are listed in the 'What's New' section of the client user interface (as described below).

The system also enables a celebrity to promote and/or recommend certain programmes, which are also presented on the user interface.

The ODPS makes use of a simple web based On Demand scheduling system in order to produce a schedule of programmes which will be made available via this system 12000. This scheduling system has the following functionality:

Provide a TV schedule for as many days ahead as is currently available.

Programmes in the TV schedule will be able to be marked as included or excluded from On Demand distribution.

Generic DRM rights templates will be able to be created. Each template consists of a number of business rules (e.g. Number plays, expiry date, copy of portable device Y/N), appropriate for the distribution platform.

Generic DRM rights templates will be able to be applied to a programme or group of programmes.

The vast majority of programmes will be available for 7 days from the point of transmission. However, certain series and certain programmes will be available for the duration of the run (Series Stacking); for example, for a 6 week run of 'Waking the Dead' all previous episodes would be available until 7 days after final episode was broadcast. Series available on an extended run will be chosen on an ad-hoc basis by TV schedulers. It is anticipated the only a few series will be available for an extended run.

Programmes that are booked in advance for downloading can be delivered to the PC 24 hours before transmission. However, the user cannot watch/listen to the programme until the programme has been transmitted on traditional TV/radio.

Direct integration between the broadcast scheduling systems and SID is also required.

Kontiki™ software is used to deliver the content to the PC client application.

TV Content Ingest

Overview

In one embodiment the broadcaster broadcasts some channels from a central location and others from various regional locations.

Typically, the regional locations use a "clean feed" of the channel (without continuity announcements and mixes) as the basis for producing their own localised channels.

Pre-recorded programmes that are received early enough by the broadcaster are ingested from source material as soon as possible and will be managed before broadcast by the MOMS system, stored as 50i MPEG2 files. This content may additionally be supplemented by Audio Description and Subtitling which will be combined with the original content through Access Services (all programmes which require subtitles will be ingested in MOMS—approximately 50% of all programmes). The MOMS system will then provide 50i MPEG2 files to the broadcast playout systems.

Content ingested near to the time of broadcast may bypass the MOMS system and be delivered directly to broadcast playout systems. Programmes may be re-integrated with the MOMS system, depending on the content, for reconciliation purposes.

All channels use a GPI feed synchronised with the broadcast stream to indicate programme junctions. The GPI feeds for all channels are integrated with SID for integration into the EPG.

Integration

Although programmes may be manually encoded and then manually uploaded to the Kontiki™ Delivery Management System such a manual process is labour intensive, susceptible to operator error, and may be hindered due to the difficulty of locating, for example, tapes.

Thus, in order to ensure that every programme listed in the programme guide as being available for download following broadcast will in fact be available, the programme ingest process and upload process to the Kontiki™ DMS is fully automated.

The ODPS is able to ingest programmes and subtitles directly off-air. Furthermore, the ODPS is able to segment the broadcast stream using the synchronised GPI stream and match individual programme content to the relevant schedule and EPG data. It is important that programmes are captured with accurate start and end times, to avoid interstitials and continuity announcements being included (this will give poor user experience and may have rights issues). Channels broadcast from the broadcasters central location will be encoded using an SDI feed directly from the playout desk. Where a "clean feed" is available the programmes will be encoded from that. Channels broadcast from regional centres will be encoded using an SDI feed from the satellite link.

The ODPS is also able to receive pre-recorded TV programme files and subtitles delivered by the MOMS system so that media files can be prepared in advance of broadcast. In circumstances where programmes are not available via the MOMS system they will be encoded directly off-air and ingested by OPDS.

The ingest of programmes off-air and via the MOMS system is fully automated with no manual intervention so programmes marked as available for On-Demand in the On Demand scheduling system are automatically captured. Alternatively, everything in the schedule may be ingested, which allows for last minute schedule changes.

Thumbnail images of video content are also generated automatically. Furthermore, ingested programmes, subtitles and thumbnails are automatically matched to the relevant EPG data using the SID system. Rights information is defined in the On Demand scheduling system.

Thumbnails are auto generated, but channel logos may also be used.

The upload of metadata, subtitles, video content and thumbnail images to the Kontiki™ DMS is also fully automated.

Radio Content Scheduling & Ingest

Overview

Radio content is managed and scheduled through the VCS system which delivers broadcast content streams, GPIs, playout schedule and rights information. The playout schedule is delivered to the SID system to be combined with other information into full EPG data, whereas rights information will is delivered in an open standards format (such as XRML). Content is stored and broadcast from audio servers as bWAV 6 Mbs raw media files.

The majority of programmes broadcast are time accurate. However, programmes which do not comply with a strict schedule are also handled.

Integration

In one embodiment a fixed weekly schedule of radio programmes may be set-up initially, for example, 7 radio programmes a day are selected from various radio channels. These programmes are then encoded live off-air from playout desks using automated encoders, driven by a script, which is synchronised with the broadcaster's clock. Encoded files are then stored on a desktop PC and obtained using FTP by operational staff. The radio content is then manually uploaded to the Kontiki™ DMS. The advantage of this solution is that the audio quality is high and the timing of recording is accurate.

In an alternative embodiment, the same level of audio quality is maintained, but radio programmes are encoded live off-air from playout using automated encoders.

This enables substantially more programmes to be made available (up to 314 programmes per week) from a wide variety of channels. The list of radio programmes provided also includes a 'What's New' section on the home page as well as a selection of programmes recommended by different celebrities, for example, on a weekly basis.

Automated encoders are used to upload the programmes to the Kontiki™ DMS without manual intervention.

The ODPS is also able to receive pre-recorded radio programmes from the VCS, which enables media files to be prepared in advance of a broadcast. In circumstances where programmes are not available from the VCS they are encoded directly off-air.

Automatic programme identification and matching to the relevant EPG data and programme thumbnail images is provided for content identification and description.

All radio programmes are available for 7 days and may be transferred to a portable device following download.

The Serial Digital Interface (SID)

Overview

The SID provides the EPG for all the broadcaster's TV & Radio programmes. The SID also consolidates data, creates EPG information, and manages EPG information. The TV and Radio schedule are delivered from SID in XML format.

Integration

The EPG data and associated GPIs are received and stored by the ODPS and matched to the relevant content files for distribution. EPG data is then stored and published to the client based on the received schedule and rights information. On request, the relevant assets (TV or radio programmes) are delivered to the client.

News and Weather Clips

Overview

News and Sport broadcast streams are packaged as clips and made available as raw media files with rights information provided in an open standards format (such as XRML). Since this is packaged rather than scheduled content, a news and sport index of content is delivered rather than a schedule. Certain time dependencies are nonetheless applicable.

Integration

The system 12000 stores the broadcast news packages, encodes this content and combines the encoded content with rights information. Programmes are also identified and matched to the relevant items in the new and sports index. Additional assets, such as thumbnails of news content, are also generated.

News content is stored on video servers as 50i MPEG2 files but will be delivered to the ODPS as packaged unencrypted 500 Kbps files for encryption and distribution.

Sports Clips

Overview

Sport broadcast streams are packaged as clips and made available as raw media files with rights information provided in an open standards format (such as XRML). Since this is packaged rather than scheduled content, a news and sport index of content is delivered rather than a schedule. Certain time dependencies are nonetheless applicable.

Integration

The system 12000 receives and store the broadcast sport packages, encodes this content and combines this with rights information. Programme identification and matching to the relevant items in the news and sport index. Programmes are also identified and matched to the relevant items in the new and sports index. Additional assets, such as thumbnails of news content, are also generated.

News and Weather Updates

Updates to news and weather programmes overwrite the previous version stored by the system.

Sport Clip Updates

The update frequency of sports clips depends upon events. Anything from nothing to 18 updates a day. Certain highlights packages of events, e.g. Wimbledon and PGA Golf will be made available on an ad-hoc basis. Each update overwrites the previous version stored by the system.

On Demand Production System (ODPS)

Audio Video Encoding

The AV Encoding system automatically schedules the encoding of the broadcast TV and radio programmes directly from broadcast playout. Most content is delivered as video or audio files as described previously but where broadcast streams are used, the streams are split out and the exact programme start and end times are taken from GPIs in the broadcast stream.

Raw media files are encoded in the appropriate format for distribution (as previously described). The transcoding of programmes uploaded to the Media Store is optimised and automatic.

All video files are encoded in forms suitable for the following platforms—

PC—a high quality version for download to PC
  Mobile device—a lower bitrate version for download to mobile devices such as a smart phone (eg. Orange™ SPV C500),
  Portable Media Centre (PMC) is supported.
  High definition content (HD) is encoded at a higher bitrate.

Media Store

The Media Store provides the following basic functionality:

The ingestion of TV programmes encoded from the TV broadcast stream.
  The ingestion of TV programmes through a direct interface to the MOMS system.
  The ingestion of radio programmes encoded from radio playout.
  The ingestion of radio programmes through a direct interface to the VCS.
  The ingestion of news, sport and weather content packages with associated metadata through a direct interface to the News A/V Database.
  The ingestion of programmes loaded directly by an operator.
  The storage and management of all versions of programmes, linked to GPIs and programme information.
  The archival of programmes to off-line storage when no longer required.

Rights Management

The rights management system is able to ingest and understand the rights templates applied to content by the scheduling systems. This includes both automatically understanding which programmes can be delivered through as catch up TV/Radio and which cannot, as well as enforcing the rights encryption process by encoding content for release and distribution only according to the rights clearance provided. The rights management system is also able to handle the following:

Maintain generic programme DRM rights templates supporting a number of business rules.
  Apply a DRM rights template to a programme or group of programmes.
  Exclude programmes from the service.
  Revoke DRM licenses that have previously been granted.

DRM Encryption and Licensing

The DRM encryption process is able to encrypt content by applying the appropriate business rules provided by the rights management system. Windows™ Media 9 DRM is used. Any of the following business rules may be used:

Start and expiry dates.
  Number of plays.
  Portable device support (eg. a smart phone and a Potable Media Centre).

Reporting System

The reporting system is able to monitor and report on all aspects of client usage and able to deliver relevant reports on a regular basis. A separate reporting database is maintained, which takes daily updates from the live Kontiki™ system. The information held in the reporting database is updated at least once every 24, which provides regular feedback.

Figure 21:
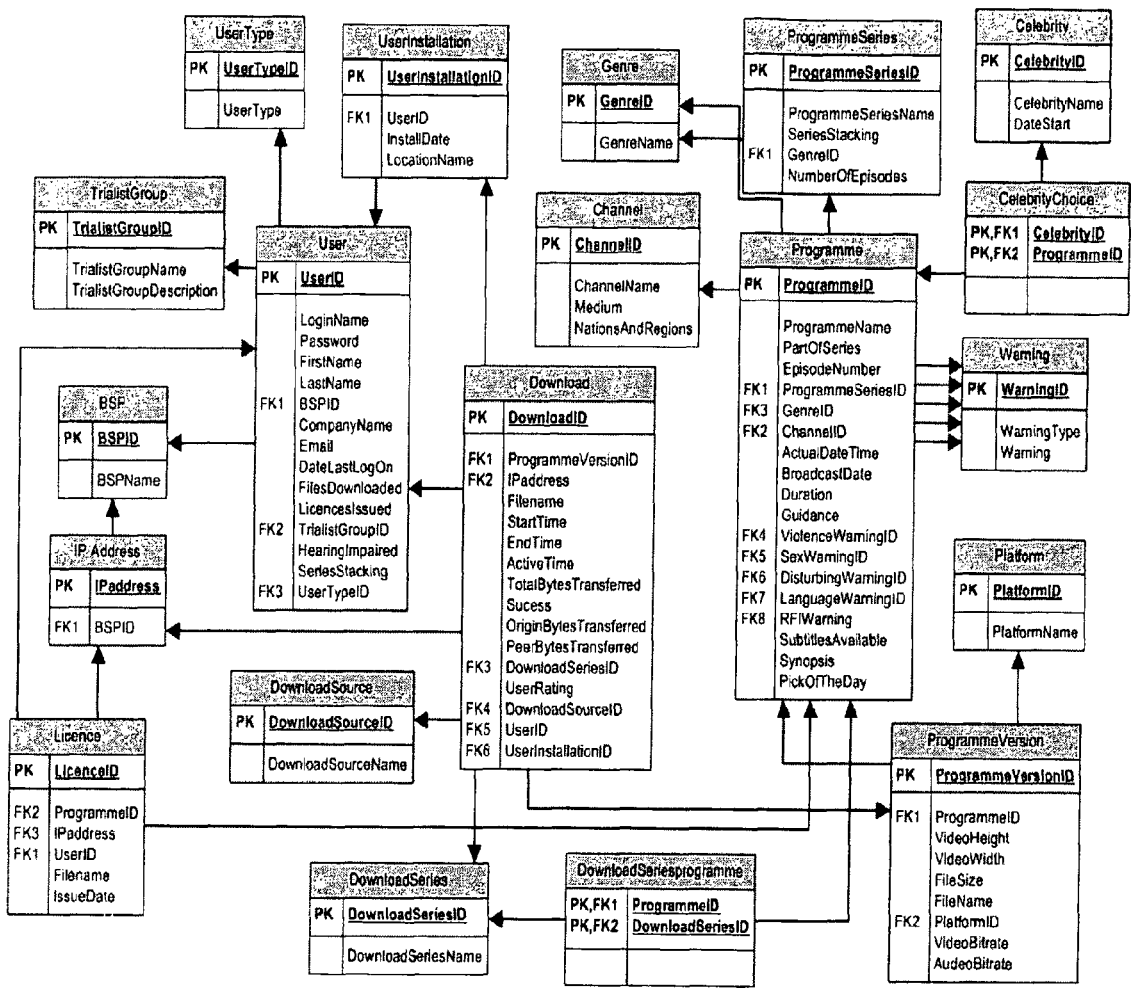
FIG. 21 shows the interconnection of various tables in a reporting database.

The reporting system comprises a database which contains tables interconnected as shown in FIG. 21.

A detailed breakdown of the table structures is shown in the tables presented in the following tables:

| User | Notes |
|---|---|
| User ID | |
| LoginName | |
| Password | |
| FirstName | |
| LastName | |
| BSPID | Broadband Service Provider ID |
| UserTypeID | Link to UserType |
| CompanyName | If applicable |
| Email | |
| DateLastLogOn | Date/time |
| FilesDownloaded | |
| LicencesIssued | |
| HearingImpaired | Y or N |
| VisionImpaired | Y or N |
| SeriesStacking | Y or N (Whether or not the UI displays the option of Series Stacking.) |

| Programme | Notes |
|---|---|
| ProgrammeID | |
| ProgrammeVersionID | |
| Programme Name | e.g. 'Dalziel and Pascoe - Heads you loose' or 'Eastenders 31$^{st}$ Jan' |
| Programme Synopsis | |
| Guidance | Y or N. Programme has guidance warnings |
| ViolenceWarning | Blank - No violence warnings |
| | V1 - This programme contains some violent scenes |
| | V2 - This programme contains prolonged violent scenes |
| | V3 - This programme contains graphic violent scenes |
| SexWarning | Blank - No sex warnings |
| | S1 - This programme contains some scenes of a sexual nature |
| | S2 - This programme contains scenes of a sexual nature |
| | S3 - This programme contains explicit sexual scenes |
| DisturbingWarning | Blank - No disturbing warnings |
| | D1 - This programme contains some scenes which some viewers may find upsetting |
| | D2 - This programme contains scenes which some viewers may find upsetting |
| | D3 - This programme contains scenes which some viewers may find disturbing |
| LanguageWarning | Blank - No language warnings |
| | L1 - This programme contains some strong language |
| | L2 - This programme contains strong language |
| | L3 - This programme contains very strong language |
| RFIWarning | Blank - No RFI warnings |
| | RFI - This programme contains scenes of Repetitive Flashing Images (eg strobe lighting) |
| PartOfSeries | Y or N |
| Episode Number | Episode of Series. If applicable, not for long running series such as Eastenders |
| ProgrammeSeriesID | If applicable |
| GenreID | |
| SubGenre ID | |
| Channel ID | |
| ActualDateTime | Date/Time - This is the actual date and time the programme was shown. e.g. 'Natural World' was shown Tuesday 1st February at 01:40am on BBC ONE. So this should be recorded as '01/02/2005 01:40' |
| BroadcastDateTime | Date/Time - This is the broadcast date and time the programme was shown. The broadcast day runs from 6:00 to 29:59 (05:59 the next actual day). e.g. 'Natural World' was shown Tuesday 1st February at 01:40am on BBC ONE, which is still on 31$^{st}$ January broadcast day. So this should be recorded as '31/01/2005 25:40' |
| Duration | In seconds |
| SubtitlesAvailable | Y or N |
| Synopsis | |
| PickOfTheDay | Y or N |

| ProgrammeVersion | Notes |
|---|---|
| ProgrammeVersionID | |
| ProgrammeID | |
| Filename | Files must be named using the following naming structure: PROGRAMME_CHANNEL_DD_MMM_YYYY_HH_MM_VERSION e.g. EASTENDERS_BBC_ONE_31_JAN_2005_20_00_PC or DAZIEL_AND_PASCOE_BBC_ONE_31_JAN_2005_21_00_PHONE or DAZIEL_AND_PASCOE_BBC_ONE_31_JAN_2005_21_00_PMC |
| PlatformID | Link to Platform |
| Audio Bitrate | In kilobits per second |
| Video Bitrate | In kilobits per second |
| Duration | In seconds |
| Video Width | In pixels |
| Video Height | In pixels |
| Filesize | In bytes |

| UserType | Notes |
|---|---|
| UserTypeID | |
| UserType | |

| UserInstallation | Notes |
|---|---|
| UserID | |
| InstallDate | |
| Location Name | Home, Office etc. |

| Celebrity | Notes |
|---|---|
| CelebrityID | |
| Celebrity Name | |
| DateStart | |

| CelebrityChoice | Notes |
|---|---|
| CelebrityID | |
| ProgrammeID | |

| Platform | Notes |
|---|---|
| PlatformID | |
| Platform | PC, Mobile Phone, Portable Media Centre* (if additional format is needed) |

| Programme Series | Notes |
|---|---|
| Programme Series ID | |
| Programme Series Name | e.g. Eastenders, Holby City, Waking the Dead etc. |
| SeriesStacking | Y or N (Are all programmes available for download for the duration of the series?) |
| NumberOfEpisodes | Only for short series like Waking the Dead. Not applicable for long running series like Eastenders. |
| GenreID | |

| Download Series | Notes |
|---|---|
| DownloadSeriesID | |
| DownloadSeriesName | |

| DownloadSource | Notes |
|---|---|
| DownloadSourceID | |
| DownloadSourceName | This is used to track where the user clicked on the download link. e.g. Home Page, Guide, Celebrity Downloads, Top Downloads, Recommendation, Email etc. |

| Download Series Programme | Notes |
|---|---|
| ProgrammeID | |
| DownloadSeriesID | |

| Download | Notes |
|---|---|
| Download ID | |
| IP Address | |
| User ID | |
| ProgrammeVersionID | |
| Download Series ID | Only use if Download Series initiated download |
| Filename | As in programme |
| StartTime | Date/time |
| EndTime | Date/time |
| Active Time | Time Client Active in seconds |
| Total bytes transferred | |
| Success | Y or N |
| OriginBytesTransferred | Bytes transferred from BBC origin server |
| PeerBytesTransferred | Bytes transferred from Peer to Peer network |
| UserRating | 1 to 5. 1 = poor, 5 = good |

| Genre | Notes |
|---|---|
| Genre ID | |
| Genre Name | Simplified version of What's On Genres Medium: TV SubType: [Blank] Current affairs Sport |

| Genre | Notes |
|---|---|
| | Drama & soaps |
| | Entertainment |
| | Comedy |
| | Films |
| | Children |
| | Documentaries |
| | Lifestyle |
| | Learning |
| | Medium: Radio |
| | SubType: Music |
| | Blues, soul, reggae |
| | Classical |
| | Classic rock and pop |
| | Dance |
| | Easy and soundtracks |
| | Experimental |
| | Folk and country |
| | Jazz |
| | Music documentaries |
| | Pop |
| | Rock and alternative |
| | Urban |
| | World |
| | Medium: Radio |
| | SubType: Speech |
| | Arts and drama |
| | Children |
| | Comedy and quizzes |
| | Entertainment |
| | Factual |
| | History |
| | News and current affairs |
| | Religion |
| | Soaps |
| | Science |
| | Sport |
| SubType | Only used for Radio (Music or Speech) |
| Medium | TV or Radio |

| Channel | Notes |
|---|---|
| Channel ID | |
| Channel Name | Network TV Stations 24, Nations & Regions TV Stations, Network Radio stations |
| NationsAndRegions | Y or N |
| Media Type | TV or Radio |

| Warning | Notes |
|---|---|
| Warning ID | e.g. |
| | V1, V2, V3 |
| WarningType | V - Violence |
| | S - Sex |
| | D - Disturbing |
| | L - Language |
| | Used to multiple link the table back to programme to avoid over normalisation. |
| Warning | e.g. |
| | This programme contains some violent scenes (V1) |
| | This programme contains prolonged violent scenes (V2) |
| | This programme contains graphic violent scenes (V3) |

| Licence | Notes |
|---|---|
| Licence ID | |
| IP Address | |
| User ID | |
| ProgrammeVersionID | |
| ProgrammeID | |
| Series ID | |
| Filename | |
| IssueDate | Date/time |

| IP Address | Notes |
|---|---|
| IP Address | |
| BSP ID | |

| BSP | Notes |
|---|---|
| BSP ID | |
| BSP Name | |

Reports

Reports are generated in SQL from the reporting database. The list below shows the types of reports generated:

Active Users by BSP
Average download speed for each download
Users by BSP
Average download speed by BSP
Programmes available by channel
Programmes available by genre
TV programmes available by number of episodes
Radio programmes available by number of episodes
Download time by time of day
Downloads by percentage use of P2P network
Downloads per programme
Downloads by genre
Downloads by channel
Unique users per day
Percentage of concurrent users per day
Licenses granted per day
Licenses granted per week
Licenses granted per month
Licenses granted per user
Licenses granted per programme
Licenses granted by genre
How soon after a programme was downloaded was it viewed?
How soon after broadcast was a programme downloaded?
Peak bandwidth by time of day EPG Production EPG production and delivery is the core information which drives the client user interface. This user interface is used by the audience to choose, download and manage content. Much of the EPG data will be delivered from SID but there are additional assets required for the client such as feature pages, thumbnails and descriptions which are managed by the ODPS. Preview production and association with the relevant programs is also supported.

The system is also able to:

Interface with TV & Radio scheduling systems to obtain the current TV & Radio Schedules for all channels.

Translate the Radio and TV schedules into the format required by the Client (XML/HTML/Linked assets).

Publish changes to the Radio and TV Schedules automatically.

Exclude programmes from the EPG which do not have the appropriate rights clearance.

Indicate which programmes have warnings associated with therewith.

Produce thumbnails and other assets.

Editorial process for publication of EPG with associated feature and home pages for content types and genres.

Content classification, labelling, tagging and metadata management.

Distribution System

Publishing and Distribution

The On Demand Production System (ODPS) provides to the Distribution System all relevant programme and scheduling information in a form suitable to be hosted and distributed. This programme and scheduling information is then integrated with the structures and frameworks provided by the client user interface presentation layer.

The EPG is also be published so that all assets are managed from within the ODPS.

Top Downloads

The top TV, radio and HDTV programmes that have been downloaded are recorded by the system and published to the client user interface at least once an hour.

Recommendation Engine

EPG data is also supplemented with personalised programme recommendations for users based upon BARB (Broadcasters' Audience Research Board) data (which provided user rating of television programmes), download data (i.e. the number of times a particular programme has been downloaded through the system), viewing data, genre viewing habits and user ratings submitted from the clients. Recommendations to users are either updated on an hourly basis or alternatively the system clients may directly interrogate the system to obtain recommendation data via CGI.

Content Distribution

Programmes are published as soon as they become available. If programmes are sourced from the MOMS system or the VCS system the file is made available for download at the time of the broadcast. If the programme is encoded off-air it is made available for download within 30 minutes of the end of the broadcast.

Geographic IP Address Checking

In one embodiment the service is restricted to only enable downloading of content in a particular territory, for example, a particular country. This may be essential in order to obtain viewing rights in certain territories. The ODPS and client thus fully support geographic IP Address checking to manage this in a robust fashion. In one embodiment the GeoIP Quovam system is used to implement geographic IP checking.

User Authentication

The ODPS provides and manages the robust authentication of users. This is linked to the Single Sign On database. Alternatively, a proprietary sign-on method may be used, which is linked to Kontiki™.

Peer-to-Peer Distribution

Kontiki™ Peer 2 Peer (P2P) content distribution is used to deliver content to the system clients.

User Interface

Further aspects of the operation and structure of a media application running on each of the user computers is now described in further detail.

The following drawing annotations apply to FIGS. 22 to 52:

| Number | Ref | Description |
|---|---|---|
| 10 000: | [4.1] | Home/Header/Title |
| 10 002: | [2.0] | Tabs |
| 10 004: | [3B] | BUTTONS (small) |
| 10 010: | [4.2] | Promo area |
| 10 020: | [4.2.1] | TV promo |
| 10 030: | [4.2.2] | Radio promo |
| 10 040: | [4.2.3] | News & Sports promo |
| 10 050: | [4.2.4] | Trial News |
| 10 060: | [4.2.5] | How to use |
| 10 070: | [4.3] | Home left Nav |
| 10 080: | [4A] | What's New |
| 10 090: | [4B] | TV |
| 10 100: | [4C] | Radio |
| 10 110: | [4D] | News & Sports |
| 10 120 | [4B.1] | TV Home Date & Icon |
| 10 130 | [4B.2] | Header/Ttile |
| 10 140 | [4B.3] | TV Subscriptions |
| 10 150 | [4B.3.1] | Subscription title |
| 10 160 | [4B.3.2] | Series Download button |
| 10 170 | [4B.3.4] | Subscription graphic |
| 10 180 | [4B.4] | Series Download confirmation |
| 10 190 | [4B.5] | 'Review booking' button |
| 10 200 | [9.1] | Confirmation Model pop-up |
| 10 210 | [4C.1] | Radio Home Date & Icon |
| 10 220 | [4C.2] | Header/Title |
| 10 230 | [4C.3] | Radio Subscriptions |
| 10 240 | [4C.3.1] | Subscription title |
| 10 250 | [4C.3.2] | Series Download button |
| 10 260 | [4C.3.4] | Subscription graphic |
| 10 270 | [4C.4] | Series Download confirmation |
| 10 280 | [4C.5] | 'Review booking' button |
| 10 290 | [4D.1] | News & Sports Home Date & Icon |
| 10 300 | [4D.2] | Header/Title |
| 10 310 | [4D.3] | Radio Subscriptions |
| 10 320 | [4D.3.1] | Subscription Title |
| 10 330 | [4D 3.2] | Series Download button |
| 10 340 | [4D 3.4] | Subscription graphic |
| 10 350 | [4D.4] | Series Download confirmation |
| 10 360 | [4D.5] | 'Review booking' button |
| 10 370 | | Video Window (14:9 ratio) |
| 10 380 | [3.8.1.1] | Full Screen button |
| 10 390 | [5.2] | Windows media 9 control |
| 10 400 | [5.1] | Player Left Nav |
| 10 410 | [5.1.1] | Programme name |
| 10 420 | [5.4] | Programme name in title bar with iMP icon |
| 10 430 | | Windows controls (Minimise, Resize, Close) |
| 10 440 | | Full Screen Video Window (14:9 ratio) |
| 10 450 | [5.3] | Back to IMP button |
| 10 470 | [6.1] | Guide Header/Title |
| 10 480 | [6.3] | Listings table |
| 10 490 | [6.3.1] | Listings header |
| 10 500 | [6.3.2] | Category header |
| 10 510 | [6.3.10] | Current selection |
| 10 520 | [6.3.3] | Feedback |
| 10 530 | [6.3.4] | Content icon column |
| 10 540 | [6.3.5] | Programme name |
| 10 550 | [6.3.6] | Broadcast on |
| 10 560 | [6.3.7] | Duration |
| 10 570 | [6.3.8] | Channel |
| 10 580 | [6.3.9] | Size |
| 10 590 | [6.4] | Listings summary/Preview area |
| 10 600 | [6.4.2] | Selected listing title |
| 10 610 | [6.4.3] | Date & Broadcast time |
| 10 620 | [3.4.1] | Download button |
| 10 630 | [3.4.2] | Series Download (when available) |
| 10 640 | [6.4.5] | File size & disk space |
| 10 650 | [6.4.1] | Thumbnail |
| 10 660 | [6.2] | Calendar |
| 10 670 | [6.2.1] | Nav arrows |
| 10 680 | [6.2.2] | Current date header |
| 10 690 | [6.2.3] | Current selection |
| 10 700 | [6.4.4] | Summary text |
| 10 710 | [3.B.4.1] | Preview button |
| 10 720 | [6.5.1] | Search |
| 10 730 | [6.2.5] | Last day |
| 10 740 | [5.2.4] | Current guide duration |
| 10 750 | [6.1.1] | Disk Space warning |
| 10 760 | [8A] | Settings disk space warning modal pop-up |
| 10 770 | | Opens & settings window |
| 10 780 | | Closes pop up. Opens your programmes |
| 10 790 | | Closes pop-up warning |

-continued

| | | |
|---|---|---|
| 10 800 | [3.A.1.1] | Download Button toggles to |
| 10 810 | [3.A.4.1] | Stop Download |
| 10 820 | | Shows a 3.A.7 progress animation with text 'downloading' |
| 10 830 | [6A.1] | Guide Header/Title |
| 10 840 | [6A.2] | Instruction text |
| 10 850 | [3.B.3.1] | Search Guide |
| 10 860 | [6A.3] | Search field/input |
| 10 870 | [6A.4] | Search progress |
| 10 880 | [6A.5] | Results text |
| 10 890 | [3B.2.1] | Back to guide |
| 10 900 | [6A.6] | Contact imp team blurb |
| 10 910 | [6A.7] | Team icon |
| 10 920 | | Toggles Series Download button to |
| 10 930 | [7.1] | Title |
| 10 940 | [7.2] | Listings table |
| 10 950 | [7.2.1] | Listings Header/Title |
| 10 960 | [7.2.2] | Category header |
| 10 970 | [7.2.10] | Current selection |
| 10 980 | [7.2.4] | Content icon type column |
| 10 990 | [7.2.8] | days left |
| 11 000 | [7.2.9] | View status |
| 11 100 | [7.2.5] | Programme name |
| 11 110 | [7.2.5A] | Thumbnails |
| 11 120 | [7.2.6] | Broadcast on |
| 11 130 | [7.2.7] | Duration column |
| 11 140 | [7.3] | Listing Summary/Preview Area |
| 11 150 | [7.4.2] | Selected listing title |
| 11 160 | [7.4.3] | Date & Broadcast time |
| 11 170 | [7.4.4] | Summary text |
| 11 180 | [7.4.5] | File size & disk space |
| 11 190 | [7.4.1] | Thumbnail |
| 11 200 | [7.4] | Your Programmes Left Nav |
| 11 210 | [7.4.1] | Play Now |
| 11 220 | [7.4.2] | Downloading |
| 11 230 | [7.4.3] | Bookings |
| 11 240 | [7.4.4] | Expired |
| 11 250 | [7.4.5] | Thumbnails ON/OFF |
| 11 260 | [7.2.13] | Progress column |
| 11 270 | [7.2.3] | Feedback column |
| 11 280 | [7.2.12] | Type |
| 11 290 | [3.A.2] | Delete button |

The overall application architecture of an interactive media application will now be described with reference to FIG. 22.

Figure 22:
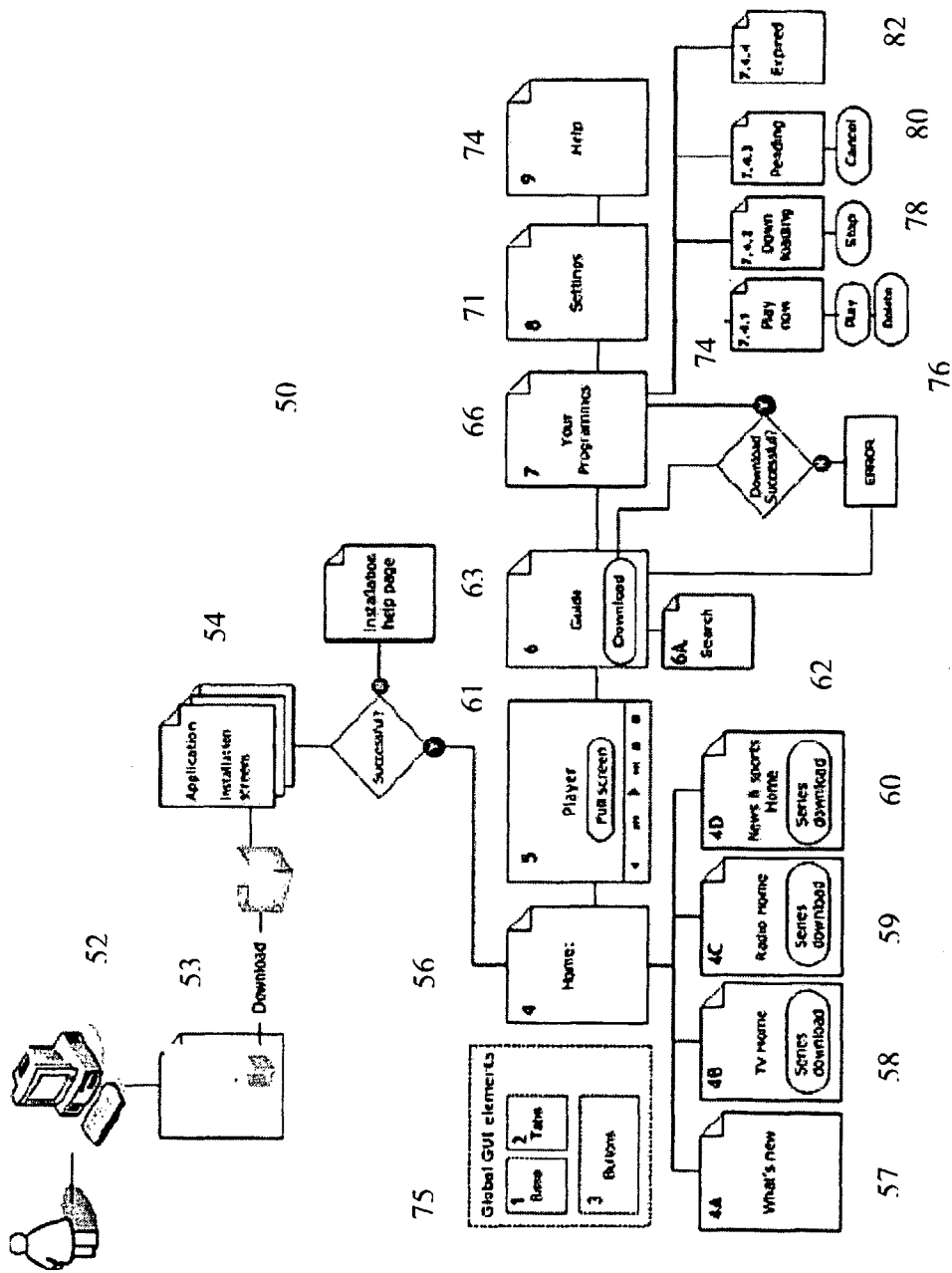
FIG. 22 shows the overall application architecture of an interactive media application program.

FIG. 22 shows an interactive media system 50 which includes a desktop computer 52 and an interactive media application program 54.

The application program 54 is installed on the computer 52 via a series of interactive installation screens 55 which download the program from an appropriate on-line server 53, or from a media storage device such as a compact disc (not shown).

Once the application program 54 is installed, the user can use it to download previously broadcast media content (including TV, radio, and pre-prepared content) which has been made available for download and replay within a limited time-frame (which functionality is provided, in part, by a Digital Rights Management System software).

The program also allows the user to order, or book, programme content which has not yet been broadcast but which will be made available for download. Programmes which are broadcast in serial format or consist of a finite number of broadcast parts, can be ordered together using a Series Download button (described below).

The application program has six main functional elements implemented as web pages; Home 56, Player 61, Guide 63, Your Programs 66, Settings 71, and Help 74, and requires the user to be online to get the latest version of the page. However, some pages can be viewed as a cached page when offline.

The main six web pages are now described below.

The Home web page 56 is the default screen presented to the user on opening the application program 54. The Home page provides direct links to subsidiary web pages (57-60) each of which provide information regarding different categories of media including broadcast television and radio content.

In the example Home page shown in FIG. 22, hyper-text links are provided to previews and for ordering downloads of material shown in the promotional material 57, television information 58, radio information 59, and news and sports information 60 sections, which are default web pages for the respective subscription content. These pages require the user to be online to get the latest version of the page.

The previews are accessed, for example, by clicking on a thumbnail graphic provided on a content subscription window. The preview appears in a pop-up window and typically comprises unencrypted multimedia streamed data. The Player application (described below) is not used for previewing, as this is typically used for viewing encrypted content which has been packaged with a Digital Rights Management software wrapper.

As previously mentioned, Series Downloads are also available, for example through the web pages 58 to 60 by clicking on the respective Series download button 62. This feature automatically adds the consecutive episodes or parts of a broadcast content to the Bookings page 80 for future downloading after it has been broadcast.

In other embodiments, an interactive media application might also provide links to additional digital content such as recorded music, digital photographs and video which belong to the user.

The Player web page 61 will now be described.

The Player web page 61 provides a media player program window for viewing downloaded files which is provided with media application button controls to control viewing of the downloaded content.

This window is not used for on-demand streamed content, ie trailers (which are not typically encrypted, in contrast with the full version programme which is typically wrapped in a Digital Rights Management package), which, in an embodiment, open in a separate browser window pop-up whenever the user clicks on a thumbnail picture provided with the content listing (from within, for example Guide web page 63).

Whenever the user clicks on a downloaded file from within Guide web page 63 or Play now web page 74 at the Your Programmes web page 66, the file will open automatically in the Player window 61 with the name of the selected programme displayed in the left side of the screen.

The video sizes differ for different content types. The user may click the 'Full screen' button to maximise the video size. In this case, for example, the video loses the interface skin (as shown in FIG. 14) and plays with only a title bar displaying a title bar icon, the name of a selected programme, the media application button controls, and a 'back' button which takes the user back to the main Player web page 61.

The Program guide web page 63 will now be described.

The Program guide web page 63 is used by the user to select programmes for download. The guide will allow the user to view today's choice. The user can also scroll back 7 days or forward 6 days. Scrolling back allows the user to download any programme available. Scrolling forward allows the user to 'mark' a file for download. The file is only available to download after TV transmission has begun ie. if "WestEnders" starts at 7.30 pm then the file will be made available for download from 7.30 pm and not before. This rule applies to all TV and radio programming except News content. News bulletins may be available as soon as they are encoded.

In the preferred embodiment, the guide page is provided with a calendar function which presents a view of, say a month, wherein the current date is highlighted together with a rolling time window of a period of time in the past and the future for which content is available for download or for booking for download, as appropriate. The dates in the time window may be coloured or highlighted for ease of reference.

The Your Programmes web page 66 will now be described.

The Your Programmes web page allows the user, via subsidiary web pages, to select downloaded content for viewing via a Play Now web page 76, manage downloading activity via a Downloading web page 78, review booking of content for download via the Booking web page 80, and manage a list of expired content via an Expired web page 82.

The Play Now web page 76 allows the user to view content that has already been downloaded and is ready to play. The download files are arranged in a listings table under the following columns: Programme; Broadcast on (i.e. date of broadcast); Days left; Status; and Duration.

In an embodiment, the programme content can be coloured, for example in red, or subject to a contrast highlight or otherwise highlighted or indicated, to alert the user which content is about to become unavailable for download and/or is downloaded but will become expired due to a time restriction on viewing.

Figure 44:
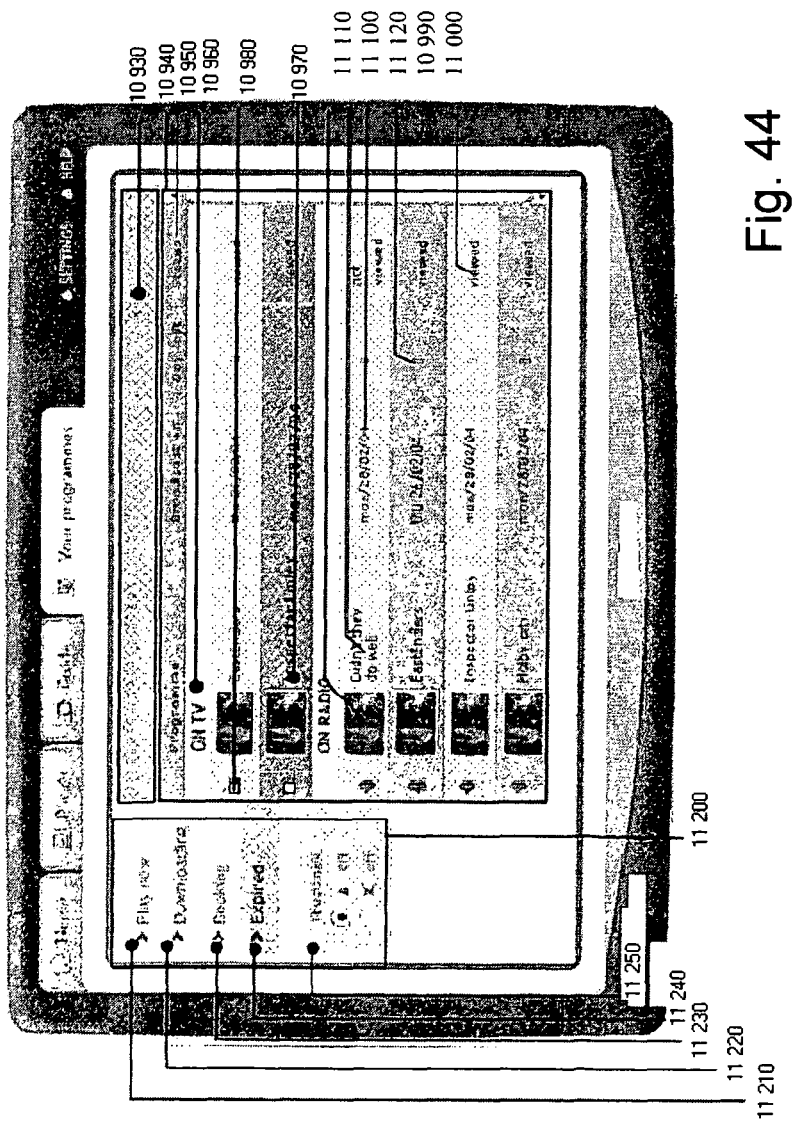
FIG. 44 shows a list of downloaded programmes which have expired.

When content has expired, it is moved to a section of the Your Programmes web page—Expired 82 (also shown in FIG. 44). The user can view a list of programmes that have expired and can no longer be viewed. The expired files are greyed out (not selectable for viewing) and are arranged in a listings table under the following column headings: Programme; Broadcast on (i.e. date of broadcast); Days Left, and View Status (i.e. already viewed, not yet viewed, viewed twice); The programmes remain in this list for a day and are then automatically deleted by the application program, freeing up storage space, e.g. on the computer's 52 hard disk drive for downloading other content.

The Downloading web page 78 allows the user to view a list of active downloading content that the user has already enabled for downloading either by clicking 'Download now' button or 'Book a download/series download' from the Program guide web page 63. The downloading files are arranged in a listings table under the following columns: Programme; Broadcast on (i.e. date of broadcast); Progress (i.e. of content download). A 'Stop download' button is also provided on this page.

The Bookings web page 80 allows the user to view a list of all the downloads which the user has booked or ordered when the 'Book a download' button or 'Book a series download' button was clicked (from Program guide web page 63 section or the TV, Radio & News & Sports Home Subscriptions area of the Home page 56). The booked programmes are arranged in a listings table under the following columns: Programme; Broadcast on (i.e. date of broadcast), and Type. A 'Delete' button is also provided on Bookings web page 80 for each subscription item currently selected.

The Expired web page 82 allows the user to view a list of active downloading content that the user has already enabled for downloading either by clicking a 'Download now' button or a 'Book a download/series download' button from Program guide web page 63. The downloading files are arranged in a listings table under the following columns: Programme; Broadcast on (i.e. date of broadcast), and Progress (i.e. of content download). A 'Stop download' button is also provided on this page.

The Settings web page 71 allows the user to perform disk management (for changing the amount of storage space for storing download programmes), proxy server, and file path settings. Settings is a pop-up window which provides the user the ability to change the path where the 'Your Programmes folder' is located, the quantity of storage, e.g. disk space allocated for their downloads, and the proxy server settings. The settings pop-up window is minimised or closed using standard windows controls in the title bar and is accessed globally from the right hand corner of the interface base.

The Help page 74 contains help for error and troubleshooting. The help files are globally available and are divided into two kinds of help: Installation help and application help. Application help typically comprises a 'Base help' and is available offline, and which is also provided with hyper-text links to online help.

Aspects of the visual appearance of the application program windows and web pages are standardised to provide a consistent 'look and feel' to the user. The application program appears as a main interface graphical user interface (GUI) in a window frame. Common GUI elements 75 across the application program are the base, the tabs and the buttons. Provision is also made for common brand elements that sit across pop-up screens such as graphic icons or logos i.e. trademarks.

Further details regarding the implementation and operation of the application program 54 are given below with reference to FIGS. 22 to 48 and accompanying tables and textual description. Please note that references to web pages or application program elements such as Home 4.0 or 4A What's New, refer to the description provided in the following tables, where applicable, under the 'Name' column.

The Production files for overall application architecture as shown in FIG. 22 are provided in the following table.

| NAME | FILE NAME | COMMENTS |
|---|---|---|
| Global GUI elements | | |
| 1 Base | Base.psd | Main interface GUI frame in a window frame |
| 2 Buttons | Button.psd_normal. psd, tab_rollover.psd, tab_selected.psd | All GUI buttons in one file |
| 3 Tabs | | 3 states, each state is in a separate file |
| 4 Home | home.psd | Same file for Home & What's new |
| 4A What's New | home.psd | " |
| 4B TV Home | home_TV.psd, | TV: Book Series Download & Review booking |
| 4C Radio Home | home_reviewb.psd | |
| 4D News & Sports home | home_radio.psd home_news&sports.psd | Radio Susbcriptions home News &Sports Subscriptions home |
| 5 Player | player.psd | Player with Windows Media 9 controls (small) |
| Full screen | full_screen.psd | Full screen player without interface, maxmised |

-continued

| NAME | FILE NAME | COMMENTS |
|---|---|---|
| 6 Guide | guide.psd, | Guide sorted by column, Last day to download, Low space warning, Guide with active download |
| 6A Search | guide_bychannel.psd, | |
| 6B Search Results | guide_lastday.psd, guide_low space.psd, | |
| 6C No Results | guide_stop_d.psd, guide_prg.psd | Search selected in Guide |
| | search.psd (Not available_guide.psd for offline) | Search successful with results |
| | search_results.psd search_results_none.psd | Unsuccessful search with no results |
| 7 Your Programmes | programmes.psd, programmes_bychannel.psd | Play Now & Your programmes default are same. |
| 7.4.1 Play now Files | programmes_low_space.psd | show sorting & low space message to user |
| 7.4.2 Downloading programmes_ | downloading.psd | List of active downloads in progress |
| 7.4.3 Bookings | programmes_booking.psd | List of booked single shows & series downloads |
| 7.4.4 Expired | programmes_expired.psd | List of expired programmes |
| 8 Settings | pop_setting.psd, pop_up_warning.psd | Covers disk management, proxy server & path |
| 9 Help | pop_help.psd | Contextual help for error shooting |
| Installation | pop_help_install.psd, pop_secure_delivery.psd | Installation screens |
| Common brand elements | imp_branding_elements.psd | Common brand elements that sit across pop-ups |

Figure 23:
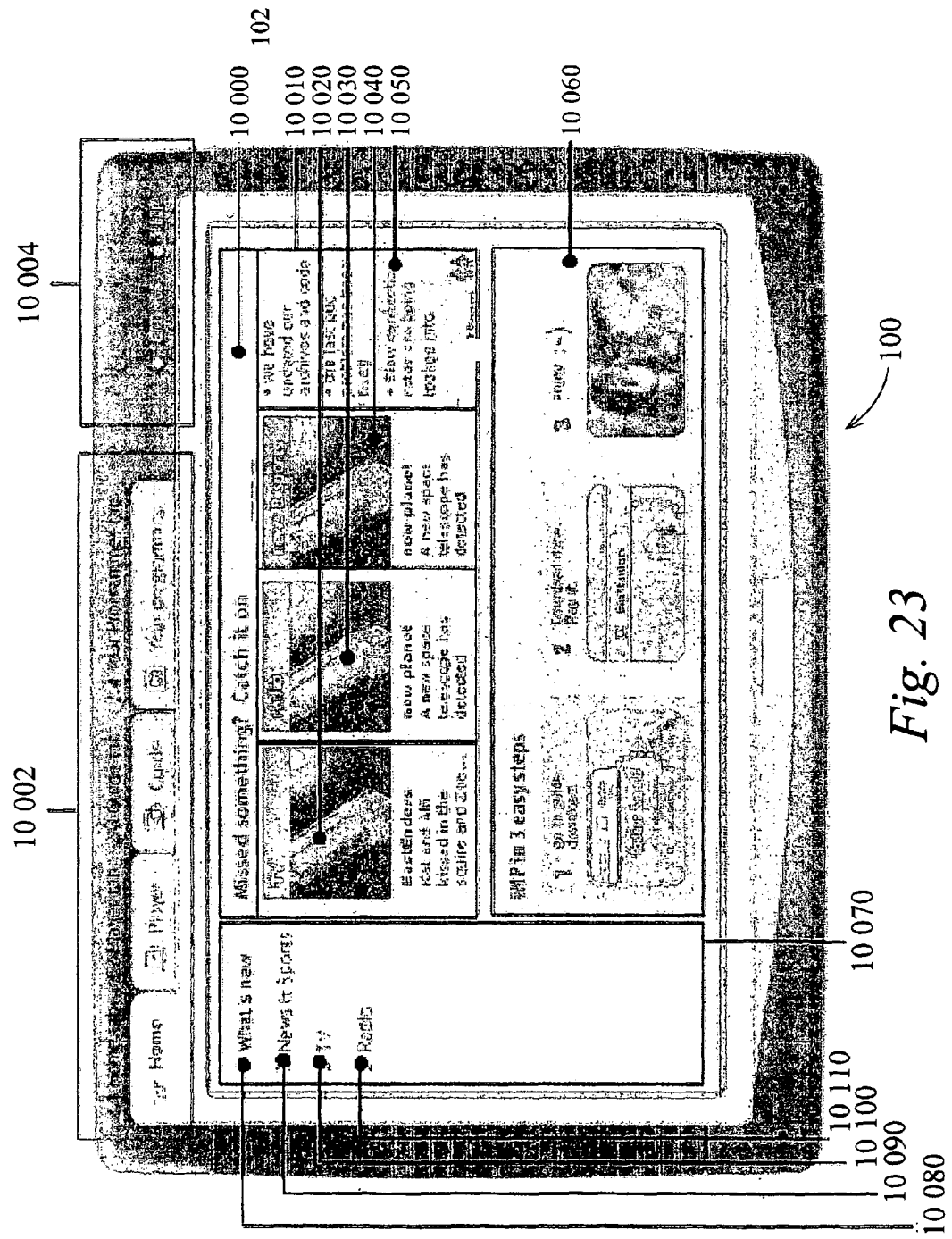
FIG. 23 shows the Home page displaying the 'What's new' information.

FIG. 23 shows the home page 100 displaying the 'What's new' information. Further details regarding elements of the home page are provided in the table below.

The home page is the default screen on opening the application. This page is essentially a web page and requires the user to be online to get the latest version of the page. However, the page can be viewed as a cached page when offline.

Details relating to the user interface tabs are provided in the following table.

| Name | Type (Graphic of a Rectangular Button representation) | Alt text | Interaction/Function | Behaviour | General Rules |
|---|---|---|---|---|---|
| 2.1 Home tab | House icon | Home | This tab takes you to 4.0 Home | Normal state: 2.1.1 On rollover: 2.1.2 Mousedown: 2.1.3 | |
| 2.2 Player | Player icon (square box with a horizontal dividing line near the bottom edge with a filled-in triangle above the dividing line) | Player | This tab takes you to 5.0 Player | Normal state: 2.2.1 On rollover: 2.2.2 Mousedown: 2.2.3 | Tab appears greyed out (don't have behaviour) when offline |
| 2.3 Guide | Guide icon shows a page with a circular magnifiying glass at the bottom right corner | Guide | This tab takes you to 6.0 | Guide Normal state: 2.3.1 On rollover: 2.3.2 Mousedown: 2.3.3 | Tab appears greyed out (don't have behaviour) when offline |
| 2.4 Your Programmes | Graphic icon | Your Programmes | This tab takes you to 7.0 | Your Normal state: 2.4.1 Programmes On rollover: 2.4.2 Mousedown: 2.4.3 | Tab appears greyed out (don't have behaviour) when offline |

Details relating to the 3B Buttons are provided below.

| Name | Type (@BMRectangular button representation) | Alt text | Function/Interaction | Behaviour | General Rules |
|---|---|---|---|---|---|
| 3B.5 Settings | Button with the a raised circular feature to the | Settings | This button opens the 8.0 Settings Pane | Normal state: 3B.5.1 | |

-continued

| Name | Type (@BMRectangular button representation) | Alt text | Function/Interaction | Behaviour | General Rules |
|------|---|---|---|---|---|
| | left of the word SETTINGS | | | On rollover: 3B.5.2 Mousedown: 3B.5.3 | |
| 3B.6 Help | Button with the a raised circular feature to the left of the word HELP | Help | This button opens a help page | Normal state: 3B.6. On rollover: 3B.6.2 Mousedown: 3B.6.3 | |

Further details regarding the Home page features of What's New, TV, Radio and News & Sports are given in the table below:

4.3 Home left navigation bar

| Name | Type (Graphic Rectangular button representation) | Title text | Function/Interaction | Behaviour | General Rules |
|------|---|---|---|---|---|
| 4.3.1 What's new | A drop-down menu displaying choices TV, Radio, News & Sports, as listed under the 'name' column | What's new | This link takes you to 4A What's new section | Normal state: 4.3.1.1 On rollover: 4.3.1.2 Mousedown: 4.3.1.3 | |
| 4.3.2 TV | | TV | This link takes you to 4B TV section | Normal state: 4.3.2.1 On rollover: 4.3.2.2 Mousedown: 4.3.2.3 | |
| 4.3.3 Radio | | Radio | This link takes you to 4C Radio section | Normal state: 4.3.3.1 On rollover: 4.3.3.2 Mousedown: 4.3.3.3 | |
| 4.3.4 News & Sports | | News & Sports | This link takes you to 4D News & Sports section | Normal state: 4.3.4.1 On rollover: 4.3:4.2 Mousedown: 4.3.4.3 | |

Further details regarding the Promotional Area 102 shown in FIG. 23 are given in the table below. Further related details are also given in the accompanying description following the table.

4.2 Promo area

| Name | Type | Alt text | Function/Interaction | Behaviour | General Rules |
|------|------|----------|---------------------|-----------|---------------|
| 4.2.1 TV promo | Graphic + HTML text | TV Home Summary text copy given by TV | Same as 4.3.2 TV | Graphic: Behaves like Cursor changes to an Image map rollover finger | |
| 4.2.2 Radio promo | Graphic + HTML text | Radio Home Summary text copy given by Radio | Same as 4.3.3 Radio | Graphic: Behaves like Cursor changes to an Image map rollover finger | |
| 4.2.3 News & sports | Graphic + HTML text | News & Sports Summary text copy given by News & Sports | Same as 4.3.4 News | Graphic: Behaves like Cursor changes to promo Home & Sports an Image map rollover finger | |

In an embodiment, Home 4.0 is same as 4A 'What's new' section. If user is offline and starts the application program, 'Home' comes up as the default landing page. All other tabs are greyed out. The graphic promos for TV, Radio, News & Sports are not dynamic and cannot be updated. Only updated item is the news (HTML text).

These are Key Use cases within 4.0 Home pages:

(Reference numerals in the use cases refer to the tables)

A. User is offline & launches the application from the desktop

B. User selects any section from 4.3 Home Left Nav

Figure 24:
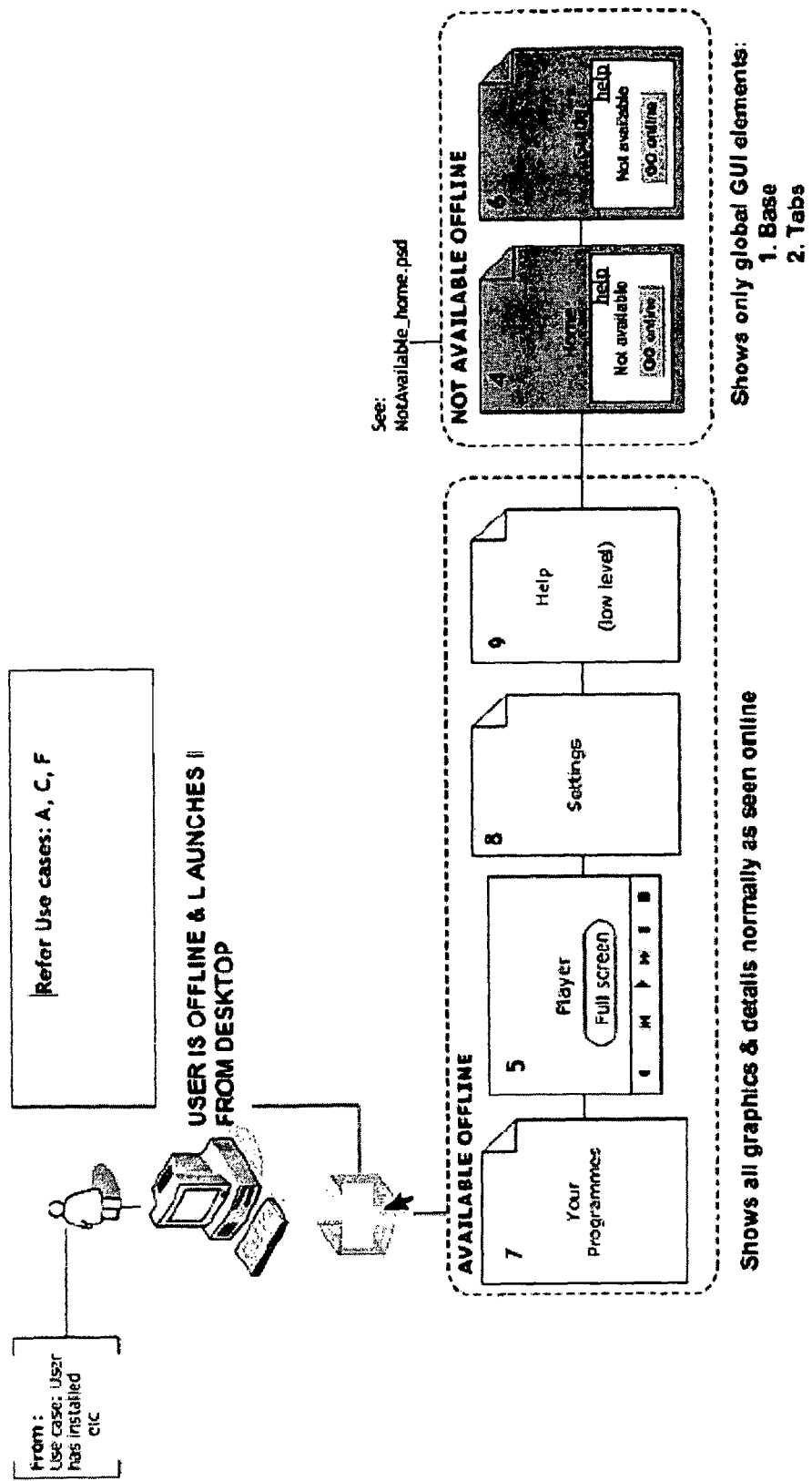
FIG. 24 shows a schematic diagram illustrating which main web pages which are available when the user is off-line and on-line.

C. User selects any tab (2.2 to 2.4) from Global interface area. User is offline.
D. User clicks on the any of 3 promo graphics within 4.2 Promo area
E. User clicks on Settings.
F. User clicks on Help
G. User minimises the application program FIG. 24 illustrates use cases A, C, and F wherein the user is offline and launches the interactive media system application program from the computer.

Figure 25:
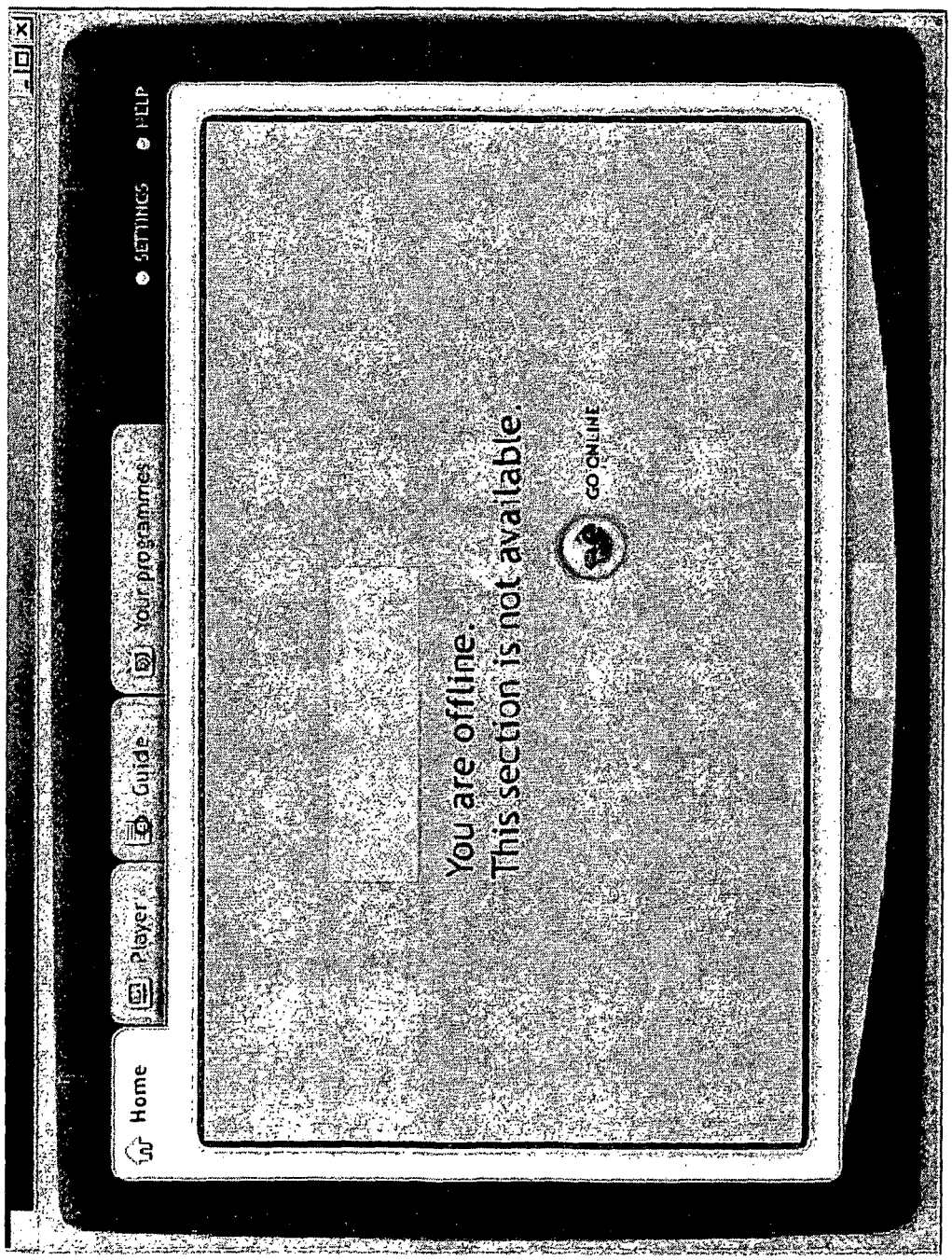
FIG. 25 shows the Home page when off-line.

FIG. 25 shows a the Home page when off-line, illustrating use case A above.

Figure 26:
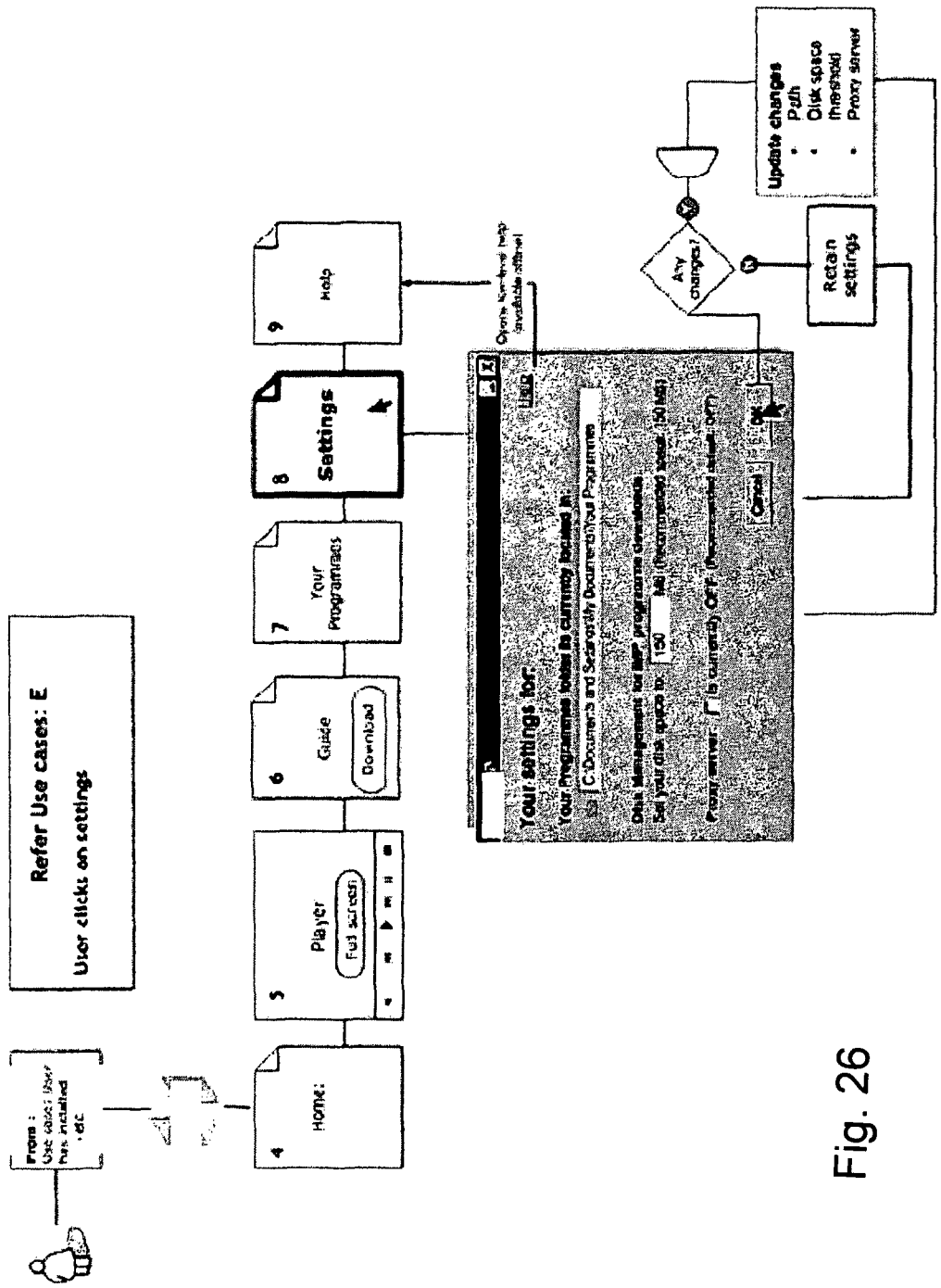
FIG. 26 shows a user adjusting the application program settings.

FIG. 26 shows a user adjusting the application program settings, illustrating use case E above.

Figure 27:
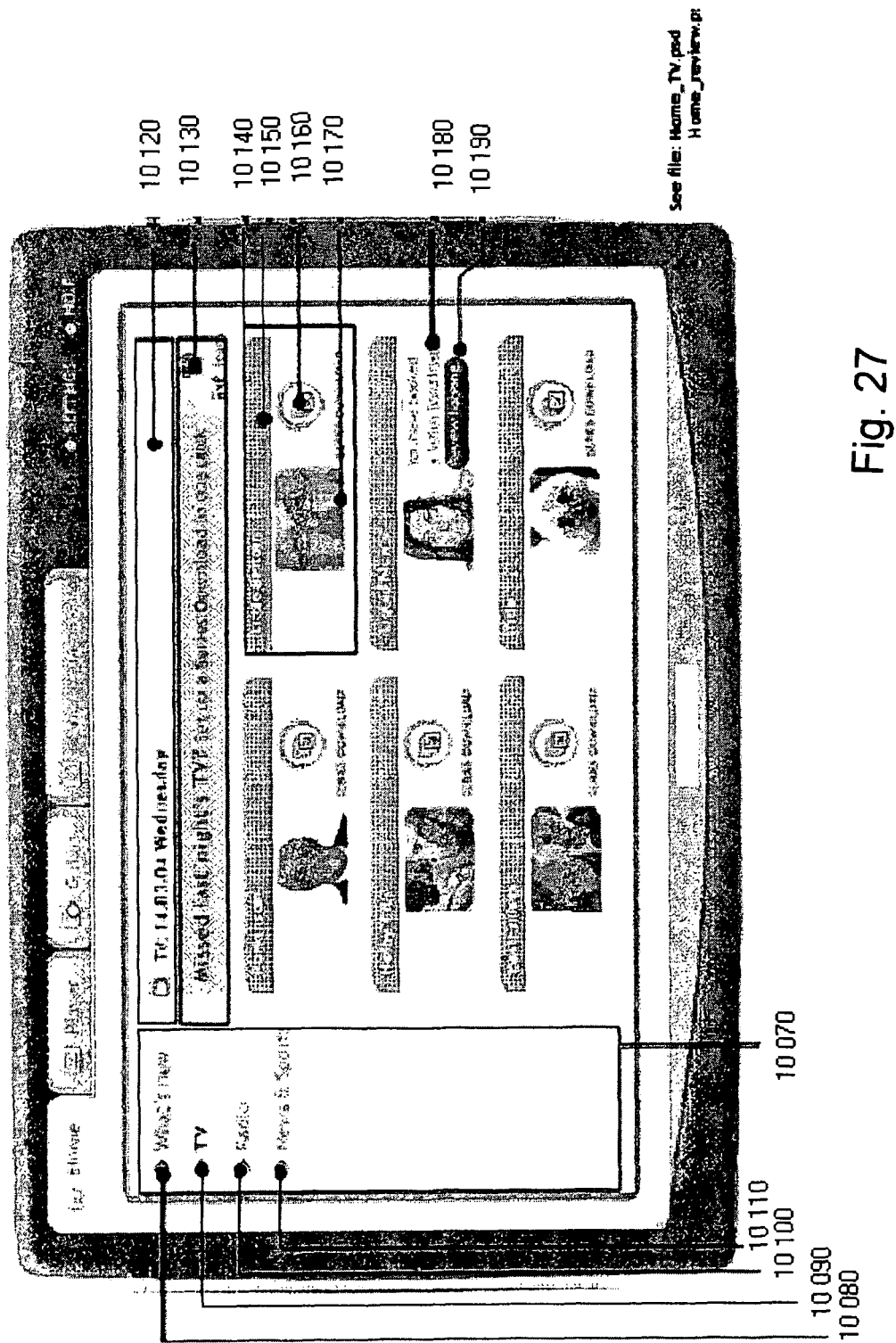
FIG. 27 shows the Home page displaying television programme information.

FIG. 27 shows the Television home page (also shown as 58 in FIG. 22).

The Television home page is the default page for all TV subscriptions, where users can set up a 'Series Download.' This page is essentially a web page and requires the user to be online to get the latest version of the page. However, the page can be viewed as a cached page when offline Further details of the elements of the Television home page are provided in the tables below and in the accompanying text.

| Name | Type | Alt text | Function/Interaction | Behaviour | General Rules |
|---|---|---|---|---|---|
| 4B.1 TV Date & Icon | Graphic + HTML | TV home | System displays current date | | day, dd/mm/yy |
| 4B.2 Header/Title | Graphic | Missed last night's TV? Set up a series download in one click- | Instruction graphic | | |
| 4B.3 TV subscriptions | | | | | |
| 4B.3.1 Subscription title | HTML | Programme Title | | | |
| 4B.3.2 Series Download button | Graphic | Book a series download | On mouse click, system books the chosen programme. 'Series download' button changes to 'Review booking' Confirmation pop-up comes up along with an instruction HTMl text"Series download has been booked' | Normal state: 4B.3.2.1 Rollover: 4B.3.2.2 Mousedown 4B.3.2.3 | Series download button toggles to '4B.5 Review' booking' once user books a 'Series Download' |
| 4B.4 Series Download confirmation text | HTML | You have booked a Series Download | | Successful setup confirmation text | Appears after button has been clicked. |

| Name | Type | Alt text | Function/ Interaction | Behaviour | General Rules |
|---|---|---|---|---|---|
| 4B.5 Review Booking button | Graphic button | Review your series download | On clicking button, system opens the corresponding 'Your Programmes' Bookings section User can review the subscription by clicking 3.A.5.1 'Delete' button | Normal state: 4B.5.1 Rollover: 4B.5.2 Mousedown 4B.5.3 | 'Review booking' only appears if user has booked a 'Series download' |

In a preferred embodiment, TV Home (4B), Radio (4C), News & Sports (4D) have the same behaviour and use cases. For example, if user is offline and starts the application, 'Your Programmes' comes up as the default landing page. The left navigation window links are active and the related sections will be cached as they will not change for a period of time. If the user clicks on any other tabs and they are offline, a system message appears asking them to connect to the Internet (e.g. get online).

These are Key Use cases provided for by the TV Home page:
A. User is offline & clicks on any other tabs
B. User books a Series Download
C. Users clicks 'Review booking'
D. User system runs out of disk space and 'Series Download' has been setup In an embodiment, certain technical requirements for the delivery of particular content items (files) are as follows:

| Programme | DRM | Bitrate | Framesize | Transferrable |
|---|---|---|---|---|
| Eastenders | 7 days | 512 kbps | 640 × 411 | No |
| Holby | 7 days | 512 kbps | 640 × 411 | No |
| Little Britain | 7 days | 512 kbps | 640 × 411 | No |
| Liquid news | 7 days | 512 kbps | 640 × 411 | No |

Figure 28:
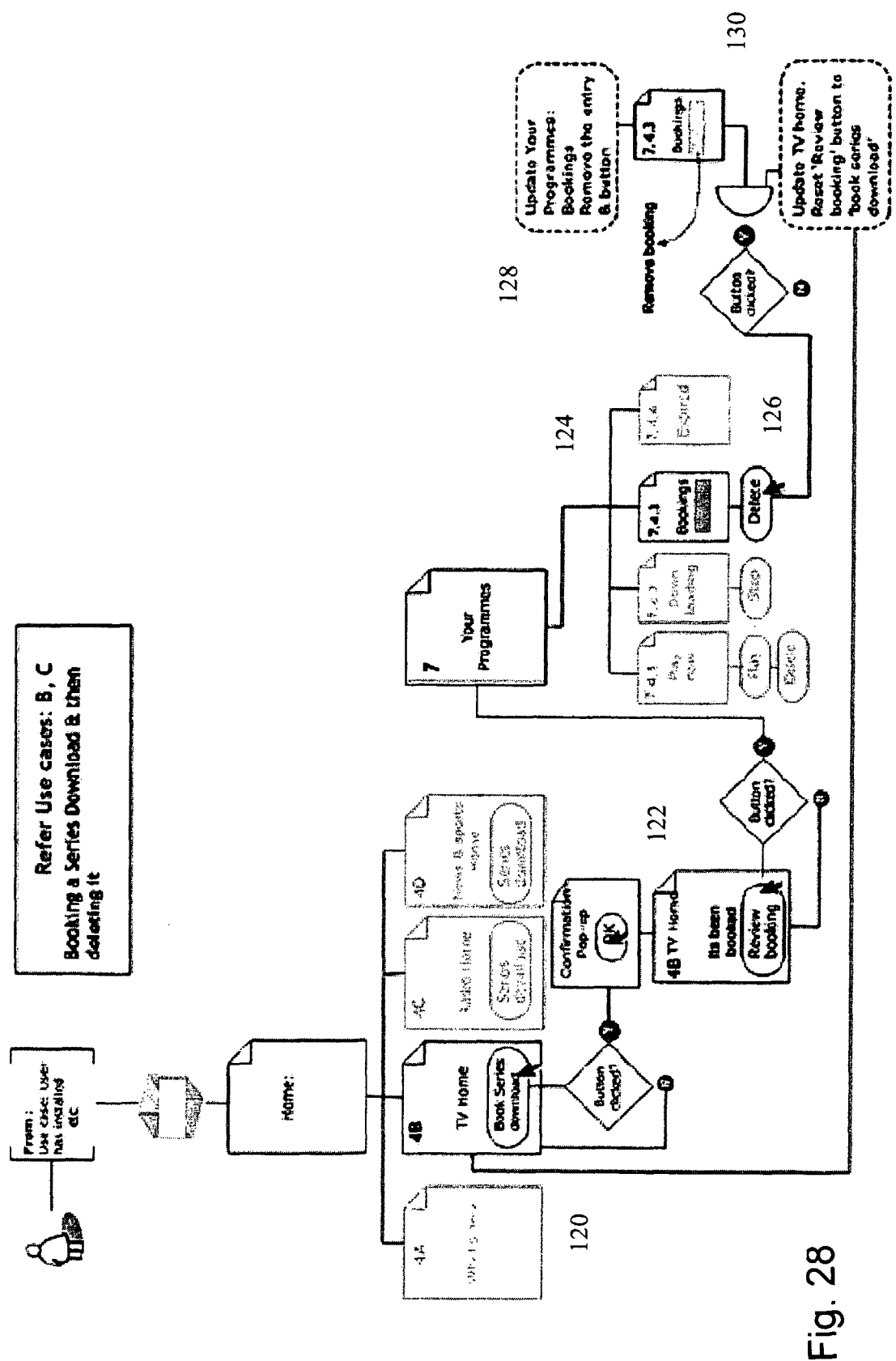
FIG. 28 shows a schematic diagram for booking and deleting a Series Download.

FIG. 28 shows a schematic diagram for booking and deleting a Series Download by illustrating use cases B and C (as described above) wherein a user books a series download and then attempts to delete it.

In this example, the user clicks on a Book Series Download button 120 which initiates the download process via a content distribution system (not shown). After receiving a confirmation screen 122, the user is then presented with a button (hyperlink) which launches the Bookings page 124 (also shown by ref 80 in FIG. 22) which allows the user to review all booked or ordered content. Each booked item is accompanied by a delete button 126, which when clicked, causes the series programme booking in question to be deleted 128 from the bookings list and correspondingly updates 130 the Television home page.

Figure 29:
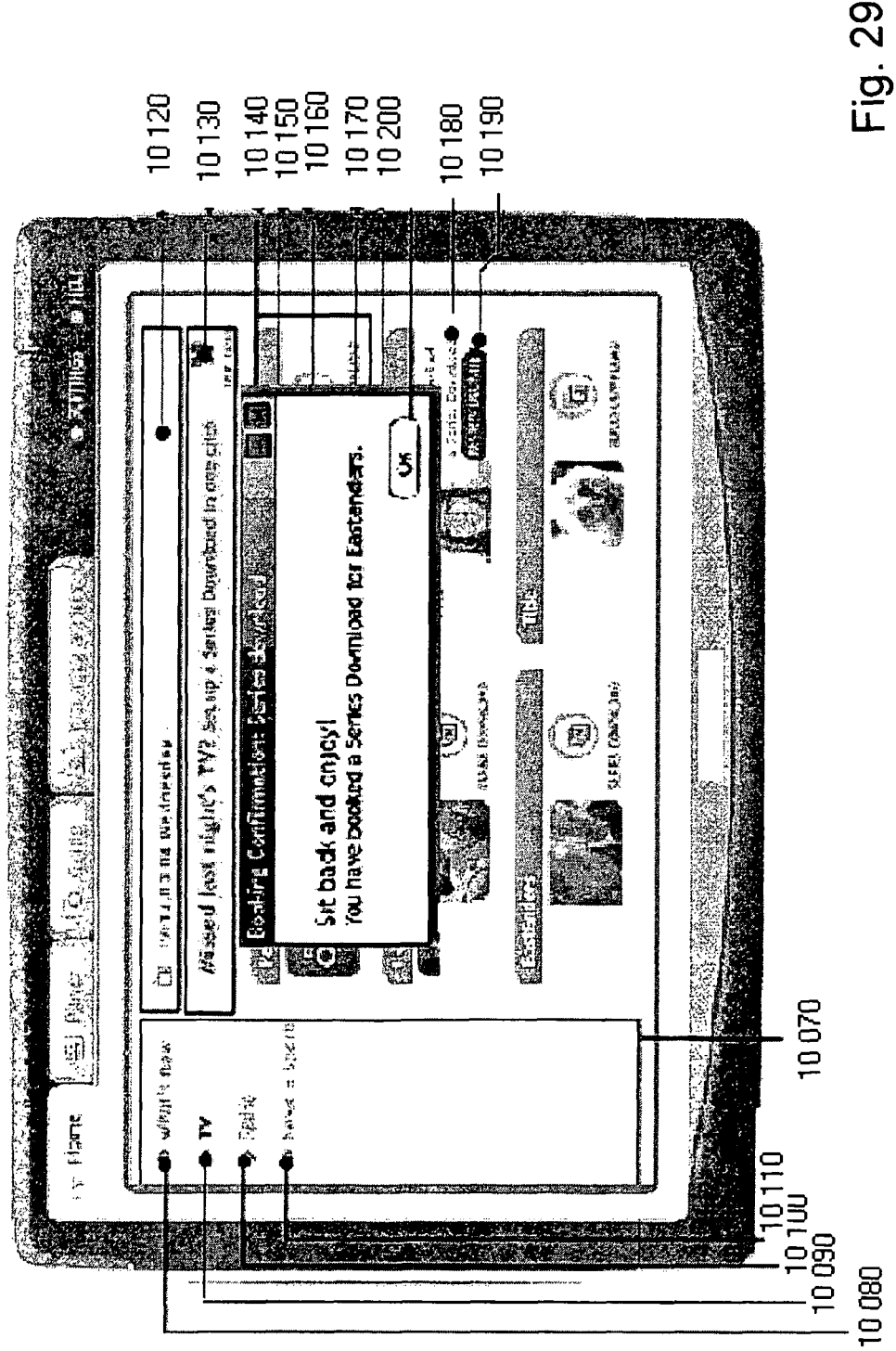
FIG. 29 shows a confirmation pop up window after booking a series download of a television programme.

FIG. 29 shows a confirmation pop up window after booking a series download of a television programme.

Figure 30:
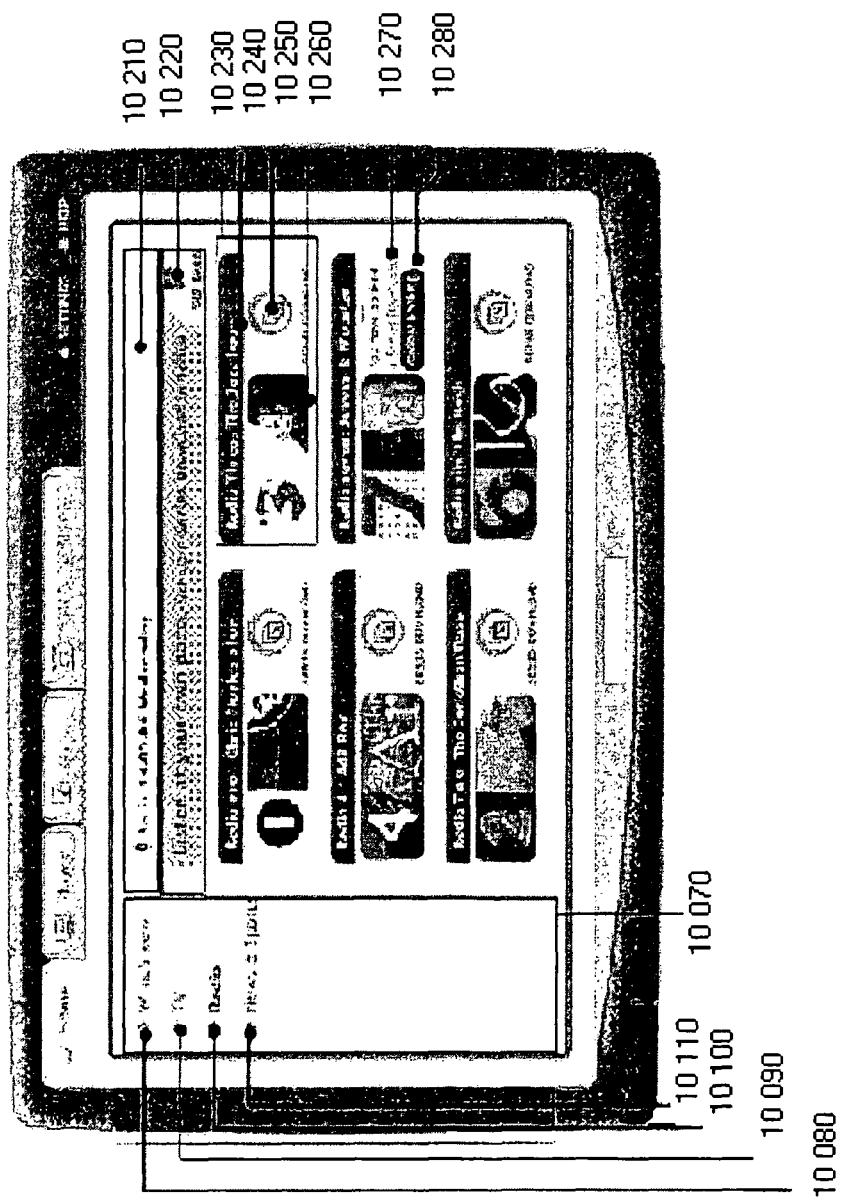
FIG. 30 shows the Radio Home page.

FIG. 30 shows the Radio Home page showing radio subscriptions.

The Radio home page is the default page for all Radio subscriptions, where users can set up a 'Series Download.' This page is essentially a web page and requires the user to be online to get the latest version of the page.

Further details of the elements of the Television home page are provided in the table below and in the accompanying text.

| Name | Type | Alt text | Function/Interaction | Behaviour | General Rules |
|---|---|---|---|---|---|
| 4C. 1 Radio Date & Icon | Graphic + HTML | Radio home | System displays current date | — | day, dd/mm/yy |
| C.2 Header/Title | Graphic | Listen at your own pace. Book a series download in one click | Instruction graphic | | |

In a preferred embodiment, Radio subscriptions works exactly like TV subscriptions with respect to behaviour and function as discussed above (see 4B.3 TV Subscriptions).

In a preferred embodiment, subscriptions specific to Radio may include:

| Programme | DRM | Bitrate | Framesize | Transferrable |
|---|---|---|---|---|
| Today Programme | n/a | 128 kbps | n/a | Yes |
| Chris Moyles | n/a | 128 kbps | n/a | No |
| Teny Wogan | n/a | 128 kbps | n/a | No |
| Jonathan Ross | n/a | 128 kbps | n/a | No |
| Book at Bedtime | n/a | 128 kbps | n/a | No |
| Archers | n/a | 128 kbps | n/a | No |

Figure 31:
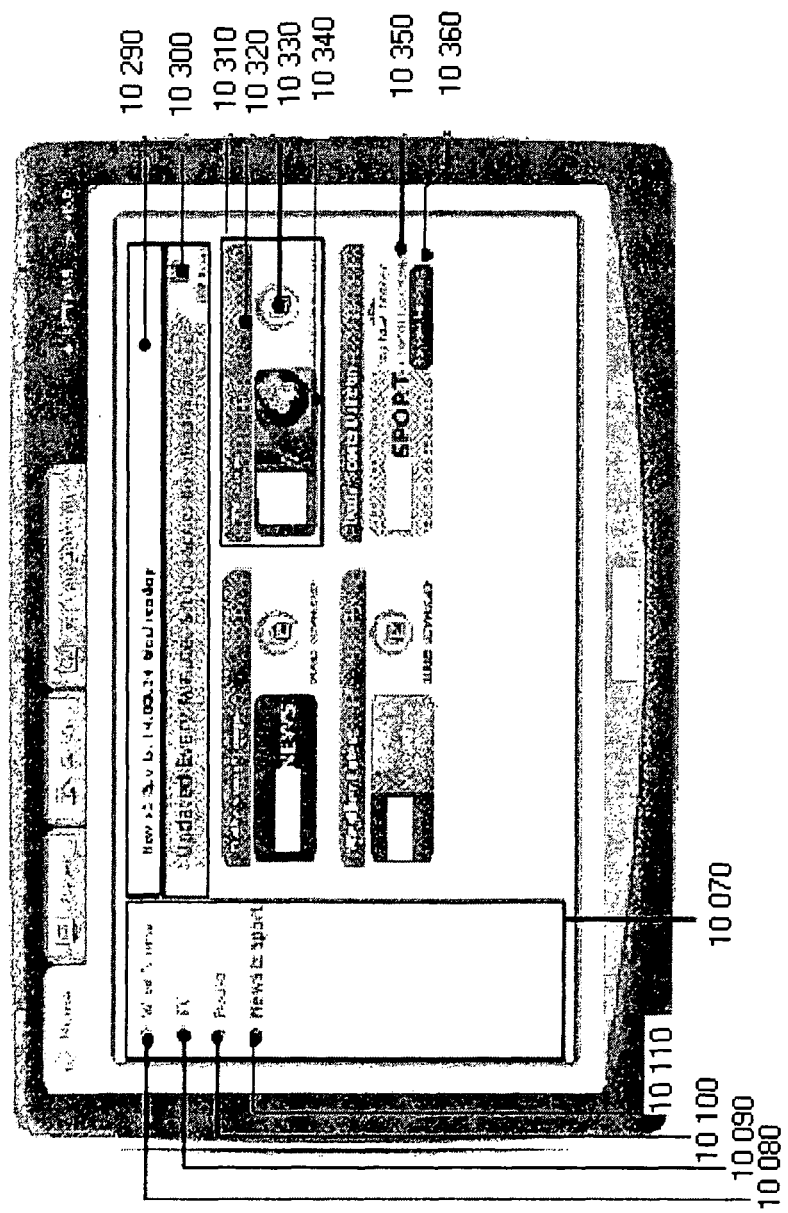
FIG. 31 shows the News and Sports home page.

FIG. 31 shows the News & Sports home page.

The News & sports home page is the default page for all News & sports subscriptions, where users can set up a 'Series Download.' This page is essentially a web page and requires the user to be online to get the latest version of the page.

Further details of the elements of the News & Sports home page are provided in the table below and in the accompanying text.

| Name | Type | Alt text | Interaction/Function | Behaviour | General Rules |
|---|---|---|---|---|---|
| 4D.1 News & sports Date, Icon | Graphic + HTML | News & sports home | System displays current date | — | day, dd/mm/yy |
| 48.2 Header/Title | Graphic | Updated every minute. Book a series download in one click- iMP team | Instruction graphic | — | |

News & Sports subscriptions works exactly like TV or Radio subscriptions (as described above in item 4B.3 in the preceding tables) with respect to behaviour and function.

In a preferred embodiment, certain technical requirements are as follows:

| Programme | DRM | Bitrate | Framesize | Transferrable |
|---|---|---|---|---|
| One News | n/a | 128 kbps | n/a | Yes |
| One TV news | n/a | 128 kbps | n/a | No |
| weather | n/a | 128 kbps | n/a | No |
| sport | n/a | 128 kbps | n/a | No |

Further details regarding the main Player web page (as shown in FIG. 22 reference numeral 61) are described below.

Figure 32:
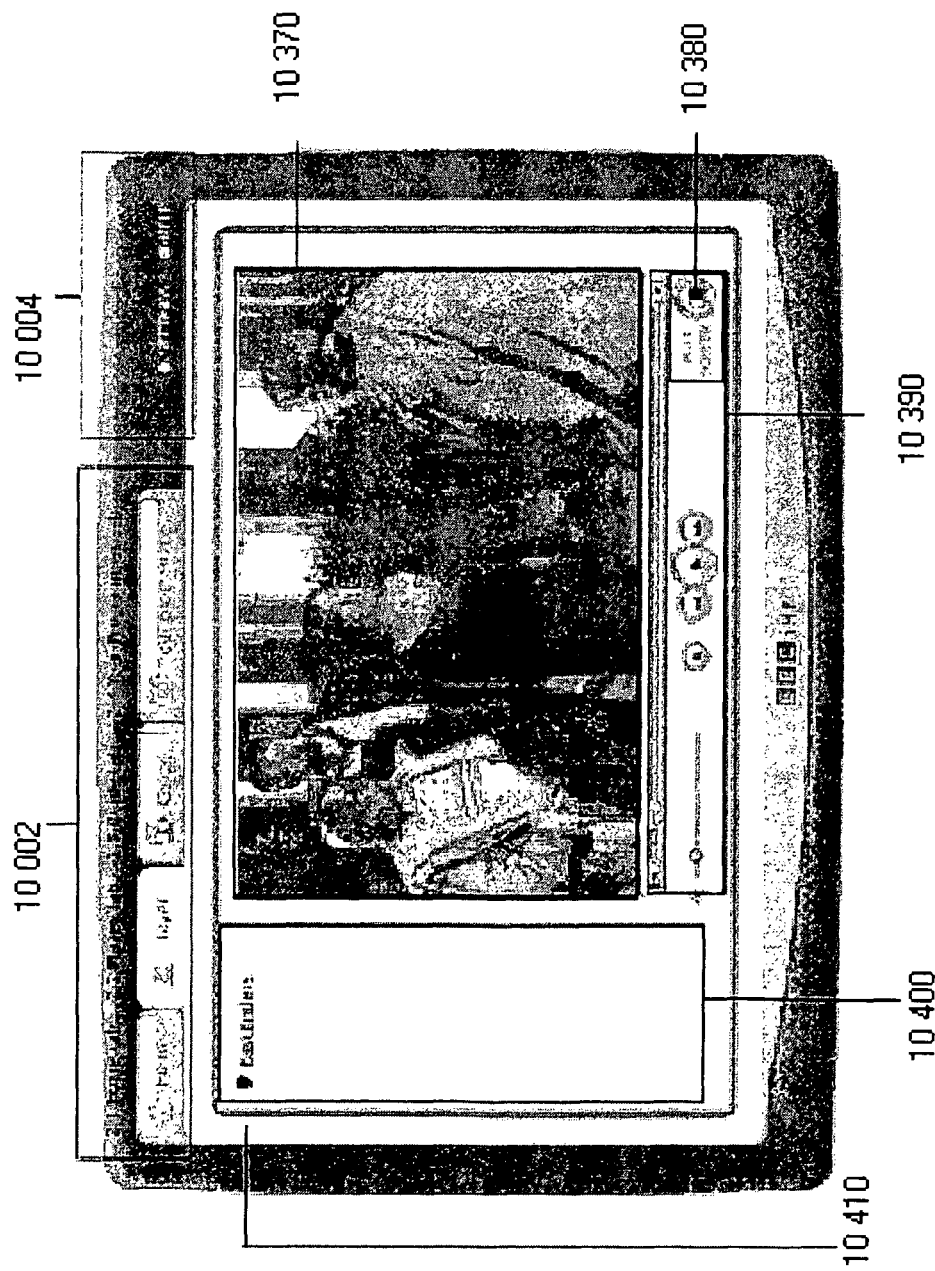
FIG. 32 shows the Player page displaying recorded television content.

FIG. 32 shows the Player page displaying recorded television content.

Figure 33:
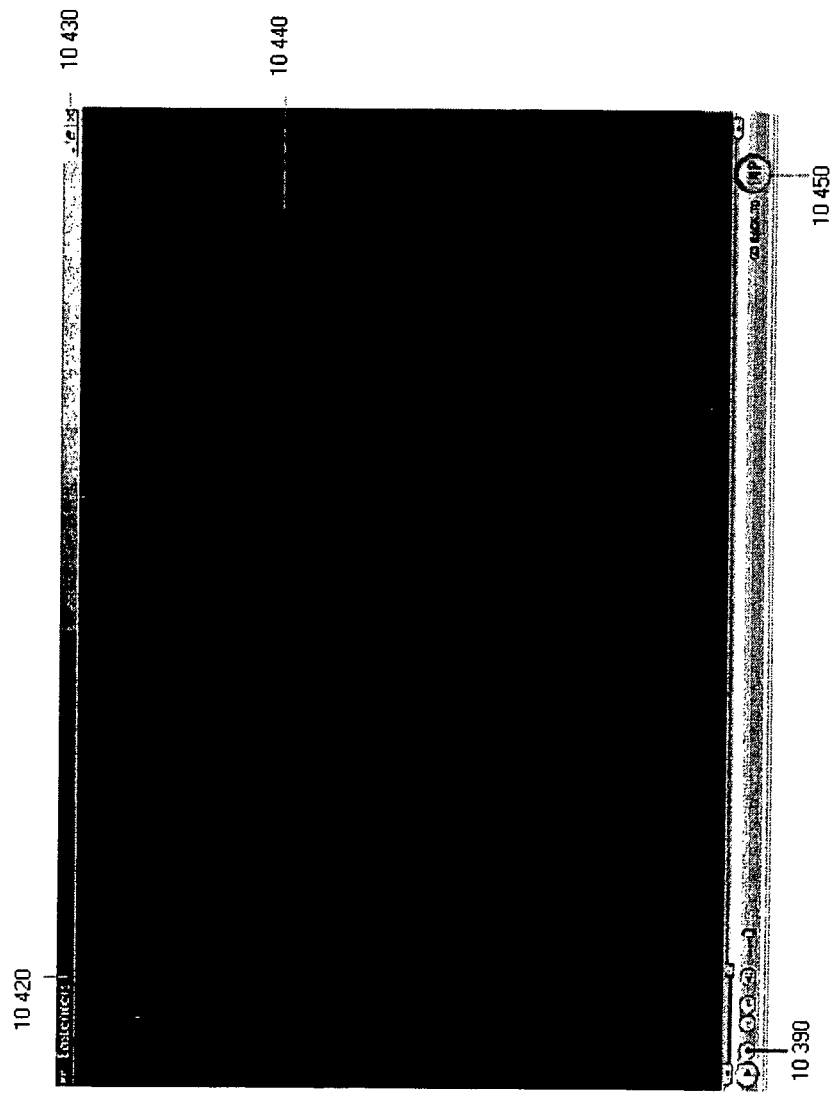
FIG. 33 shows a maximized Player window.

The player window is for viewing downloaded files. This window is not used for on demand streamed content, i.e. trailers, which, in a preferred embodiment are unencrypted. Previews can open in a separate browser window pop-up whenever user clicks on the programme thumbnail from within Guide. In an embodiment, the Player uses the Windows™ Media 9 controls. Whenever the user clicks on a downloaded file from within Guide or 'Your Programmes/Play now' section, the file will open automatically in the application Player window with the name of the selected programme in the left navigation window (implemented in the file 'left nav'). The video sizes differ for different content types. The user clicks the 'Full screen' button to maximise the video, (as shown in FIG. 33). The video loses the interface skin and plays with only the title bar displaying the application title bar icon, the name of the selected programme, Windows™ Media 9 controls and a 'back to the application' button, which takes the user back to the main application window shown in FIG. 32.

Further details of the elements of the Player home page (as shown in FIG. 22 reference numeral 61) are provided in the table below and in the accompanying text.

| Name | Type | Alt text/content | Interaction/Function | Behaviour | General Rules |
|---|---|---|---|---|---|
| 5.1 Player left nav | HTML column | | Displays the name of current selected programme file that is playing | | |
| 5.1.1 Programme name | HTML + graphic | Programme name | | | Video ratio = 14:9 466 × 300px |
| 5.2 Win Media 9 control | Windows media 9 | | Standard Window Media 9 controls | See Windows documentation | |
| 3.8.1.1 Full screen button | Graphic button | Full screen | On clicking 3.8.1.1 Full screen button player window becomes 'Full screen' Interface frame is replaced with a maximised video displayed with Win Media 9 controls and the button toggles to 3.A.14.1 'Go Back' button | Normal: 3.8.1.1 Rollover: 3.8.1.2 Mousedown: 3.8.1.3 | Toggle button 'Go Back to home' 3.A.14.1 |
| 3.A.14.1 'Go Back to home | Graphic button | Go back to home | On clicking 3.A.14.1 Full screen window closes and the main window comes up with the video playing in the player window | Normal: 3.A.14.1 Mousedown: 3.A.14.3 Rollover: 3.A.14.2 | Toggle button 'Full screen' 3.B.1.1 |

In an embodiment, the video for the application player window has been restricted to 499×300 pixels to maintain the aspect ratio of 14:9. These are the final sizes for various content types to be displayed in the application player:

| | |
|---|---|
| TV: | 466 × 300 px |
| Radio: | 466 × 300 px |
| News & sports: | 300 × 200 px |

These are Key Use cases involving the Player application.
A. User clicks on any downloaded programme within 'Your programmes' or 'Guide'
B. User clicks 'Full screen'
C. User clicks 'Go back to application'
D. User minimises 'Full screen'

Figure 34:
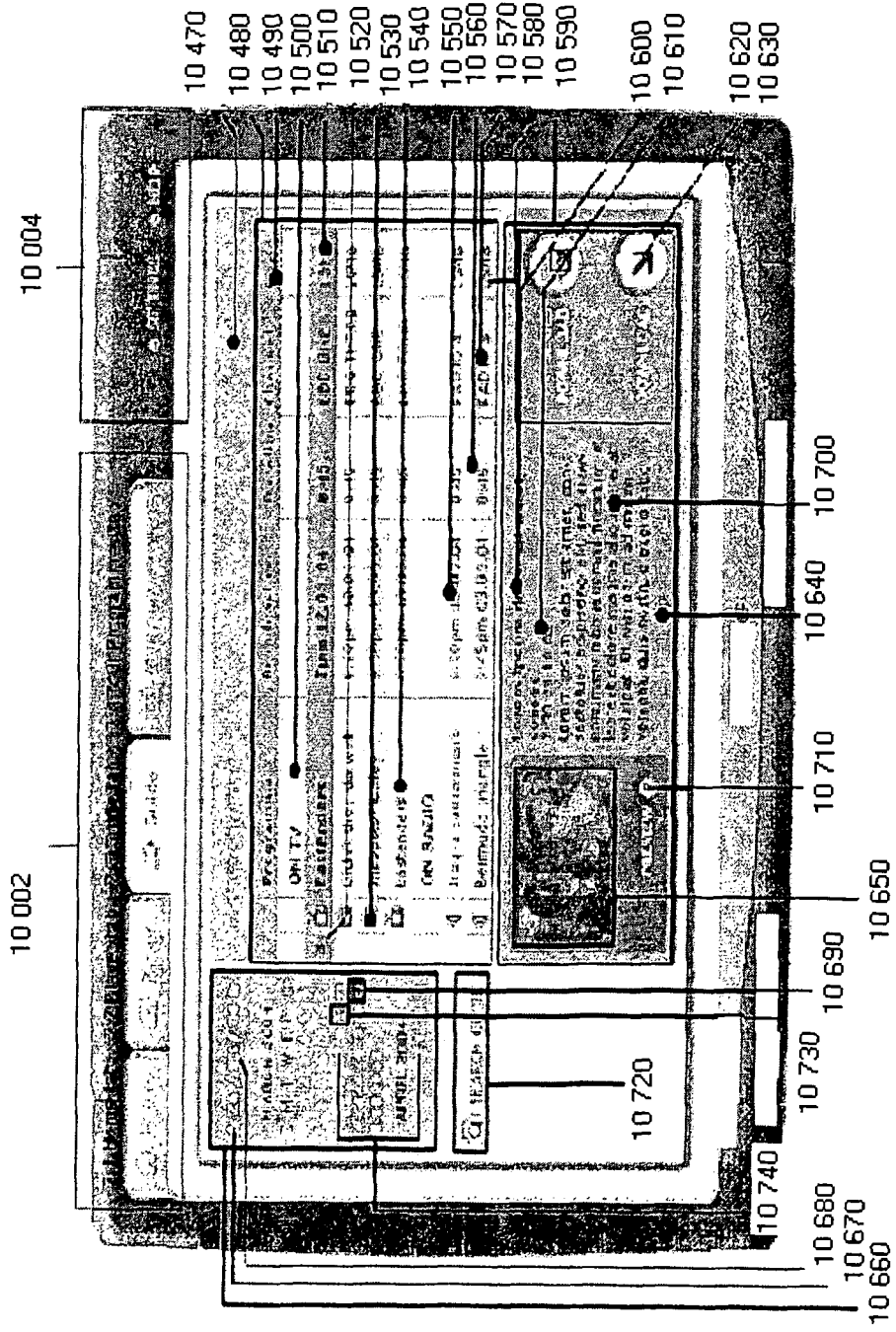
FIG. 34 shows the Programme Guide page.
Figure 35:
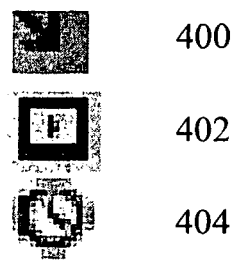
FIG. 35 shows graphic icons used during programme download.

FIG. 34 shows the Programme Guide page.

The guide is used by the user to select programmes for download. The guide also allows the user to view today's choice. The user can also scroll back 7 days or forward 6 days. Scrolling back allows the user to download any programme available. Scrolling forward allows the user to 'mark' a file for download. Programme files are only available to download after TV transmission has begun i.e. if 'WestEnders' starts at 7.30 pm then the file will be made available for download from 7.30 pm and not before. This rule applies to all TV and radio programming except News content. News bulletins should be available as soon as they are encoded.

Further details of the elements of the Programme Guide web page are provided in the tables below and in the accompanying text.

| Name | Type | Alt text/content | Interaction/Function | Behaviour | General Rules |
|---|---|---|---|---|---|
| 6.1 Header/Title | HTML | Today: Current day<br>Start of week: Monday<br>Start of week: Tuesday<br>Mid week: Wednesday<br>Nearly there: Thursday<br>Weekend: Friday!<br>Unwind: Saturday<br>Relax: Sunday | System displays title + current day | — | Title + day<br>If its the last day for downloading programmes then a message saying programmes on this day" |
| 6.2 Calendar | | | | | |
| 3.B.10.1 Nav arrows | Graphic | (Left arrow) Previous day<br>(Right arrow) Next day | On clicking left arrow, 6.1 Header updates with selected day.<br>6.2.4 Current selection updates<br>6.3 Listings table updates with programmes from that day. | — | If user keeps clicking 'Previous day' arrow and end of the 'Guide's listing period is reached, then the nav arrow becomes 'greyed out' 3.B.10.2: unavailable (not clickable) Also, if user keeps clicking future dates, it changes the 'Download now' to 'Book a download' |
| 6.2.2 Current date | HTML | dd/mm/yy | On clicking 3.B.10.1 Nav arrows, Current date gets updated to reflect the user's clicks till end of guide's listing period is reached. | — | |

The following table adds further detail associated with the Programme Guide web page.

| Name | Type | Alt text/content | Interaction/Function | Behaviour | General Rules |
|---|---|---|---|---|---|
| 6.2.3 Current guide duration | HTML | Row colour | System automatically colours the current guide duration in a specific row colour as defined in visual guidelines. This row colour is dynamic and matches the guide listing period | | |
| 6.2.4 Current selection | HTML | Cell colour | Cell colour dynamically changes when user clicks on a day in the calendar to reflect this is the current selection | Cell colour change. Refer visual guidelines | |
| 6.2.5 Last day | HTML | Text colour | The system automatically calculates the last day for downloading listings in the current guide duration and automatically makes that day colour to reflect its 'Last day' status. This also affects 6.1 Header | | User clicking on 3.8.10.1 nav arrow will not change this. This is fixed daily by the system |
| 6.3 Listings table | | | | | |
| 6.3.1 Listings header | HTML + sort icon | Programme Broadcast on Duration Channel Size | The title bar table header can be clicked on any individual column to sort/order the listings table accordingly. The current sort order selection is seen by that column header getting coloured (see visual guidelines) | The header title supports dynamic column width manipulation (e.g Outlook columns) | All programme names longer than 20 characters appear truncated with ( . . . ) attached to the end. If user plays with width |

| Name | Type | Alt text/content | Interaction/Function | Behaviour | General Rules |
|---|---|---|---|---|---|
| | | | | | of column then the full name appears |
| 6.3.2 Category header | HTML | On TV On Radio On News & Sports | Refer to visual guidelines for styles etc | | |
| 6.3.3 Feedback icon column | HTML + icons | 6.3.3.1 Downloading 6.3.3.2 Downloaded 6.3.3.2 Future view | Appears when user clicks Download Appears when Download is Complete Appears when download for a 'Viewable in Future' programme is complete | Timed animated gif Static gif Static gif | |

The following table also adds further detail to the Programme Guide web page.

| Name | Type | Alt text/content | Interaction/Function | Behaviour | General Rules |
|---|---|---|---|---|---|
| 6.3.4 Content icon column | HTML + icons | 6.3.4.1 TV 6.3.4.2 Radio 6.3.4.3 Preview 6.3.4.4 Series Subscribe | Refer to visual guidelines for styles etc All static gifs | 6.3.4 same as 6.3.1 | |
| 6.3.5 Programme name column | HTML | 'Programme' Eg: Only Fools and Horses | On click, row gets highlighted and 6.4 Listing summary area gets updated with selected programme details | 6.3.5 same as 6.3.1 | Programme text gets bold in selection. Ref visual guidelines. |
| 6.3.6 Broadcast on column | HTML | 'Broadcast on' dd/mm/yy time (12 hour clock) eg: 23/2/04 9 pm | On click, row gets highlighted and 6.4 Listing summary area gets updated with selected programme details | 6.3.6 same as 6.3.1 | Broadcast on text gets bold on selection. Ref visual guidelines |
| 6.3.7 Duration column | HTML | 'Duration(mins)' eg: 0:45 | On click, row gets highlighted and 6.4 Listing summary area gets updated with selected programme details | 6.3.7 same as 6.3.1 | Duration text gets bold on selection Ref visual guidelines |
| 6.3.8 Channel column | HTML | 'Channel' eg: BBC One | On click, row gets highlighted and 6.4 Listing summary area gets updated with selected programme details | 6.3.8 same as 6.3.1 | Channel text gets bold on selection. Ref visual guidelines |
| 6.3.9 Size column | HTML | 'Size' eg: 15 MB | On click, row gets highlighted and 6.4 Listing summary area gets updated with selected programme details | 6.3.9 same as 6.3.1 | Size text gets bold on selection. Ref visual guidelines |

The following table adds yet further detail associated with the Programme Guide web page.

| Name | Type | Alt text/content | Interaction/Function | Behaviour | General Rules |
|---|---|---|---|---|---|
| 6.4.1 Thumbnail | Graphic | Related programme | Updates when user clicks on a listing in 6.3 Listings table | | 120 px × 77 px |

-continued

| Name | Type | Alt text/content | Interaction/Function | Behaviour | General Rules |
|---|---|---|---|---|---|
| 6.4.2 Selected listing title | HTML | Programme title | Updates when user clicks on a listing in 6.3 Listings table | | 34 characters max |
| 6.4.3 Date & broadcast time | HTML | Same as 6.3.6 | Updates when user clicks on a listing in 6.3 Listings table | | See 6.3.6 |
| 6.4.4 Summary text | HTML | Related programme summary text from SID | Updates when user clicks on a listing in 6.3 Listings table | | 200 characters max |
| 6.4.5 File size & disk space | HTML | Eg: File size: 15 MB Space left: 2 GB | Updates when user clicks on a listing in 6.3 Listings table. System calculates space available. | If space runs out Download is terminated | Disk space warning appears here, if space is low |
| 3.8.4.1 Preview button | Graphic button | Preview | Appears when 'Preview' is available. When user clicks it a 'Preview' browser window (To be defined) opens with a streaming clips of the selected preview | Normal: 3.B.4.1 Rollover: 3.B.4.2 Mousedown: 3.B.4.3 | Preview window will be a pop-up with minimise & close window functionality |
| 3.A.1 Download now button 3.A.1 Book a download now | Graphic buttons | Download now Book a download | User clicks 'Download now' and button changes to 'Stop Download'. A download progress animation appears next to button. The downloaded programme row gets the 6.3.3.1 Download feedback icon. If it's a future programme yet to be broadcasted they get 'Book a download button' | Normal: 3.A.1.1 Rollover: 3.A.1.2 Mousedown: 3.A.1.3 | If user is downloading from future, the 'Book a download' button toggles to 'Review booking'. |
| 3.A.2 Book Series Download | Graphic button | Book a series download | On mouseclick, system books the chosen 'Series download'. Button changes to 48.5 'Review Booking' along with Confirmation pop-up | Normal state: 3.A.2.1 Rollover: 3.A.2.2 Mousedown: 3.A.2.3 | Series toggles to 'Review booking' once user books a 'Series Download' |
| 6.1.1 Disk space warning message | HTML + icon | "You have run out of disk space! Please increase it!" | If user's system is running low on allocated disk space and user has clicked for a download or booked a series download, they get a Disk Space low warning message & 8A Disk Space low warnings modal pop-up | | 8A Disk Space warning modal pop-up allows user to go to 8.0 Settings to increase Disk Space threshold or to 7 Your Programmes to delete files to make space. |

In an embodiment, if the user is offline and starts the application, 'Your Programmes' comes up as the default landing page. For example, if the user clicks on the Guide tab (i.e. described in a previous table under 2.3-Guide), a message will be displayed prompting the user to go online to view the Guide web page.

In the listings table, each listing has three stages:

1. 'Available for immediate download', wherein the user clicks on this listing and gets a 'DOWNLOAD NOW' button.

2. 'Book a download', wherein the user clicks on this listing and gets a 'BOOK DOWNLOAD' button.

3. 'Programme is downloading', wherein the user sees a downloading feedback icon in the feedback column (as shown by icon 400 in FIG. 35).

4. Programme has downloaded and is in 'Your Programme' list. The user sees this after programme has successfully downloaded and is ready to be played (as shown by icon 402 in FIG. 35)

5. Programme has been booked as a 'Single Show' or a 'Series Download'. The User gets a corresponding feedback icon to show the listing's 'Booked' status (as shown by icon 404 in FIG. 35)

These are Key Use cases which are provided for by the Guide web page:
A. User clicks on Guide Calendar
B. User clicks a date in the future in Guide Calendar
C. User clicks a date in the past in Guide Calendar
D. User sorts 6.3 Listings table by any one of the columns
E. User is offline & clicks the Guide tab
C. User clicks 'Download Now'
F. User clicks 'Book download'
G. User clicks 'Book Series download'
H. User clicks 'Review booking'
I. User clicks 'Search'
J. User gets some 'Search results'
K. User gets no 'Search results'
L. User runs low on Disk Space and is downloading a programme.

Figure 36:
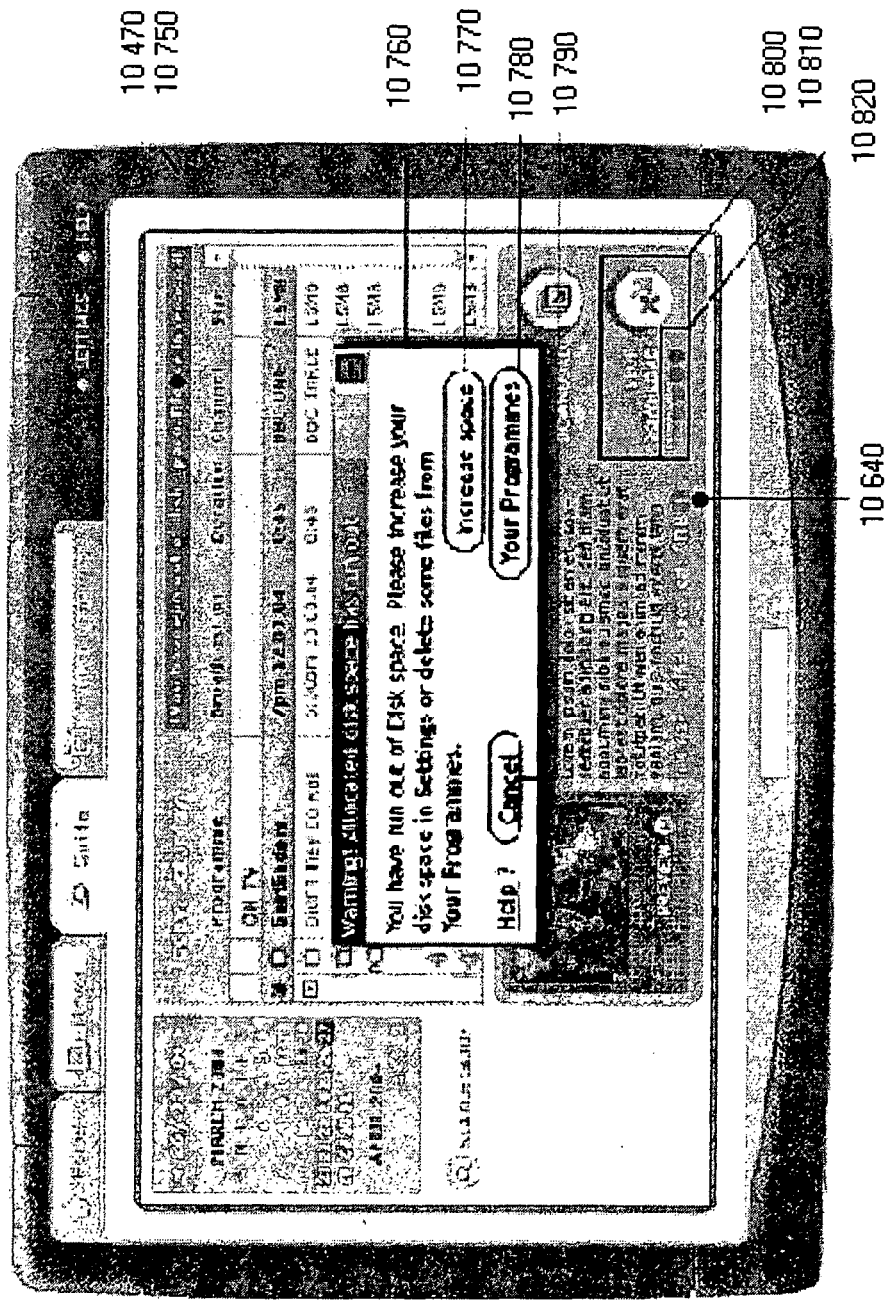
FIG. 36 shows a pop-up warning of insufficient disk space for recording downloadable content.

Selected use cases L, I, J, K, G, and H are illustrated in the following figures:

FIG. 36 shows a pop-up warning of insufficient disk space as in use case L.

Figure 37:
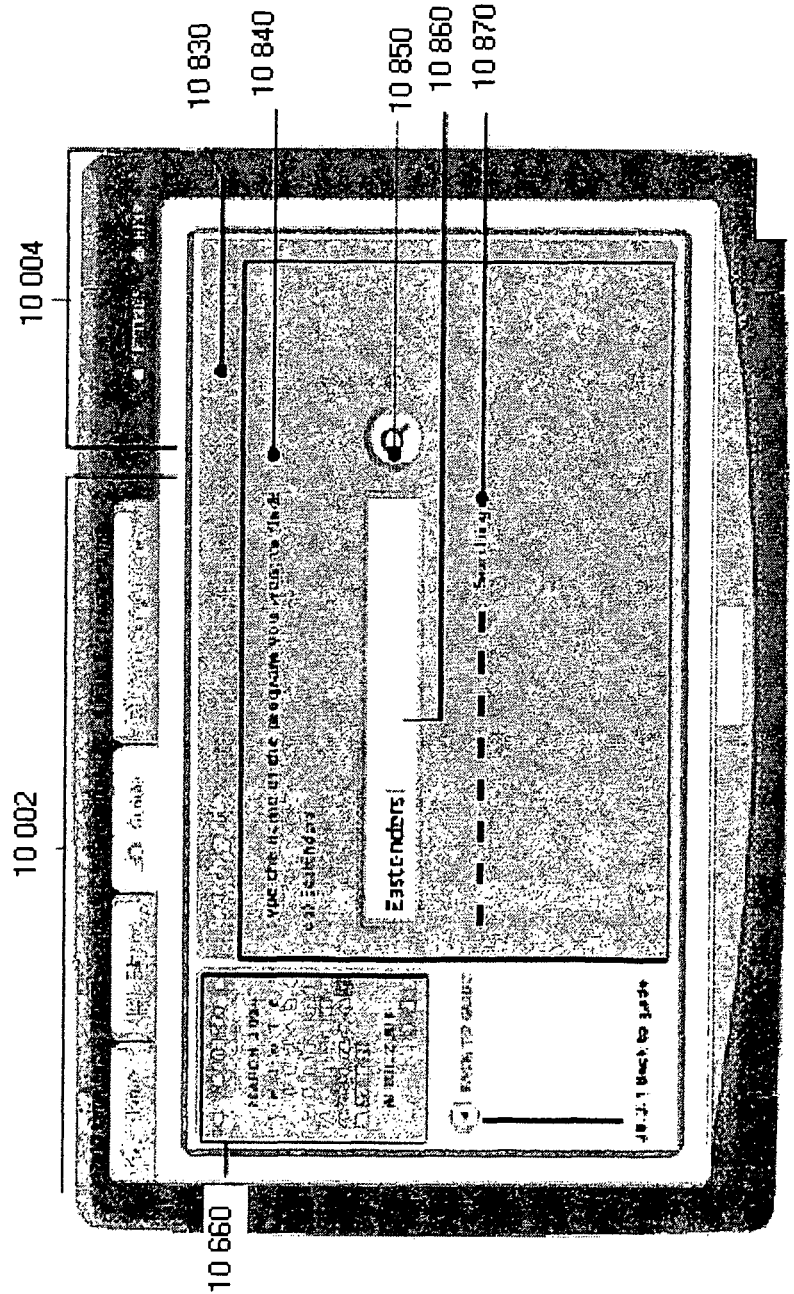
FIG. 37 shows the Search feature of the Programme Guide page.

FIG. 37 shows the Search feature of the Programme Guide page as in use case I.

Figure 38:
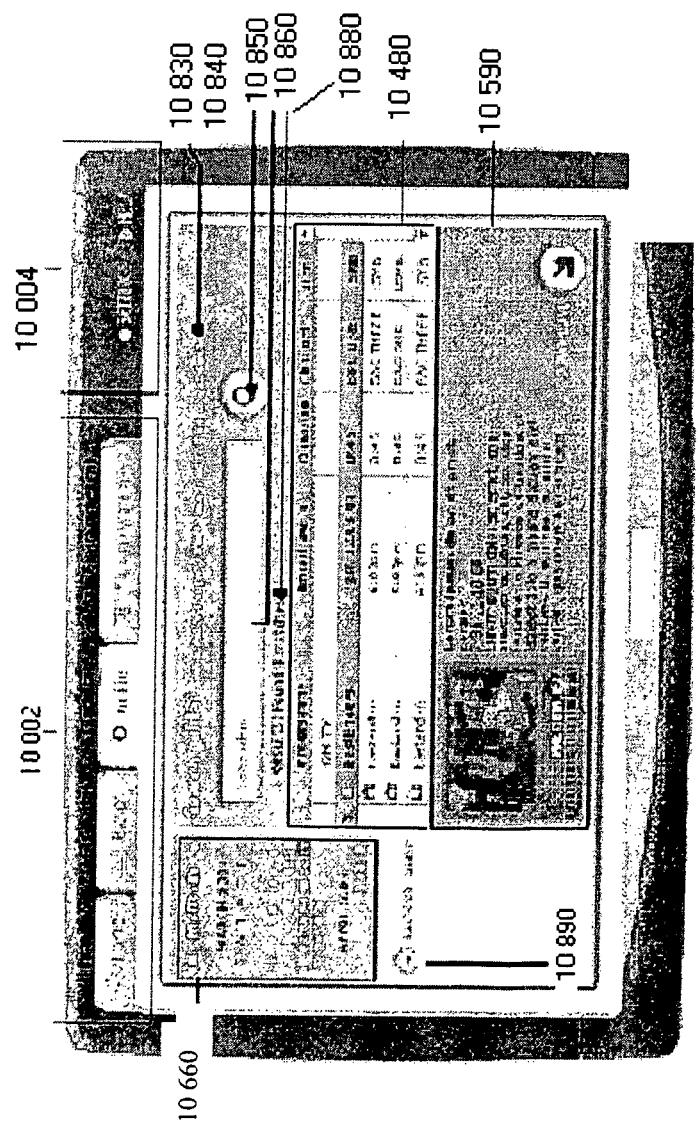
FIG. 38 shows the results of a successful search attempt.

FIG. 38 shows the results of a successful search attempt as in use case J

Figure 39:
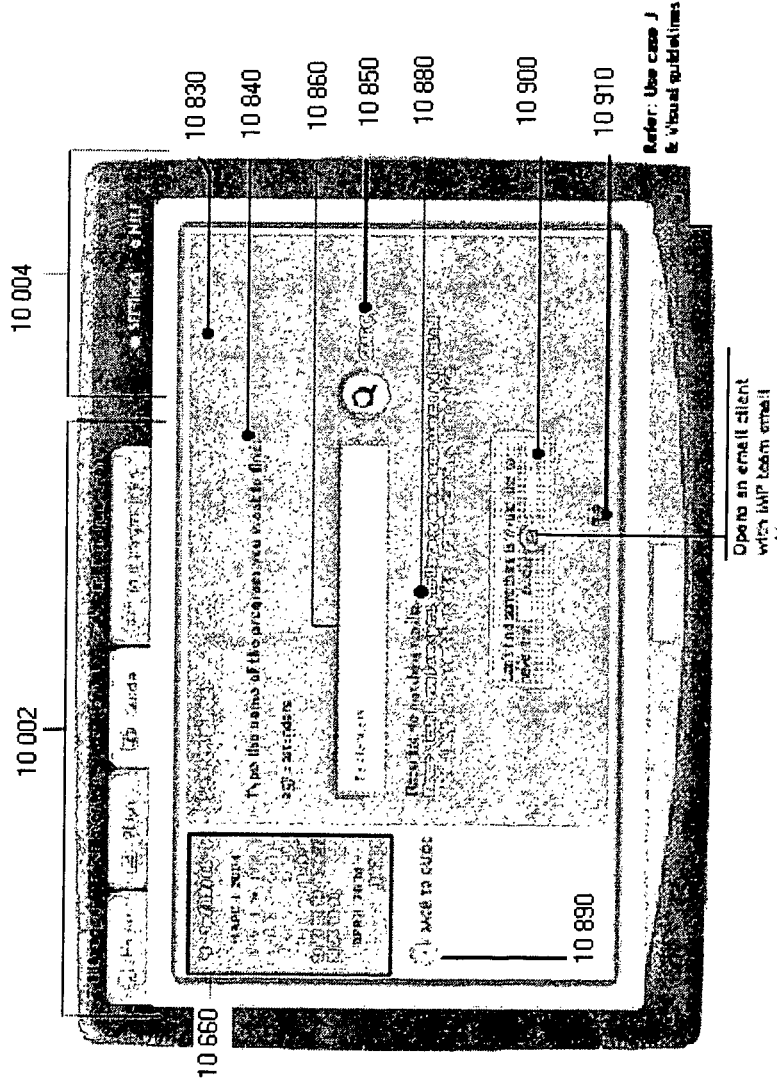
FIG. 39 shows the outcome of an unsuccessful search attempt.

FIG. 39 shows the outcome of an unsuccessful search attempt as in use case K and shows the application program feature of opening an e-mail client to enable the user to contact the application support team.

Figure 40:
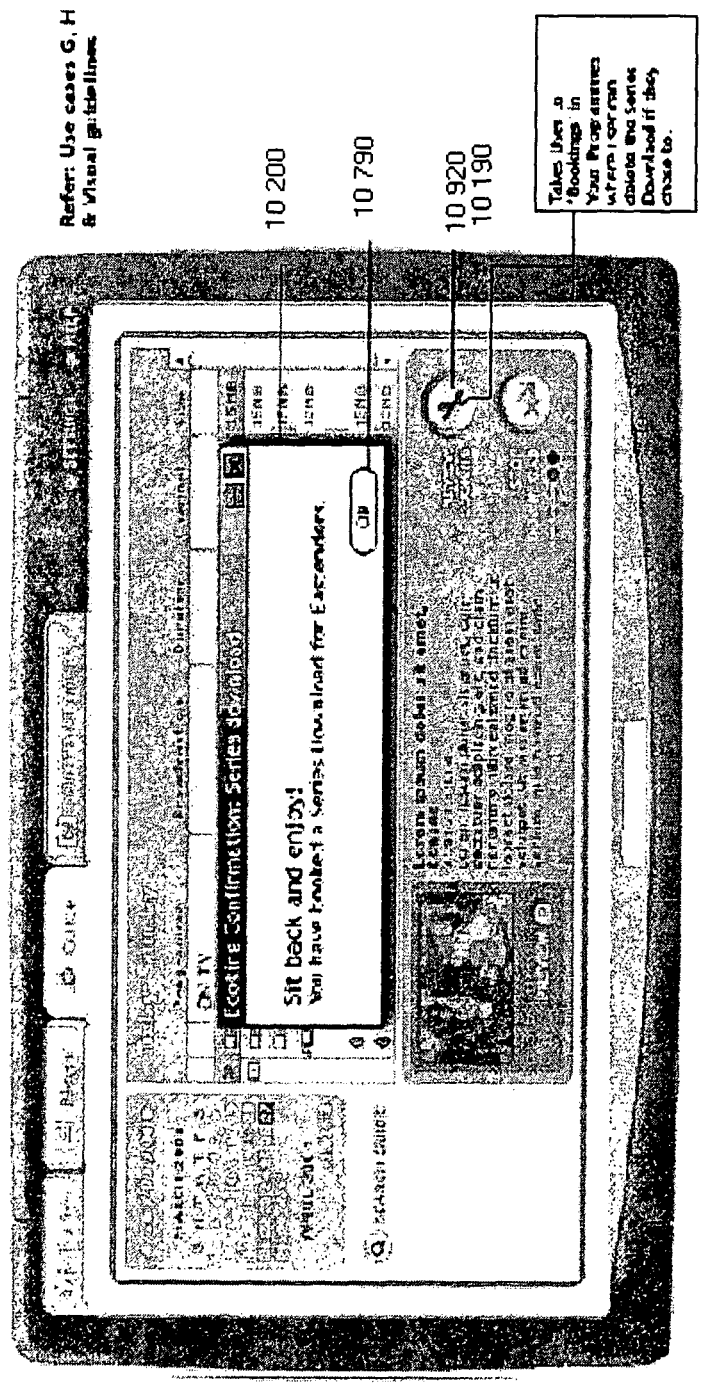
FIG. 40 shows the Guide page after a Series Download has been successful.

FIG. 40 shows the Guide page after a Series Download has been successful as in use cases G and H.

Further information relating to the Guide page and Your Programmes page is described below.

The Guide web page is where users can either download or book a download for a single show and series. If the programme is already broadcast, it is available for immediate download and user can play it. All other programmes that are yet to be broadcasted, the user can only 'book' a download by clicking button 'Book a download'. All bookings are managed in the 'Bookings section' of your programmes. If user is offline, the Guide is not available.

Once a programme is downloaded from the guide, it appears in 'Play now' within 'Your Programmes'. It also shows that's it already exists in 'Your Programmes' by changing icon state in icon feedback column as well as the listing row colour changes to match 'Your programmes: Play now or Bookings' depending on if user has booked a download or if file has completed being downloaded.

Figure 41:
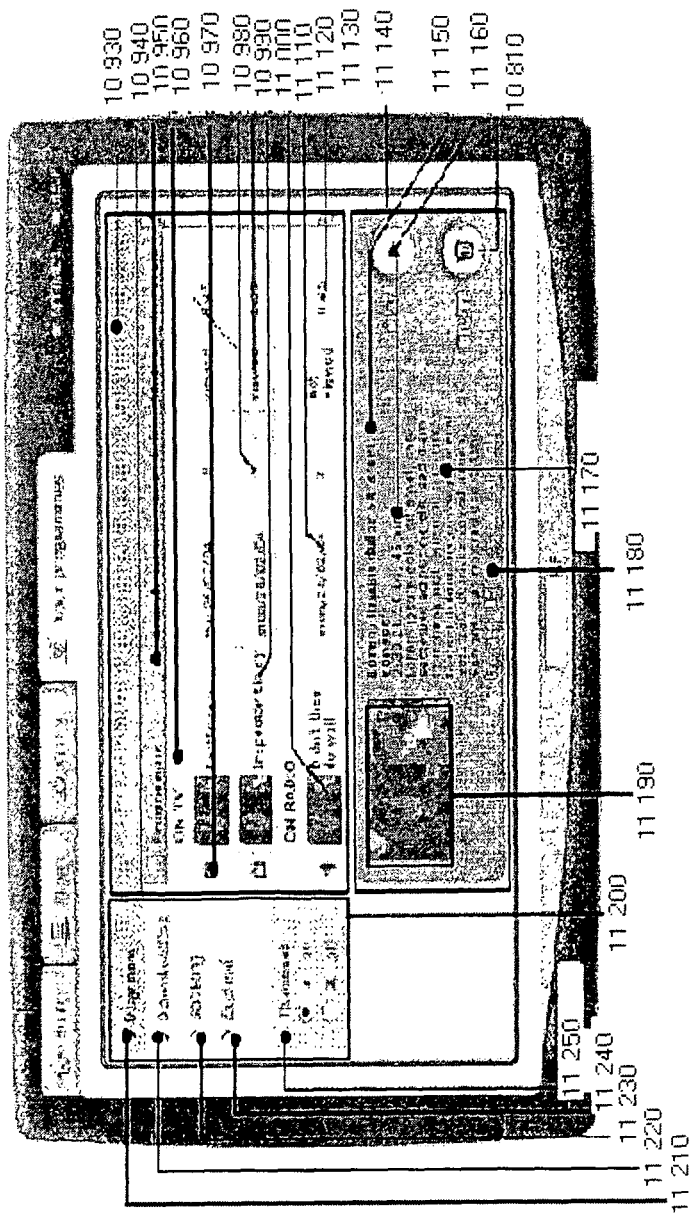
FIG. 41 shows the Your Programmes web page with a list of downloaded programmes.

FIG. 41 shows the Your Programmes web page with a list of downloaded programmes.

The 'Your Programmes: Play now' web page allows the user to view content that has already been downloaded and is ready to play. The downloaded files are arranged in a listings table under the following columns:
Programme
Broadcast on (i.e. date of broadcast)
Days left
Status (i.e. viewed or not viewed)
Duration (i.e. viewing time)

The following buttons appear in the 'Your Programmes: Play now' web page for each programme listing
Play
Delete In a preferred embodiment, the user can sort the downloaded content available, for example in the Play Now web page by clicking on the listings table title bar on an appropriate heading, e.g. File size, Days left, Duration as described above.

Further details of the elements of the Your Programmes web page are provided in the tables below:

| Name | Type | Alt text/content | Interaction/Function | Behaviour | General Rules |
|---|---|---|---|---|---|
| 7.1 Header/Title | HTML | Your Programmes | Title for Section | | If disk space is low, a disk space warning message appears here. |
| 7.2 Listings Table | | | | | |
| 7.2.2 Listings Header/Title | HTML + sort icon | Programme Broadcast on Days left Status Duration (Maintain this order) | The title bar table header can be clicked on any individual column to sort/order the listings table accordingly. The current sort order selection is seen by that header getting coloured with a sort icon appearing in that column | The header title supports dynamic column width column header manipulation (e.g Outlook columns) | All programme names longer than 20 characters appear truncated with ( . . . ) attached to the end. If user plays with the width of the column then the full word appears. |

| Name | Type | Alt text/content | Interaction/Function | Behaviour | General Rules |
|---|---|---|---|---|---|
| 7.2.2 Category header | HTML | On TV On Radio On News & Sports | Refer to visual guidelines for styles, etc | | |
| 7.2.4 Content icon column | HTML + icons | TV Radio | Refer to visual guidelines for styles, etc | All static gifs | |
| 7.2.5 Programme name column | HTML | 'Programme' Eg: Only Fools and Horses | On click, row gets highlighted and 7.3 Play now summary area 7.3 gets updated with selected programme details | | Programme text gets bold on selection. Allow name to truncate after 16 characters. Allow word wrap if 7.2.5A thumbnails is enabled. |
| 7.2.5A Programmed thumbnails | Graphic 54 × 34 px | Programme name | On click, row gets highlighted and 7.3 Play now summary area 7.3 gets updated with selected programme details | User can switch on/off thumbnails using 7.4.5 Thumbnails ON/OFF controls | If thumbnails are OFF then the rows collapse and more rows are displayed |
| 7.2.6 Broadcast on column | HTML | 'Broadcast on' day dd/mm/yy times (12 hour clock) eg: mon 23/2/04 9 pm | On click, row gets highlighted and 7.3 Play now summary area 7.3 gets updated with selected programme details | | Broadcast on text gets bold on selection |
| 7.2.7 Duration column | HTML | 'Duration(mins)' eg: 0:45 | On click, row gets highlighted and 7.3. Listing summary area gets updated with selected programme details | | Duration text gets bold on selection |
| 7.2.8 Days left | HTML | 'Days left' | On click, row gets highlighted and 7.3. Listing summary area gets updated with selected programme details | | If only one day left for viewing, text appears bold |

Yet further details are provided in the following table:

| Name | Type | Alt text/content | Interaction/Function | Behaviour | General Rules |
|---|---|---|---|---|---|
| 7.2.9 View status | HTML | Status | On click, row gets highlighted and 7.3 Play now summary area 7.3 gets updated with selected programme details | | |
| 7.3 Listing summary/Preview area | | | | | |
| 7.3.1 Thumbnail | Graphic | Related programme | Updates when user clicks on a download in 7.2 Your Programme table | | 120 px × 77 px |
| 7.3.2 Selected listing title | HTML | Programme title | Updates when user clicks on a listing in 7.2 Your Programmes table | | 34 characters max |
| 7.3.3 Date & broadcast time | HTML | Same as 7.2.6 | Updates when user clicks on a listing in 7.2 Your Programmes | | See 7.2.6 |

-continued

| Name | Type | Alt text/content | Interaction/Function | Behaviour | General Rules |
|---|---|---|---|---|---|
| 7.3.4 Summary text | HTML | Related programme summary text from SID | table Updates when user clicks on a listing in 7.2 You Programmes table | | 200 characters max |
| 7.3.5 File size & Disk space | HTML | Eg: File size: 15 MB Space left: 2 GB | Updates when user clicks on a listing in 7.2 Your Programmes table. System calculates space available. Updates message area 7.1 | | Disk space warning appears here, if space is low |
| 3.A.3.1 Play button | Graphic buttons | Play | User clicks 'Play' button and selection starts playing in Player | Normal: 3.A.3.1 Rollover: 3.A.3.2 Mousedown: 3.A.3.3 | Only fully downloaded files can be played. So all files in this section can be played |
| 3.A.5.1 Delete button | Graphic button | Delete | On clicking 'Delete', system deletes the selected file. Updates 7.2 Listings table and 7.3.5 File size & disk space | Normal: 3.A.5.1 Rollover: 3.A.5.2 Mousedown: 3.A.5.3 | |

Still further details are provided in the following table:
7.4 Your Programmes Left Navigation Bar

| Name | Type | Alt text/content | Interaction/Function | Behaviour | General Rules |
|---|---|---|---|---|---|
| 7.4.1 Play now | HTML | Play now | Updates main page areas 7.2 Listings table & 7.3 Listing summary/preview area and displays 7.4.1 Play now section | | |
| 7.4.2 Downloading | HTML | Downloading | Updates main page areas 7.2 Listings table & 7.3 Listing summary/preview area and displays 7.4.2 Downloading section | | |
| 7.4.3 Bookings | HTML | Bookings | Updates main page areas 7.2 Listings table & 7.3 Listing summary/preview area and displays 7.4.3 Bookings section | | |
| 7.4.4 Expired | HTML | Expired | Updates main page areas 7.2 Listings table & 7.3 Listing summary/preview area and displays 7.4.4 Expired section | | |
| 7.4.5 Thumbnails On/Off | Graphic + radio buttons | Thumbnails ON/OFF | Updates main page areas 7.2 Listings table if user selects radio button 'OFF' and displays 7.2.5A thumbnails in 7.2 Listings table if user selects 'ON' | | This function is available for all sections within 'Your Programmes' 7.4.1 Play Now 7.4.2 Downloading |

| Name | Type | Alt text/content | Interaction/Function | Behaviour | General Rules |
|------|------|------------------|----------------------|-----------|---------------|
| | | | | | 7.4.3 Bookings 7.4.4 Expired |

Figure 42:
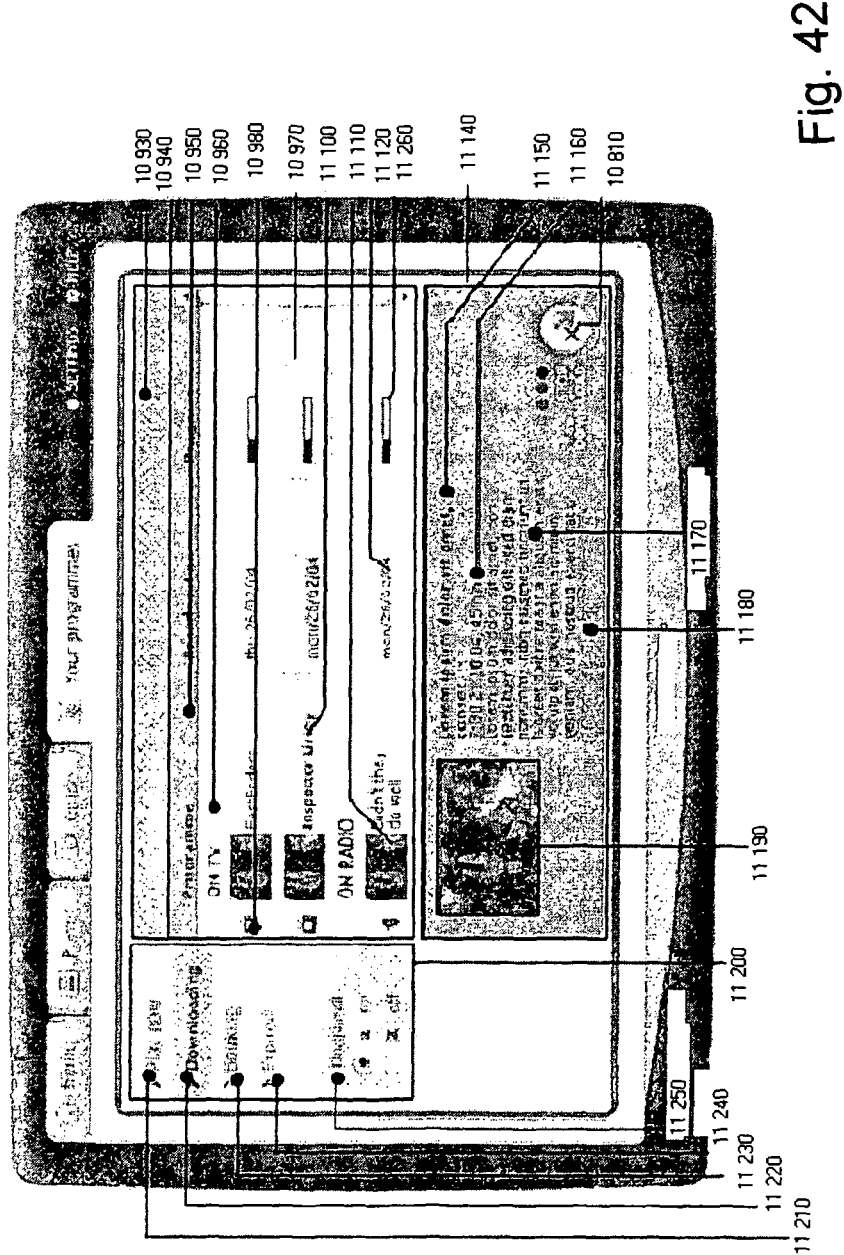
FIG. 42 shows a program download in progress.

FIG. 42 shows a program download in progress in the Your Programmes—Downloading web page.

This section allows the user to view a list of active downloading content that the user has already enabled for downloading either by having clicked the 'Download now' button or the 'Book a download/series download' from the 'Guide' web page. The downloading files are arranged in a listings table under the following columns:
Programme
Broadcast on (i.e. date and/or time of broadcast)
Progress (i.e. of content download)
A 'Stop download' button is also provided for each programme listing.

In a preferred embodiment, common program elements which are similar to the Your Programmes: Play now web page are described in the following list.
7.1 Header/Title
7.2 Listings table:
7.2.1 Listings header/title
7.2.2 Category header
7.2.4 Content icon type
7.2.5 Programme name
7.2.5A Thumbnails
7.2.6 Broadcast on (i.e. date of broadcast)
7.2.10 Current selection
7.3 Listings summary/preview area:
7.3.1 Thumbnail
7.3.2 Selected listing title
7.3.3 Date &Broadcast time
7.3.4 Summary text
7.3.5 File size & disk space
7.4 Your Programmes left navigation window
7.4.1 Play now
7.4.2 Downloading
7.4.3 Bookings
7.4.4 Expired
7.4.5 Thumbnails On/Off Further details relating to the elements of the Your Programmes—Downloading web page are provided in the table below.

Figure 43:
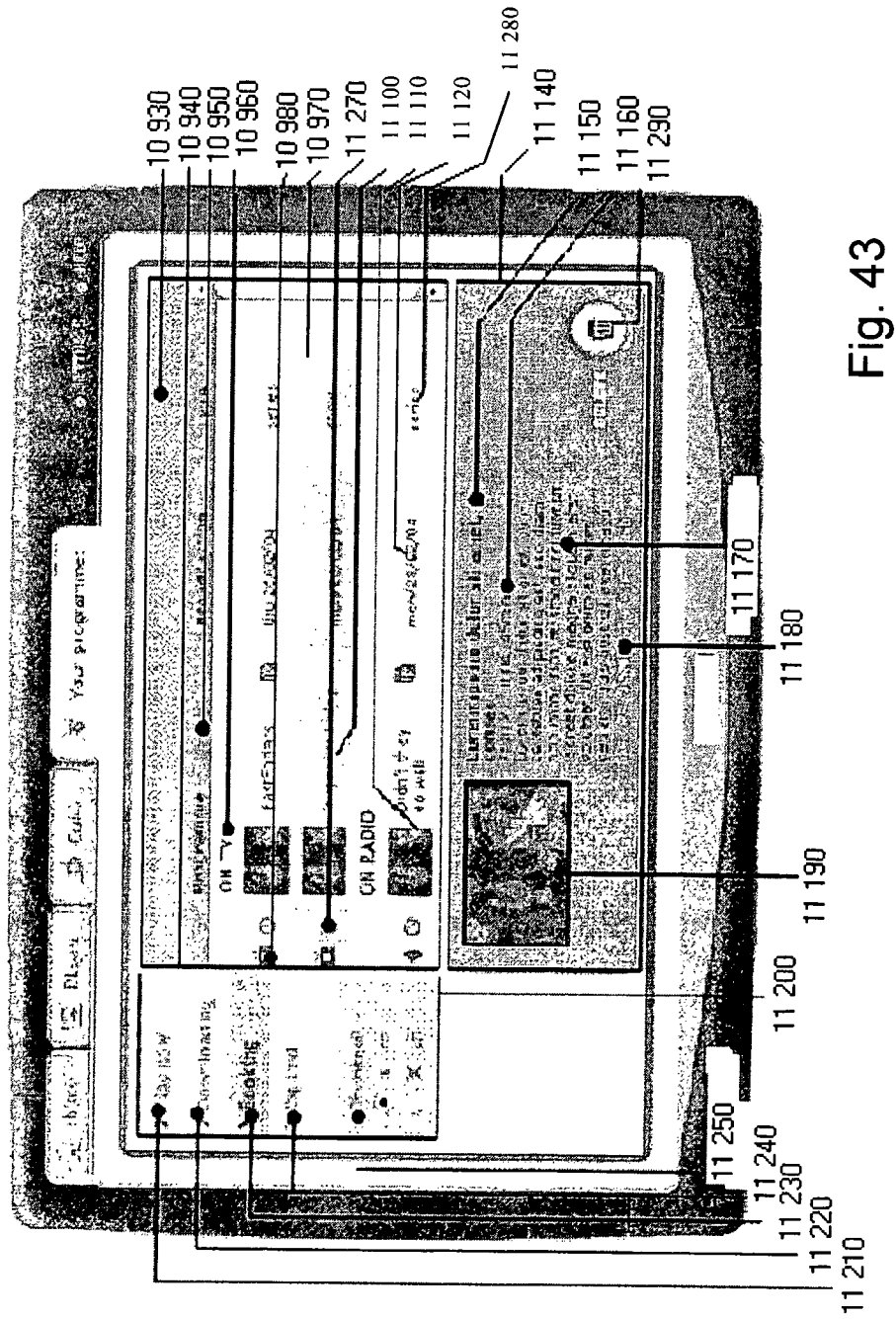
FIG. 43 shows a list of programmes booked for downloading.

The following elements are specific to the 7.4.2 Your Programmes: Downloading section
Programmes Downloading Table FIG. 43 shows a list of programmes booked for downloading on the Your Programmes—Booking web page.

The 'Your Programmes: Bookings' section allows the user to view a list of all the 'booked' downloads which were booked by clicking the 'Book a download' button or 'Book a series download' from 'Guide' section or the 'TV, Radio & News & Sports Home Subscriptions' area. The booked programmes are arranged in a listings table under the following columns:
Programme
Broadcast on (i.e. date of broadcast)
Type
A 'Delete' button is also provided for each booked programme.

In a preferred embodiment, depressing the delete button takes the User to the Bookings page in Your Programmes where the user can delete the Series Download, if required.

Common elements similar to the Your Programmes: Play now and the Downloading web pages are shown in the list below:
7.1 Header/Title
7.2 Listings table:
7.2.1 Listings header/title
7.2.2 Category header
7.2.4 Content icon type
7.2.5 Programme name
7.2.5A Thumbnails
7.2.6 Broadcast on (i.e. date of broadcast)
7.2.10 Current selection
7.3 Listings summary/preview area:
7.3.1 Thumbnail
7.3.2 Selected listing title
7.3.3 Date &Broadcast time
7.3.4 Summary text
7.3.5 File size & disk space
3.A.2.1 Delete button
7.4 Your Programmes left nav
7.4.1 Play now
7.4.2 Downloading
7.4.3 Bookings
7.4.4 Expired

| Name | Type | Alt text/content | Interaction/Function | Behaviour | General Rules |
|------|------|------------------|----------------------|-----------|---------------|
| 7.2 Listings table: | | | | | |
| 7.2.13 Progress | HTML + gif anim | Progress[mins](column name) Timed gif animation 0:00 | This column tracks the download progress of a programme that is downloading | Timed swf animation that plays according to count-down timer | Use animation smallp_ani.gif See visual guidelines |
| 7.3 Listings summary: | | | | | |
| 3.A.4.1 Stop Download Button | Graphic button + swf anim | Stop Download Swf anim: [s_d_ani.swf] | On clicking 'Delete', system stops downloading the selected file. Updates 7.2 Listings table and 7.3.5 File size & disk space swf.animation disppears. | Normal state: 3.A.4.1 Rollover: 3.A.4.2 Mousedown: 3.A.4.3 | See files: button.psd & s_d_ani.swf |

7.4.5 Thumbnails On/Off

Further details of the elements of the Your Programmes web page are provided in the table below.

The following table describes elements specific to the Your Programmes: Bookings web page.
(see file: programmes_booking.psd)

7.4.1 Play now
7.4.2 Downloading
7.4.3 Bookings
7.4.4 Expired
7.4.5 Thumbnails On/Off

| Name | Type | Alt text/content | Interaction/Function | Behaviour | General Rules |
|---|---|---|---|---|---|
| 7.2 Listings table: | | | | | |
| 7.2.3 Feedback | HTML + | Graphic: Clock icon | This column displays icons which represent that a programme has been booked and will be downloaded in the future after its broadcasted | | See files: icon.psd |
| 7.2.5 Programme name | HTML + icon | 'Programme' E.g.: Only Fools and Horses Graphic: Series Subscribe icon | On click, row gets highlighted and 7.3 Play now summary area 7.3 gets updated with selected programme details | Series Subscribe icon appears next to series subscriptions in this column | Programme text gets bold on selection. Allow name to truncate after 16 characters Allow word wrap if 7.2.5A thumbnails is enabled. |
| 7.2.12 Type | HTML | Type (column name) | This column shows if a programme is a single show booking or a series | | If its a series download, the file will always appear here. The single show that belongs to the series will appear in 'Your programmes: Downloading with date & episode number, whenever it automatically downloads itself. Single shows that have been booked, will disappear from here, once they start automatically downloading |

FIG. 44 shows a list of downloaded programmes which have expired.

The 'Your Programmes: Expired' section allows the user to view a list of programmes that have expired and therefore can no longer be viewed (Digital Rights Management having taken effect). The expired files are grayed out and are arranged in a listings table under the following columns.

Programme
Broadcast on (i.e. date of broadcast)
Days left
View status

The programmes remain in the Expired list for a day and then are automatically deleted by the system.

The following common program elements are similar to Play now, Downloading, Bookings pages as previously described:
7.1 Header/Title
7.2 Listings table:
7.2.1 Listings header/title
7.2.2 Category header
7.2.4 Content icon type
7.2.5 Programme name
7.2.5A Thumbnails
7.2.6 Broadcast on (i.e. date of broadcast)
7.2.8 Days left
7.2.9 View status
7.2.10 Current selection
7.3 Listings summary/preview area:
7.3.1 Thumbnail
7.3.2 Selected listing title
7.3.3 Date &Broadcast time
7.3.4 Summary text
7.3.5 File size & disk space
7.4 Your Programmes left nav In a preferred embodiment, the Your Programmes and the 7.4.1, 7.4.2, 7.4.3, 7.4.4 sections (as shown in the above list) respectively, are essentially the same page, but have sorted views which automatically puts them into Play now, Downloading, Bookings & Expired programmes sections (accessed from left navigation window). Every programme in Your Programmes moves across four states which are: Play now, Downloading, Bookings & Expired through its digital lifecycle.

Figure 45:
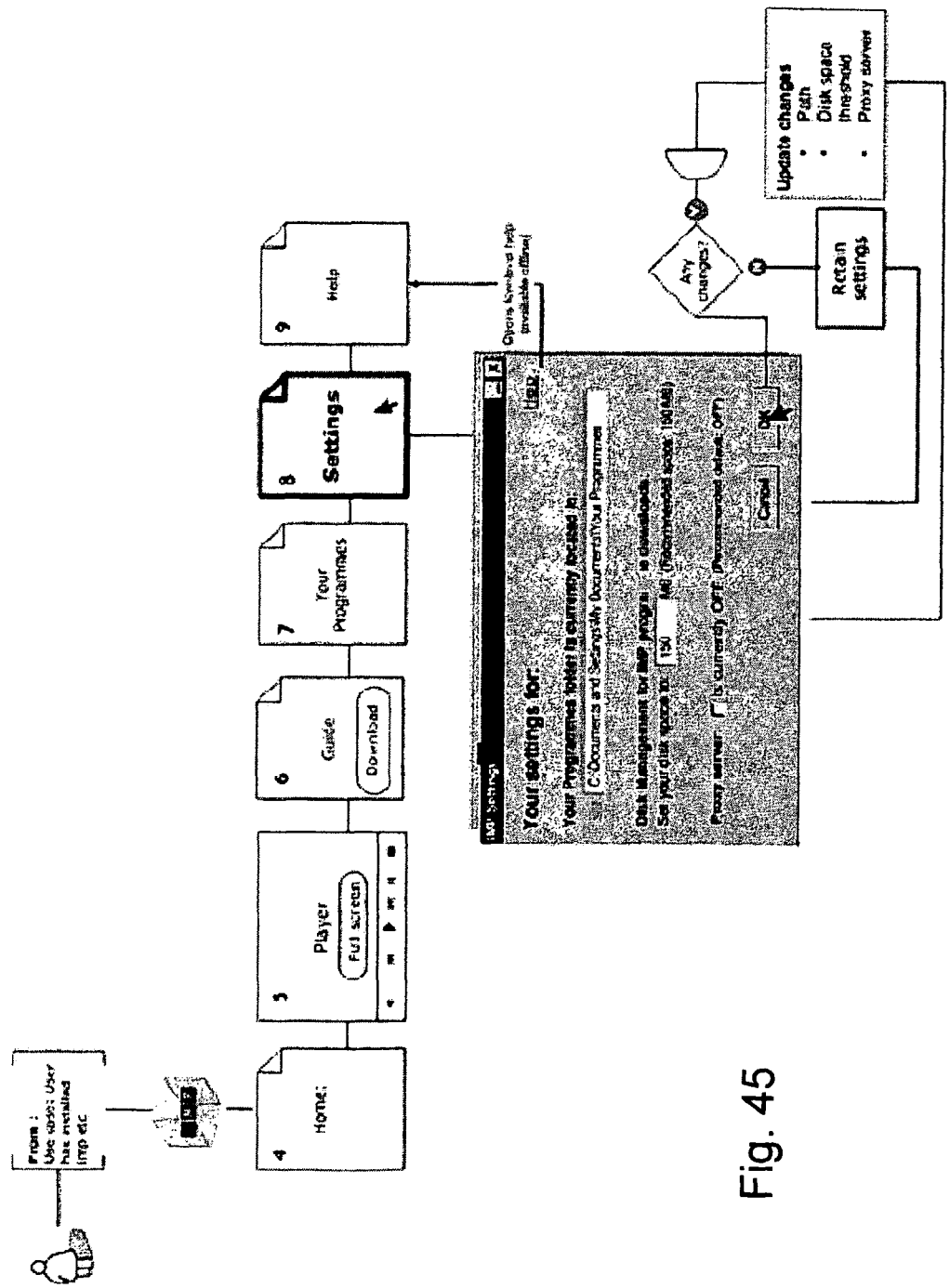
FIG. 45 shows a schematic diagram of the Settings web page.

The following are Key Use cases which are provided for in the Your Programmes web page:
A. User clicks on 7.4.1 Play now, 7.4.2 Downloading, 7.4.3 Bookings, 7.4.4 Expired
B. User sorts 7.2 Listings table by any one of the columns
C. User is offline & clicks the Your Programmes tab
D. User sorts 6.3 Listings table by any one of the columns
E. User is offline & clicks the Guide tab
C. User clicks 7.4.5 Thumbnails On & Off
F. User deletes a file from within 7.4.1 Play now
G. User plays a file from within 7.4.1 Play now
H. User stops a file from downloading within 7.4.2 Downloading
I. User deletes a 'booked' single download/series download
J. User runs low on Disk Space and is downloading a programme FIG. 45 shows a schematic diagram of the Settings web page;

The Settings function is implemented as a pop-up dialog window wherein the user is allowed to set the file path of where their 'Your Programmes folder' is located, the amount of disk space allocated for their downloads and the proxy server settings. The settings pop-up window can be minimised or closed using standard windows controls in the title bar. It is accessed globally from the right hand corner of the interface base.

The interactive media system allows the user to set options for disc management for program downloads and proxy server settings, as shown in FIG. 26. It shows a schematic of the main web pages including the settings page and shows a screen shot of the user setting the directory or file part for storing downloaded contents and also setting the disc space to 150 megabytes. The proxy server setting is shown as off.

Figure 46:
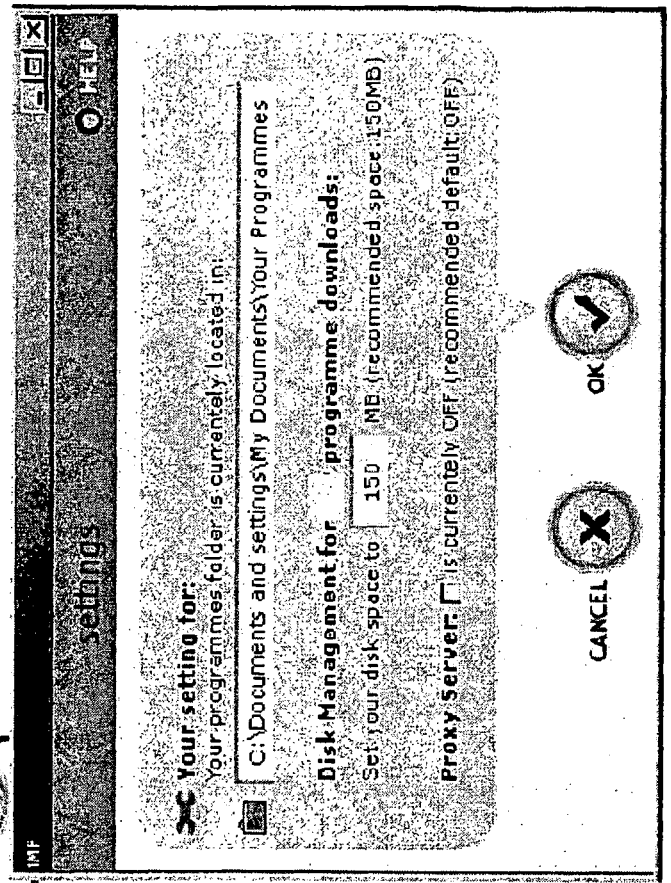
FIGS. 46 and 47 show pop-up windows used for setting application program system attributes.
Figure 47:
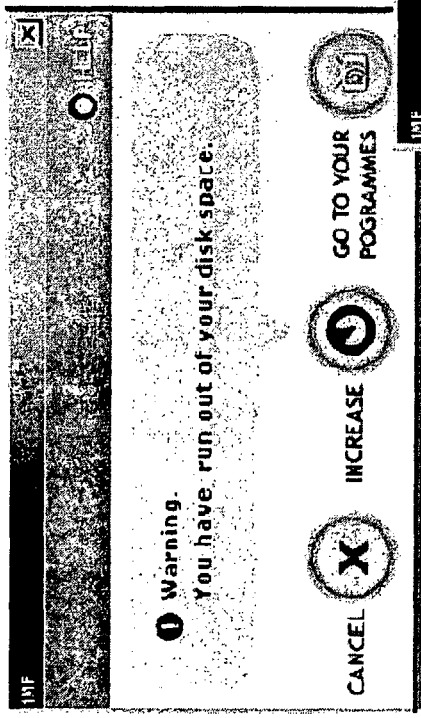

FIGS. 46 and 47 show pop-up windows used for setting application program system attributes.

Further details pertaining to the Settings web page are shown in the following table.

| Name | Type | Alt text/content | Interaction/Function | Behaviour | General Rules |
|---|---|---|---|---|---|
| Header/Title | HTML + icon | Your settings for: | | | |
| Your Programmes folder path | Field + icon | Your Programmes folder is currently located in: | Path is given by default | User can re-edit it | C:\Documents and Settings\ My documents\ Your Programmes (default, system auto creates the folder 'Your Programmes) |
| Disk management | Field | Disk management for iMP Programme downloads. Set your disk space to 'X' MB (recommended space: 150 MB) | User can change number in field | | '150' MB given as defalut |
| Proxy Server | Check box | Proxy server is currently__OFF. (Recommended default: OFF) | User can check check box | | |
| OK | graphic button | OK | User clicks to OK. System registers any changes tha user might have made and resets settings | Normal: Rollover: change blurb Mousedown: | see 09. Buttons chapter visual guidelines |
| Cancel | graphic button | Cancel | User clicks on Cancel. System doesn't make any changes to settings. Shuts | Normal: Rollover: change blurb | see 09. Buttons chapter visual guidelines |

Figure 48:
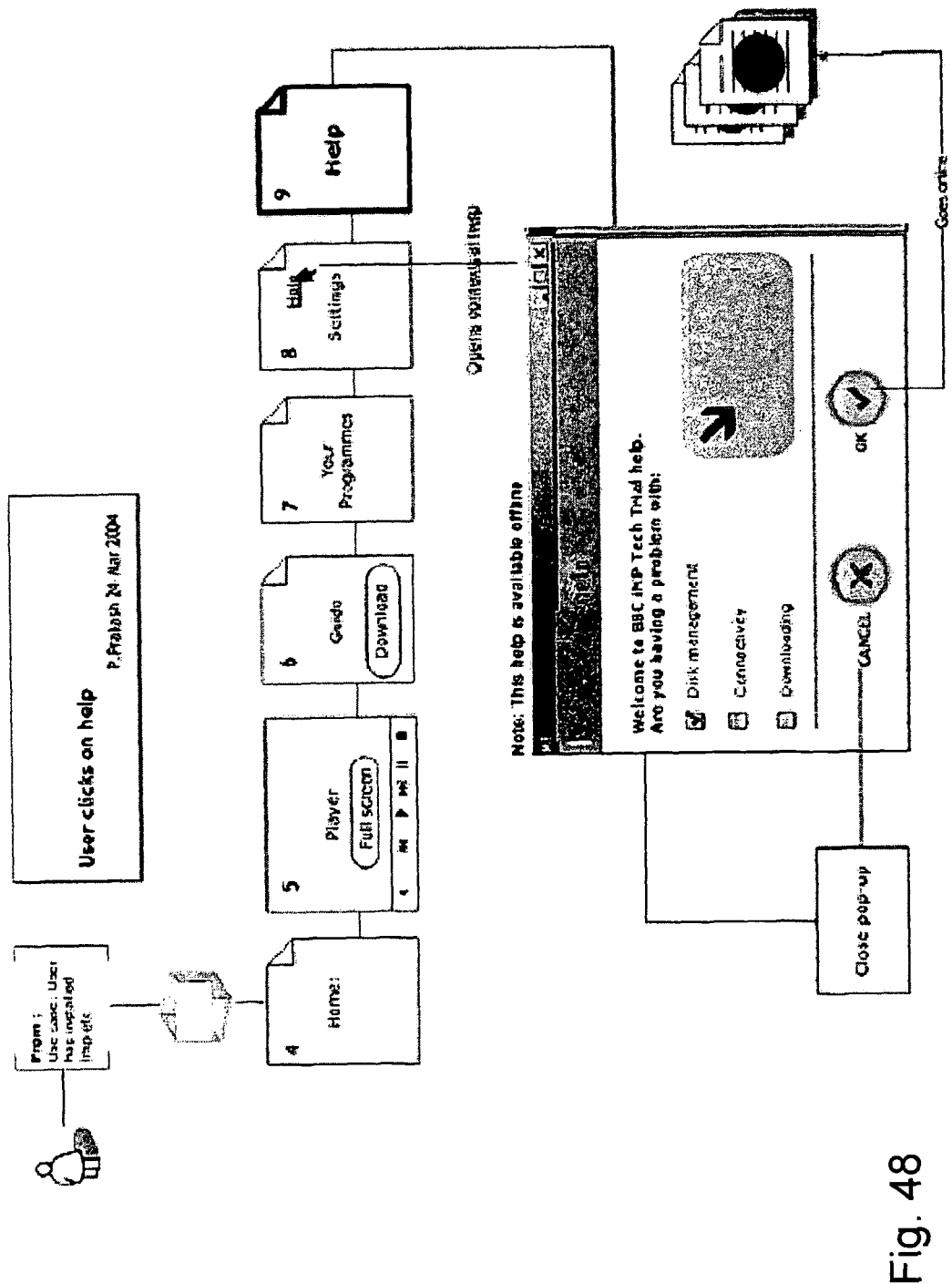
FIG. 48 shows a schematic diagram of the Help web page.

FIG. 48 shows a schematic diagram of the Help web page.

The help files are globally available and are divided into two kinds of help:

Installation help and the application help. Application help is made of Base help that is available offline and that in turn links to online help.

Further details pertaining to the Help web page are provided in the following table:

| Name | Type | Alt text/content | Interaction/Function | Behaviour | General Rules |
|---|---|---|---|---|---|
| BBC iMP help | Graphic | BBC iMP help | — | — | — |
| Welcome note | HTML | Welcome to BBC tech trial Are you help. having a problem with | — | | |
| Help Check box option | Check boxes | Disk Management Connectivity Downloading | On clicking any of the checkboxes, a new browser window opens with Kontiki help pages. Help popup shuts when user clicks OK | — | |
| OK | graphic button | OK | User clicks on OK. System registers any radio check boxes user might have checked and opens related help | Normal: Rollover: Mousedown: | see 09. Buttons chapter visual guidelines |
| Cancel | graphic button | Cancel | User clicks on Cancel. System shuts Help pop-up. | Normal: Rollover: Mousedown: | see 09. Buttons chapter visual guidelines |

Figure 49:
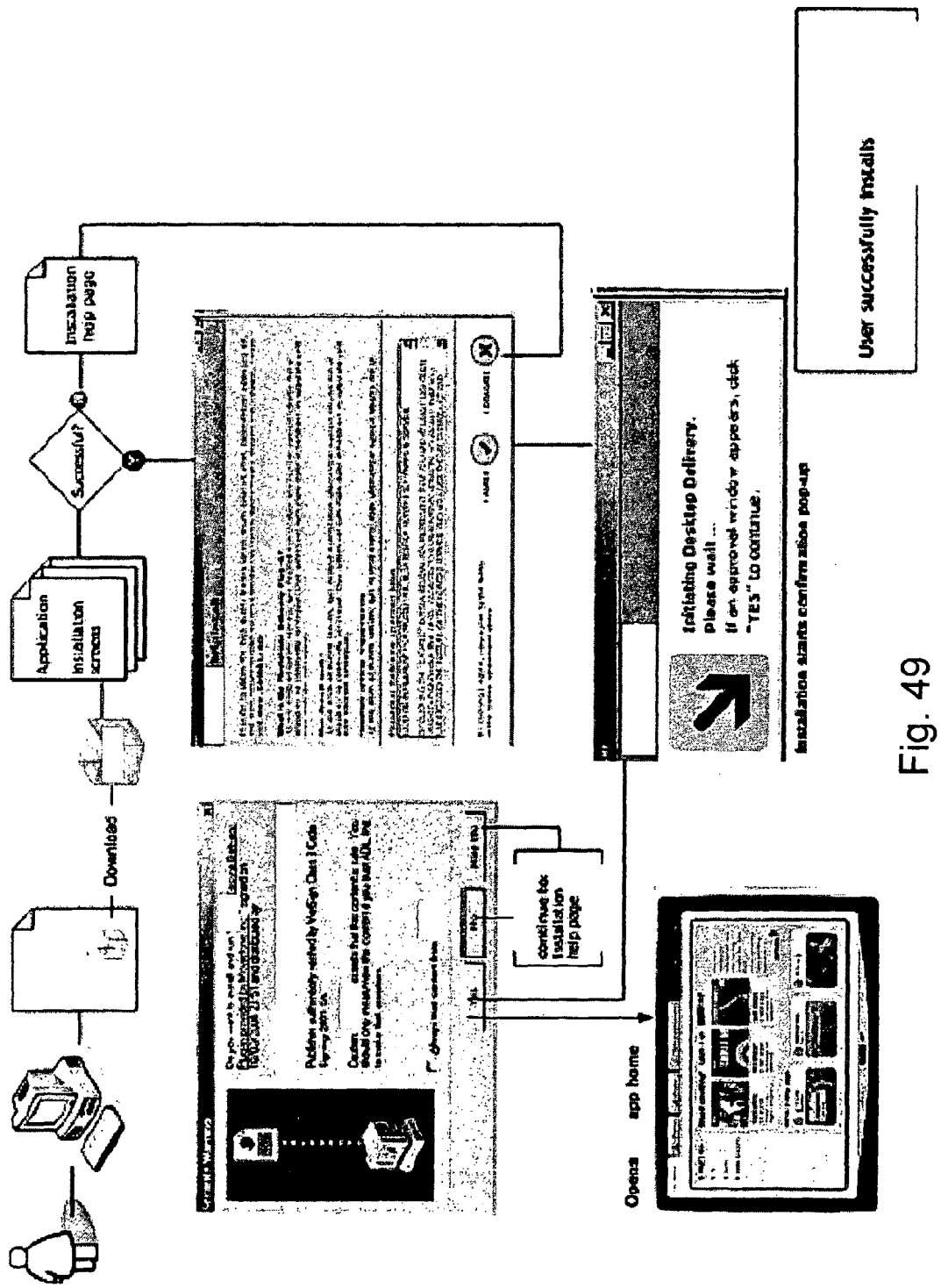
FIG. 49 shows a flowchart of the on-line installation process for installing the application program.

FIG. 49 shows a flowchart of the on-line installation process for installing the application program.

Installation of the application is achieved using three main screens: User Agreement, Secure delivery initiation confirmation, Security agreement screens. When installed, the application opens up with main Home page as default.

Figure 50:
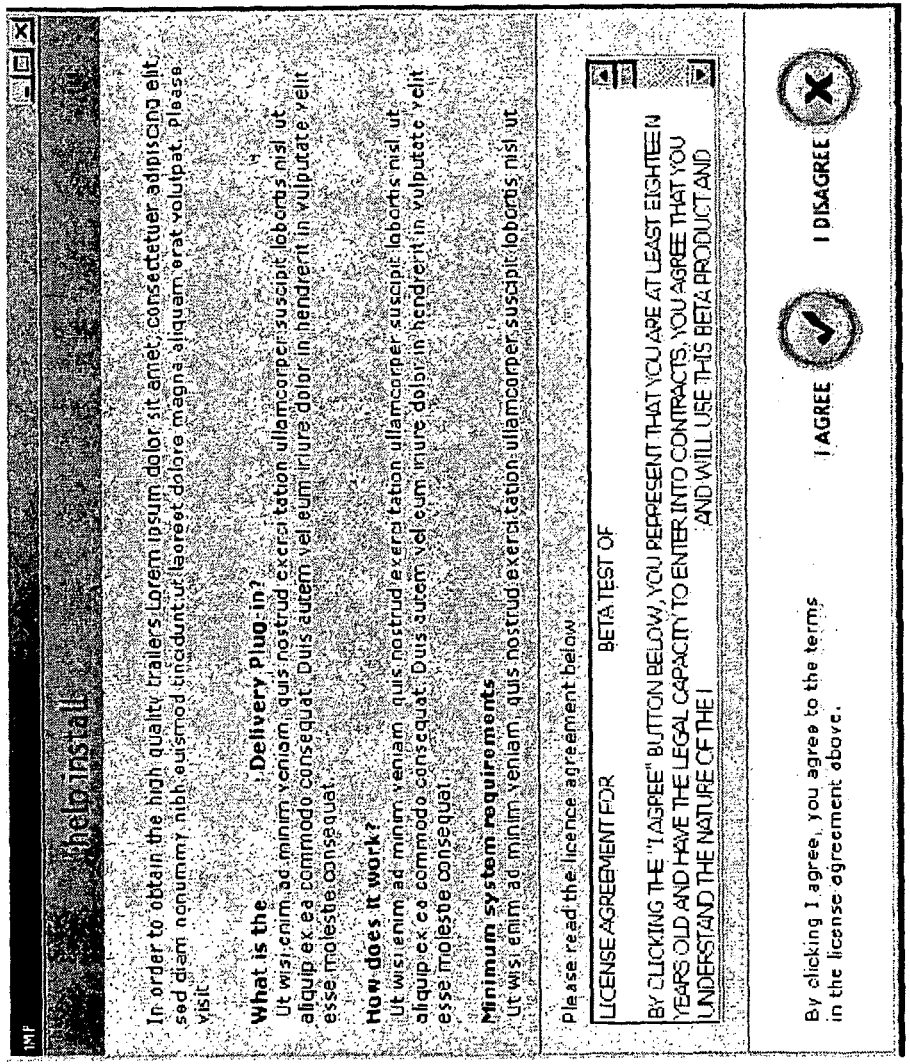
FIG. 50 shows a user agreement screen used during the installation process.
Figure 51:
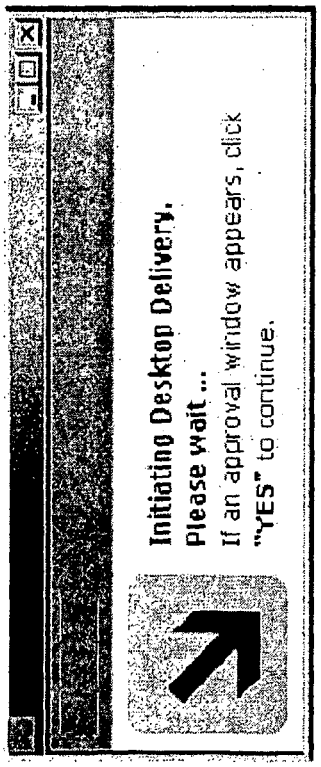
FIG. 51 shows a secure delivery initiation confirmation screen.
Figure 52:
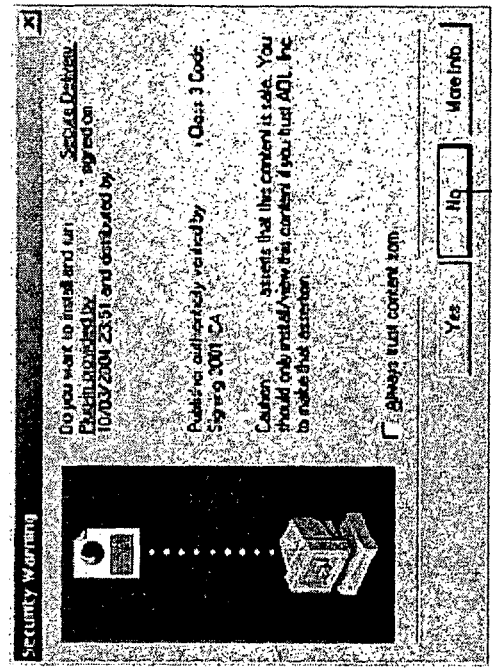
FIG. 52 shows a security agreement screen.

These main screens are shown in FIG. 50, which shows the user agreement screen. FIG. 51 which shows a secure delivery initiation confirmation screen; and FIG. 52 which shows a security agreement screen.

A further embodiment of the user interface is now described with reference to FIGS. 53 to 73.

Figure 53:
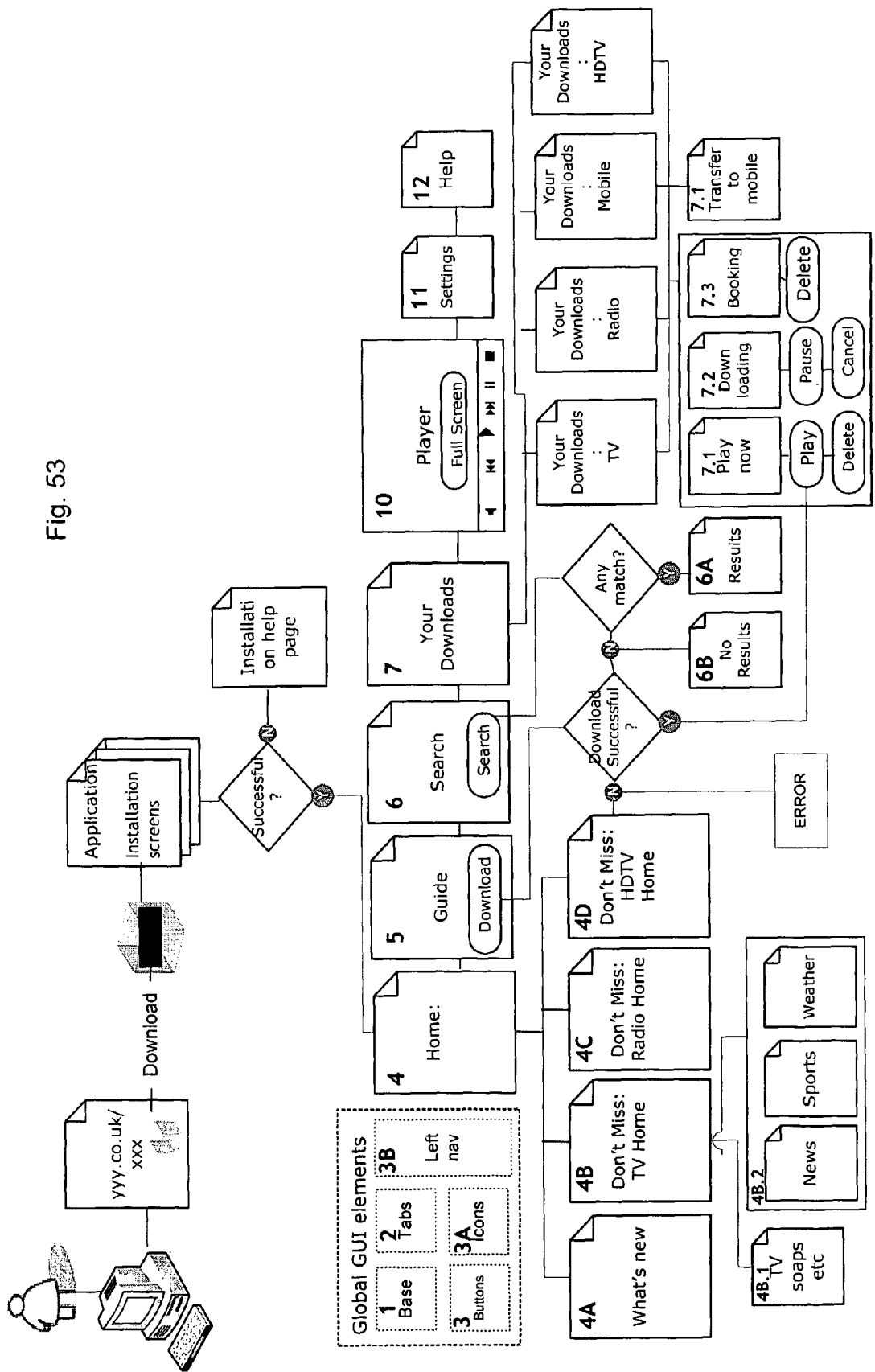
FIG. 53 shows an overall application architecture of another embodiment of the interactive media application program shown in FIG. 22.

FIG. 53 shows an overall application architecture of another embodiment of the interactive media application program (the system client). The overall architecture is similar to the architecture of the embodiment shown in FIG. 22, but includes certain additional features.

In particular, a search screen is provided, a mobile downloads area is provided and further recommendations screens are provided as part of the "Don't Miss" screen.

The layout of the user interface in this embodiment is also somewhat different from the embodiment described above, and in particular, for example, the guide screen includes a number of content filters (as described below).

Figure 54:
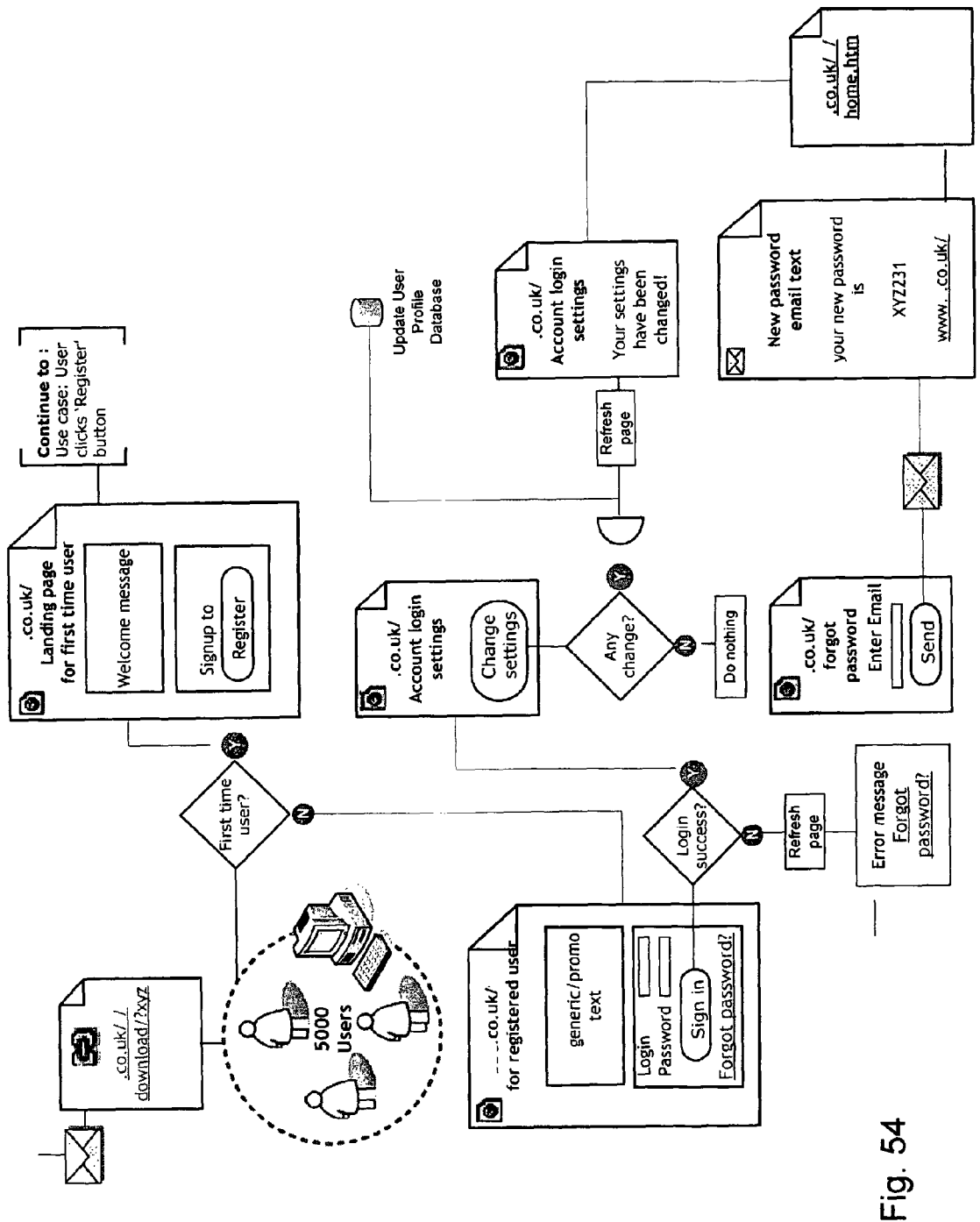
FIGS. 54, 55 and 56 show flow diagrams indicating the registration and installation of the application shown in FIG. 53.
Figure 55:
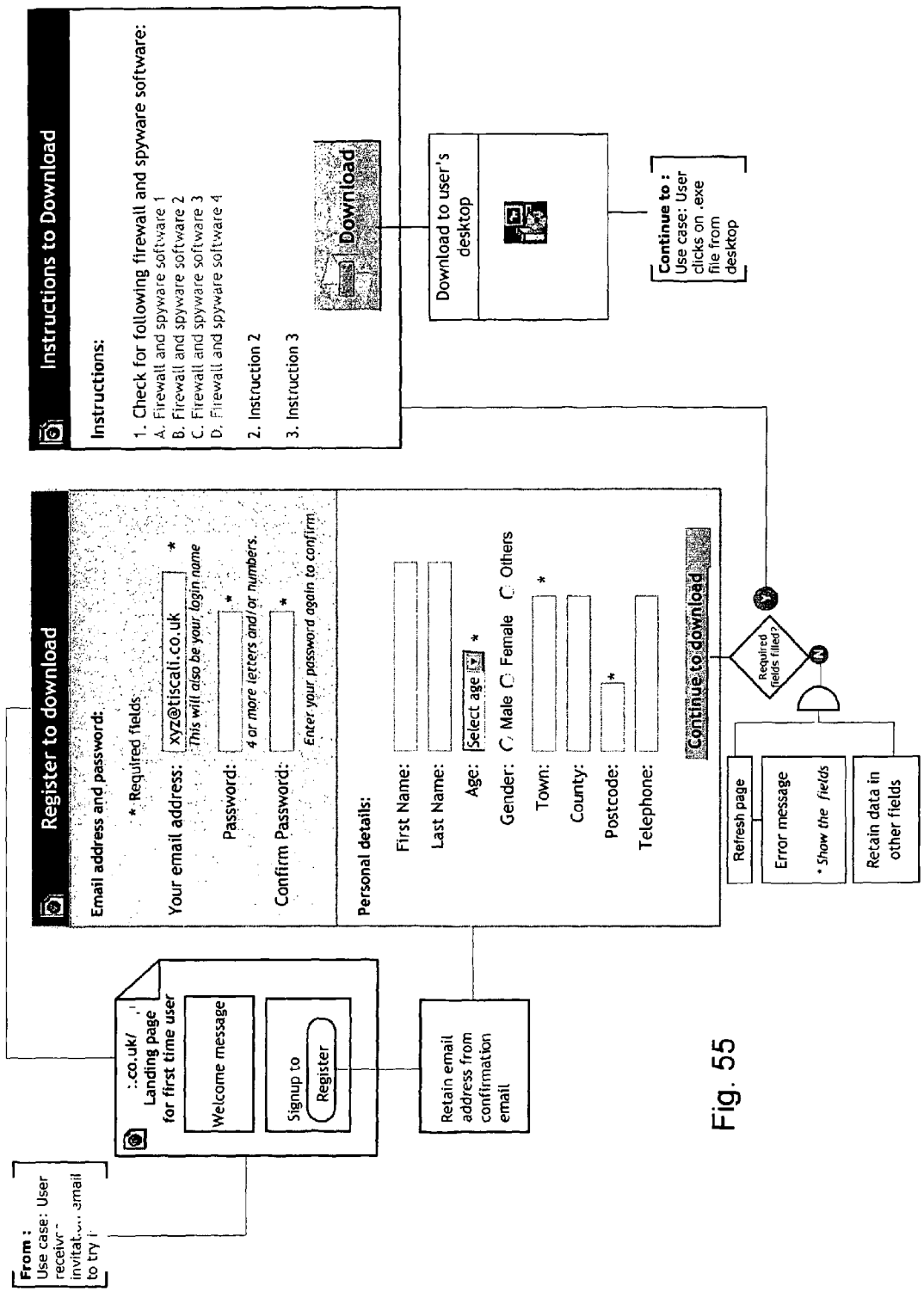
Figure 56:
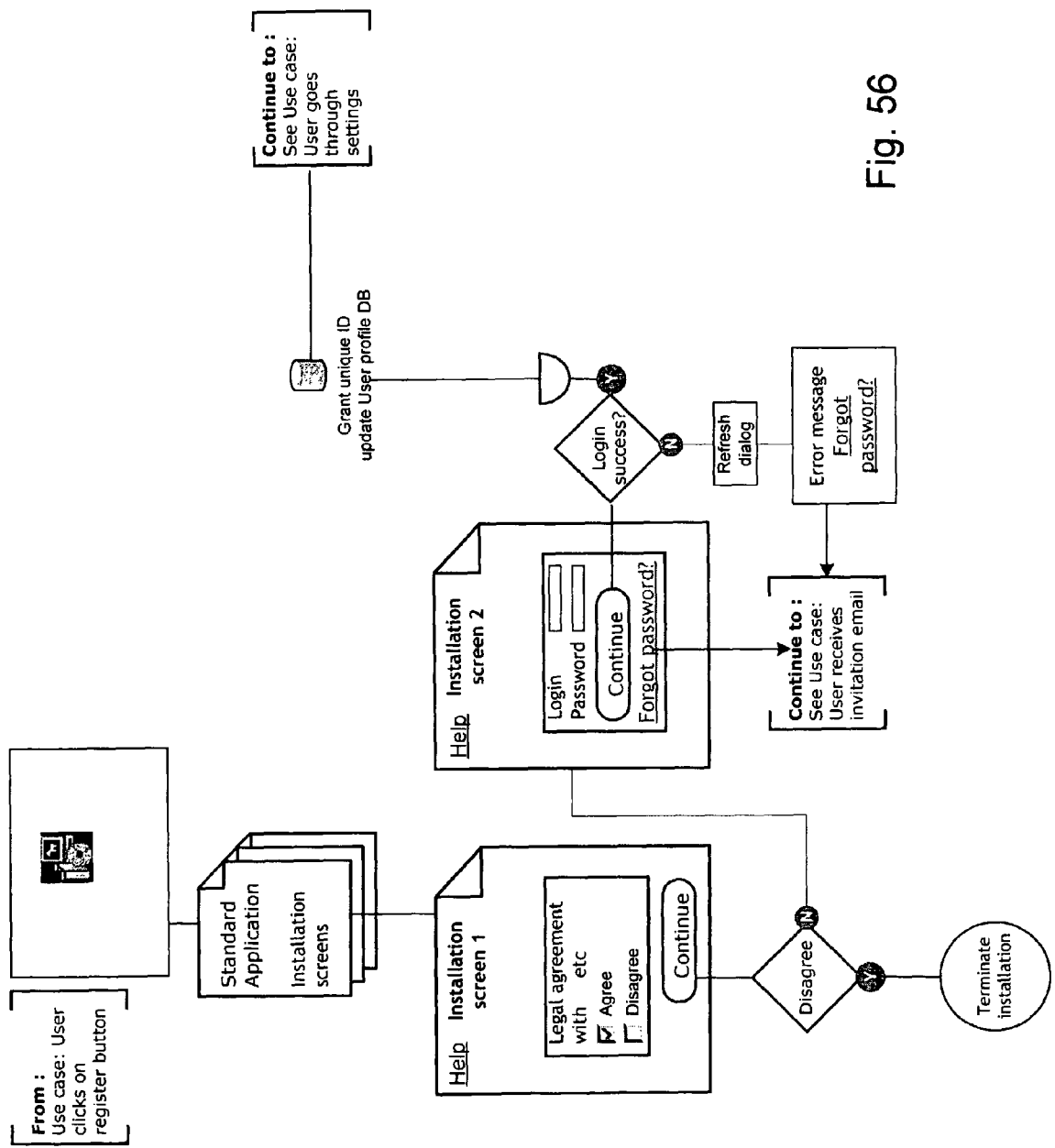

FIGS. 54, 55 and 56 show the process of registration and installation of the media application. In this embodiment the application is in the form of a software programme executable on a desktop personal computer, for example, an IBM™ compatible Microsoft™ Windows™ machine, a Linux machine, or an Apple™ Macintosh™ machine).

Figure 57:
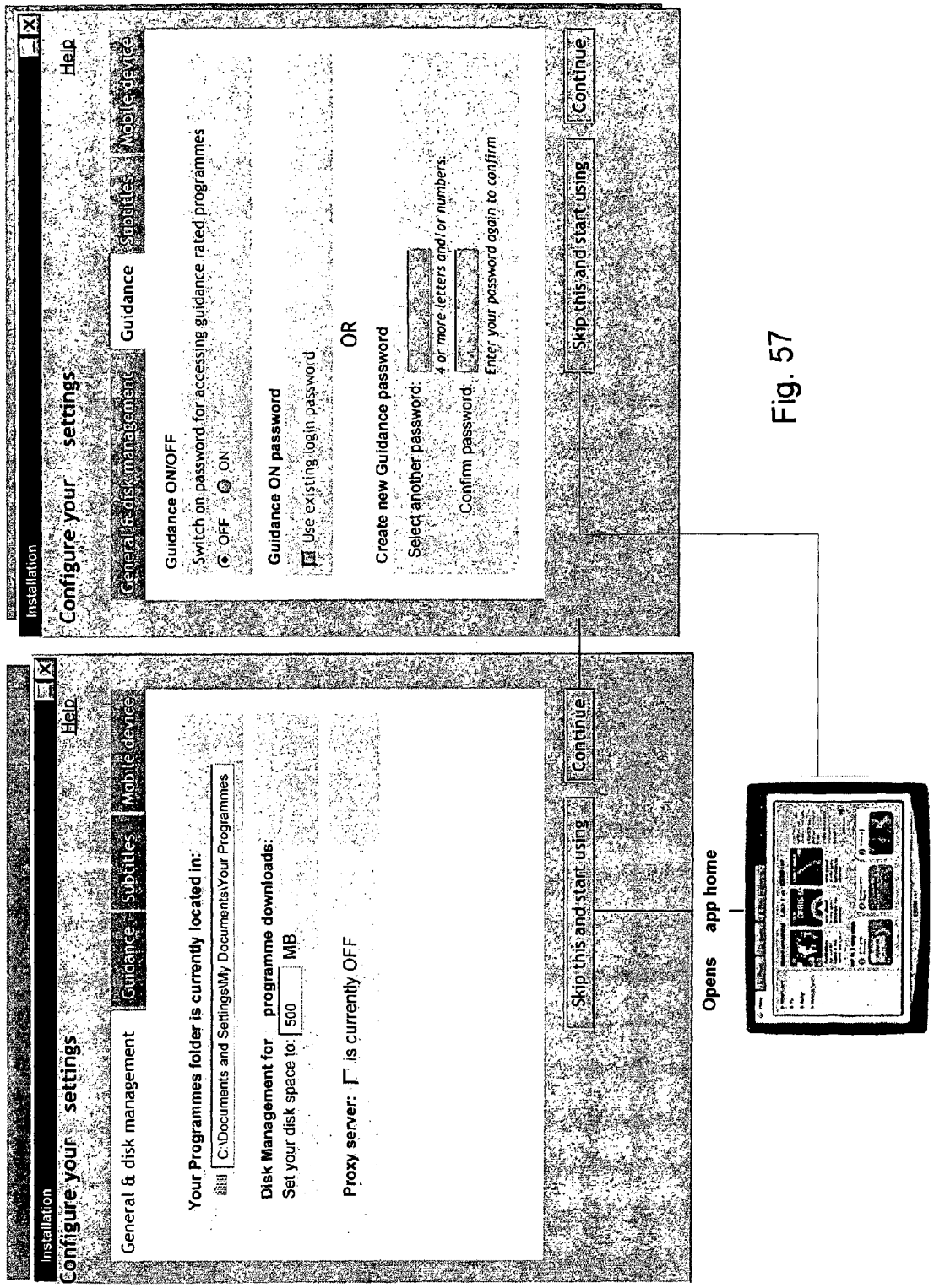
FIGS. 57 and 58 show configuration and set-up screens.
Figure 58:
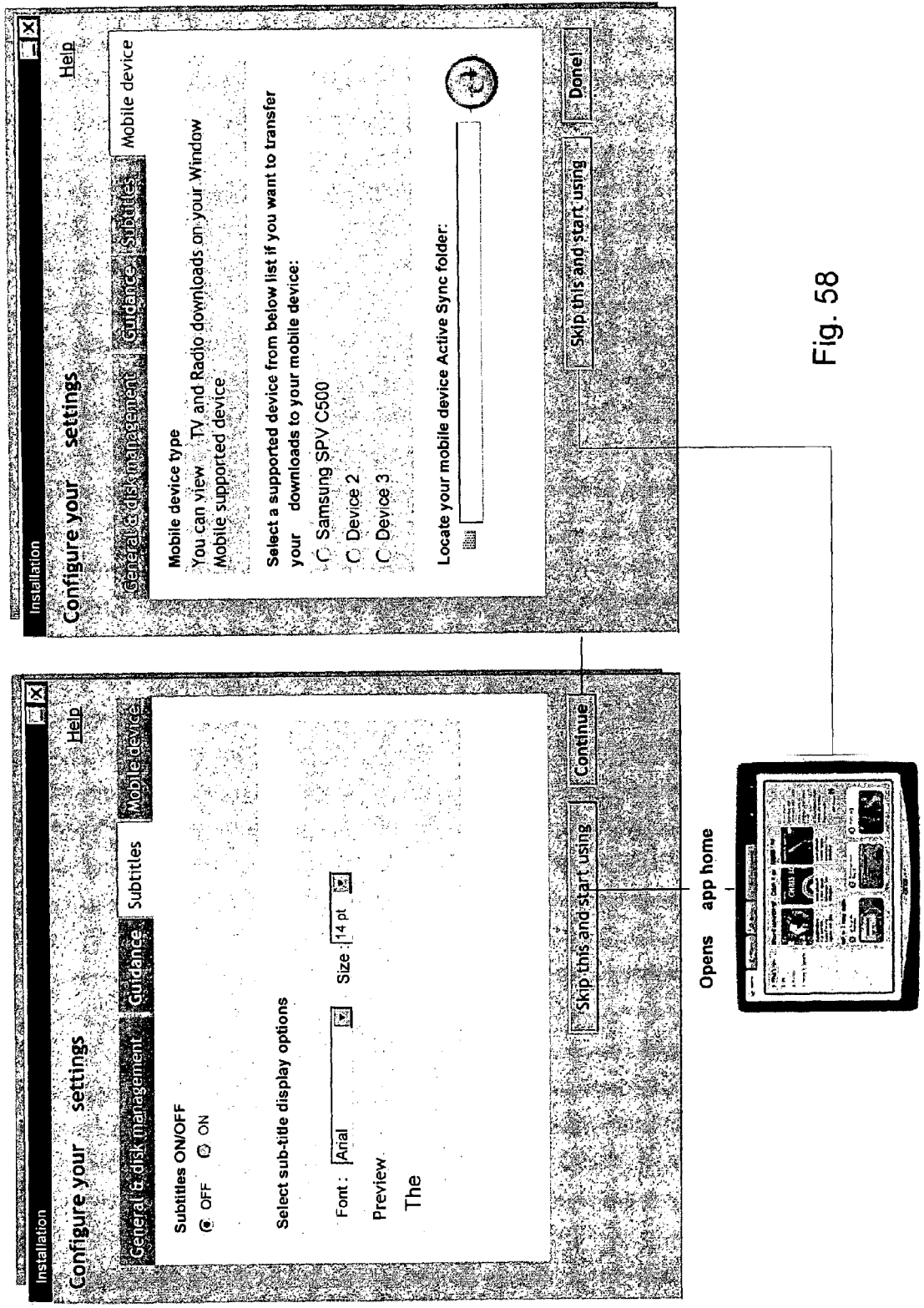

FIGS. 57 and 58 show screenshots indicating the set-up and configuration of the application. This enables a user to set a limit on the disk space to be occupied by downloaded programme files and to set-up guidance parameters for content not suitable for viewing by children. The set-up screen also enable a user to configure the use of subtitles and to specify a mobile device which will be used for viewing content.

Further details relating to the aforementioned functionality is described below.

Figure 59:
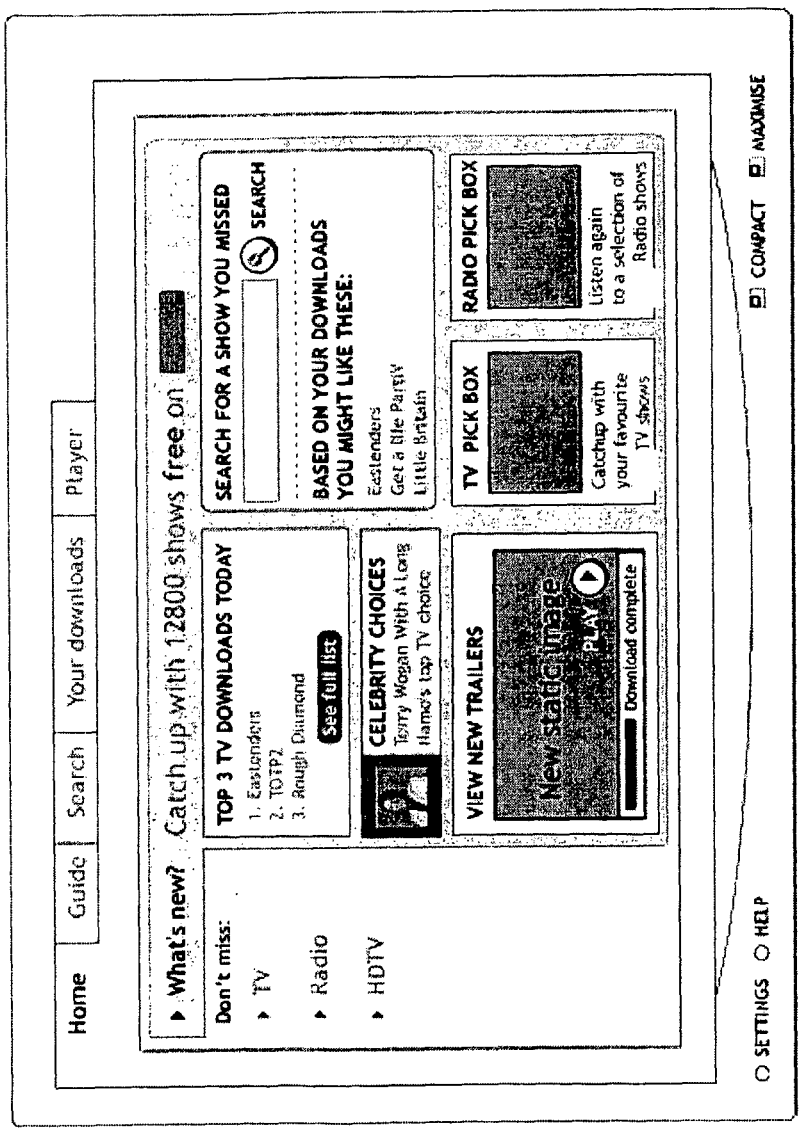
FIG. 59 shows an initial "home" screen.

The initial home screen is shown in FIG. 59. As above the application includes a number of tabs which enable a user to navigate between the various areas of the application (Home, Guide, Search, Your downloads and Player). The home screen also includes a number of promotional areas, such as "Whats New"/"Don't Miss" areas, a "Top Downloads" area, a "Celebrity Choices" area, "We Recommend" area and direct access to the searching screen. Settings and help buttons are also provided.

Figure 60:
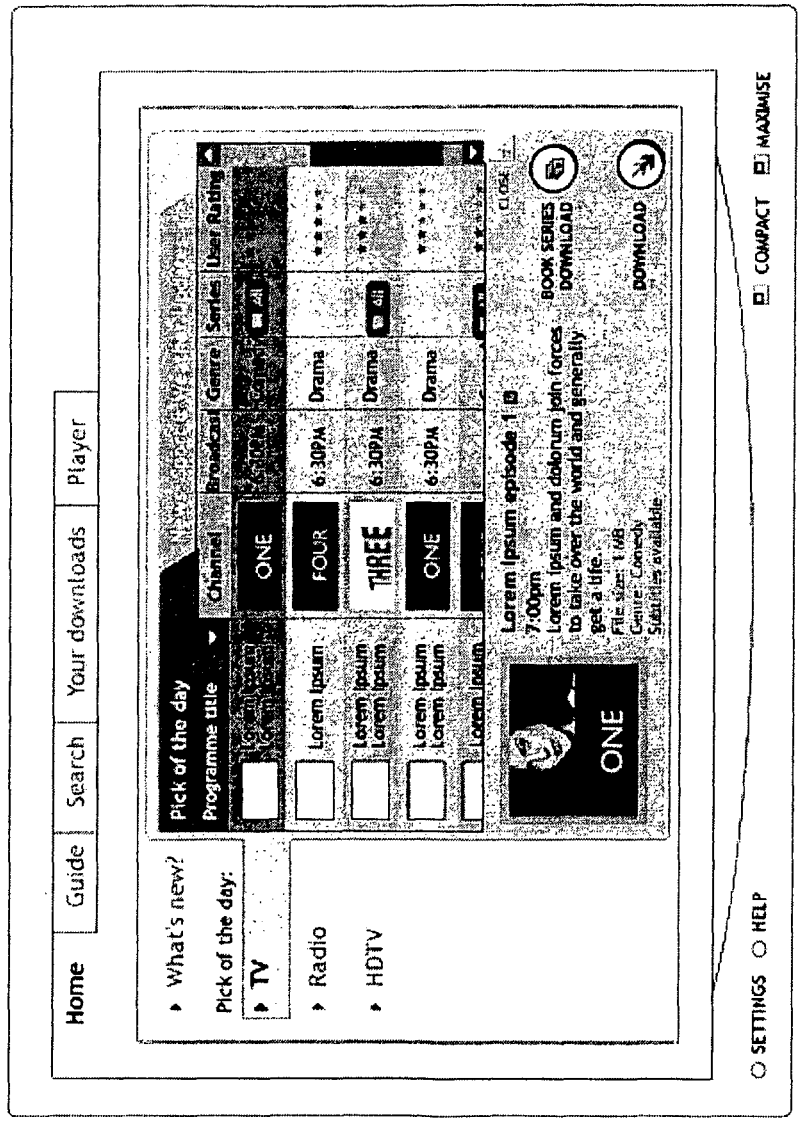
FIG. 60 shows another view of the home screen shown in FIG. 59.

A further view of the home screen is shown in FIG. 60. In this view the TV section of the "Don't Miss" section has been selected. As can be seen in FIG. 60, the "pick of the day" available programme downloads are presented in a list, which indicates, for each programme, the channel, broadcast time, genre, user rating, and series information for that programme.

Once a programme is highlighted in this screen it is possible to download the programme file and, if the programme forms part of a series, book the download of the entire series.

Figure 61:
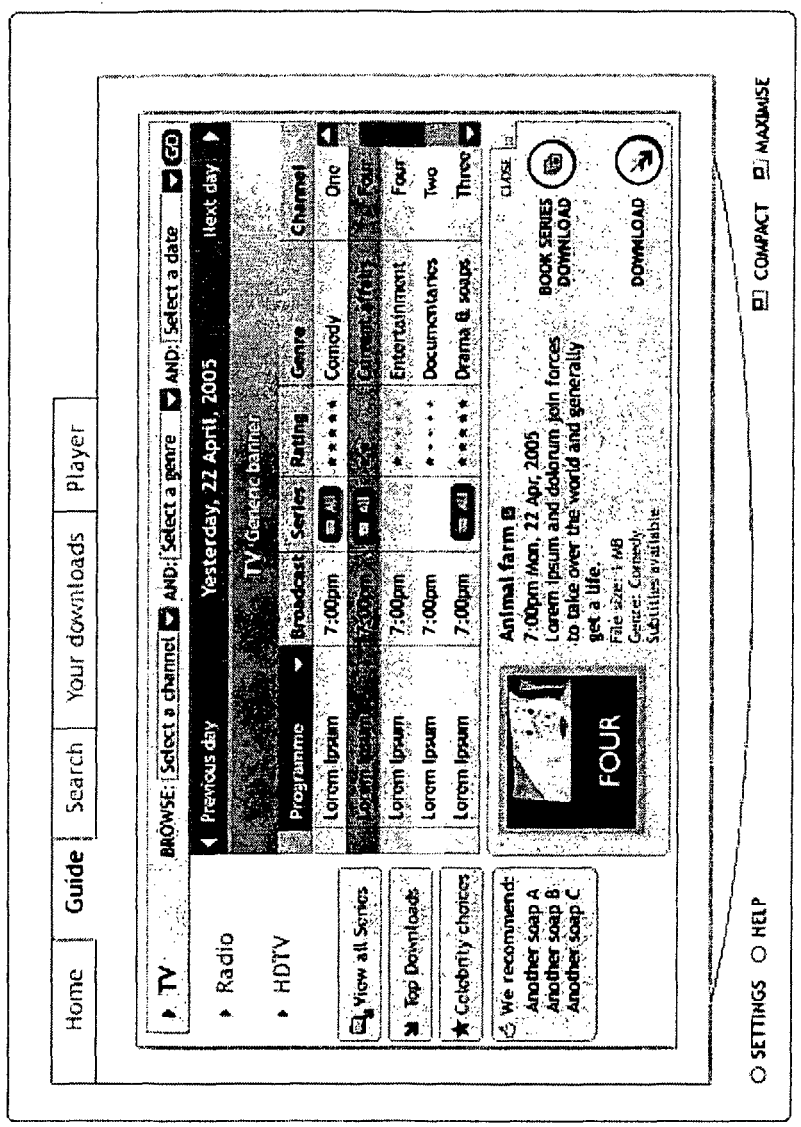
FIG. 61 shows a "guide" screen.

FIG. 61 shows the guide screen, which is divided into TV, radio and HDTV (high Definition TV) sections. It is also possible, from this screen, to link to the "Top Downloads" screen, "We Recommend" screen, the "Celebrity Choices" screen and to a screen showing all series programmes via buttons on a navigation bar displayed on the left hand side of the screen.

Hereto the programmes available for download are indicated in a list which provides details relating to each downloadable programme. In particular, the broadcast time/date is provided, along with the channel, user rating and genre.

Once a programme has been selected further information is provided relating to that particular programme; for example, a summary of the programme and whether it forms part of a series.

A number of filters are also provided on the guide screen which enable a user to dynamically filter content based on any combination of date, genre and channel.

A pair of banners are provided above the programme list. The first is used to provide channel branding along with genre information and the second is used to indicate the date.

The date banner also provides navigation keys to allow a user to move to the previous day/date and the next day/date. Thus, a user can easily see what programmes have been (or will be) broadcast on a particular date.

When a user accesses the guide the default screen displayed shows all programmes broadcast the previous day (i.e. the guide defaults to yesterday), with the time of the broadcast indicated in the broadcast time/date column. The user can then simply navigate to previous days, or future days using the date banner navigation keys. In this way a straightforward user interface is provided to enable less sophisticated users to access TV programmes they missed on a particular day.

Alternatively, or in addition, the user may use the filters to sort the programmes based on any combination of genre, date and channel.

When a user has performed a search based on date, i.e. by selecting a particular date range, the date of broadcast is shown in the broadcast time/date.

When a user has performed a search based on either channel or genre, the channel branding or a graphic indication of the genre is shown in the channel/genre banner.

If a user perfumers a search based on both channel and genre the banner is split to indicate both a graphic indication of the channel and a graphic indication of the genre.

The downloaded programme files are also sortable by clicking on the column titles; for example, a user may sort by programme title, in which case the programmes are listed alphabetically.

Figure 62:
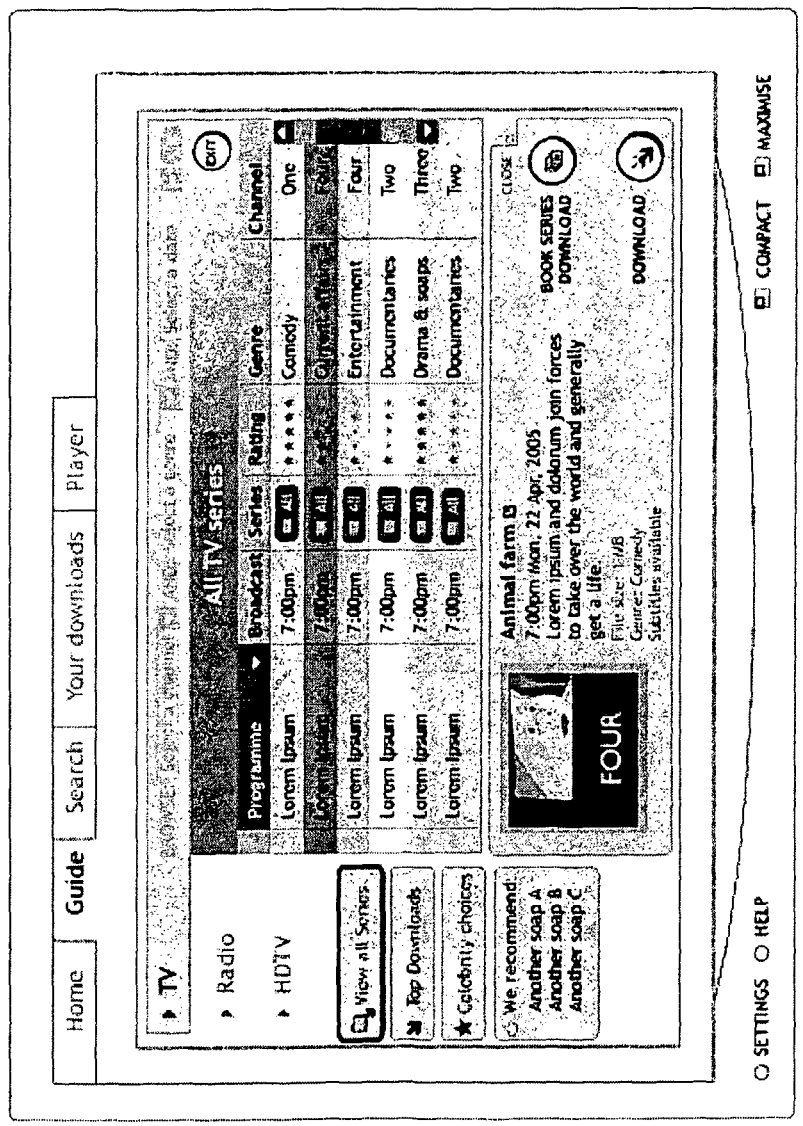
FIGS. 62 to 65 show further view of the guide screen shown in FIG. 61.
Figure 63:
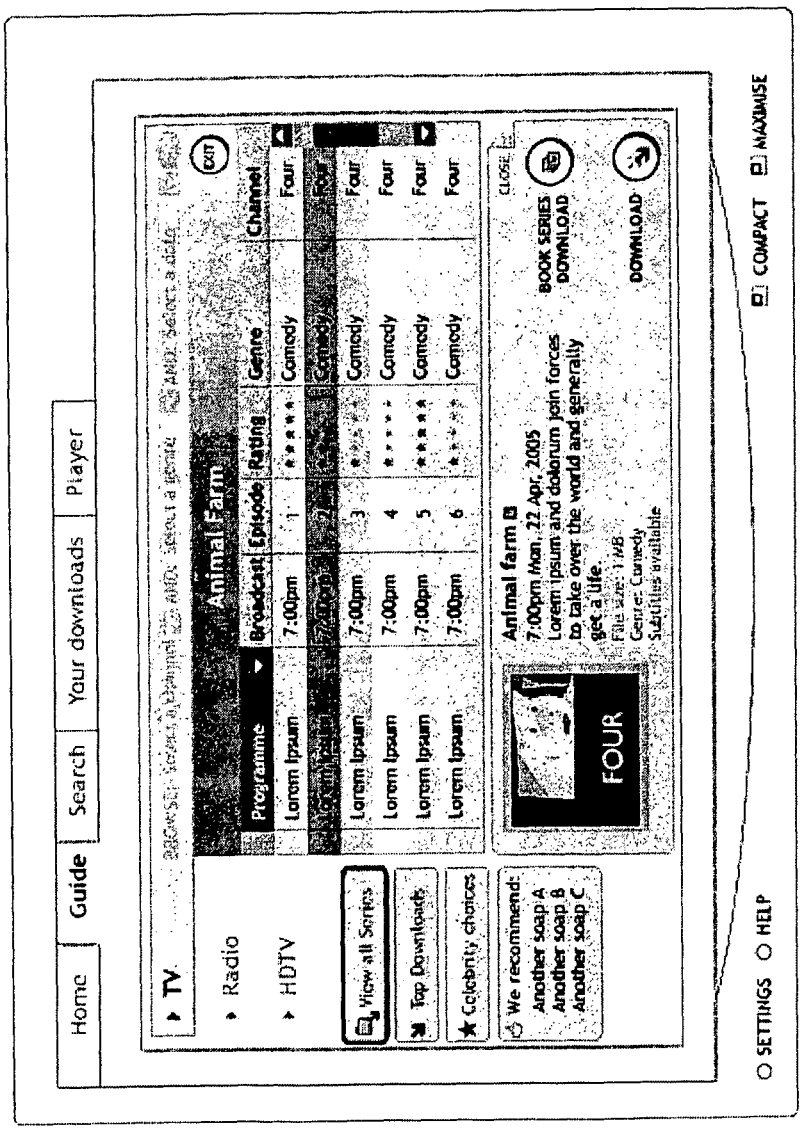

FIGS. 62 and 63 show the guide screen following the selection of the view all series button. In this case all programmes which form part of a series are displayed in the guide.

It is possible to view all the programmes in a particular series by selecting the series icon displayed alongside all programmes forming part of a series. A user is then able to download any programmes in that series which have been missed, or to book the download of future programmes which have not yet been broadcast. These will then be downloaded following broadcast.

Figure 64:
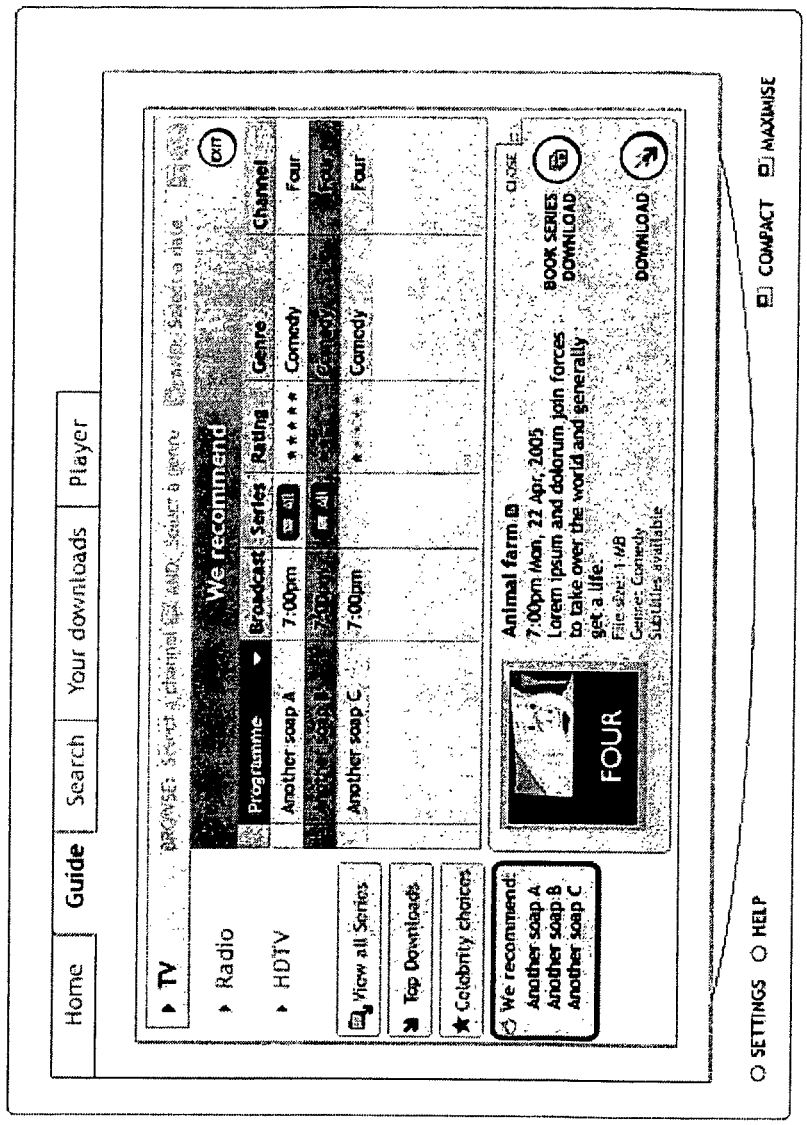
Figure 65:
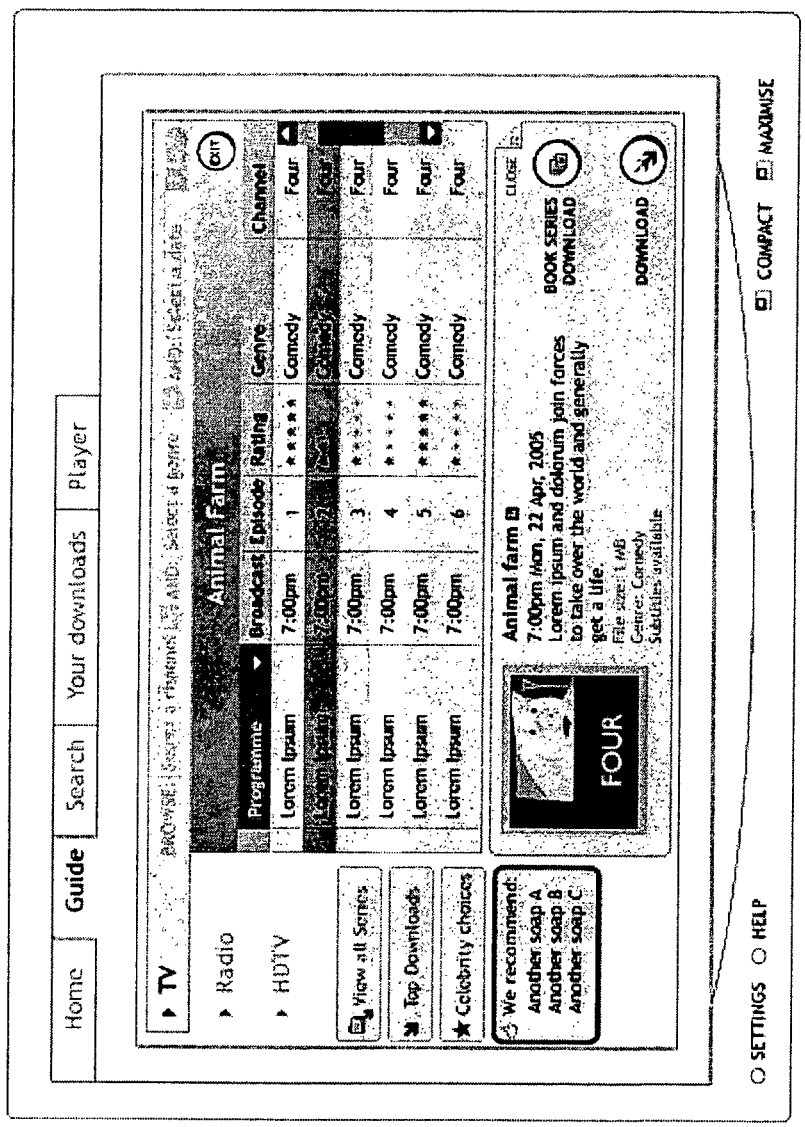

The "We Recommend" area shows programmes similar to a programme which is currently highlighted by a user. A user can select to download particular programme by directly clicking on a programme shown in this area, or alternatively may select the "We Recommend" button to display all the recommended programmes. FIG. 64 shows a view of the guide screen following the selection of the "We Recommend" button. Recommendations may also be based on user viewing and downloading habits, user preference. Autonomy™ recommendations and referencing software is used to drive programme recommendations.

Figure 66:
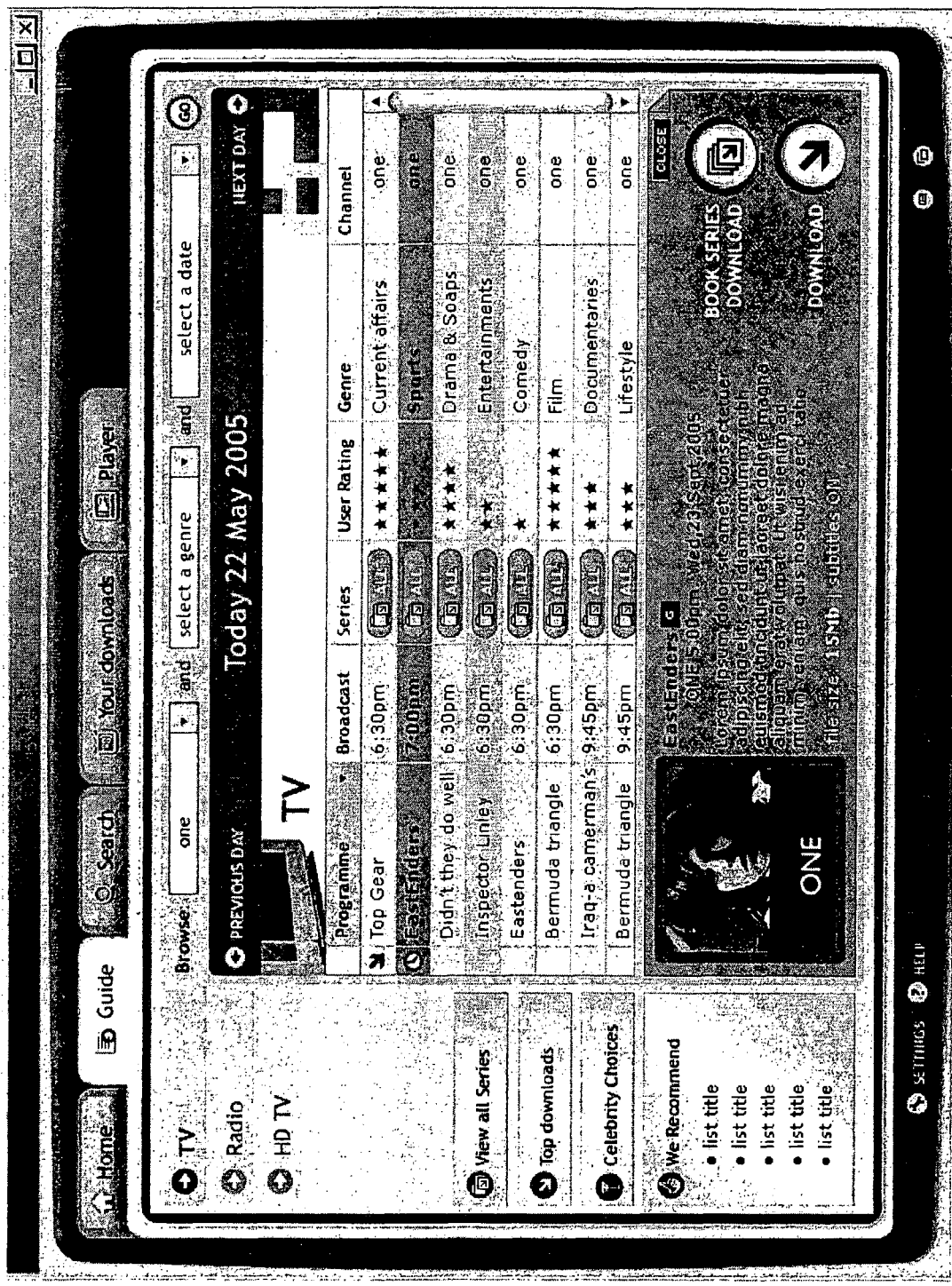
FIG. 66 shows a screen shot of the guide screen of FIG. 61.

FIG. 66 shows a screen shot of the guide screen, showing the genre, channel and date filters, the channel/genre and date banners and default programme display screen (i.e. all programmes broadcast yesterday).

The channel/genre banner is also used to provide indicate whether the user has accessed the "View all Series", "Celebrity Downfoads" or "We recommend" sections—via appropriate graphic indications.

Figure 67:
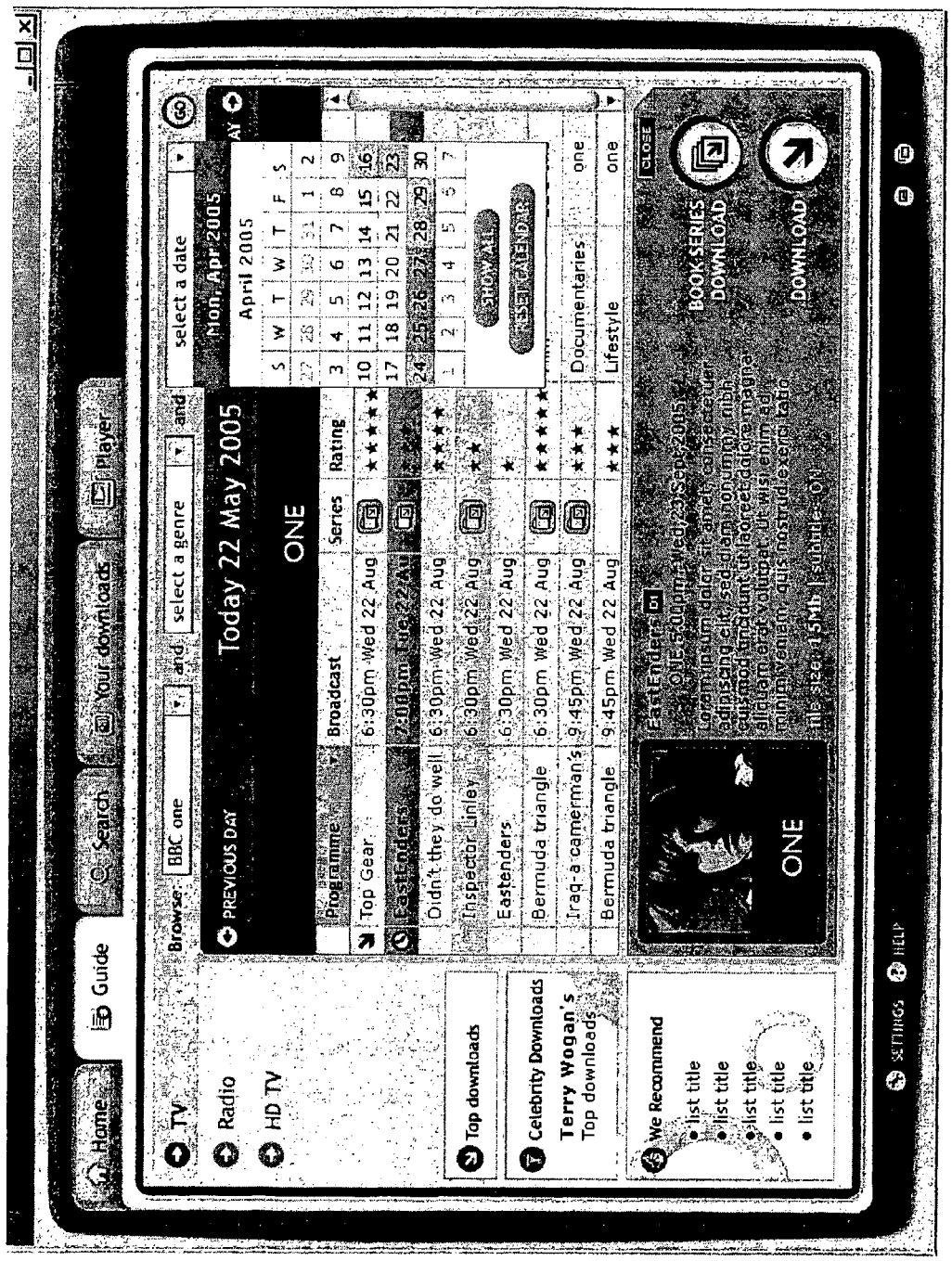
FIG. 67 shows a further screen shot of the guide screen of FIG. 61.

FIG. 67 shows a screen shot of the guide following selection of the date filter drop-down menu. As mentioned previously, the application enables a user to access programmes which have been broadcast during the past 7 days and to book downloads for programmes which will be broadcast within the forthcoming 7 days. Thus, a user can select any day within this "rolling time window" graphically indicated on the calendar; for example, a user may select a range of dates from within the time window, corresponding to a time period during which he was away from home. All programmes the user missed, which are now available for downloading, will then be displayed in the guide.

As mentioned above a user may only access and/or open and view downloaded files for 7 days following the broadcast of the programme.

In one embodiment the application allows a user to download programmes in advance of a broadcast, but only enables a user to open and view the downloaded files following the broadcast.

In this embodiment it is possible to download and/or view all programmes forming part of a series up until 7 days following the broadcast of the final programme in the series.

Figure 68:
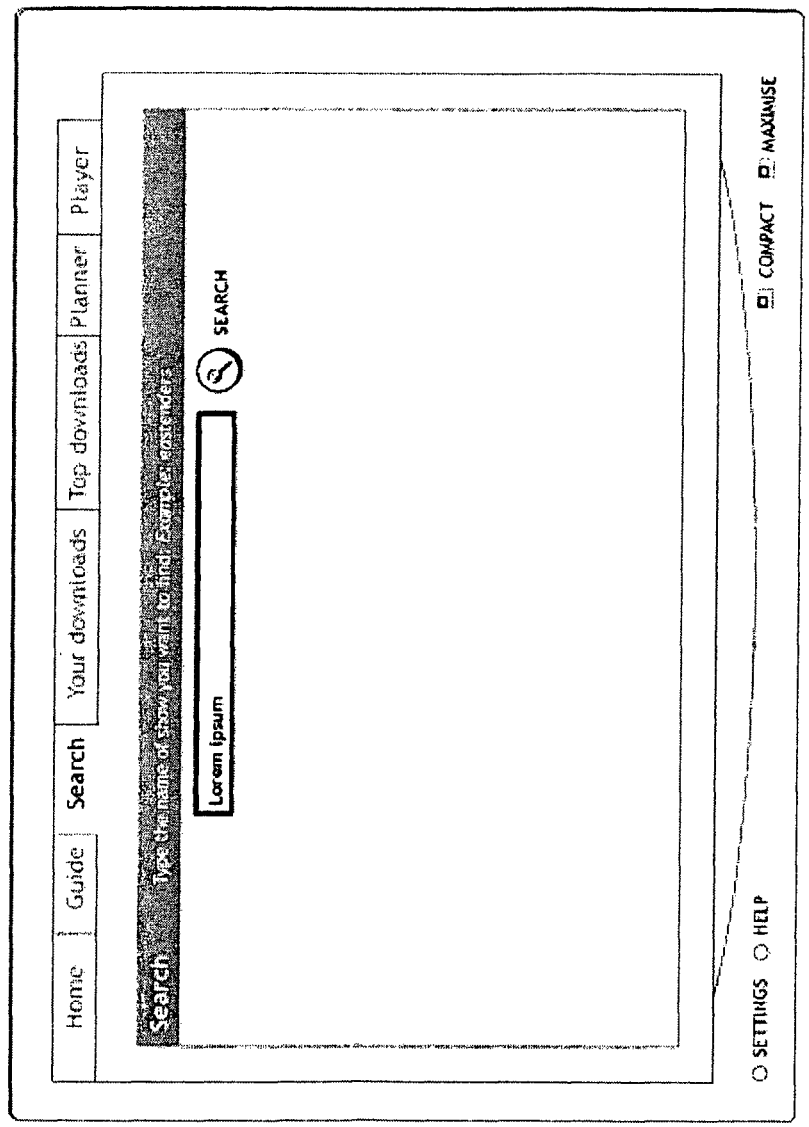
FIG. 68 shows a search screen.
Figure 69:
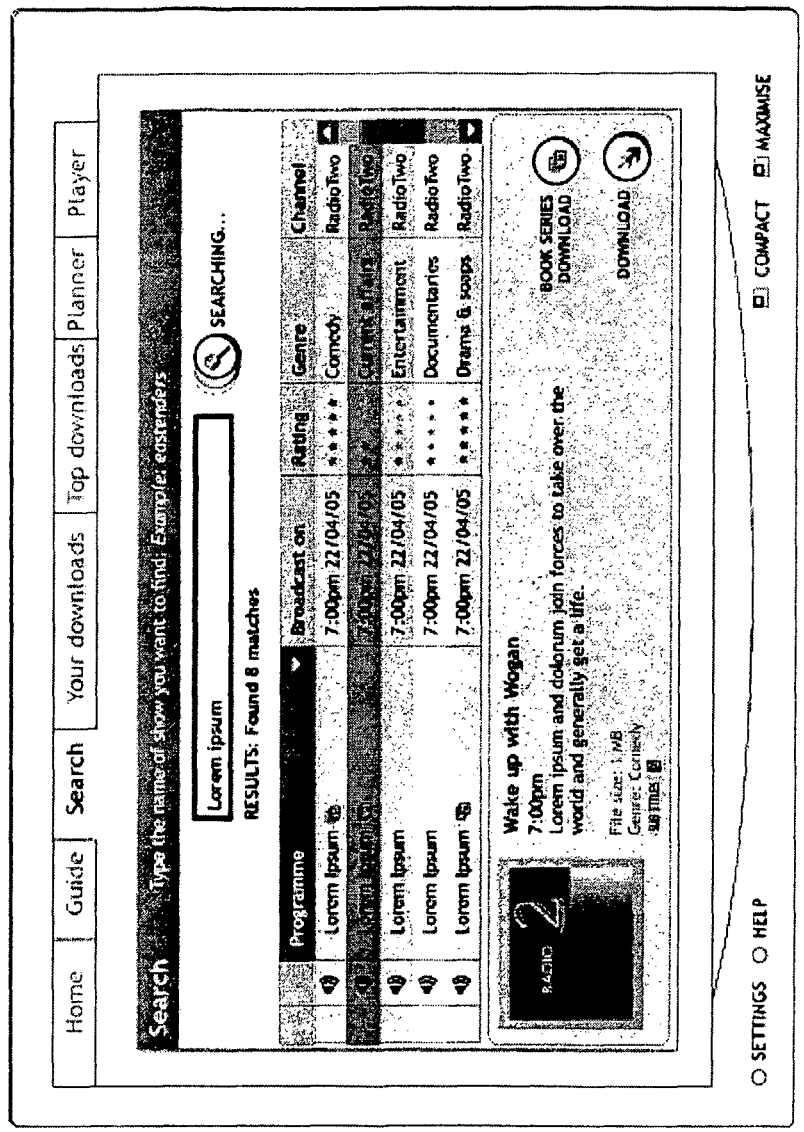
FIGS. 69 and 70 show further views of the search screen of FIG. 68.
Figure 70:
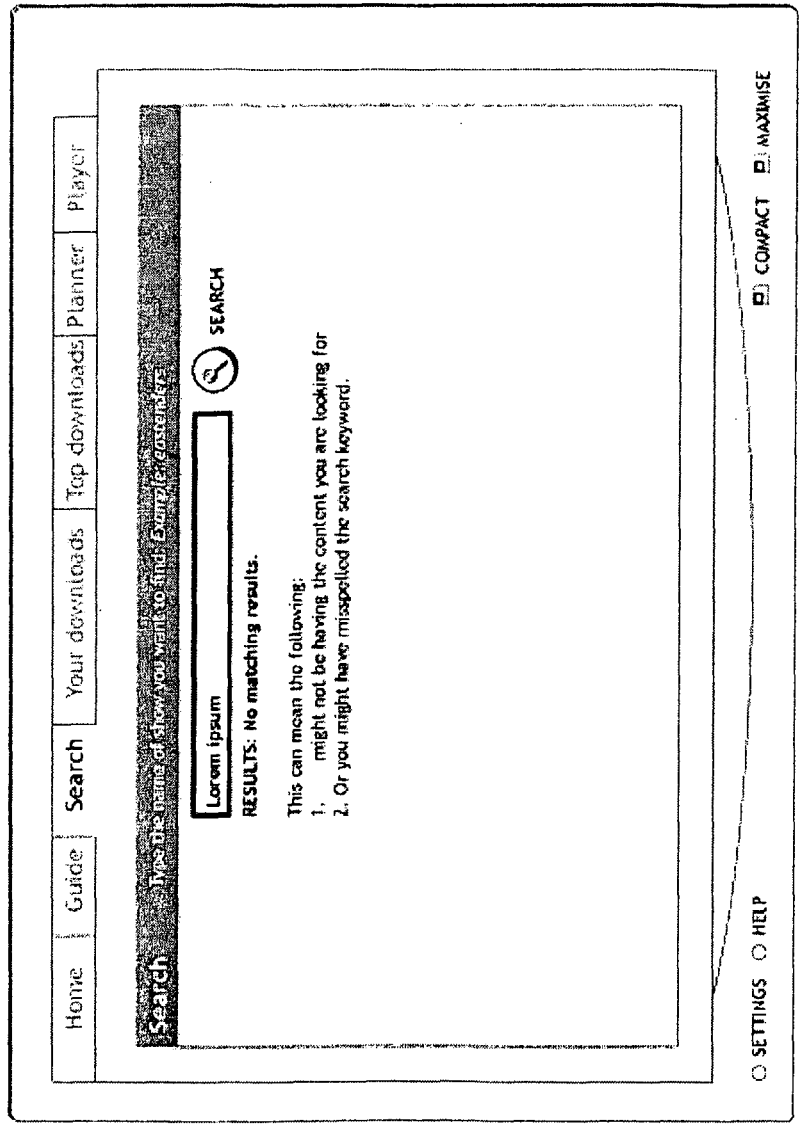

FIGS. 68, 69 and 70 show the search screens. The search facility enables a user to search for keywords in programme titles, subtitles, and programme synopsis information.

Figure 71:
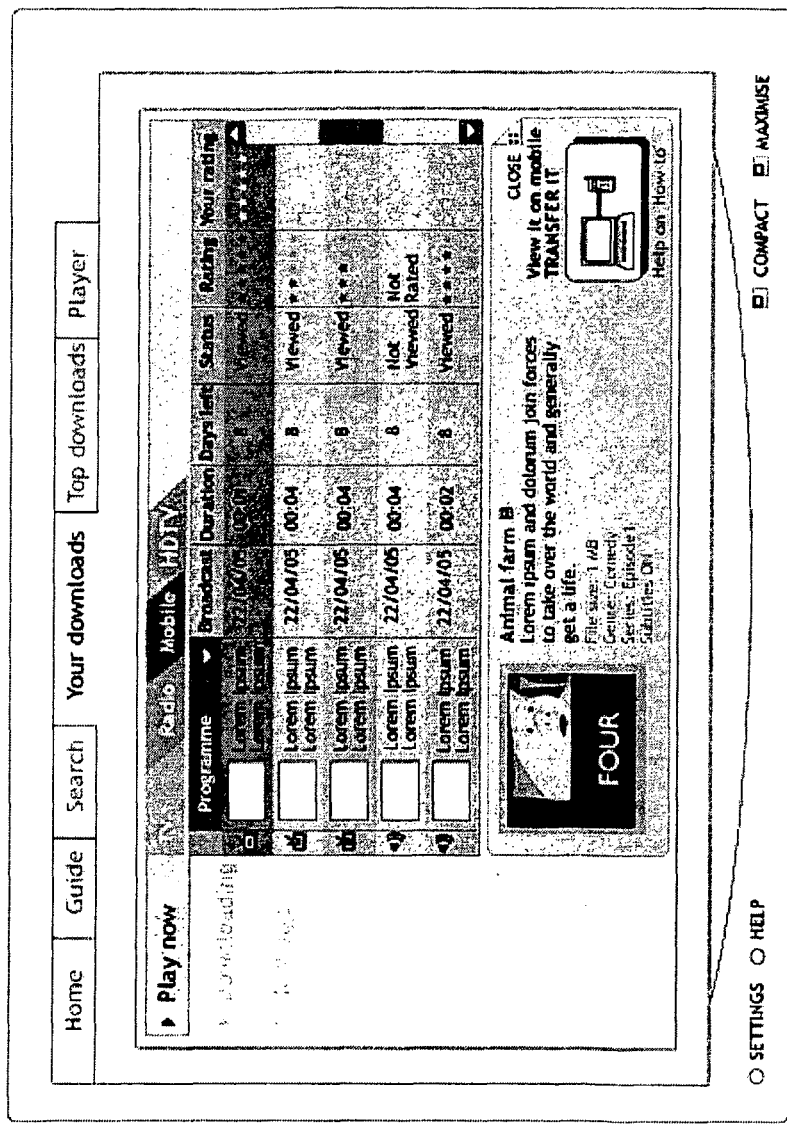
FIG. 71 shows a downloads screen.
Figure 72:
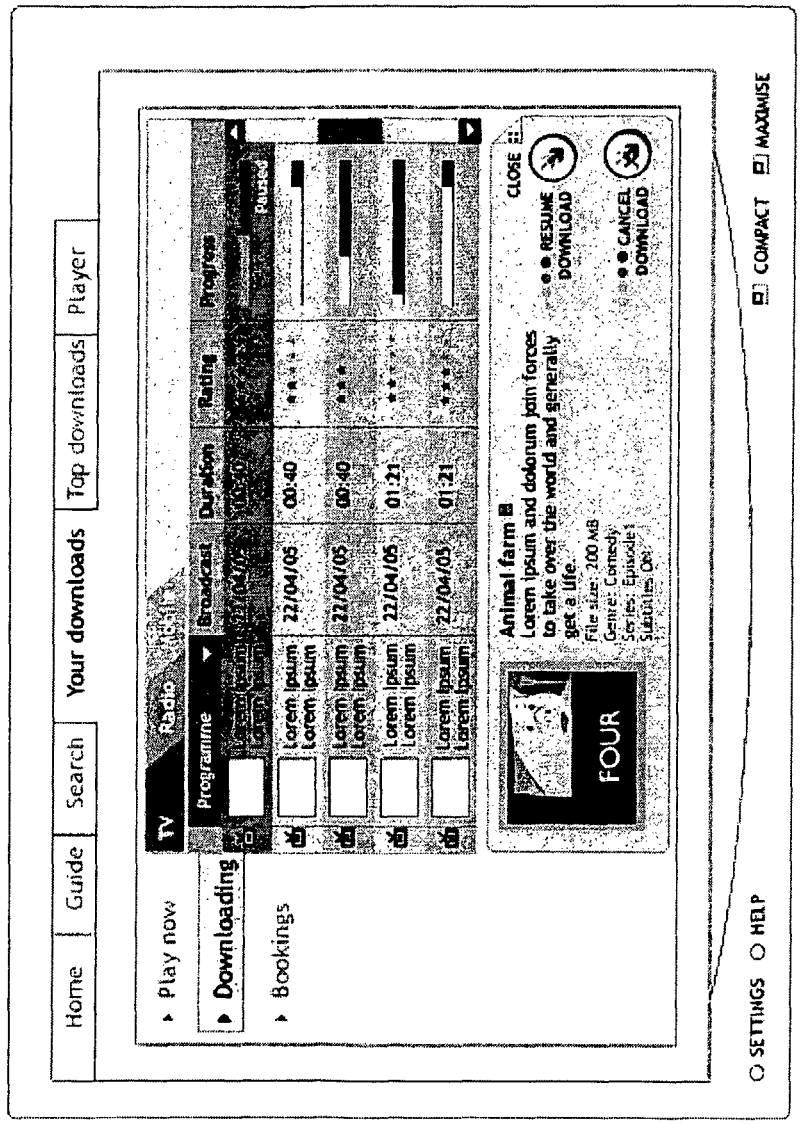
FIGS. 72 and 73 show further views of the downloads screen of FIG. 71.
Figure 73:
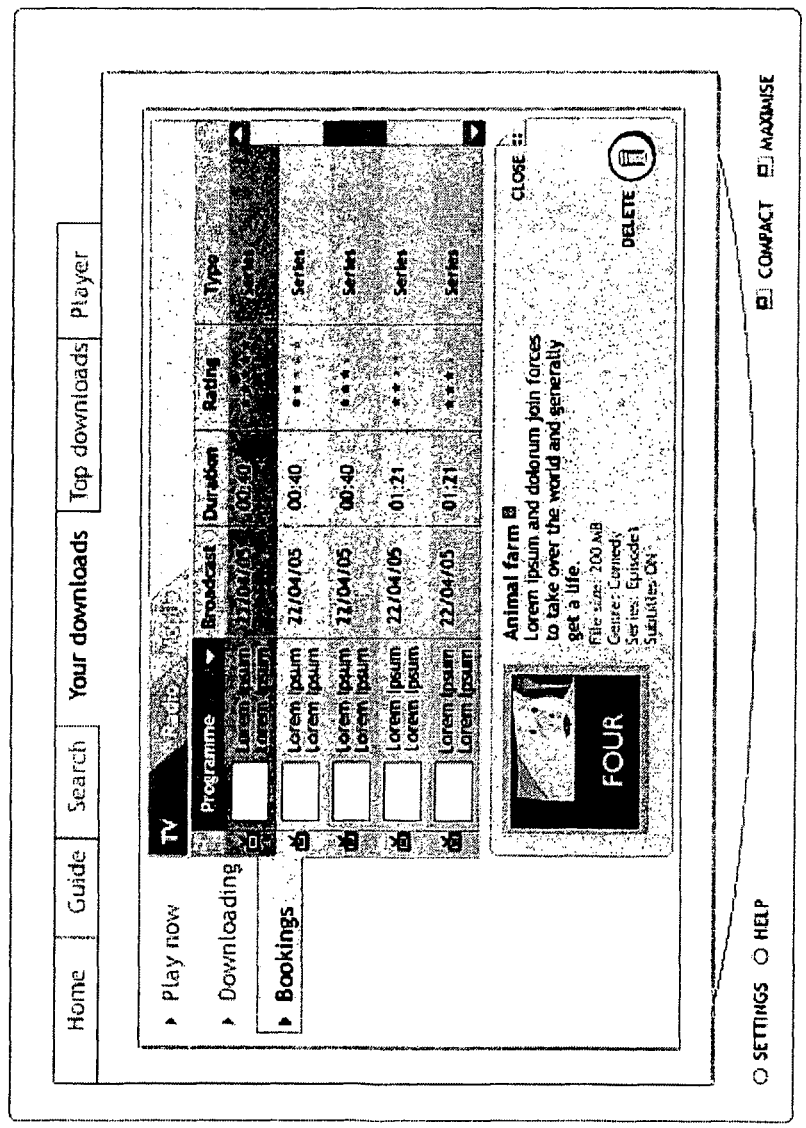

FIGS. 71, 72 and 73 show various views of the your downloads screen.

The downloads screen display programme files which have been downloaded by the user and which are available for viewing. The downloads screen also displays the status of booked downloads and the progress made in downloading further programme files. In this regard, it is possible to pause and restart a download if a user requires downloading bandwidth for other applications.

The downloads area is divided into various tabs: TV, radio, HDTV and Mobile. Each tab includes downloads of one of the above types. The mobile downloads area includes downloads of programmes which are in a form suitable for viewing on a particular mobile device—pre-selected by the user during installation.

All programmes that are downloaded are downloads in at least two formats (if this option is specified by the user during set-up): a full high quality version and a low resolution version or format suitable for viewing on the users mobile device. Thus, a user may either open and view the programme in "fully quality" mode using the application player on his PC, or alternatively may transfer the file to his mobile device for viewing offsite.

For this purpose, a "transfer to mobile" button is provided in the mobile downloads area, as shown in FIG. 71, which activates a file transfer application enabling a user to transfer particular files to his mobile device.

Further aspects relating to this embodiment of the application are now described in more detail.

Client for the PC

Further functionality of this embodiment of the client (or media application) is now described.

It is important to keep track of the location in the application from which a user initiates a file download (TV Pick Box, "What's New", Guide, Recommendations, Top Downloads, and Celebrity Choice etc.), for this reason when a download is initiated the location from which it was initiated from must be recorded. This is specified in the Reporting database design, as described above.

As mentioned above, the application has five main sections:
1. Home
2. Guide
3. Search
4. Your programmes
5. Player There are also two other areas—Settings and Help.

Home

What's New

The page will be used to promote particular programme types.

Coming soon video barker—This trailer will promote TV content and will last approx 2 minutes (4 programme trails). This will be updated once a day. This video will be offered as a download and users will be able to sign-up to a 'series download' of these files.

TV pick box—By default a static promotional image of a TV programme will be shown. This image will need to be updated up to 3 times a day. Clicking on the image take the guide to the Guide and highlight the programme, the filter should be the day the programme is on, all channels and all genres.

Radio pick box—By default a static promotional image of a Radio programme will be shown. This image will need to be updated up to 3 times a day. Clicking on the image take the guide to the Guide and highlight the programme, the filter should be the day the programme is on, all channels and all genres.

Top 3 downloads for TV—these are obtained and published to the client application at least once an hour.
1. Eastenders (Thur) BBC ONE
2. Eastenders (Friday) BBC ONE
3. Top Gear BBC ONE Thus, the system keeps a record of the number of times particular downloads have occurs and provides updates for the client applcaitions.

A basic content management system is also provided to allow graphics and text shown in the Coming Soon video barker, TV Pick box and Radio Pick areas to be editd. In the content management system the TV and Radio Pick boxes images are allocated a start time/date and end date/time for when they are shown.

Search—There is a search field and the user will be able to type a keyword into search field. The results will be displayed within the Search tab.

TV

This section will is split in to two sub-sections:

What's New—This section is used to promote 'Pick of the Day' type programmes for the previous day that are available now to be downloaded. The list will be generated automatically from schedule data provided weekly by on the basis of, say, marketing requirements.

News, Weather & Sport: Updates Daily—This section contains a list of subscriptions to News updates, Weather updates and Sports News Updates and allow the user to sign up.

Radio

This section will allow the user to sign up to regular downloads of a Radio programme. A list of Radio programmes is provided.

HDTV Page

This page is used to promote HDTV programmes.

Guide

The Guide will be navigated using the following major headings:
TV
Radio
HDTV

The following minor headings are also provided:
View all Series
Top Downloads
Celebrity Choices
We Recommend When the user selects a major heading, they will be able to navigate to that heading using filtering (by station, genre and date) or by using minor headings. Clicking the minor heading acts as a filter/mode within the major heading that is currently selected.

A certain number of programme series will have all previous episodes available for the duration of the run (series stacking feature). This is enabled from the backend so when the application starts up users will be able to view in the guide and download certain programmes before the 7 day window.

The grid will be able to be expanded by closing the synopsis window. Clicking the 'open' button or a programme will show the synopsis window. By default the synopsis window will be shown.

After a user has initiated a download the user is able to 'pause' it. The pause button allows the user to interrupt a download without cancelling it. A 'resume downloading' button restarts the download request from where it was stopped. And a 'Cancel download' button deletes the download in progress.

The functionality of the major headings and minor headings is described below:

Guide: TV

This is the default section. The user is able to view by TV station, Genre and Date or any combination of above. The user may make their selection of filters and click a 'Go' button to change the view. The default view will be TV station: all; Genre: all; and Date: Yesterday.

Programmes listed in the guide show User Ratings. These are only displayed where 5 or more people have rated a particular programme.

Where a programme is a series an icon is displayed, which when clicked on will show the list of episodes available.

TV Stations

The TV station pick list will list a variety of network TV stations

Genres

A list of possible genres is provided below:
Current affairs
Sport
Drama & soaps
Entertainment
Comedy
Films
Children
Documentaries
Lifestyle
Learning Date A calendar control is provided in the form of a drop-down control. The user has the option of choosing a single date or the complete 14 day period, via the 'Select All' indication. A 'Reset Calendar' will also be provided which will do exactly the same as the 'Select All'.

When a single date has been chosen the 'Broadcast' column in the grid will show only times. When a range of dates are selected only the dates will be shown in the 'Broadcast' column in the grid.

When the current date is selected the date heading will be prefixed by 'Today'. When yesterdays date is selected the date heading will be prefixed by 'Yesterday'.

Banner Behaviour in Major Headings

The banners displaying the TV channel brand get updated each time user selects a brand from the dropdown. If user selects a 'Channel Brand'+'Genre', then the system updates the banner with the respective banner asset.

Guide: Radio

The user is able to view by Radio Network, Genre and Date or any combination of above. The user makes their selection of filters and click a 'Go' button to change the view. The default view will be Radio station: all; Genre: all; and Date: Yesterday.

Programmes listed in the guide show User Ratings. These are only displayed where 5 or more people have rated the programme.

Where a programme is a series an icon is displayed, which when clicked on will show the list of episodes available.

Radio Networks

A variety of radio stations are provided in a radio pick list.

Genres

A list of possible radio genres is provided below.
Music
  Blues, soul, reggae
  Classical
  Classic rock and pop
  Dance
  Easy and soundtracks
  Experimental
  Folk and country
  Jazz
  Music documentaries
  Pop
  Rock and alternative
  Urban
  World
Speech
  Arts and drama
  Children
  Comedy and quizzes
  Entertainment
  Factual
  History
  News and current affairs
  Religion
  Soaps
  Science
  Sport Date A calendar control is available as a drop-down control. The user thus has the option of choosing a single date or the complete 14 day period, via a 'Select All' indication. A 'Reset Calendar' is also provided which will do exactly the same as the 'Select All'.

When a single date has been chosen the 'Broadcast' column in the grid will show only times. When a range of dates are selected only the dates will be shown in the 'Broadcast' column in the grid.

When the current date is selected the date heading will be prefixed by 'Today'. When yesterdays date is selected the date heading will be prefixed by 'Yesterday'.

Banner Behaviour in Major Headings

The banners displaying the Radio Network brand get updated each time user selects a brand from the dropdown. If user selects a 'Radio Network'+'Genre', then the system updates the banner with the respective banner asset.

Guide: HDTV

TV Channel, Genre and Date will be greyed out.

HDTV programmes will be classified using the TV Genres. Broadcast date will be blank.

Programmes listed in the guide will show User Ratings. These will only be displayed where 5 or more people have rated the programme.

Guide: View all Series

When 'TV' is selected as the major heading, selecting this displays a listing of all TV series.

When 'Radio' is selected as the major heading, selecting this displays a listing of all Radio series.

When 'HDTV is selected as the major heading this will be greyed out.

An exit button will be displayed to return to the guide view.

Each series will have a series icon displayed, which when clicked on shows the list of episodes available. An exit button is available to enable a user to return to the initial 'View all Series' view.

Guide: Top Downloads

When 'TV' is selected as the major heading, selecting this displays a numbered list of the top 20 TV programme downloads.

When 'Radio' is selected as the major heading, selecting this displays a numbered list of the top 20 Radio programme downloads.

When 'HDTV is selected as the major heading, selecting this displays a numbered list of the top HDTV programme downloads.

An exit button is displayed to return to the guide view.

Where a programme is a series an icon is displayed, which when clicked on will show the list of episodes available. An exit button is provided to enable a user to return to the initial 'Top Downloads' view.

Guide: Celebrity Choices

When 'TV' is selected as the major heading, selecting this displays a list of the celebrity TV downloads for the week.

When 'Radio' is selected as the major heading, selecting this displays a list of the celebrity Radio downloads for the week.

When 'HDTV is selected as the major heading this is greyed out. An exit button is displayed to return to the guide view.

Where a programme is a series an icon is displayed, which when clicked on will show the list of episodes available. An exit button is displayed to return to the initial 'Celebrity Downloads' view.

Guide: We Recommend

When 'TV' is selected as the major heading and a programme is selected in the guide this will list the titles up to three recommended TV programmes. Selecting this will display in full the three recommendations which relate to this programme.

When 'Radio' is selected as the major heading and a programme is selected in the guide this will list the titles up to three recommended Radio programmes. Selecting this will display in full the three recommendations which relate to this programme.

When 'HDTV is selected as the major heading this will be greyed out.

An exit button will be displayed to return to the guide view.

Search

This will have a single search box and 'Go' button. Programme Title, Synopsis and subtitles will be searched. The search results should be weighted in priority of Title, Synopsis and subtitles.

Your Programmes

Alternate views of downloaded programme files are available—with or without thumbnails. The "Your programmes" area is structured in the following way:

Play Now

This displays the programmes that have been downloaded. It is divided in to the following sections:

TV—This shows only the PC version of the TV Programme

Radio—This shows only Radio Programmes

Mobile—This shows mobile versions of the TV programmes and Radio programmes

HDTV—This shows only HDTV programmes.

The "play now" section also shows the average User Rating (if over 5 people have rated the programme). The user is able to rate each programme. The user rating is captured and stored centrally. When the user is off-line they are also able to rate programmes, i.e. user ratings are stored on the client and synchronised with the server when they next connect.

Downloading

This displays the programmes that are currently downloading. It is divided in to the following sections:

TV—This shows only the PC version of the TV Programme

Radio—This shows only Radio Programmes

Mobile—This shows mobile versions of the TV programmes and Radio programmes

HDTV—This shows only HDTV programmes.

This section does not show User Rating

Users are able to 'pause' a download. The pause button allows the user to interrupt a download without cancelling it. A 'resume downloading' button restarts the download request from where it was stopped.

Booking

This displays the programmes that are currently downloading. It will be divided in to the following sections:

TV—This shows only the PC version of the TV Programme

Radio—This shows only Radio Programmes

Mobile—This shows mobile versions of the TV programmes and Radio programmes

HDTV—This shows only HDTV programmes.

This section does not show User Ratings.

Player

Full Screen Option

A button is provided to allow the video to go full screen and play outside of the application. This is also possible if the user double-clicks the video window but not necessarily obvious to users.

Continued Play

If the user plays a programme in the player then moves to another section of the application, the programme is paused at that point. When the user moves back to the player, the programme can be reactivated and then will continue to play from where it left off.

Radios programmes continue to play when the user moves to other sections of the application.

When the application is closed down while playing the programme is effectively paused at that point, and can then be reactivated when the application is re-launched.

Radio Still

Whilst playing a radio programme in the player, a graphical still appears in the player window. The graphic relates to the programme. If there is no graphic available for a particular programme, then a generic application graphic will be displayed.

Player Detection

The player automatically detects which version of Microsoft™ Windows™ Media Player is installed, which is used to handle playback of programmes. If the user does not have the correct version installed then they will be prompted to upgrade their player. This detection step is performed during the installation process.

Subtitles and Access Services

A large percentage of television programming carries subtitling. Thus, this system is adapted to provide subtitles as part of catch up TV.

Subtitles are presented in a separate area of the player, i.e. they are not embedded in the video. The subtitle text is controlled by the user. Thus, subtitles may be activated or deactivated and the font size of the subtitles may also be changed.

The subtitle text is generated from European Broadcast Union (EBU) files, which are then converted into SAMI files, a Windows™ Media format.

The subtitles are then applied to the encoded video.

Users can identify whether subtitle content is available via an additional symbol associated with the programme in the Guide (not shown), or via the further programme information shown when a particular programme is highlighted (see FIG. 60 for example).

Subtitling may have other applications for example Karaoke on top of the pops. The application also supports the use of audio descriptors.

The iMP client will be compatible will screen readers for the visually impaired.

Settings

There are three additional features in the Settings menu:

Changing Access Settings

The user can change their access settings at any time. However, the user is prompted for their password in order to change the settings.

Changing Login

If the user wants to change their login, they must enter their current email and password first. Then they can enter new login details. An email confirmation will be sent to the user.

Forgotten Password

If the user has forgotten their password then they can enter their email address and an email will be sent automatically to the user with their password.

Further Features

Maximise Button

In order to view the list of downloadable programmes more easily on a single screen it is possible for the user to maximise the application to fill the screen.

Guidance

Programmes that have guidance labelling will be accompanied by a Guidance Symbol (G). Clicking on the 'Guidance' symbol will launch a pop-up containing the relevant guidance text.

Any user will be able to download a programme with a guidance rating. However, users who have chosen to restrict access to content will be asked for their password when they try to play the programme.

The guidance tags are as follows.

Violence

V1—This programme contains some violent scenes
V2—This programme contains prolonged violent scenes
V3—This programme contains graphic violent scenes Language L1—This programme contains some strong language
L2—This programme contains strong language
L3—This programme contains very strong language Disturbing D1—This programme contains some scenes which some viewers may find upsetting
D2—This programme contains scenes which some viewers may find upsetting
D3—This programme contains scenes which some viewers may find disturbing Sex S1—This programme contains some scenes of a sexual nature
S2—This programme contains scenes of a sexual nature
S3—This programme contains explicit sexual scenes
RFI—This programme contains scenes of Repetitive Flashing Images (eg strobe lighting)

Message Board

A message board feature is provided which enables users to communicate with each other and discuss the system. This will be accessed from a website and will launch in a separate window, the user will be certified via their login. The message board is used as a method of monitoring user feedback and not as a support function.

Website Downloads

In addition to downloading programmes through the application it is also possible for users to download programmes through a website.

Email Downloads

Users may also receive email prompts to download content. The user is then able to download a programme from a 'download now' button within the email.

The selection of the download button launches the application in the download section of 'Your programmes.'

If the application is not installed then the user is presented with a message to say that they do not have the application installed.

Interoperability with Windows™ Media Player™ Library

Once files have been downloaded they will are registered with the Microsoft™ Windows™ Media Playerm Media Library. This enables the files to be visible in the Media Library™ in Microsoft™ Windows™ Media Player™. When files expire they are removed from the media library. This is important as the support for portable devices is also implemented through Windows™ Media Player™ and not directly through the application client.

Registration Process

Setting Up a Login

Each user will be required to set up a username and password during installation. Ideally an adult in the household will control access to programmes with guidance labelling.

The user chooses an email address as a username and creates a password of their choice. The user is also given the option of restricting access to content that carries a 'guidance' warning. The default will be 'no restrictions.'

The login can be changed at any time. The user is emailed a confirmation that contains the password.

This login details are used for the following:
1. Issuing a license for each programme requested
2. Controlling access to content with a guidance rating Changing a Login The login can be changed at any time from the 'Settings' menu. The user is required to enter their current login in order to change to another.

Forgotten Passwords

If the user forgets their current login they can request a reminder. The reminder is sent in an email to the login email address. This email will contain the password. Alternatively they can refer to their login confirmation email sent at the time of setup.

Storing User's Login

Login details are not stored locally, for example, they may be stored using the Kontiki™ servers.

Minimise Button

A minimise is provided next to the 'close' button on the top right corner of the application. When this button is pressed it will move the application down to the taskbar. Minimising the application also allows the user to continue listening to an audio file currently being played by the application.

Transfer to Portable Devices

The availability of portable devices which can play both audio and video content means that it is desirable to support the ability to transfer downloaded content from the application to such devices. In this case the DRM is managed and supported on the portable device. Such functionality requires lower bitrate versions of all video files for devices such as a smart phone (e.g. an Orange™ SPV C500), and a Potable Media Centre™ (PMC).

Peer-to-Peer Client

The peer-to-peer client is built using Kontiki™ to deliver the following:

Pull content scheduled or requested by the user.
Receive pushed content subscribed to by the server.
Providing and managing local storage for content.
As well as single file downloads, the client has the ability to segment downloads and draw content across the network over time (trickle download)—including pause and resume of downloads.
Operation in the background to take advantage of local computer downtime so as not to interfere with normal usage.

DRM Client

The DRM and licensing client is implemented using Windows™ Media 9 DRM and manages the following issues.

Supporting start and expiry dates
Supporting Number of plays
Portable device support
    Allow or disallow playing on a portable device such as a Smartphone or Portable Media Centre.
    Expiry date on portable device
    Number of plays on portable device Copy protection Revocation of licenses and clients Robust support for changing computer clocks (to prevent users from rolling time forward or back to play media)

Client for TV (Media Centre)

The client application as described above is essentially in the form of a stand-alone executable application which runs on a desktop PC with access to an open IP network. In another embodiment the application is able to execute within the Microsoftm Media Centre™. In particular, the application is suitable for running within MS Media Centre™ Edition 2005 and the MS Media Centre™ Extender™.

This embodiment is also suitable for running on a PVR (Personal Video Recorder), such as the Microsoft™ PVR, and a set top box.

In order to enable the application to run within such environments, the user interface for the application is slightly different from the embodiments described above. In particular, such environments use a remote control instead of a pointing device, such as a mouse. Nonetheless much of this embodiment functions in a similar fashion.

Figure 74:
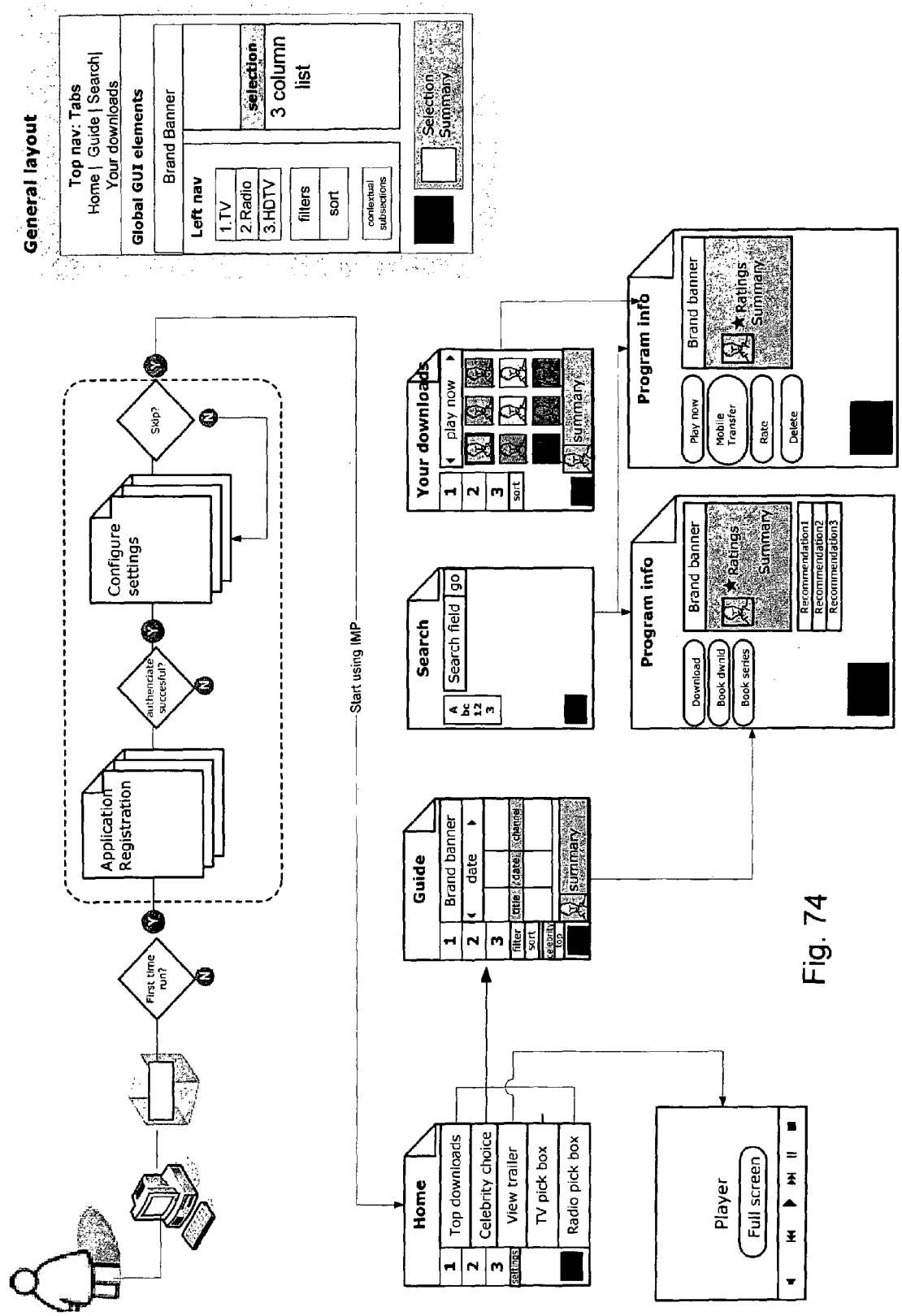
FIG. 74 shows an overall application architecture of another embodiment of the interactive media application program shown in FIGS. 22 and 53.
Figure 75:
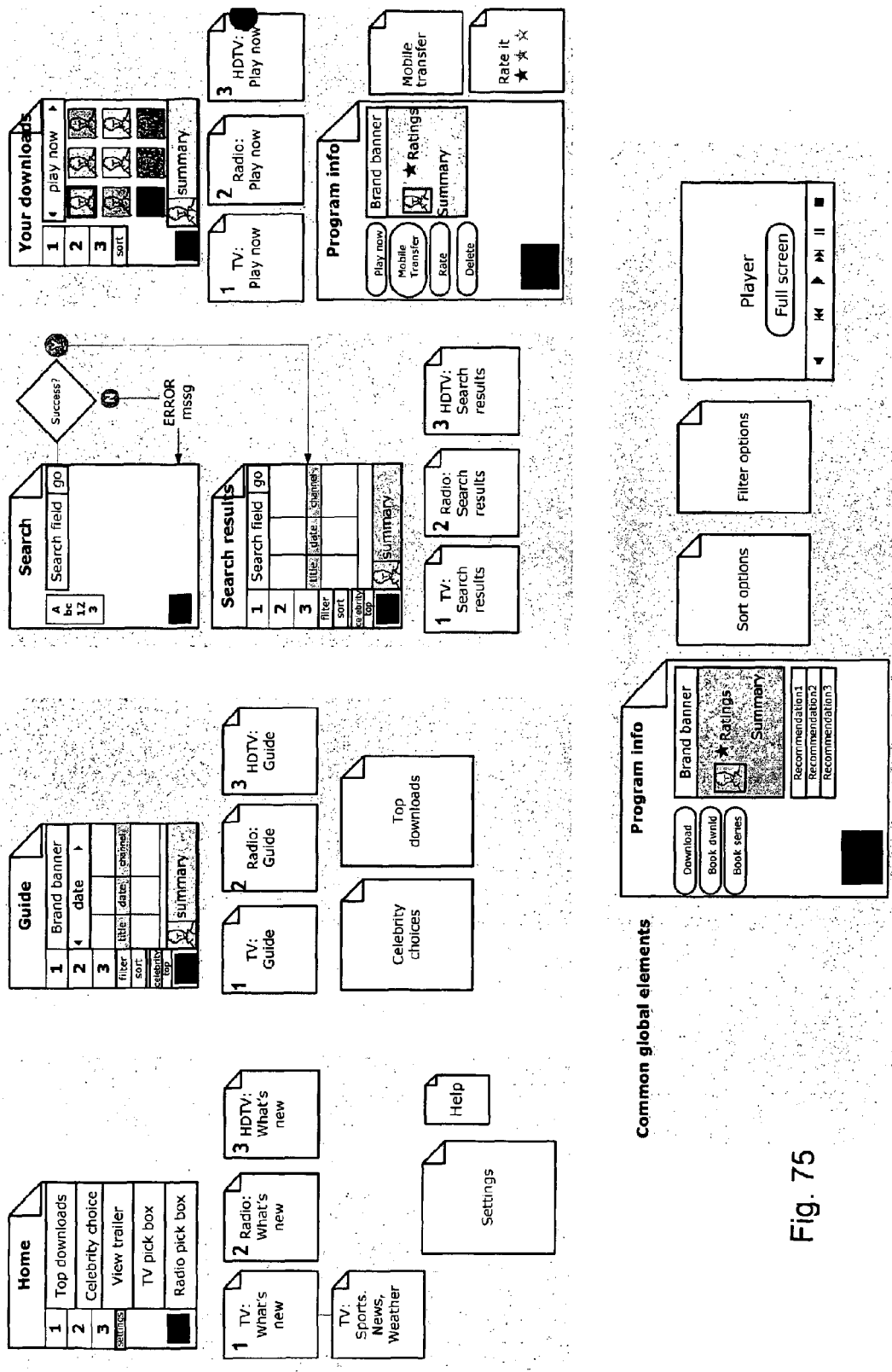
FIG. 75 shows a further details of the application architecture shown in FIG. 74.

As shown in FIGS. 74 and 75, the overall structure is fairly similar to the embodiments described above. However, the navigational structure is altered to enable a user to navigate using a remote control instead of a mouse.

Figure 76:
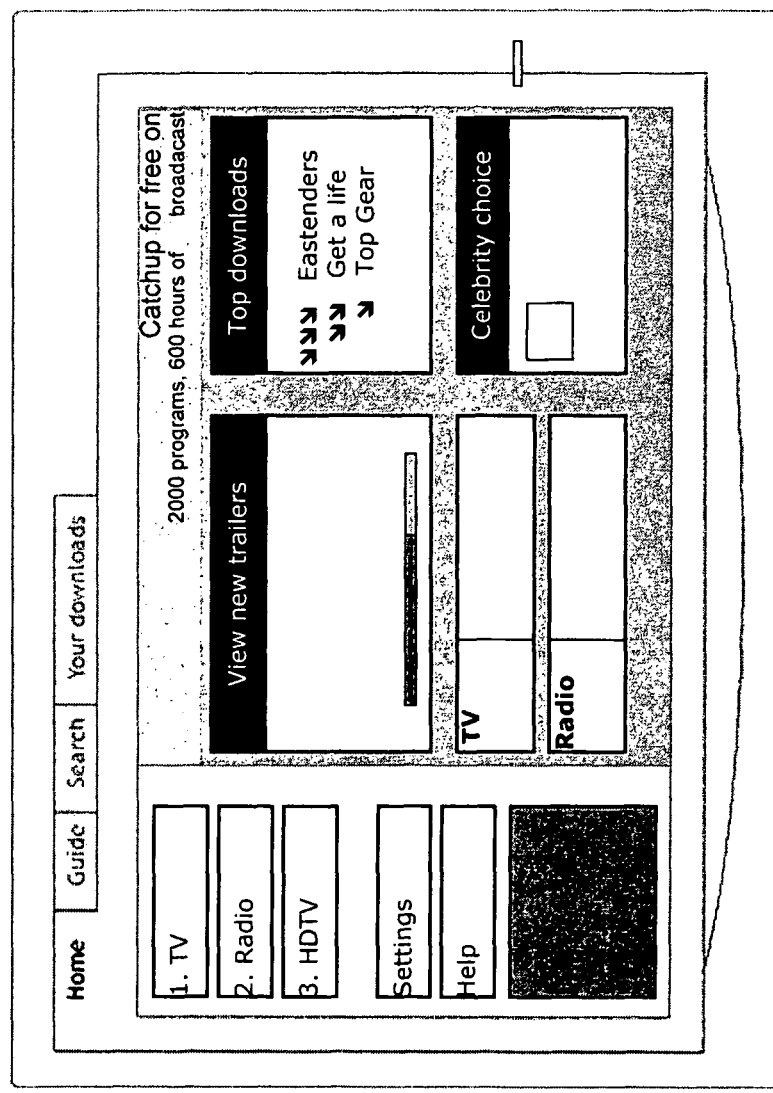
FIG. 76 shows a initial home screen.

The home screen is shown in FIG. 76, which is similar to the home screen shown in FIG. 59.

Figure 77:
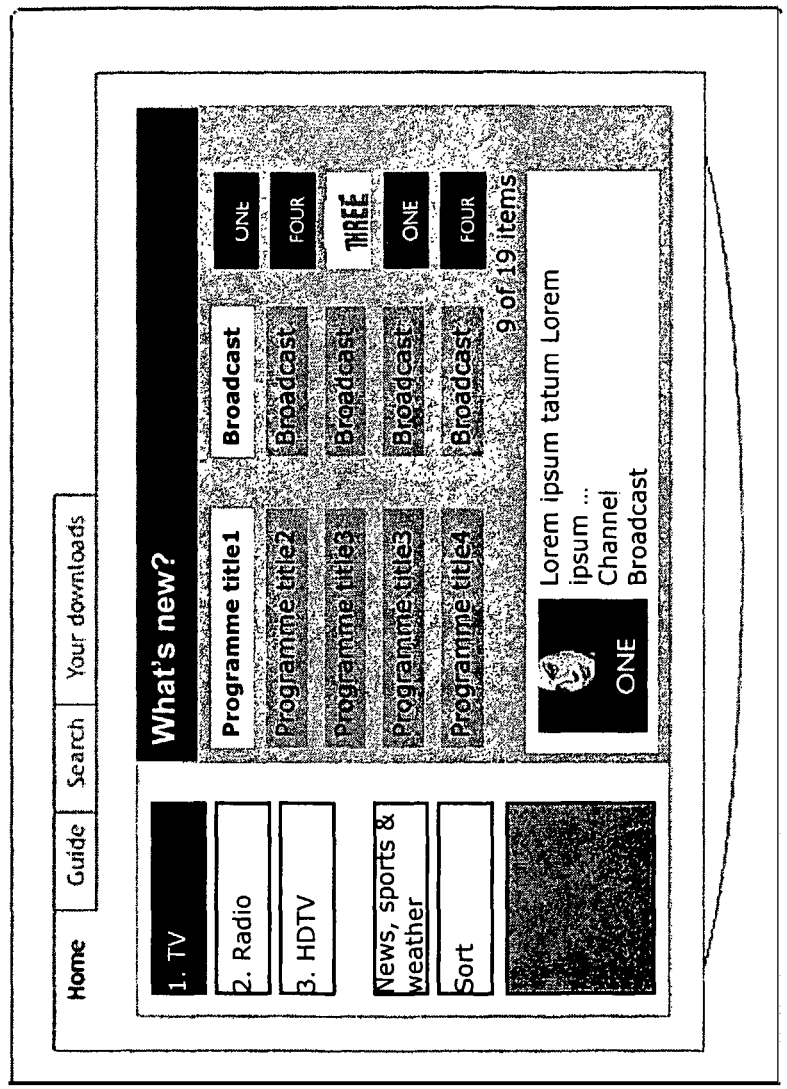
FIG. 77 shows a further view of the screen shown in FIG. 76.

As shown in FIG. 77, when a user highlights the TV button, a selection of programmes is displayed in a "What's New" area.

Figure 78:
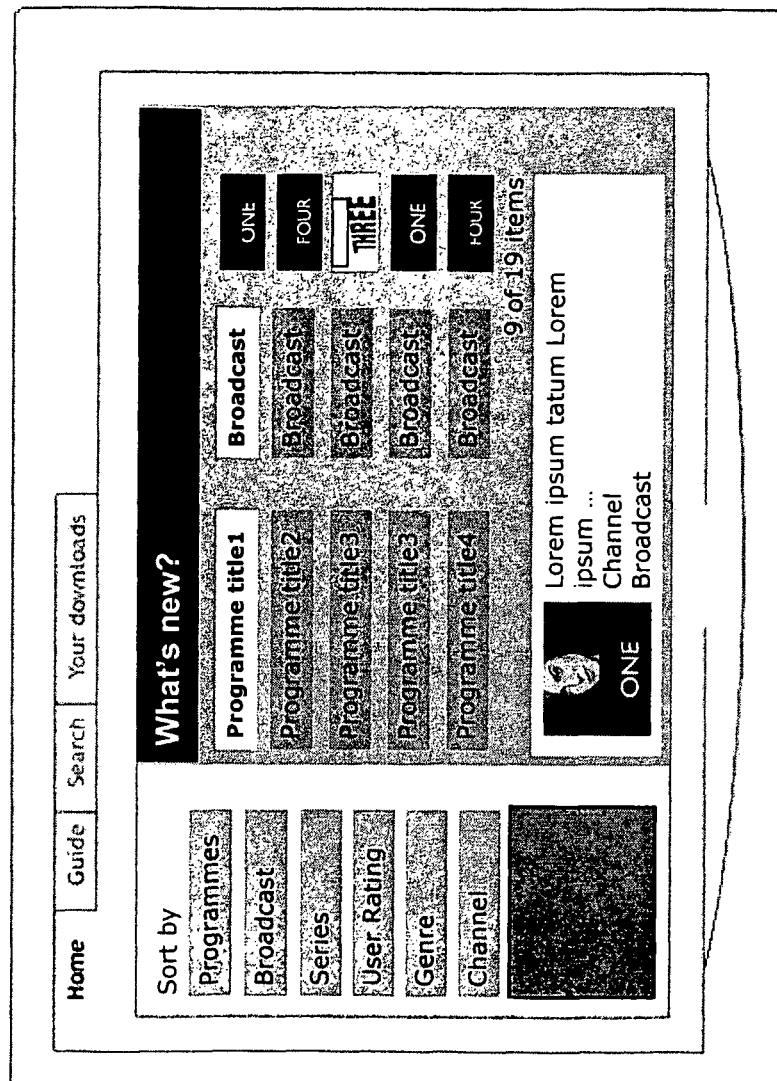
FIG. 78 shows a sort screen.

Once programmes are displayed on the screen a sort button is provided, which enables a user to sort programmes available for download (as shown in FIG. 78). Programmes are sortable according to programme, broadcast, series, user rating, genre and channel.

Figure 79:
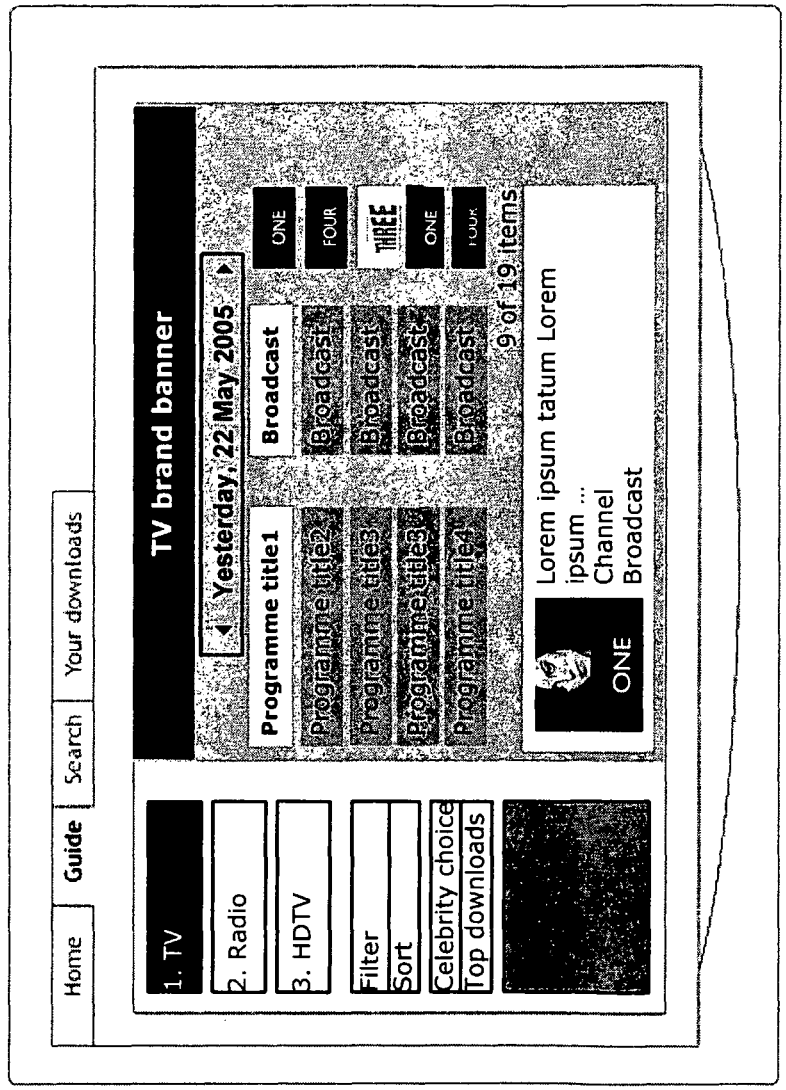
FIG. 79 shows a guide screen.

As shown in FIG. 79 it is also possible for a user to navigate through the guide one day at a time, thereby displaying all programmes available for download for a particular day.

Figure 80:
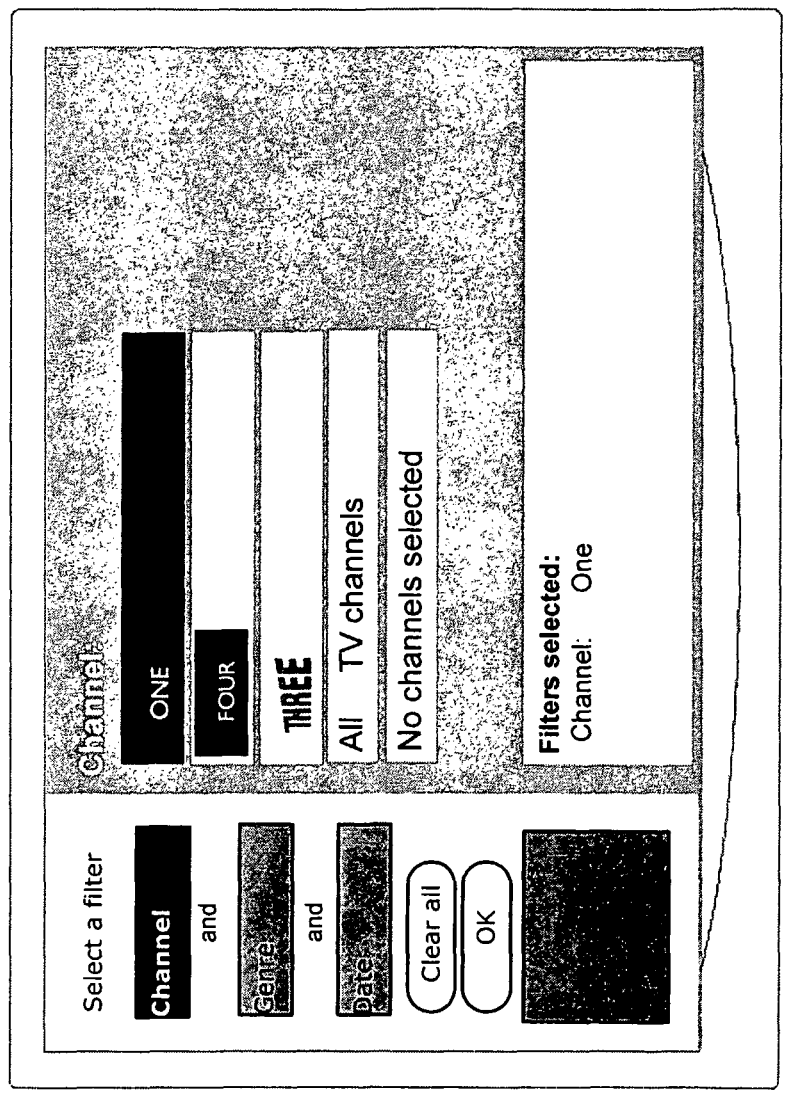
FIGS. 80, 81 and 82 show further views of the screen shown in FIG. 79.
Figure 81:
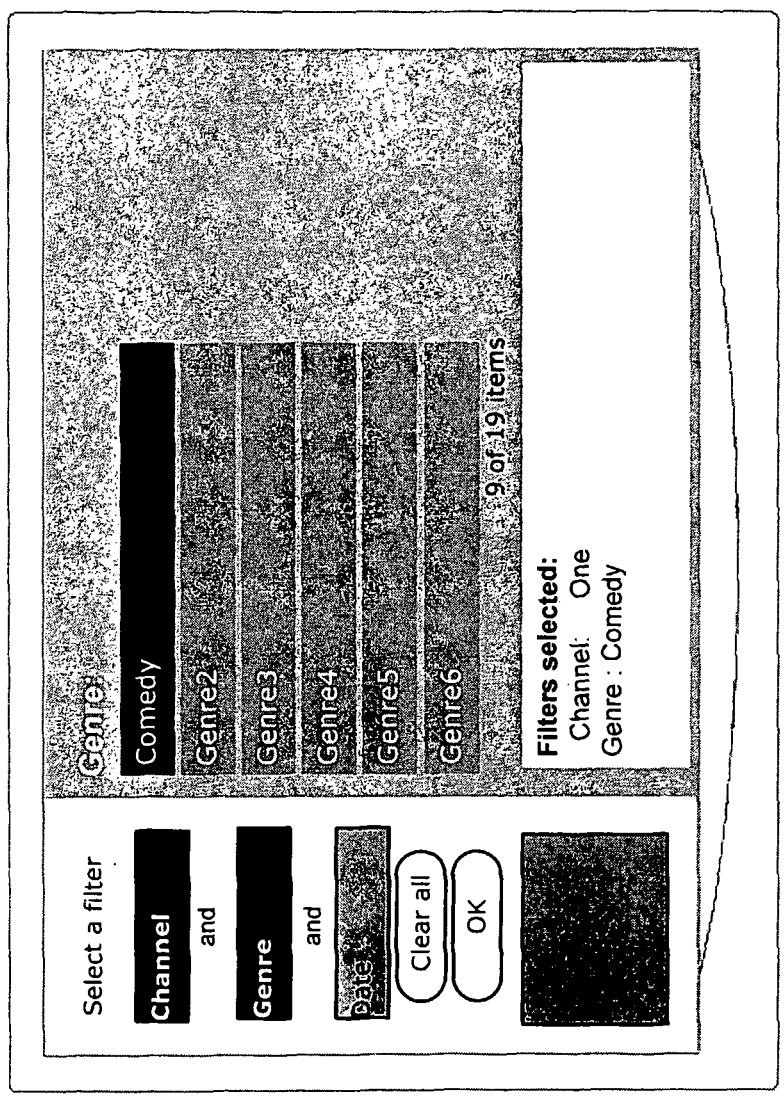
Figure 82:
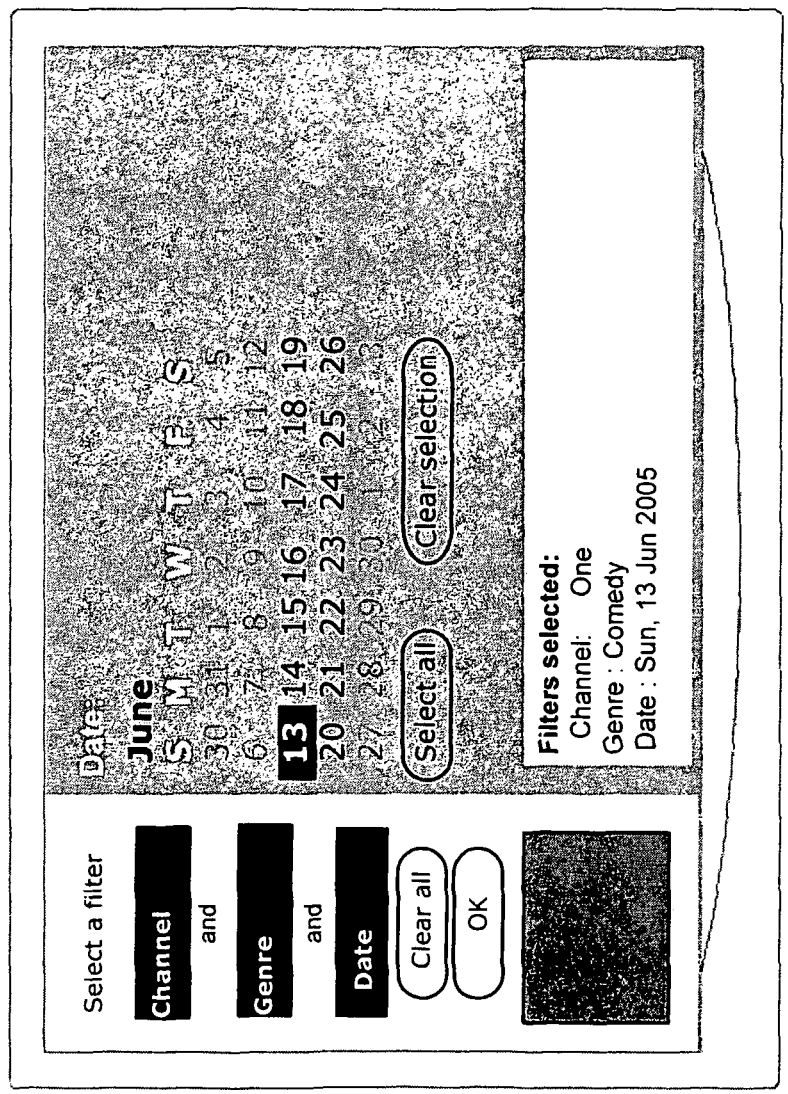

It is also possible to filter the programmes that will be displayed in the guide (as shown in FIGS. 80, 81 and 82) based on channel, genre and date.

In this case, the programmes are not sorted dynamically, as described above, rather a filer is first set-up and then an output is provided to the user indicating the programmes that comply with the overall filtering criteria set-up by the user.

It will be understood that the present invention has been described above purely by way of example, and modification of detail can be made within the scope of the invention.

Each feature disclosed in the description, and (where appropriate) the claims and drawings may be provided independently or in any appropriate combination.

The invention claimed is:

1. A system for providing user access to audio/visual content, the system comprising:
   a first subsystem that broadcasts the content to a plurality of users at a scheduled broadcast time via a broadcast channel; and
   a second subsystem that provides at a server, via a separate communications channel, user access to a downloadable file, in which the broadcasted content is stored;
   wherein the second subsystem comprises:
      a memory device that stores the broadcasted content;
      a processor that processes the broadcasted content at the server to produce the downloadable file in which the broadcasted content is stored, and restricts access to the broadcasted content by applying restricted access rights to the downloadable file;
      a client device that enables a user to download the downloadable file directly from the server, and
      a client device processor that enables the user to access the broadcasted content by opening and playing the downloaded file on the client device,
   wherein the restricted access rights applied to the downloaded file allows access to the broadcasted content in the downloaded file only within a fixed time period after the scheduled broadcast time of the content,
   wherein the client device processor enables the user to order the download of content, in advance of the scheduled broadcast time of the content, and within a fixed time period before the scheduled broadcast time of the content, and
   wherein the client device enables the user to download the downloadable file before the scheduled broadcast of the content, in response to an order placed in advance of the scheduled broadcast time, and the client device processor enables the user to open and play the file only once the content has been broadcast, and only after a delay after the content has been broadcast.

2. A system according to claim 1, wherein the client device processor is able to open and/or play the downloaded file only once the downloading of the file has been completed.

3. A system according to claim 1, wherein the client device is able to enable the user to download the content via a network.

4. A system according to claim 3, wherein the network comprises a wide area network.

5. A system according to claim 4, wherein the network comprises an open IP network.

6. A system according to claim 5, wherein the network comprises at least part of the internet.

7. A system according to claim 1, wherein the content is available for downloading in each of a plurality of different formats and/or in each of a plurality of different resolutions.

8. A system according to claim 7, wherein the client device processor is associated with a display or storage device, and the client device processor selects the format or resolution in which the content is downloaded in dependence upon the type of display or storage device.

9. A system according to claim 8, wherein the display or storage device comprises one of: a television, a portable computer, a desktop computer, a personal video recorder, a mobile phone, and a games console.

10. A system according to claim 1, wherein the audio/visual content is televisual content which has been broadcast to a plurality of users as a scheduled television broadcast, as a scheduled free-to-air television broadcast or as a scheduled webcast.

11. A system according to claim 1 wherein the audio/visual content comprises subtitles and/or audio description, and the client device processor displays the subtitles and/or plays the audio description in association with the viewing of the content, upon request of the user.

12. A system according to claim 1, wherein the client device processor is able to enable a user to order the download of a series of related content items.

13. A system according to claim 1, the memory device is able to store content in the form of downloaded files.

14. A system according to claim 1, wherein the processor is able to enable the downloadable file to be divided up into a number of parts, thereby enabling the file to be stored on one or more storage devices for subsequent downloading.

15. A system according to claim 14, wherein the client device is able to download the downloadable file in parts and to combine the parts once downloaded.

16. A system according to claim 15, wherein the client device is able to download the parts of the downloadable file out of order.

17. A system according to claim 1, wherein the memory device comprises a plurality of separate storage devices in different locations, and the client device is able to download the content from any of the storage devices.

18. A system according to claim 17, wherein the content stored in at least one of the storage devices is of broadcast quality and preferably originates directly from the same source as the content as broadcast.

19. A system according to claim 17, wherein the client device is able to download a part of the downloadable file from one of the storage devices and to download another part of the downloadable file from another of the storage devices.

20. A system according to claim 17, wherein at least one of the storage devices comprises a storage device associated with another user, and preferably comprises a hard disk drive of a personal computer associated with the another user.

21. A system according to claim 17, wherein the system is able to store and/or download content using Peer-to-Peer (P2P) technology.

22. A system according to claim 17, wherein the client device is able to select one or more of the storage devices from which to download a piece of content, in dependence upon at least one of bandwidth demands, content requirements, and the location of stored content.

23. A system according to claim 1, wherein the client device processor is able to monitor use of the system.

24. A system according to claim 1, further comprising a user interface, wherein the user interface can display a list of content which is available for download and/or content whose download has been ordered and/or content which has been downloaded.

25. A system according to claim 1, wherein the processor is able to prepare downloadable files in respect of content which may be downloaded.

26. A system according to claim 1, wherein the processor is adapted able to encode the content.

27. A system according to claim 1, wherein the client device processor is able to allow a user to replay the content for a certain period of time following the scheduled broadcast of the content, for between 2 and 15 days, or for between 5 and 10 days, or for 7 days, following the scheduled broadcast of the content.

28. A system according to claim 1, wherein the client device processor is able to allow a user to replay the content a fixed number of times following the download of the content.

29. A system according to claim 1, wherein the processor is able to encrypt the content.

30. A system according to claim 29, wherein the processor uses Digital Rights Management (DRM) technology.

31. A system according to claim 29, wherein the processor is able to wrap the downloadable file in a digital rights management package.

32. A system according to claim 1, wherein the processor creates a key for providing access to the downloadable file.

33. A system according to claim 32, wherein the key is able to provide access to the downloadable file in accordance with the access rights associated with the downloadable file.

34. A system according to claim 32, wherein the downloaded file and the key are stored locally by the user.

35. A system according to claim 1, wherein the client device processor is able to obtain a key for providing access to the downloaded file.

36. A method for providing user access to audio/visual content, the method comprising:
broadcasting the content to a plurality of users at a scheduled broadcast time via a broadcast channel; and
providing at a server, via a separate communications channel, user access to a downloadable file in which the broadcasted content is stored;
wherein separately providing user access to the downloadable file in which the broadcasted content is stored comprises:
storing the content;
processing the content, at the server, to produce a downloadable file in which the broadcasted content is stored;
restricting access to the content by applying restricted access rights to the downloadable file;
enabling a user to download the downloadable file directly from the server to a client device;
enabling the user to access the broadcasted content by opening and playing the downloaded file on the client device, wherein the restricted access rights applied to the downloaded file allows access to the broadcasted content in the downloaded file only within a fixed time period after the scheduled broadcast time of the content;
enabling the user to order the download of content, in advance of the scheduled broadcast time of the content, and within a fixed time period before the scheduled broadcast time of the content, and
enabling the user to download the downloadable file before the scheduled broadcast of the content, in response to an order placed in advance of the scheduled broadcast time, enabling the user to open and play the file only once the content has been broadcast, and only after a delay after the content has been broadcast.

37. A computer program product comprising program instructions stored on a non-transitory computer-readable medium, which when executed carry out the method of claim 36.

* * * * *